US007472439B2

(12) United States Patent
Lemire et al.

(10) Patent No.: US 7,472,439 B2
(45) Date of Patent: Jan. 6, 2009

(54) HOSPITAL PATIENT SUPPORT

(75) Inventors: Guy Lemire, Beaumont (CA); Jean-Paul Dionne, Levis (CA); Nadine Trepanier, Charlesbourg (CA); Luc Landry, La Pocatiere (CA); Nicolas Cantin, Levis (CA); Marco Morin, Levis (CA)

(73) Assignee: Stryker Canadian Management, Inc., Quebec (CA)

( * ) Notice: Subject to any disclaimer, the term of this patent is extended or adjusted under 35 U.S.C. 154(b) by 53 days.

(21) Appl. No.: 11/362,543

(22) Filed: Feb. 23, 2006

(65) Prior Publication Data

US 2006/0277683 A1 Dec. 14, 2006

Related U.S. Application Data

(60) Provisional application No. 60/655,730, filed on Feb. 23, 2005, provisional application No. 60/655,738, filed on Feb. 23, 2005.

(51) Int. Cl.
*A61G 7/002* (2006.01)
*G01G 19/52* (2006.01)

(52) U.S. Cl. .......................................... 5/607; 177/144

(58) Field of Classification Search ............. 5/607–610; 177/144, 245

See application file for complete search history.

(56) References Cited

U.S. PATENT DOCUMENTS 3,686,696 A 8/1972 Lanigan
4,038,709 A 8/1977 Kerwit
4,669,136 A * 6/1987 Waters et al. .................. 5/601
4,869,266 A * 9/1989 Taylor et al. ................ 600/587
4,961,470 A * 10/1990 Koerber, Sr. ................ 177/144
5,077,843 A * 1/1992 Dale et al. ..................... 5/600
5,611,096 A 3/1997 Bartlett et al.
5,715,548 A * 2/1998 Weismiller et al. ............. 5/624
5,780,781 A * 7/1998 Berger et al. ................ 177/126

(Continued)

FOREIGN PATENT DOCUMENTS

WO WO 03/079953 10/2003

(Continued)

*Primary Examiner*—Randy W Gibson
(74) *Attorney, Agent, or Firm*—Van Dyke, Gardner, Linn & Burkhart, LLP

(57) ABSTRACT

The patient support with a head end and a foot end comprises a lying surface supported by a frame system. It also comprises a pair of head end siderails, a pair of foot end siderails, a headboard, a footboard, a power system and a communication system. The frame system comprises a lying surface support moveably connected to a load frame by an articulation system providing means for pivoting sections of the lying surface support relative to the load frame, a head end support arm pivotally attached to the head end of the load frame, a mobile frame translationally attached to foot end of the load frame, an intermediate frame being operationally connected to the load frame by a plurality of load cells and movably connected to a base frame by an elevation system, the elevation system providing a means for raising and lowering the intermediate frame relative to a base frame, the base frame being supported on the floor by a plurality of caster wheels, including a drive wheel operatively connected to assist in movement of the patient support. A communication system is also provided to communicate with and control various functions of the patient support.

21 Claims, 100 Drawing Sheets

U.S. PATENT DOCUMENTS

| | | | | |
|---|---|---|---|---|
| 6,240,579 | B1 | 6/2001 | Hanson et al. | |
| 6,256,812 | B1 | 7/2001 | Bartow et al. | |
| 6,438,776 | B2 | 8/2002 | Ferrand et al. | |
| 6,576,849 | B2 * | 6/2003 | Bliss et al. | 177/25.13 |
| 6,822,571 | B2 | 11/2004 | Conway | |
| 7,296,312 | B2 * | 11/2007 | Menkedick et al. | 5/611 |
| 2007/0157385 | A1 * | 7/2007 | Lemire et al. | 5/600 |
| 2007/0163043 | A1 * | 7/2007 | Lemire et al. | 5/600 |
| 2007/0169268 | A1 * | 7/2007 | Lemire et al. | 5/617 |
| 2007/0174964 | A1 * | 8/2007 | Lemire et al. | 5/600 |
| 2007/0174965 | A1 * | 8/2007 | Lemire et al. | 5/600 |

FOREIGN PATENT DOCUMENTS

| | | |
|---|---|---|
| WO | WO 2004/082549 | 9/2004 |

* cited by examiner

700

A

B

A

B

B

A

A

B

HOSPITAL PATIENT SUPPORT

FIELD OF THE INVENTION

This invention relates generally to a hospital patient support and, more particularly, to improvements to the structure, functionality and maintenance of the patient support.

BACKGROUND

Typical hospital patient supports are subjected to daily use by various hospital personnel and patients. Patients, medical professionals, maintenance staff and others operate and move patient supports according to the various requirements such as patient needs, and stresses which require sturdy components and reliable measurements.

The headboard needs to be moved or removed often for various tasks and in emergency situations. A removable headboard must be lightweight and sturdy so as to facilitate easy removal and replacement by the user. There is a need for a light, sturdy headboard which is easy to use and cost-effective to produce.

The footboard often is also used to hang other equipment on the top rail or with another device which is attached to and hangs from the footboard. The placement of such equipment can obscure a reading area or control panel located on the footboard. Furthermore, such equipment may fall off the headboard or other device, thereby resulting in damage. There is a need for an integral equipment holder within a footboard to accommodate the requirement to hang equipment but without compromising access to a control panel on the footboard or risking damage to the equipment.

The change in a patient's weight is recorded by medical professionals for various reasons at different times during a hospital stay. Scales are incorporated in patient supports which can weigh a load such as the patient. When load cells are used in the patient support, the load readings in a horizontal patient support are not the same as those in an articulated patient support. The location of a patient's centre of gravity has been further used in a patient detection system, such as the system described in U.S. Pat. No. 6,822,571 (the '571 patent) which issued to Conway on Nov. 23, 2004. In order to obtain an accurate weight measurement, patients who are in an articulated patient support often have to be repositioned to the horizontal, which is inconvenient and disruptive. There is a need to measure and a patient's weight on a patient support independent of the patient support's angular position.

Hospital patient supports currently are equipped with a number of complex mechanical and electrical subsystems that provide various functions such as positioning, weight monitoring, and other functions related to the patient's care. Despite their inherent complexity, these systems need to be easy to operate by the user. The ease of use and operation is of critical importance, particularly in emergency situations. Due to the complexity and required minimal downtime for these patient supports, the status of such systems needs to be constantly monitored, which currently is performed by technicians in order to ensure the desired functionality of the patient support is maintained. This form of monitoring and potentially diagnosis of problems with a patient support can be both time consuming and costly.

Early designs of adjustable patient supports often employed the concept of a hand crank and gearing to adjust the height of a patient support. Such manual systems suffer from the need for considerable physical effort to adjust the patient support height. Other designs include elevation systems incorporating mechanical jacks using hydraulic piston cylinders or screw drives to adjust the height of the hospital patient support. Such hydraulic systems are known to be relatively expensive and prone to leakage. Additionally, prior mechanical systems suffer from excessive complexity, excessive size, a lack of load capacity, and manufacturing difficulties.

Hospital patient support siderails of the prior art comprise support arms, which form undesirable pinch points for users. The movement of such siderails from the deployed to the stowed positions is often hampered by siderail oscillations. The siderail falls due to gravity and the movement can jar the patient support and disturb patients.

In addition, the patient support apparatus of the prior art relies on batteries to provide all power to the patient support's electronic systems. When the battery power runs out, the battery itself must be recharged before power can be supplied to the electronics. This is problematic in circumstances where the life of the battery itself has run out or in settings where a suitable power supply to recharge the battery is not available.

Currently, nurses and other hospital staff hang pumps (or other hospital equipment) on the top edge of the footboards of hospital patient supports. Since footboards were not designed to support the hanging of pumps (or other hospital equipment), this current footboards, generates patient support motions and causes damage to pumps (and other equipment) that fall from its hangers.

Ordinarily, there is a tendency for detached headboards or footboards placed in an upright position against an object or structure to slip, thereby causing the headboard or footboard to fall and potentially suffer damage. This is a particularly acute concern in the situation of a medical emergency during which headboards and footboards may need to be removed and set aside in haste. In a busy hospital, a discarded headboard or footboard that has fallen to the floor creates a tripping hazard to both staff, who may be carrying equipment or medication and thus have an obstructed view of the floor, and patients, who may have compromised mobility owing to illness. Preventing slippage, therefore, reduces the likelihood of personal injury stemming from hastily removed headboards and footboards.

Therefore there is a need for a control and diagnostic system for integration into a multifunctional patient support that can overcome the identified problems in the prior art and provide the desired functionality with a reduced level of human interaction.

SUMMARY OF THE INVENTION

A patient support according to the present disclosure is shown in FIG. 1. The patient support with a head end and a foot end comprises a lying surface supported by a frame system. It also comprises a pair of head end siderails, a pair of foot end siderails, a headboard, a footboard, a power system and a communication system. The frame system comprises a lying surface support moveably connected to a load frame by an articulation system providing means for pivoting sections of the lying surface support relative to the load frame, a head end support arm pivotally attached to the head end of the load frame, a mobile frame translationally attached to foot end of the load frame, an intermediate frame being operationally connected to the load frame by a plurality of load cells and movably connected to a base frame by an elevation system, the elevation system providing a means for raising and lowering the intermediate frame relative to a base frame, the base frame being supported on the floor by a plurality of caster wheels, including a drive wheel operatively connected to assist in movement of the patient support.

Head end siderails are coupled to the head section of the lying surface support and may be moved between raised and lowered positions. Foot end siderails are coupled to the load frame and may also be moved between raised and lowered positions. The headboard is removably connected to the load frame and the footboard is connected to the mobile frame.

A communication system is provided to communicate with and control various functions of the patient support. Communication system and the remainder of patient support are powered by an AC source or a battery source (supported by the frame system).

In one aspect the communication system operates and monitors a plurality of linear actuators within the articulation system to extend and retract adjustable leg length section, to rotate sections of the lying surface support relative to the load frame, and within the elevation system to move the intermediate frame relative to the base frame.

In another aspect the communication system comprises a control system adapted for controlling functionality one or more load cells and one or more tilt sensors. The load sensors are operatively connected to the load frame, the intermediate frame and electrically connected to a control unit that is configured to receive signals from the load sensors, said signals relating to the weight of the patient. The tilt sensors are operatively connected to the lying support frame and are connected to the control unit that is configured to receive data from the tilt sensors, said data representative of frame tilt. The control unit correlates the signals and data thereby providing a means for determining patient characteristics.

Another aspect of the communication system is to provide a diagnostic and control system for a patent support, having integrated therein one or more electronically controlled devices for providing one or more functions to the patient support, the system comprising: a control subsystem electronically coupled to one or more electronically controlled devices for transmission of data therebetween, the control system for controlling the functionality of the one or more electronically controlled devices, the control system collecting information relating to operational conditions representative of the one or more electronically controlled devices; and a diagnostic subsystem electronically coupled to the control subsystem for transmission of data therebetween, the control subsystem activating the diagnostic subsystem upon detection of an operational fault relating to the one or more electronically controlled devices, said diagnostic subsystem for receiving information from the control subsystem and analysing said information using one or more evaluation routines for the determination of a potential source of the operational fault.

BRIEF DESCRIPTION OF THE DRAWINGS

This invention is described with particularity in the accompanying claims. The further features and benefits of this invention are better understood by reference to the following detailed description, as well as by reference to the following drawings.

DETAILED DESCRIPTION

The term, patient, includes any person being supported by the patient support, and is not restricted to patients in a hospital, but rather could mean any person laying on the patient support.

Figure 1:
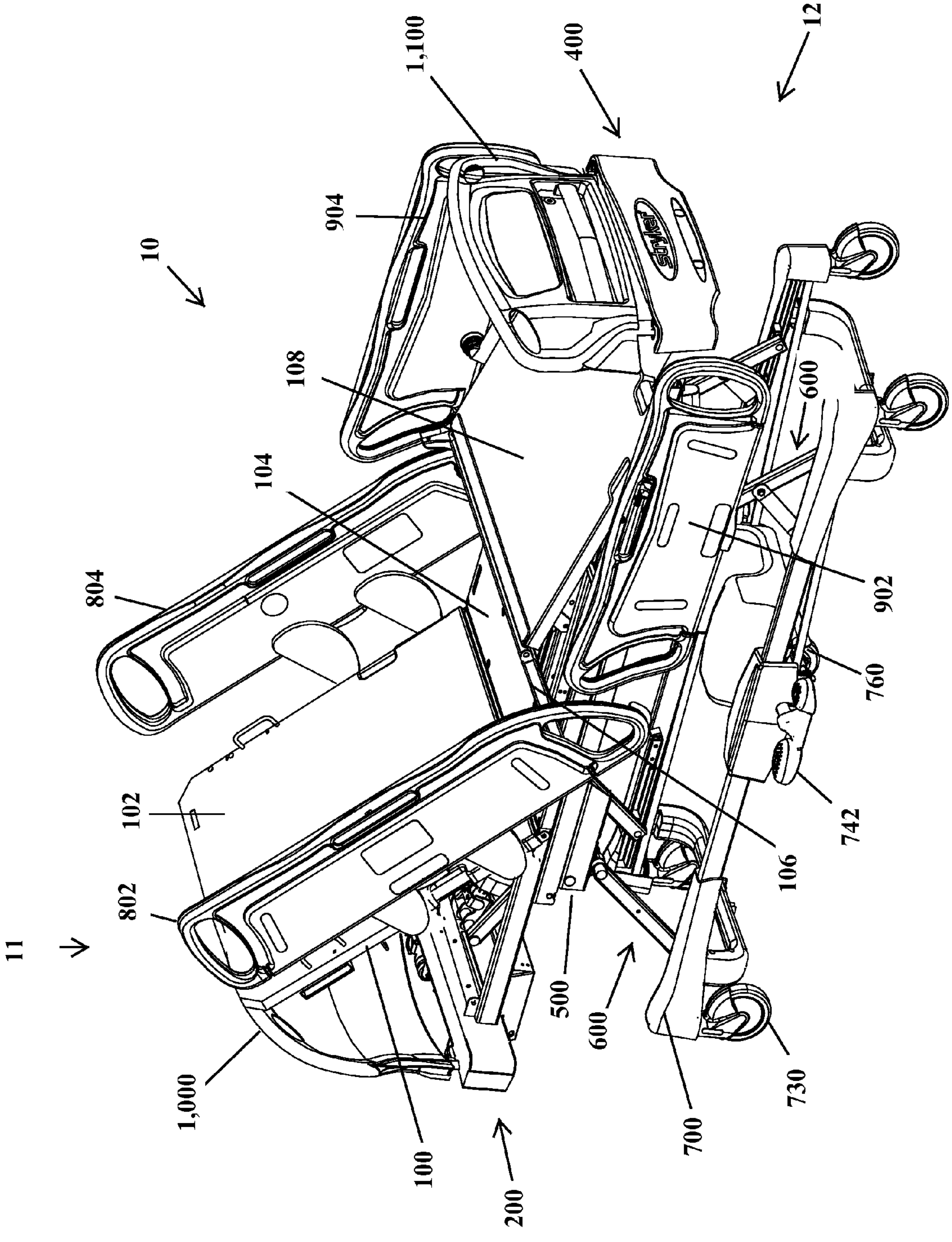
FIG. 1 illustrates a perspective view of a patient support according to an embodiment of the present invention.

A patient support according to the present disclosure is shown in FIG. 1. The patient support with a head end and a foot end comprises a lying surface supported by a frame system. It also comprises a pair of head end siderails, a pair of foot end siderails, a headboard, a footboard, a power system and a communication system. The frame system comprises a lying surface support moveably connected to a load frame by an articulation system providing means for pivoting sections of the lying surface support relative to the load frame, a head end support arm pivotally attached to the head end of the load frame, a mobile frame translationally attached to foot end of the load frame, an intermediate frame being operationally connected to the load frame by a plurality of load cells and movably connected to a base frame by an elevation system, the elevation system providing a means for raising and lowering the intermediate frame relative to a base frame, the base frame being supported on the floor by a plurality of caster wheels, including a drive wheel operatively connected to assist in movement of the patient support.

Head end siderails are coupled to the head section of the lying surface support and may be moved between raised and lowered positions. Foot end siderails are coupled to the load frame and may also be moved between raised and lowered positions. The headboard is removably connected to the load frame and the footboard is connected to the mobile frame.

A communication system is provided to communicate with and control various functions of the patient support. Communication system and the remainder of patient support are powered by an AC source or a battery source (supported by the frame system).

The Lying Surface

The patient support, with a head end and a foot end includes a lying surface supported by a frame system. A patient is supported on a lying surface, which can be referred to as a lying surface, a support surface, a lying surface, a patient surface, etc. For the purpose of this invention, these terms are used interchangeably to indicate the article upon which the patient lies, which is generally cushioned for patient comfort. The article may be cushioned with foam, air, springs, etc. In one embodiment of this invention, the lying surface is a mattress, such as found in a hospital setting. For ease of discussion, the term lying surface is used throughout, although another type of article defining a lying surface may be used.

The Frame System

The frame system includes a lying surface support moveably connected to a load frame by an articulation system providing means for pivoting sections of the lying surface support relative to the load frame, a head end support arm pivotally attached to the head end of the load frame, a mobile frame translationally attached to foot end of the load frame, an intermediate frame being operationally connected to the load frame by a plurality of load cells and movably connected to a base frame by an elevation system, the elevation system providing a means for raising and lowering the intermediate frame relative to a base frame, the base frame being supported on the floor by a plurality of caster wheels, including a drive wheel operatively connected to assist in movement of the patient support.

The Lying Surface Support

The lying surface 20 (FIG. 2) rests on a lying surface support 100. FIGS. 3 to 11 illustrate embodiments of the lying surface support 100 according to the present invention. As can be easily appreciated from FIGS. 3 to 7, lying surface support 100 can comprise several sections, such as a head section 102, a seat section 104, a thigh section 106 and a foot section 108. These sections are named after the body part of a patient lying on a lying surface 20 during normal use of the patient support 10. It would be understood by a worker skilled in the art that the lying surface support 100 could be comprise of more or fewer sections without departing from the scope of the present invention. The connection between sections of lying surface support 100 are hinged in order to allow lying surface support 100 to be pivotally articulated and accommodate different positioning needs of the patient of for treatment. Articulating means 120 (FIGS. 6 and 7) are provided for the pivotal articulation of lying surface support 100. Some sections of the lying surface support 100 are operatively connected to an articulation system 300, which will be discussed below. A lying surface retainer 180 (FIGS. 7, 9 to 11) is provided on the foot section 108 of the lying surface support 100 to prevent the longitudinal movement of the lying surface 20 in relation to the patient support 10. According to one embodiment of the present invention, ancillary lying surface retainers 182 (FIGS. 6 and 7) are also provided prevent the lateral movement of the lying surface 20 in relation to the patient support 10.

Figure 37A:
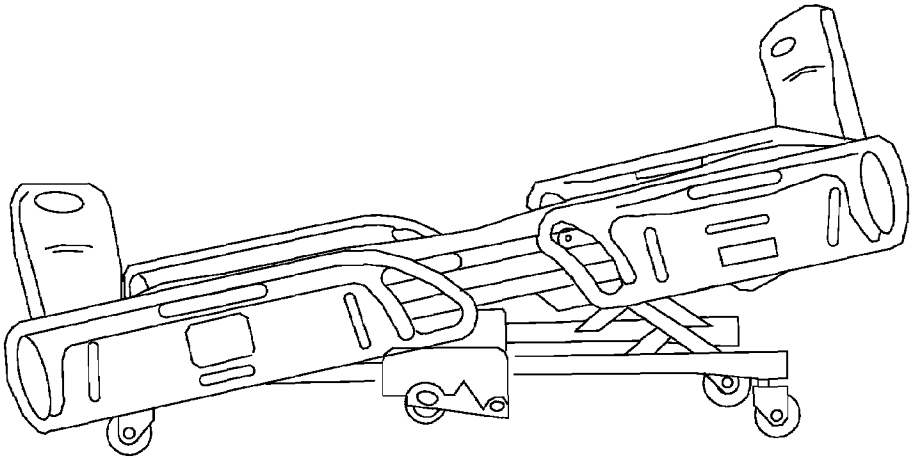
FIGS. 37A and 37B show a side view of a support system according to one embodiment of the present invention in a Trendelenburg position and in a reverse Trendelenburg position respectively.
Figure 37B:
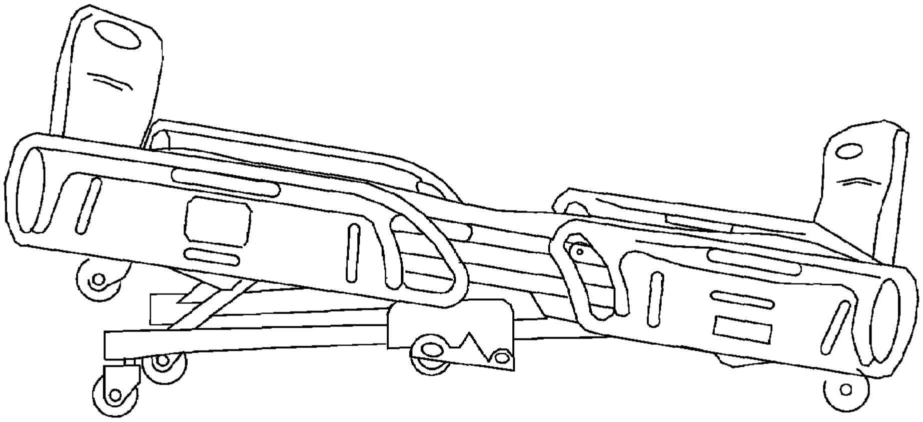
Figure 38:
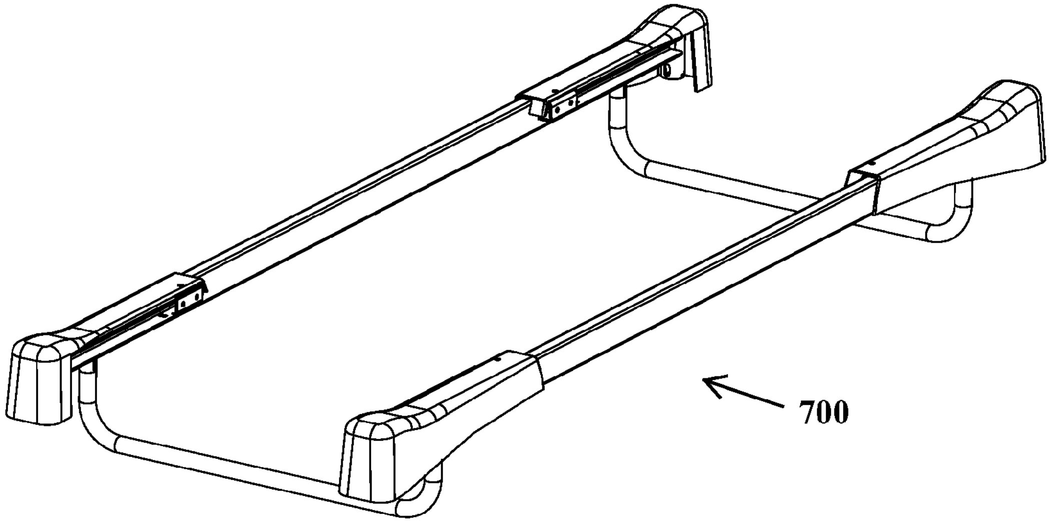
FIG. 38 is a perspective view of a base frame according to one embodiment of the present invention.
Figure 39:
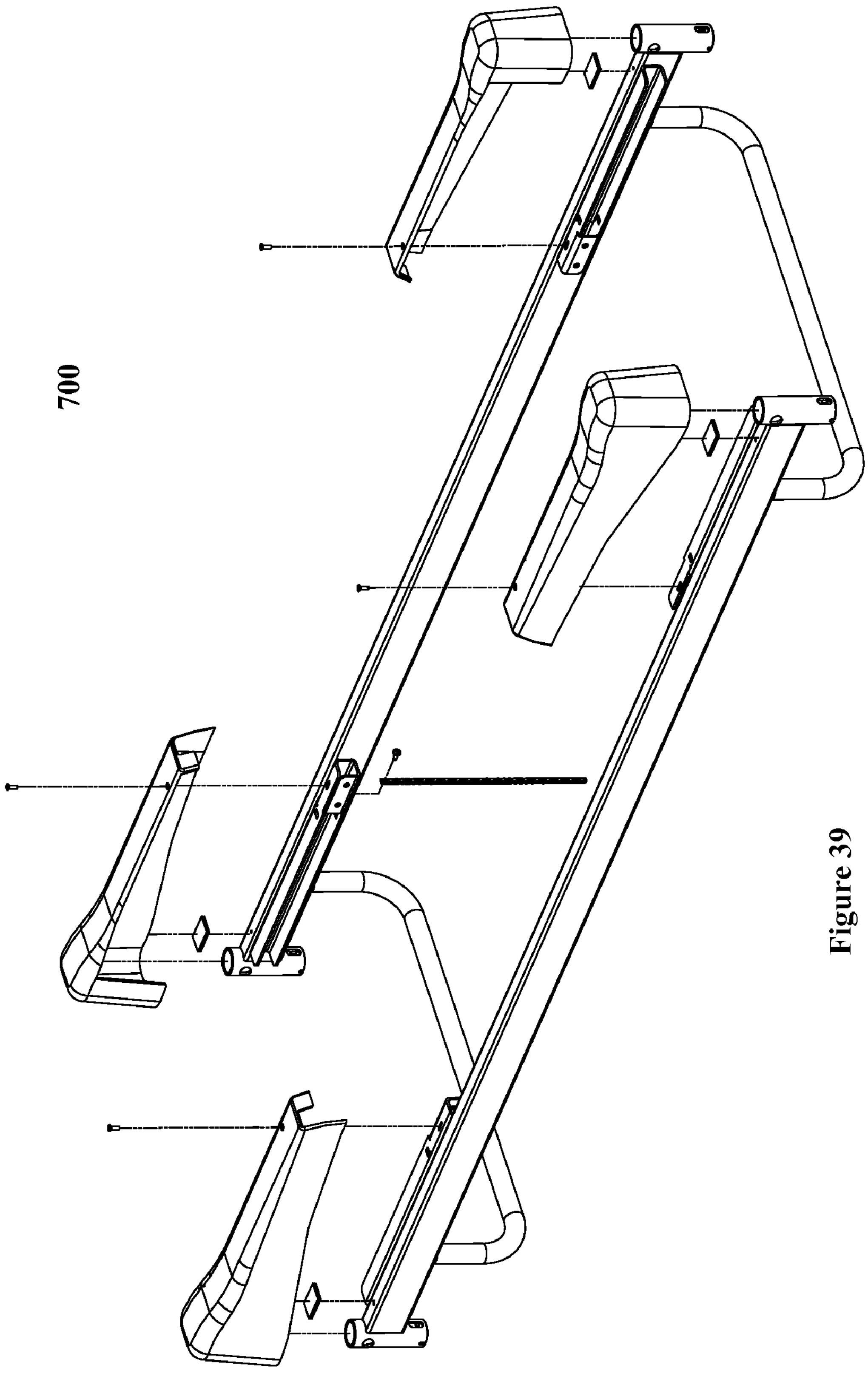
FIG. 39 is an exploded perspective view of a base frame according to one embodiment of the present invention.
Figure 40:
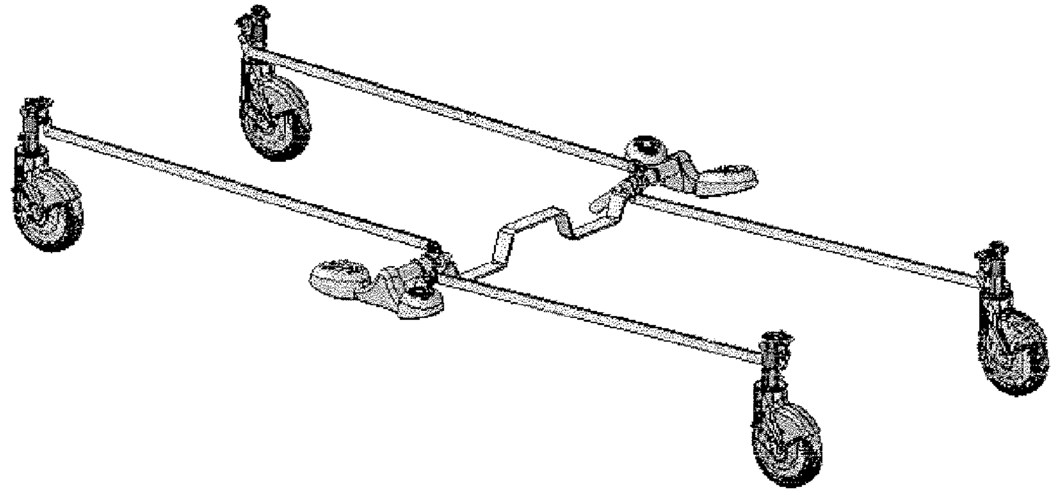
FIG. 40 is a perspective view of caster wheels and a braking system according to one embodiment of the present invention.
Figure 41:
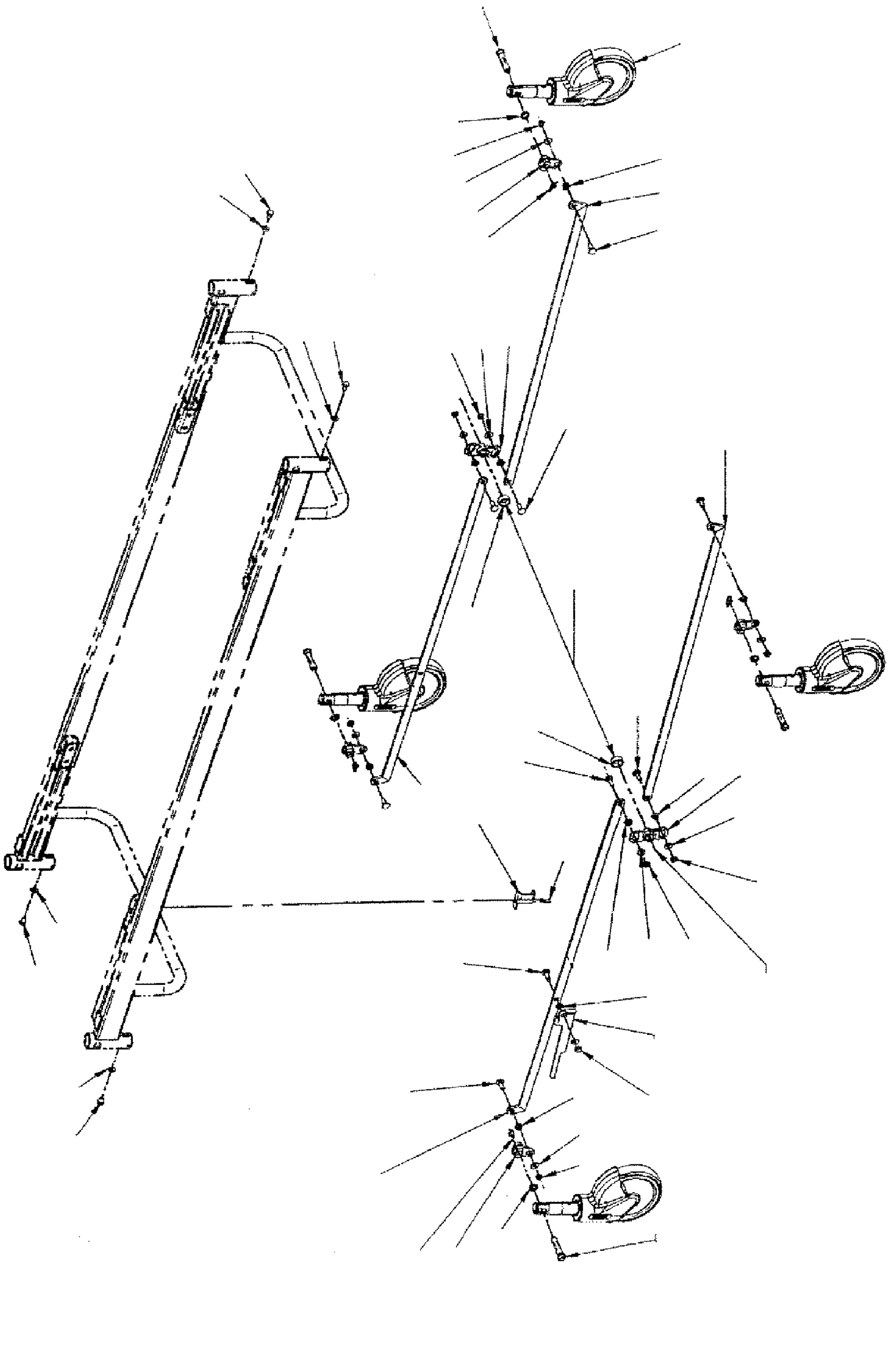
FIG. 41 is an exploded perspective view of caster wheels and a braking system according to one embodiment of the present invention.
Figure 42:
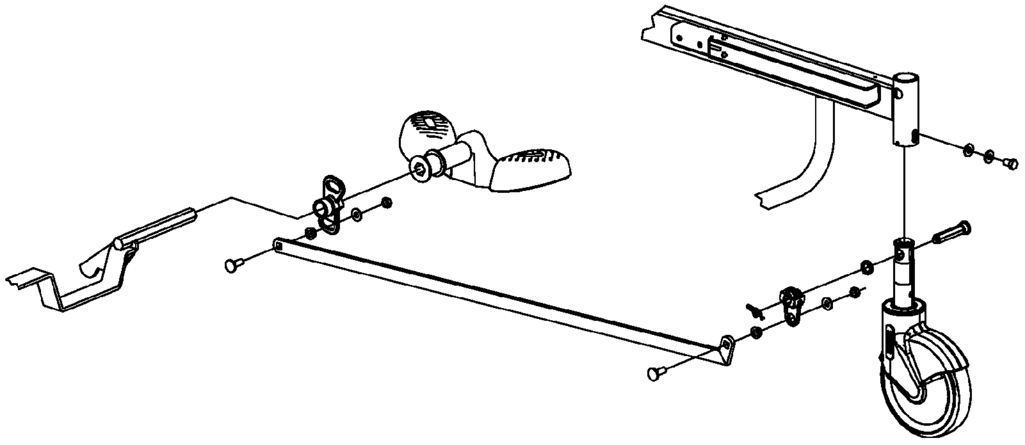
FIG. 42 is an exploded perspective view of a breaking pedal and castor wheel according to one embodiment of the present invention.
Figure 43:
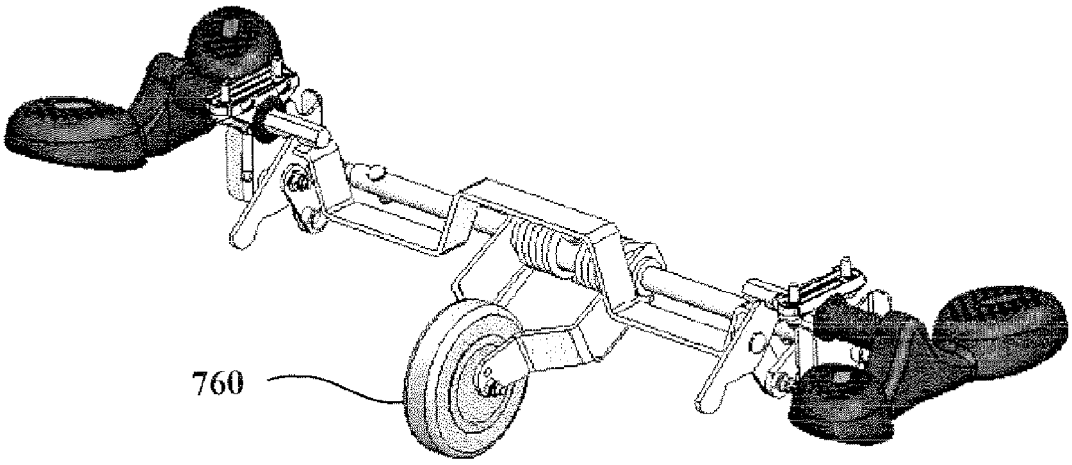
FIG. 43 is a perspective view of a drive wheel mechanism according to one embodiment of the present invention.
Figure 44:
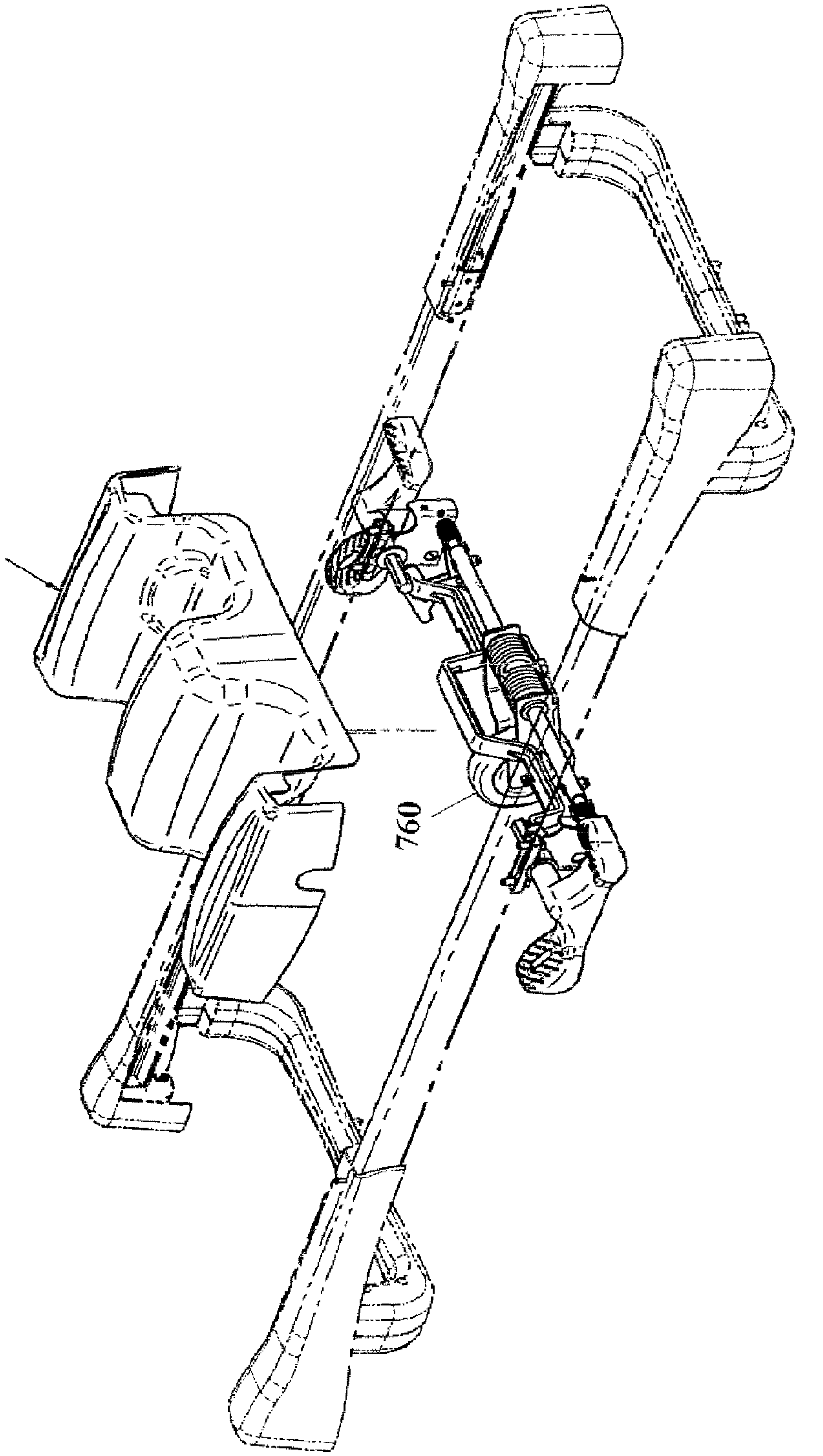
FIG. 44 is a perspective view of a drive wheel mechanism according to one embodiment of the present invention in relation to a base frame.
Figure 45:
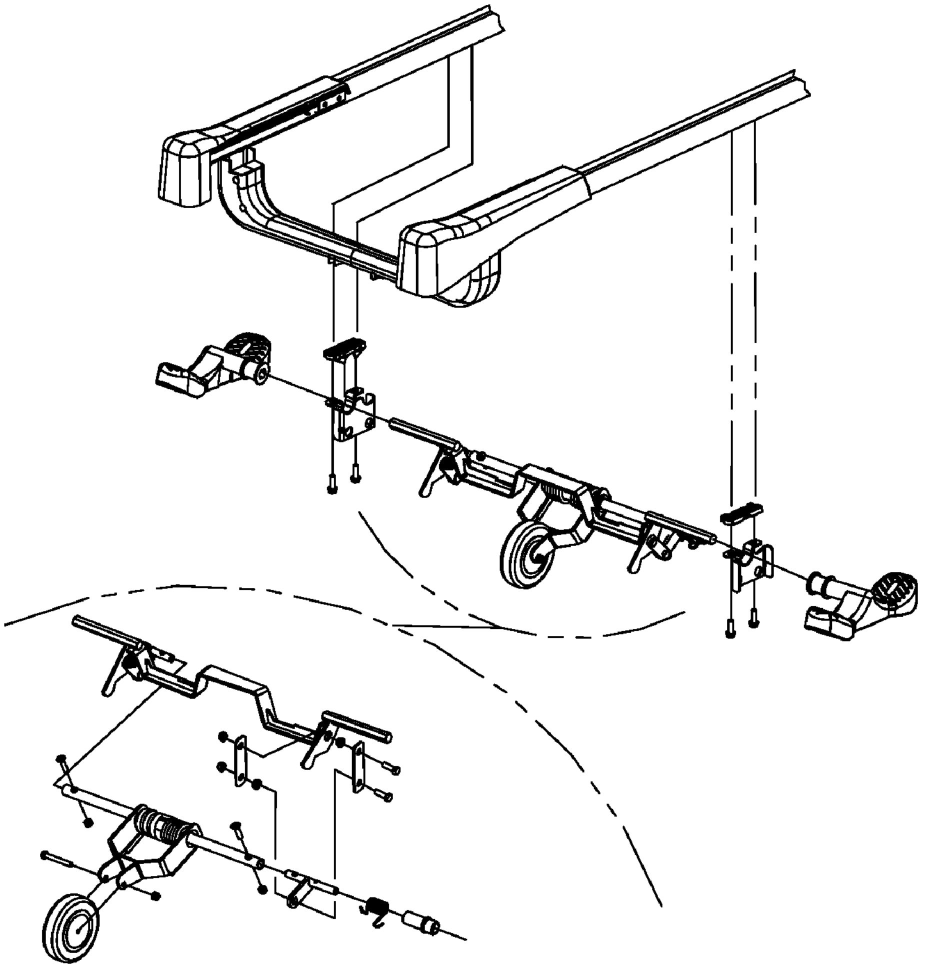
FIG. 45 is a perspective exploded view of a drive wheel mechanism according to one embodiment of the present invention in relation to a base frame.
Figure 46:
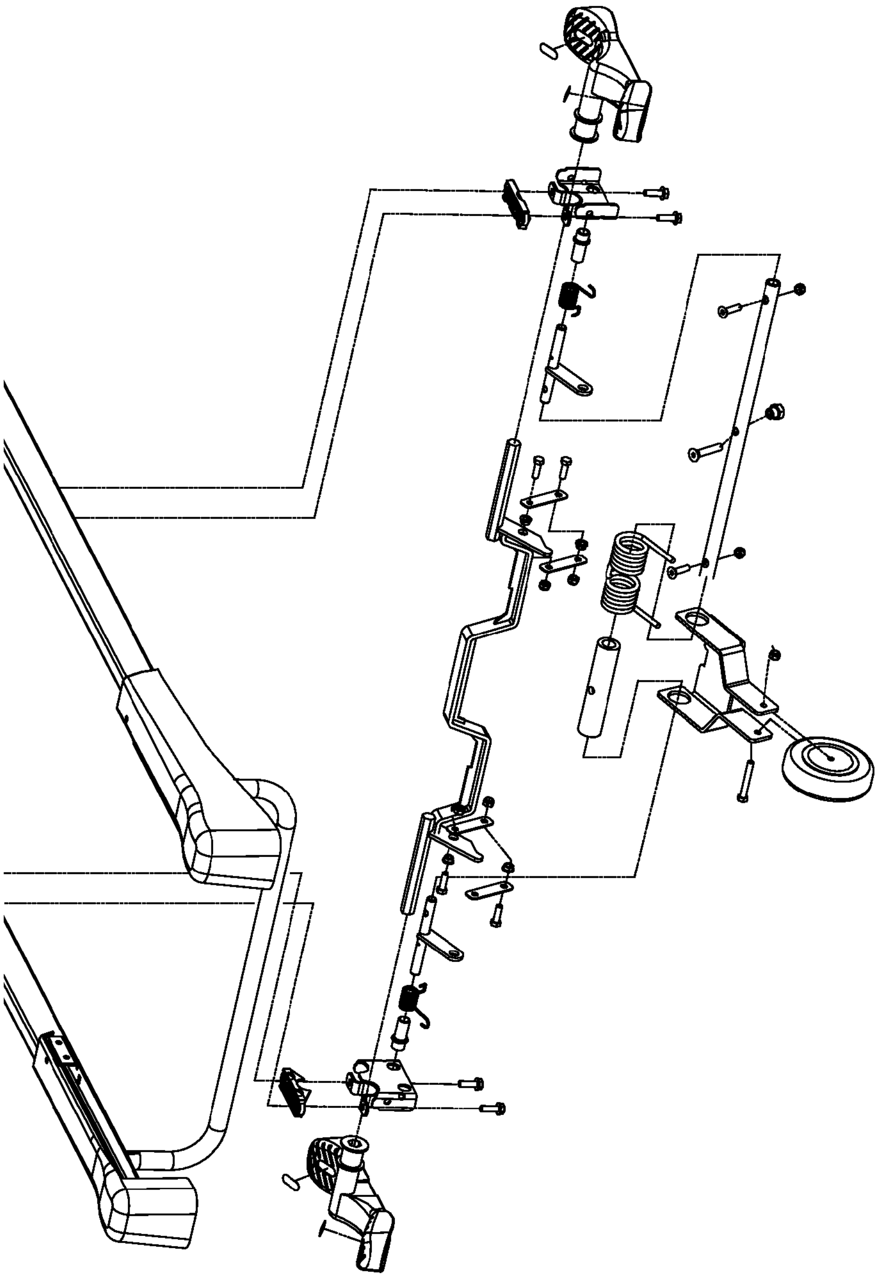
FIG. 46 is a perspective exploded view of a drive wheel mechanism according to another embodiment of the present invention in relation to a base frame.

Often it is required to configure patient support 10 in a CPR configuration which is tailored to assist a caregiver in providing CPR to the patient supported on patient support 10. In one illustrative example, a CPR configuration is defined by placing head section 102, seat section 104, thigh section 106 and foot section 108 of the lying surface support 100 in a generally linear and horizontal relationship (for example as in FIG. 3). In a further illustrative CPR configuration, head section 102, seat section 104, thigh section 106 and foot section 108 of the lying surface support 100 are placed in a generally linear relationship, and lying surface support 100 is oriented such that head end 11 is lower relative to foot end 12, generally known as a Trendelenburg position as shown in FIG. 37A for example. Such a position will be described below in the section dealing with elevation system 600.

The Load Frame

Figure 13:
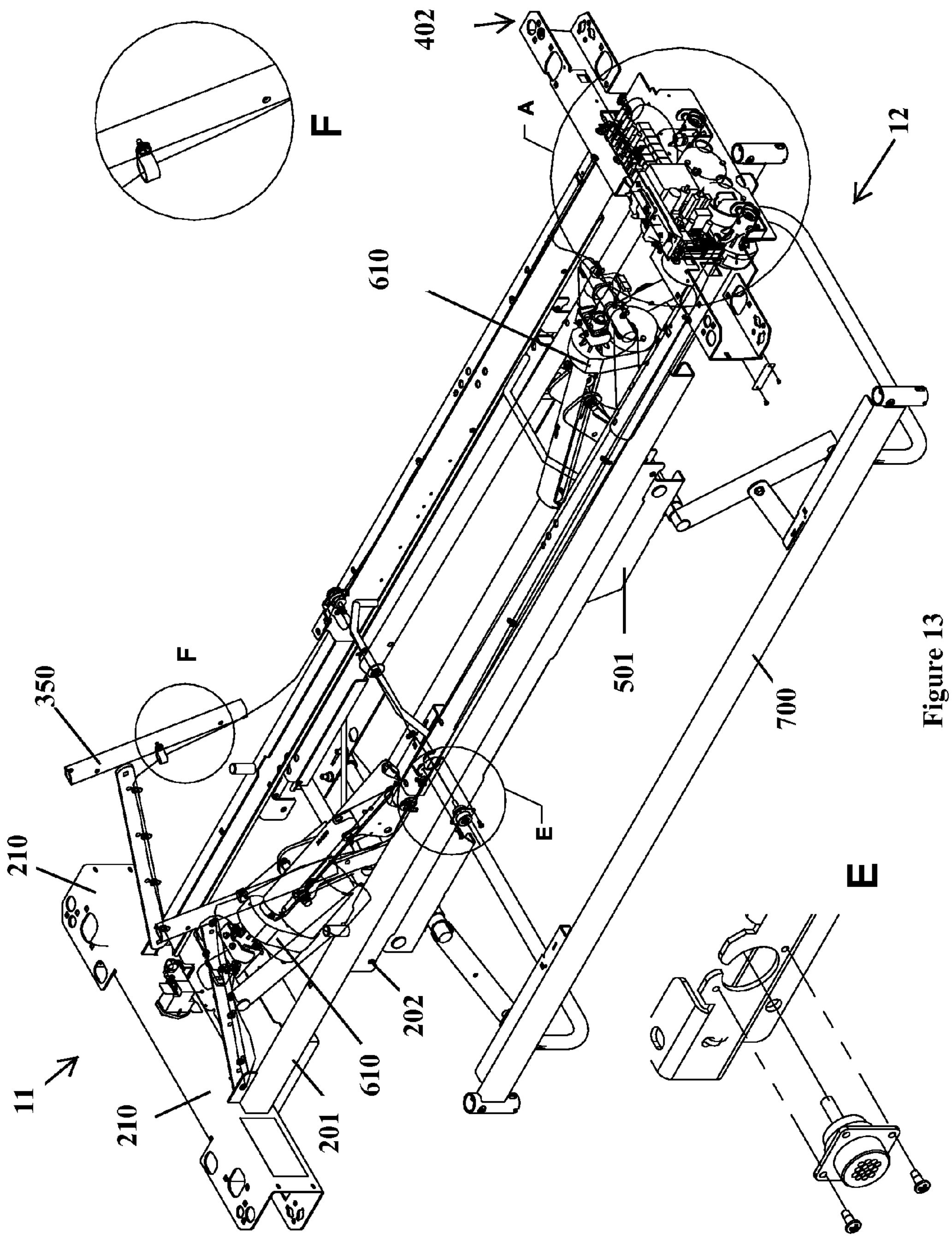
FIG. 13 is a perspective view of a load frame within a frame system according to one embodiment of the present invention.
Figure 14:
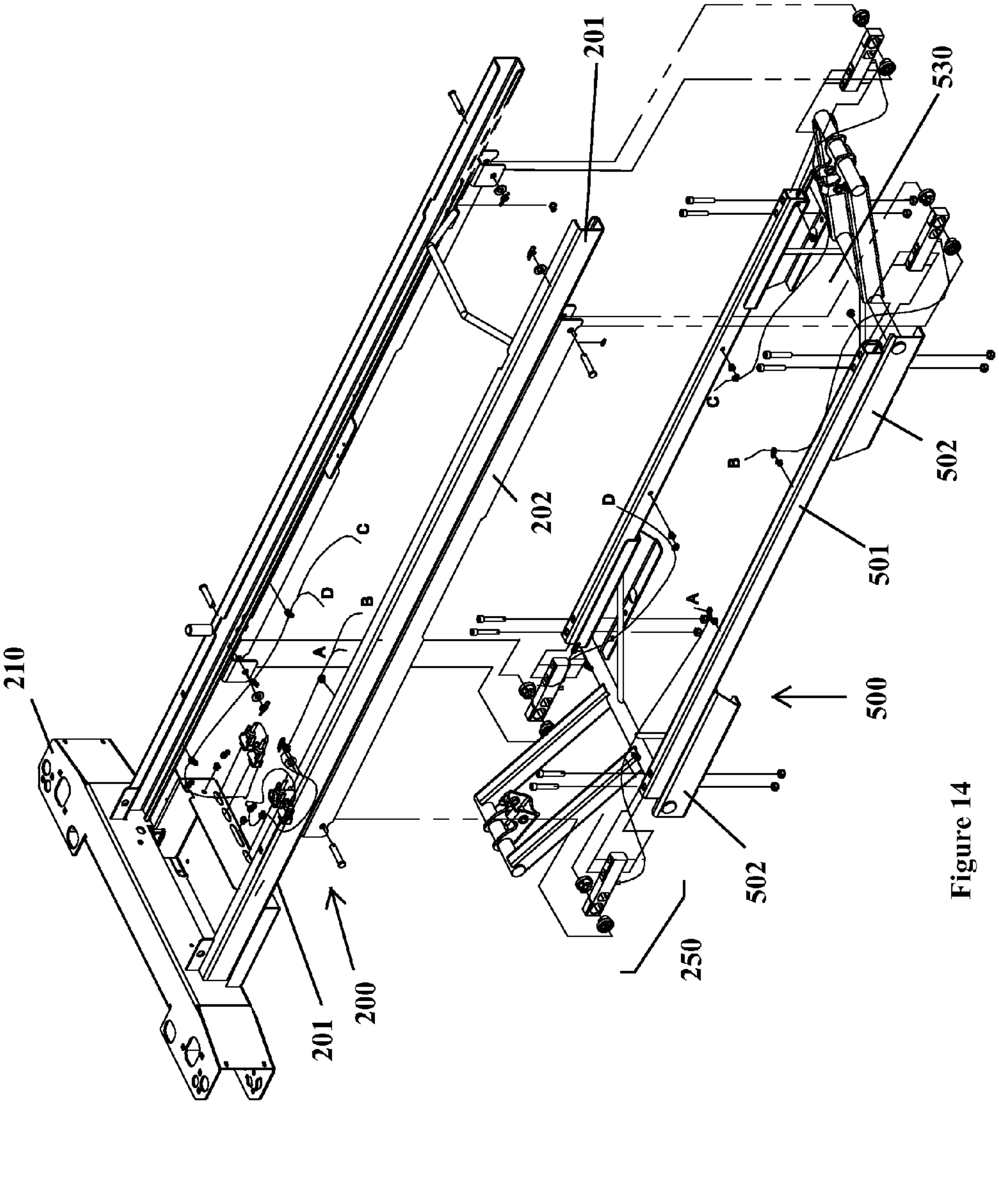
FIG. 14 is a perspective view of a load frame, intermediate frame and load cells according to one embodiment of the present invention.

In reference now to FIGS. 12 to 17, embodiments of a load frame 200 according to the present invention are depicted. FIG. 13 illustrates a load frame 200 incorporated in a frame system 30. As can be clearly viewed in FIG. 14, load frame 200 comprises a head end casing 210 and two superior components 201 extending longitudinally therefrom in a substantially parallel manner. Two inferior components 202 are permanently affixed to the bottom surface of said two superior components 201.

Figure 15:
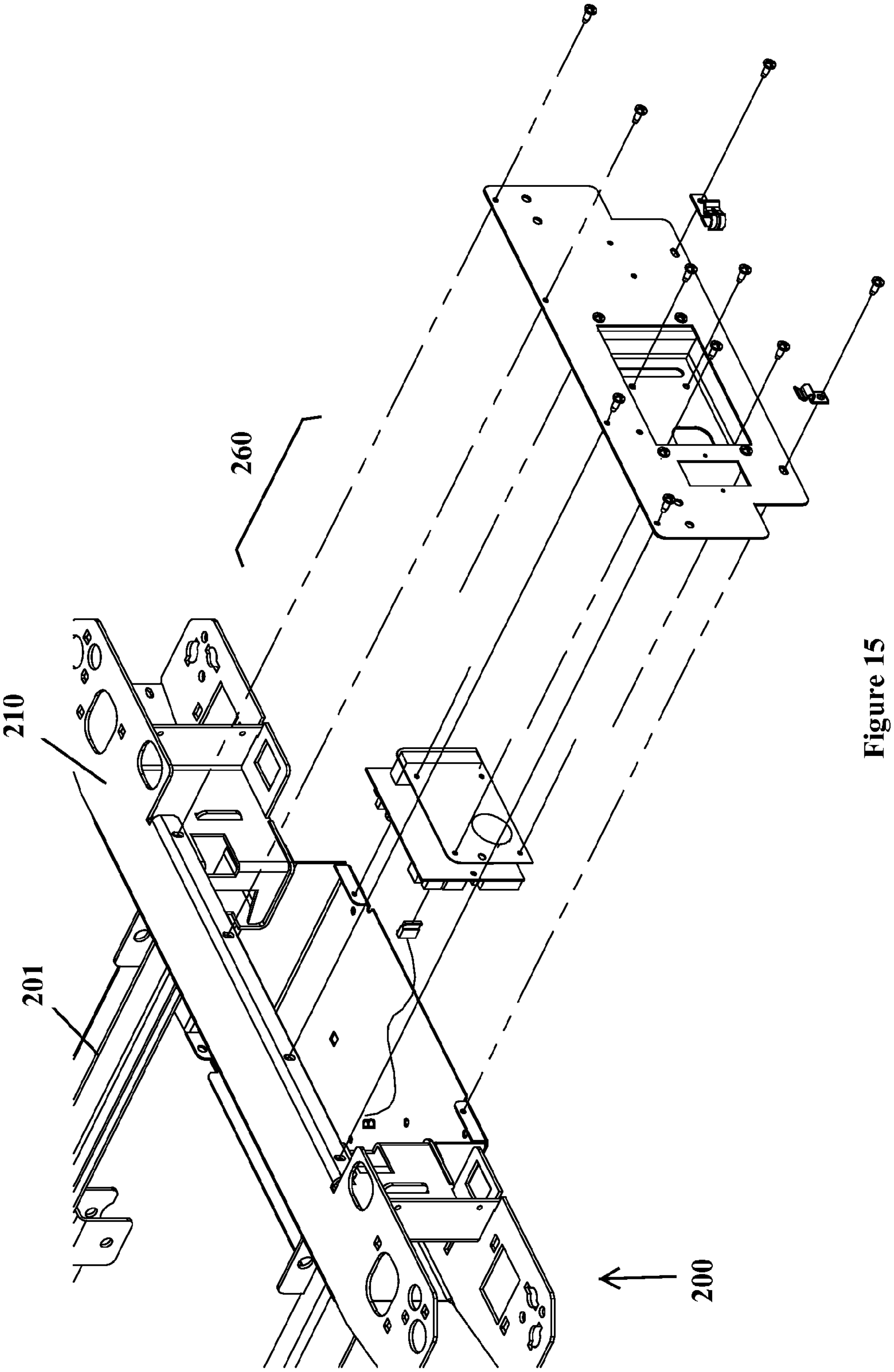
FIG. 15 depicts a top view of a tilt sensor circuit and its relative position to the head end casing of the load frame according to one embodiment of the present invention.
Figure 16:
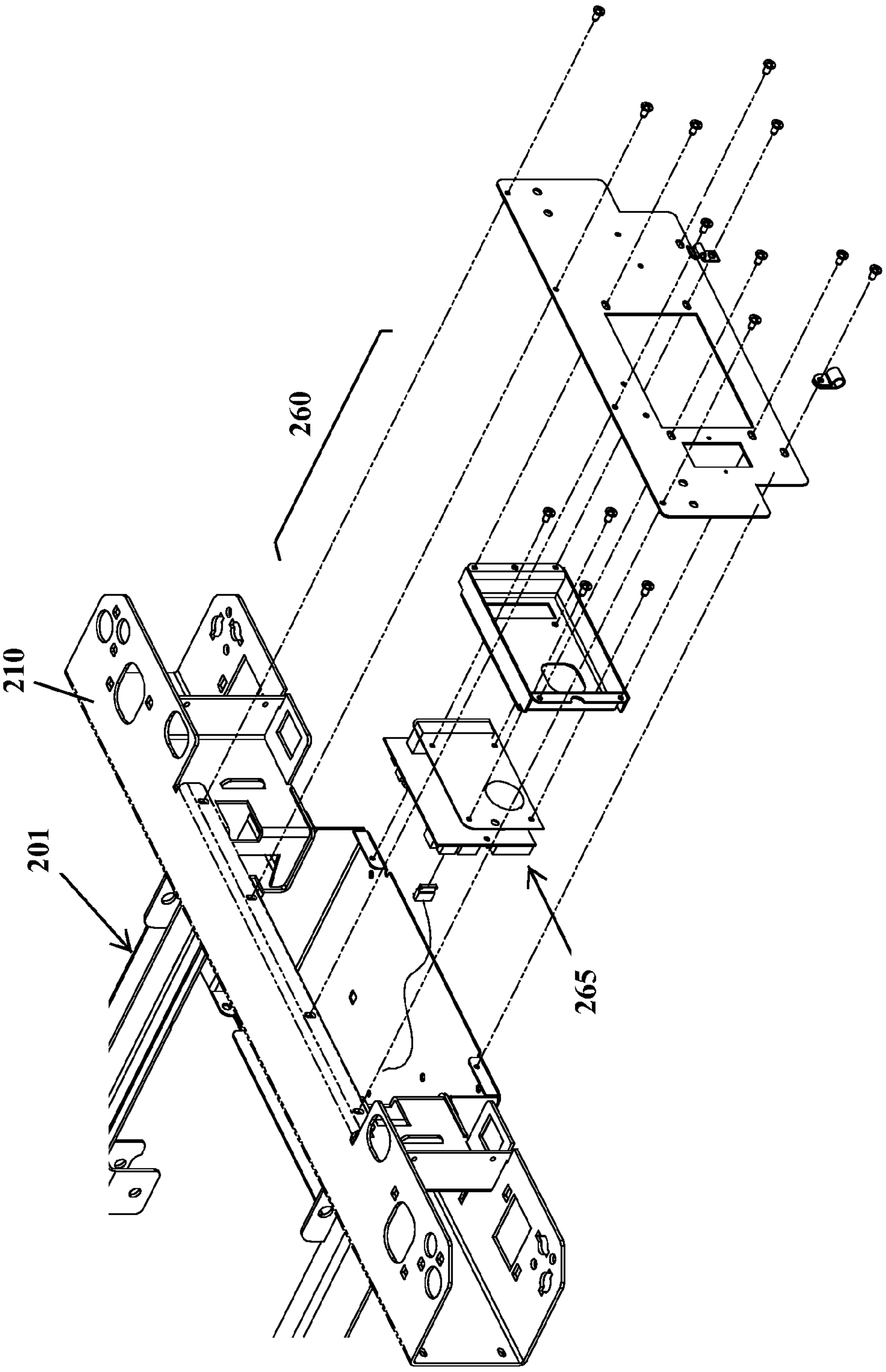
FIG. 16 depicts an exploded view of a tilt sensor circuit attached to the head end casing of the load frame according to one embodiment of the present invention.
Figure 17:
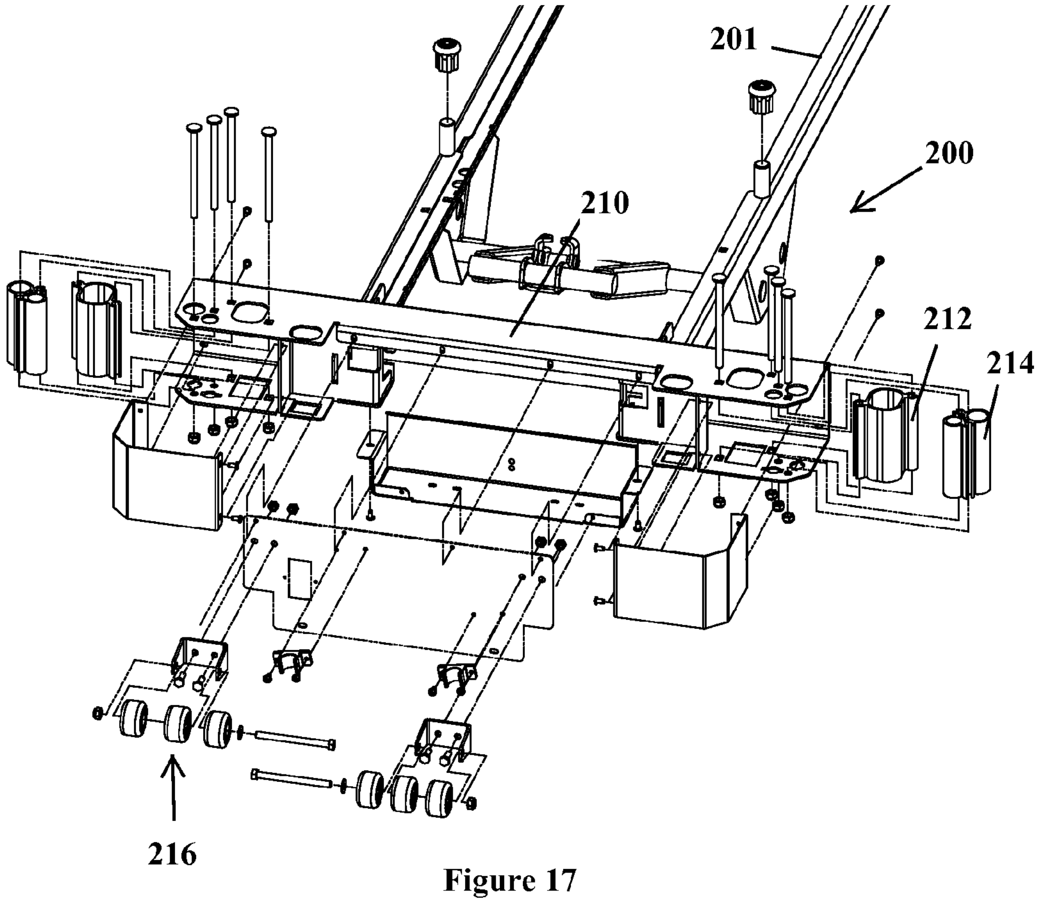
FIG. 17 illustrates an exploded perspective view of a head end casing of a load frame according to one embodiment of the present invention.

FIGS. 15 and 16 depict a top view of a tilt sensor circuit 265 within a tilt censor 260 and their relative position to the head end casing 210 of the load frame 200 according to one embodiment of the present invention. The load frame 200 supports, directly or indirectly, the various components of the patient support 10 located above the load frame 200. FIG. 17 shows an exploded perspective view of a head end casing 210 of a load frame 200 according to one embodiment of the present invention comprising footboard extrusions 212, accessory extrusions 214 and wall protecting wheels 216.

FIGS. 14, 23, and 32 to 34 depict load cells 250 that are operatively connected to the load frame 200. In one embodiment depicted in FIG. 32, four load cells 250 are within the frame system 30. The load cells 250 are respectively located proximate to the four corners of the intermediate frame 500, said intermediate frame 500 being operatively connected to the load frame 200 via the four load cells 250. More specifically, the load cells 250 are coupled with the respective ends of the superior components 501 of the intermediate frame 500 and with complementary areas on the inferior components 202 of the load frame 200. The superior components 501 of the intermediate frame 500 and the inferior components 202 of the load frame 200 are longitudinally adjacent but are not in contact, the sole physical connection between these components being through the load cells 250.

A detailed description of the load cells 250 functionality as contemplated within the present invention is provided in an ulterior section below.

Figure 21:
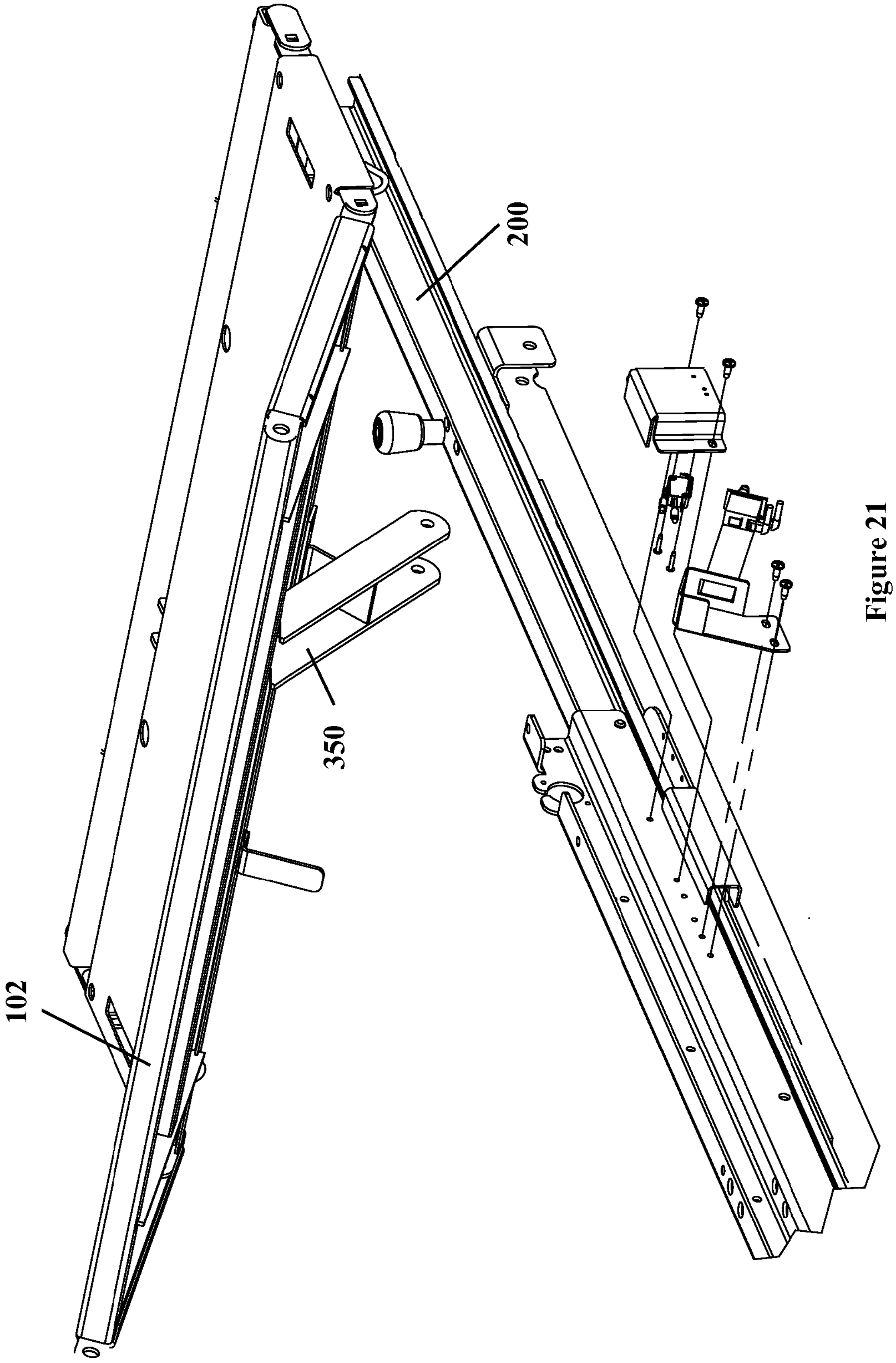
FIG. 21 is a partial exploded perspective view of an articulation mechanism according to one embodiment of the present invention.
Figure 22:
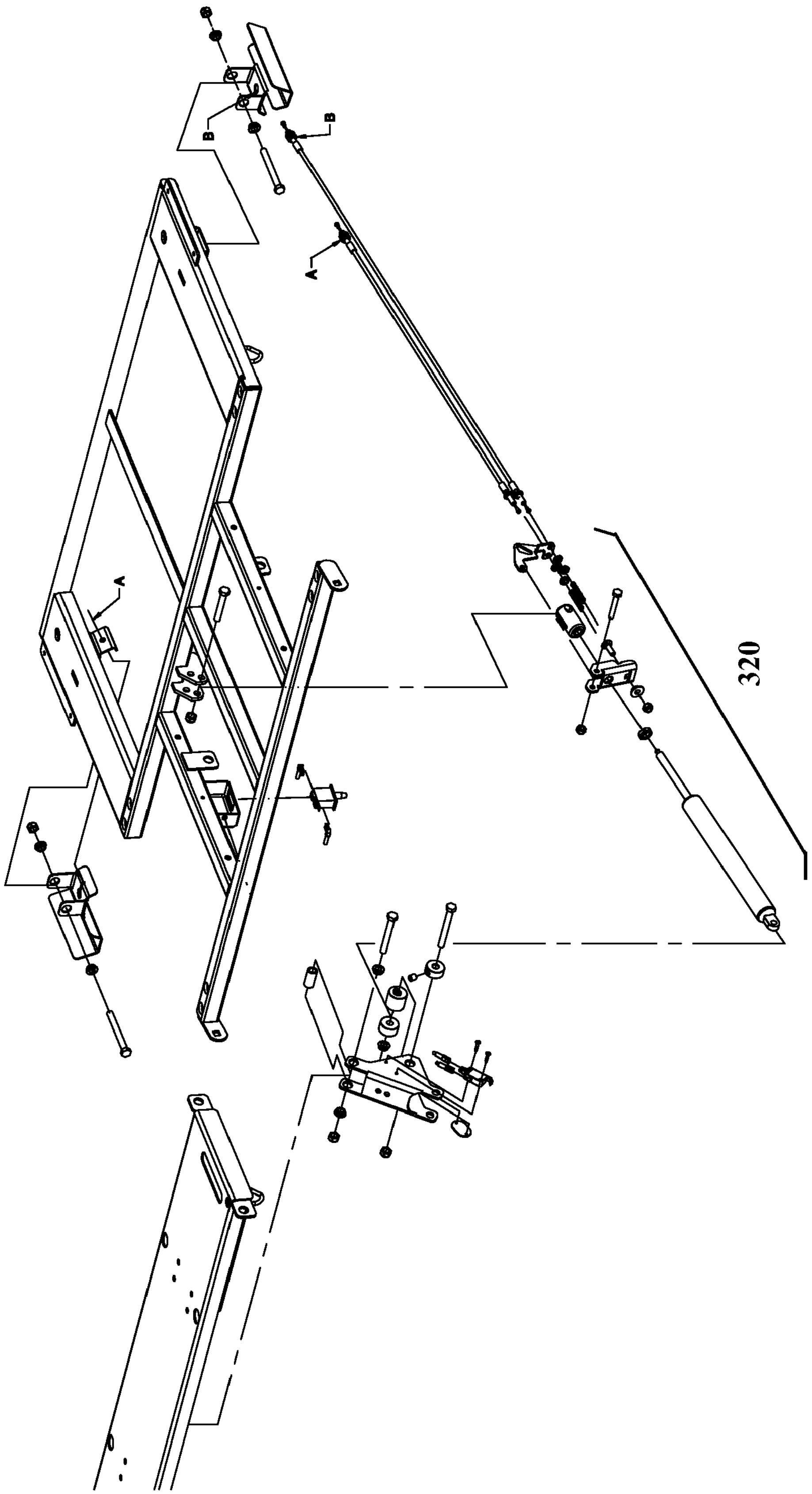
FIG. 22 is a partial exploded perspective view of an articulation mechanism according to one embodiment of the present invention.
Figure 23:
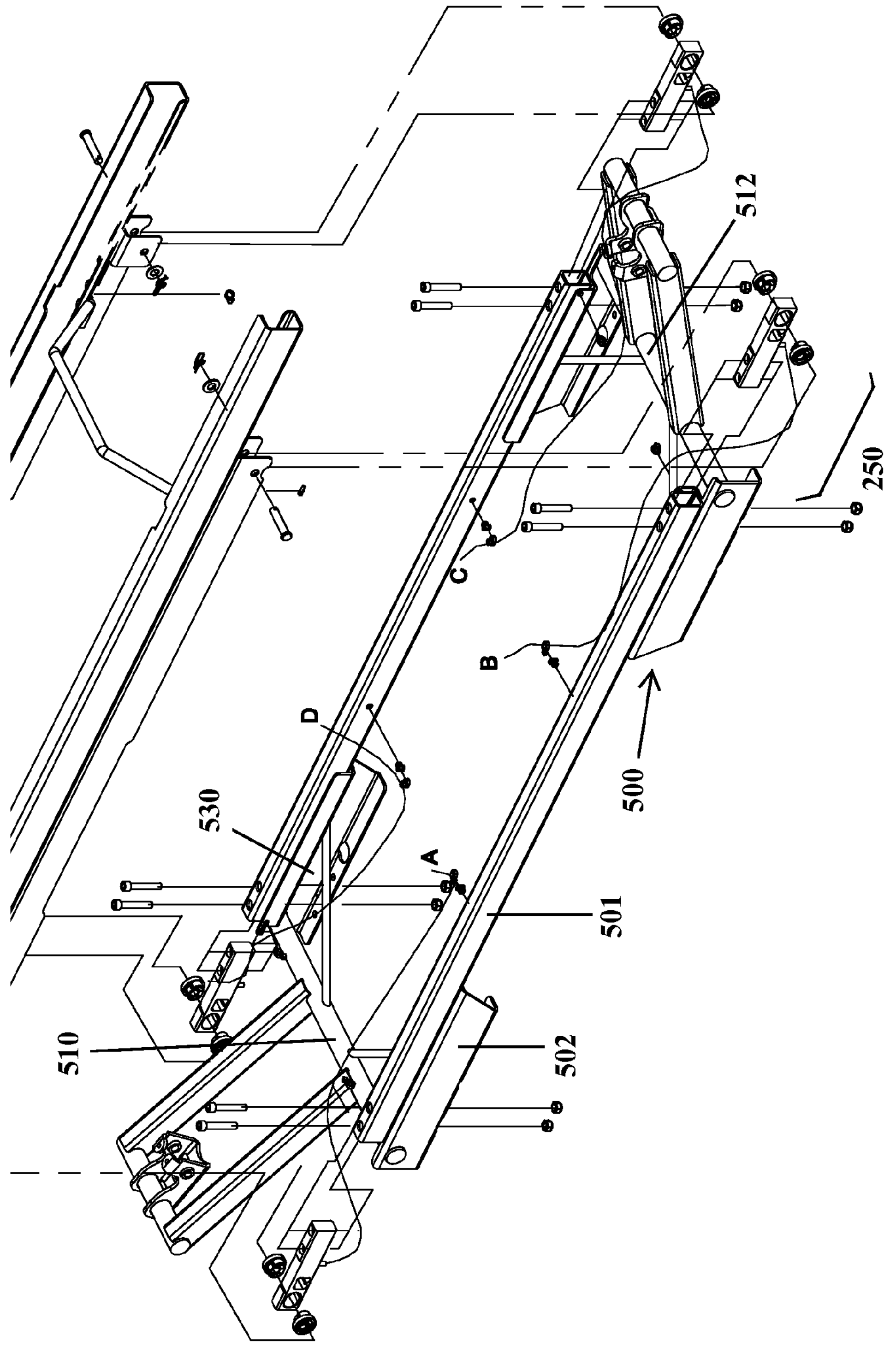
FIG. 23 is a partial exploded perspective view of an articulation mechanism according to one embodiment of the present invention in relation to a load frame and an intermediate frame.
Figure 24:
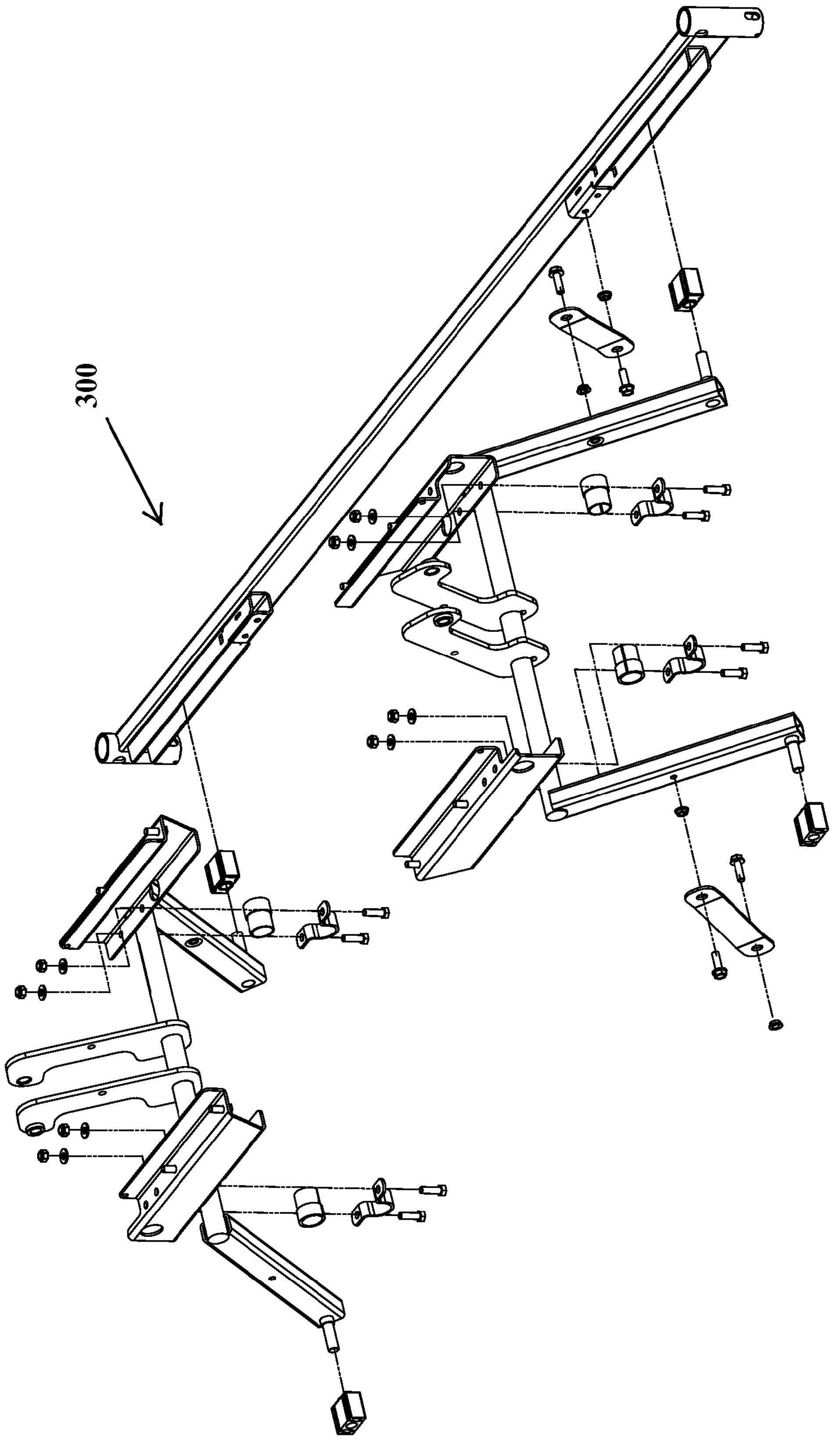
FIG. 24 is a partial exploded perspective view of an articulation mechanism according to one embodiment of the present invention.
Figure 25:
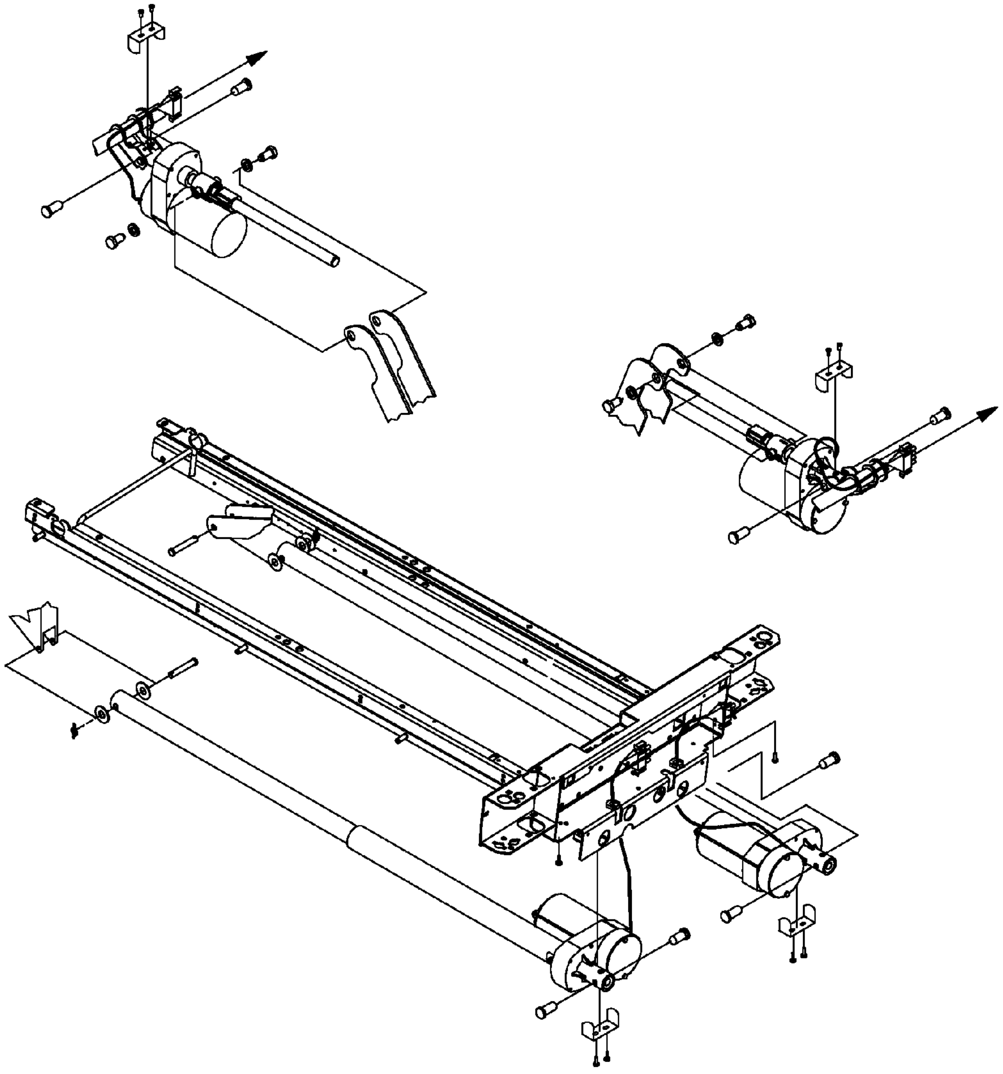
FIG. 25 is a partial perspective view of an articulation actuator according to one embodiment of the present invention.

The lying surface support 100 and its respective components (head section 102, seat section 104, thigh section 106 and foot section 108) described above are also supported by load frame 200. In one embodiment, the head section 102 and thigh section 106 are respectively operatively connected to a head section support arm 350 (FIGS. 13 and 21) and a thigh section support arm 322. The head section support arm 350 and a thigh section support arm 322 are comprised in articulation 300 (discussed below) which is connected to the load frame 200.

The two superior components 201 extending longitudinally from head end casing 210 of load frame 200 comprise longitudinal mating grooves 225 to allow for translational mating with complementary mating extensions 425 of the mobile frame 400.

The Articulation System

An articulation system 300 is provided within the frame system 30 of patient support 10. The articulation system 300 is designed to provide a means for the lying surface support 100 and some or all of its respective components (for example the head section 102, seat section 104, thigh section 106 and foot section 108) to be rotationally moved in order to provide a desired position for the lying surface 20 supported thereon. For example, with reference to the embodiment shown in FIG. 21, head section support arm 350 is attached to the bottom surface of head section 102 of lying surface support 100. Head section actuator 310 (FIG. 8) is operatively connected to head section support arm 350 at a first end and to transverse members 510 and 512 connected to the superior components 201 of load frame 200 at a second end. Alternatively, in another embodiment, the second end of head section actuator 310 could be operatively connected to the superior components 201 of load frame 200 directly. Similarly, other section of the lying surface support 100 can be moved.

The Mobile Frame

Figure 6:
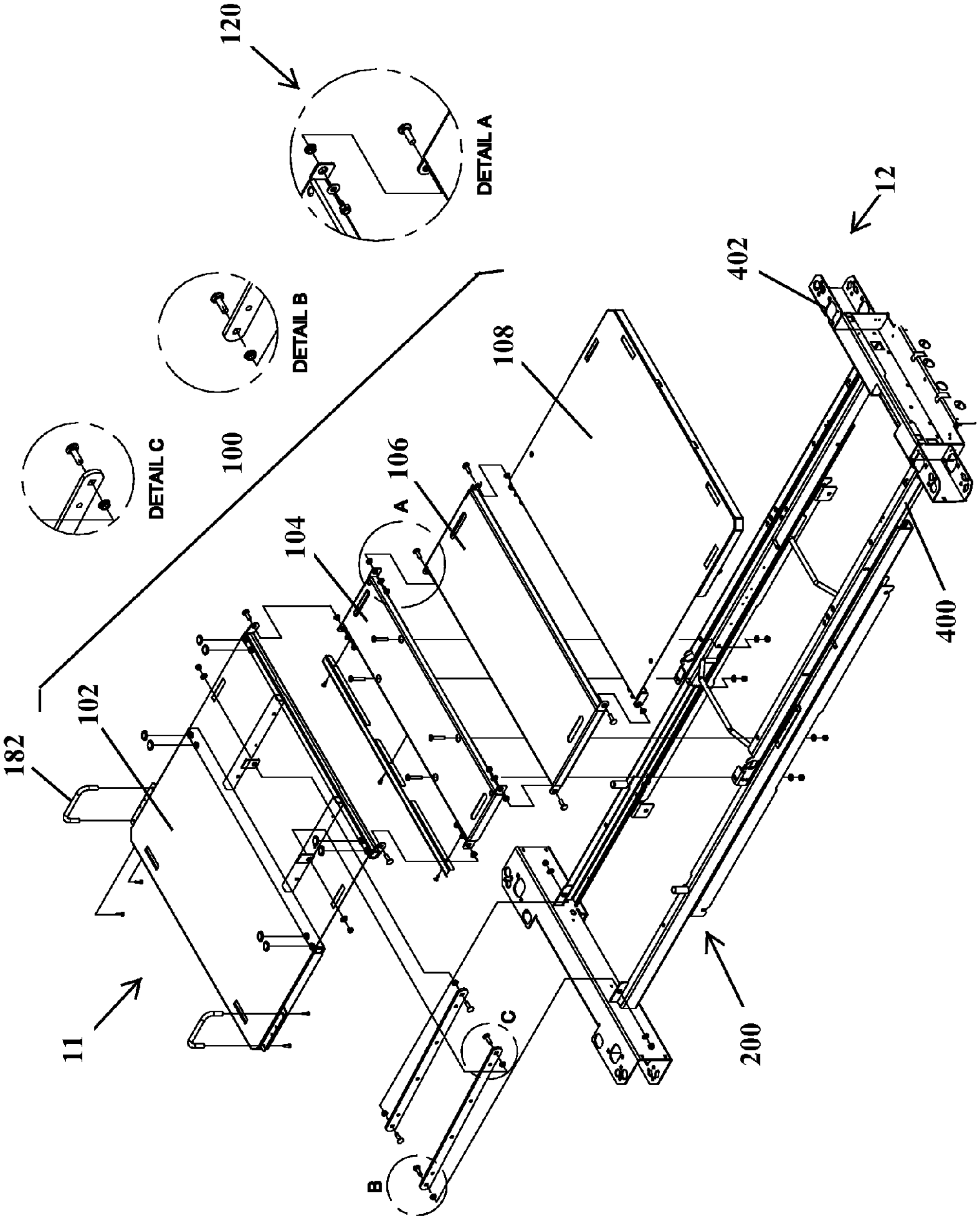
FIG. 6 is a perspective exploded view of a lying surface support, a load frame and a mobile frame according to one embodiment of the present invention.
Figure 7:
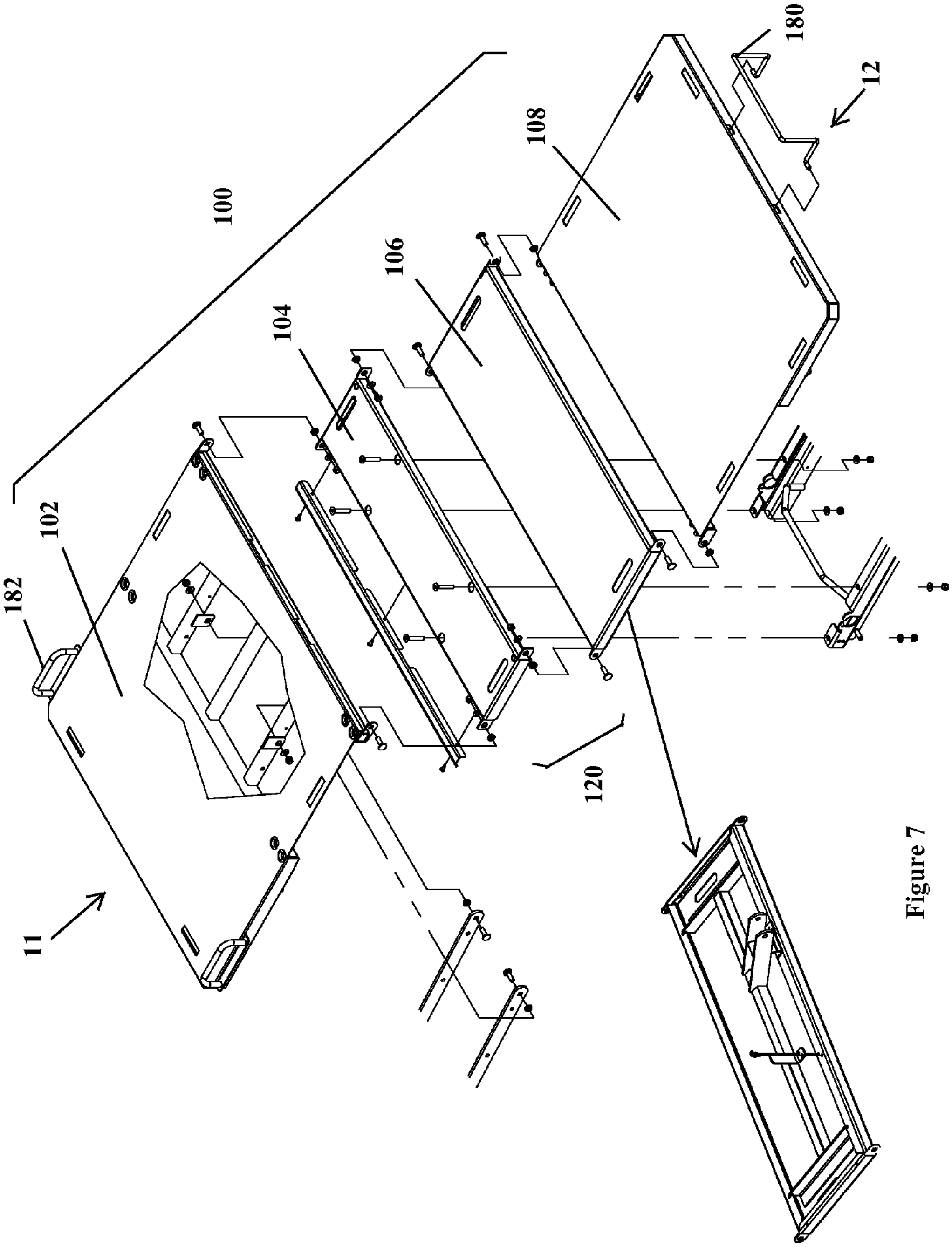
FIG. 7 is a perspective exploded view of a lying surface support and part of an articulation system according to one embodiment of the present invention.
Figure 8:
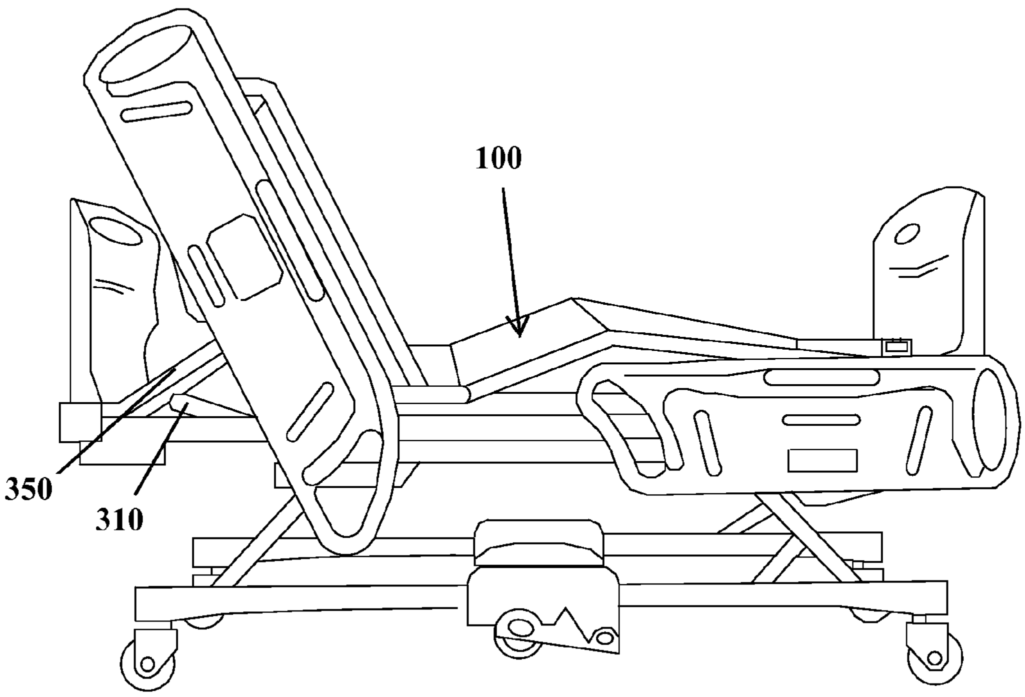
FIG. 8 is a side view of a lying surface support according to one embodiment of the present invention in an articulated position.
Figure 19:
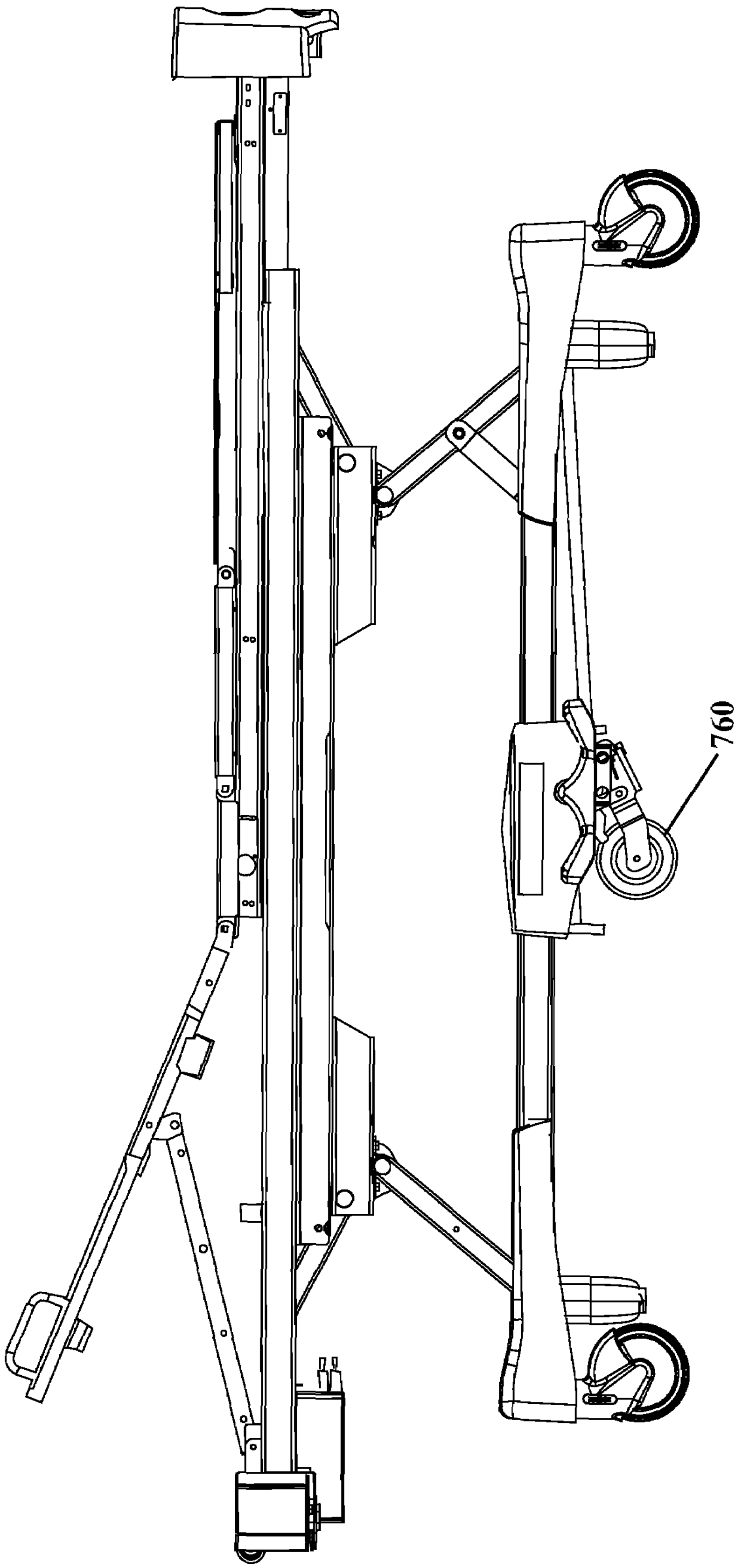
FIG. 19 is a side view of a patient support according to one embodiment of the present invention wherein the head section of the lying surface support.
Figure 20:
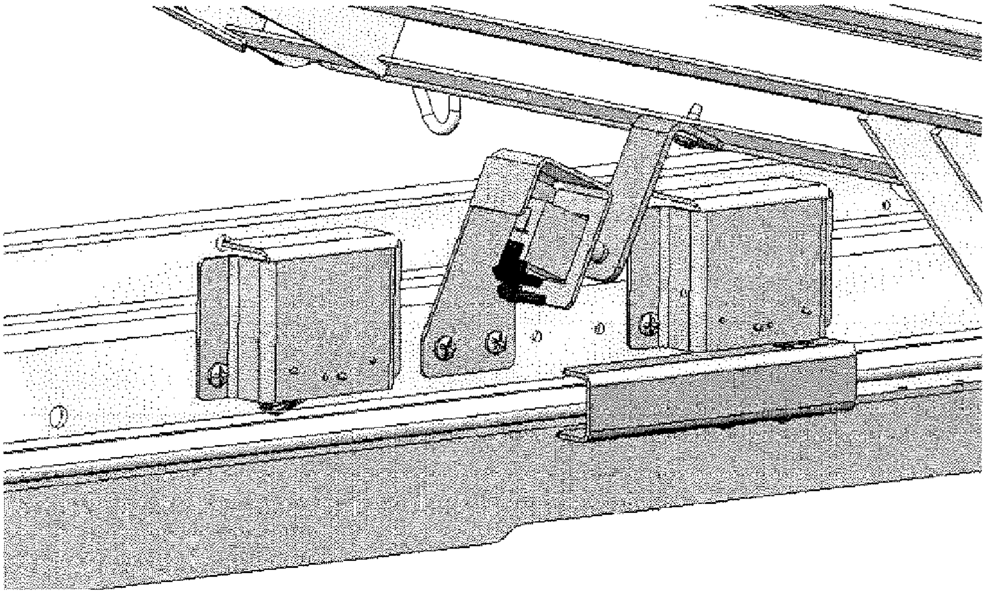
FIG. 20 is a partial perspective view of an articulation mechanism according to one embodiment of the present invention.
Figure 26:
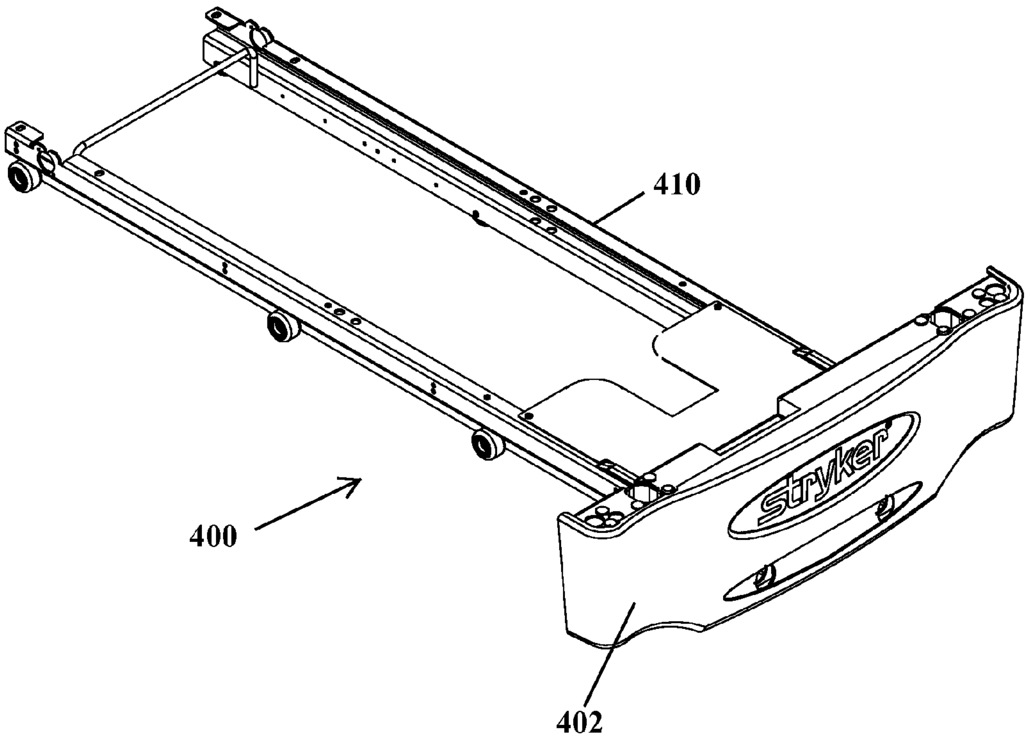
FIG. 26 is a perspective view of a mobile frame according to one embodiment of the present invention.
Figure 27:
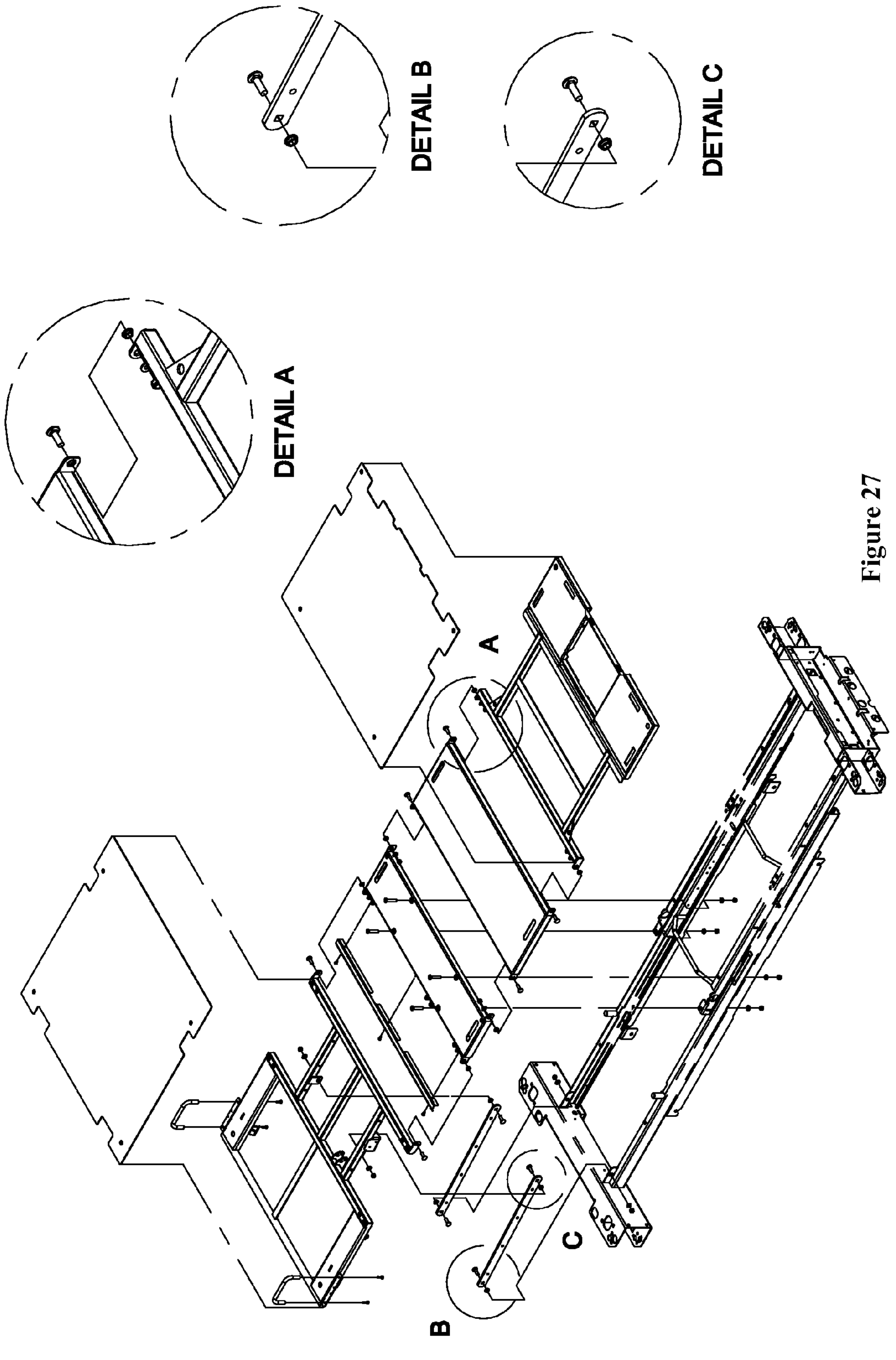
FIG. 27 is a perspective view of a mobile frame and foot end casing according to one embodiment of the present invention in relation to a load frame and a lying surface support.
Figure 28:
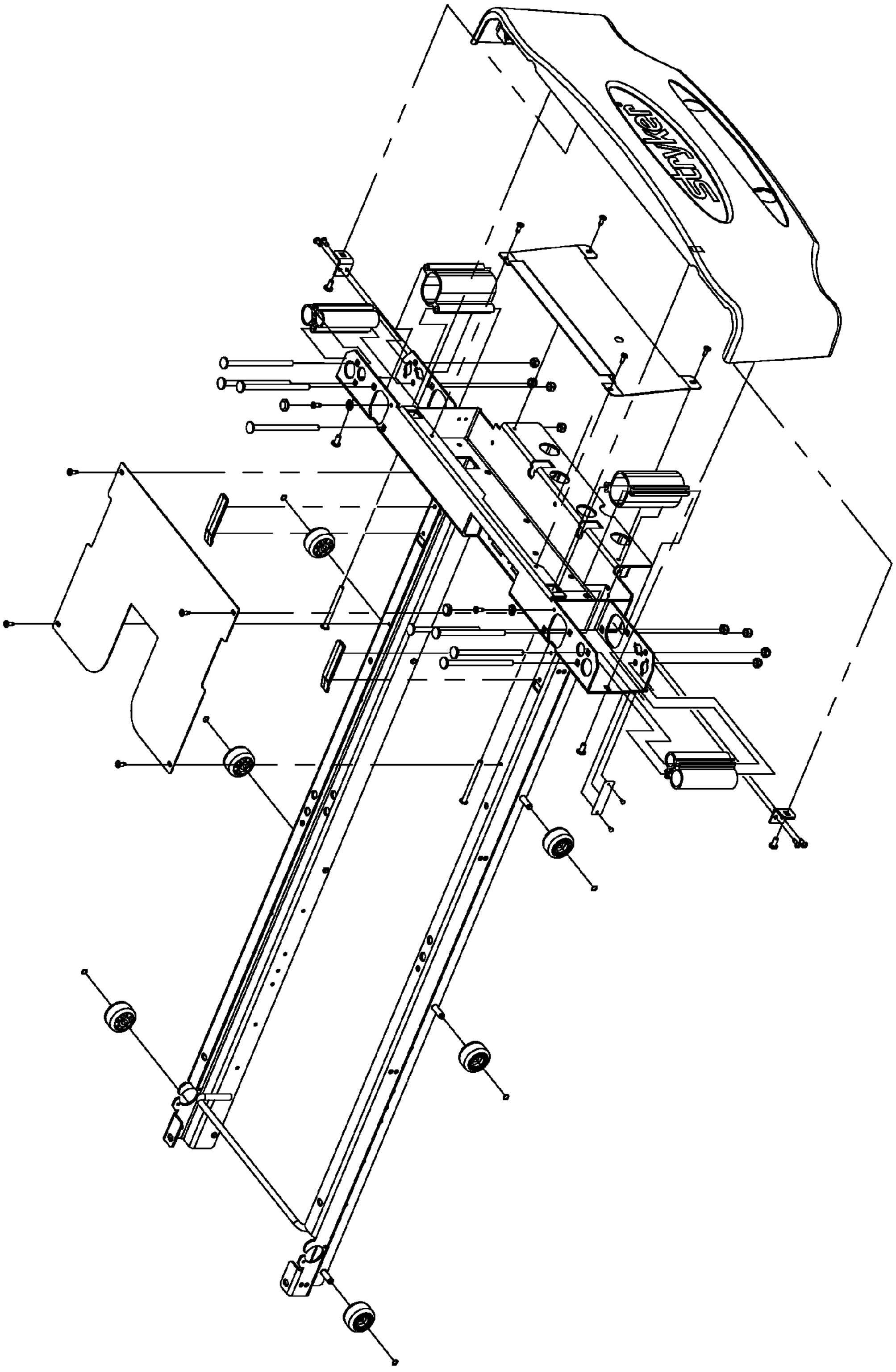
FIG. 28 is an exploded perspective view of a mobile frame and foot end casing according to one embodiment of the present invention.
Figure 29:
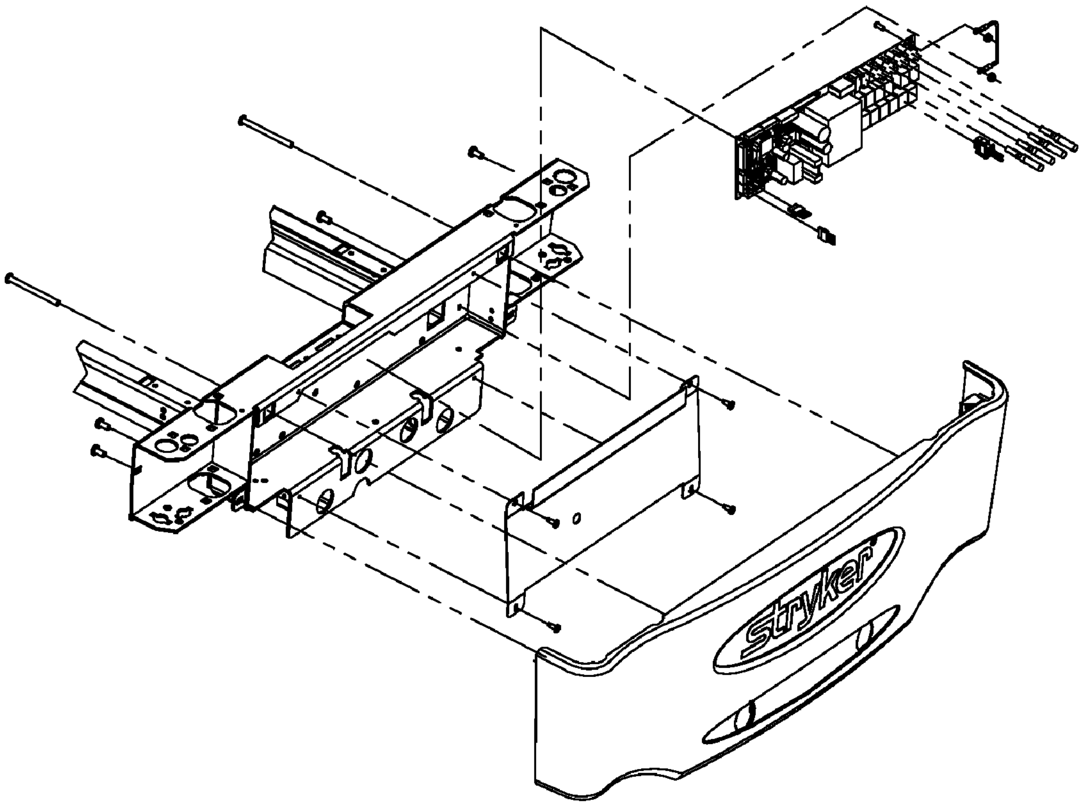
FIG. 29 is a partial exploded perspective view of a mobile frame and foot end casing according to one embodiment of the present invention.
Figure 30:
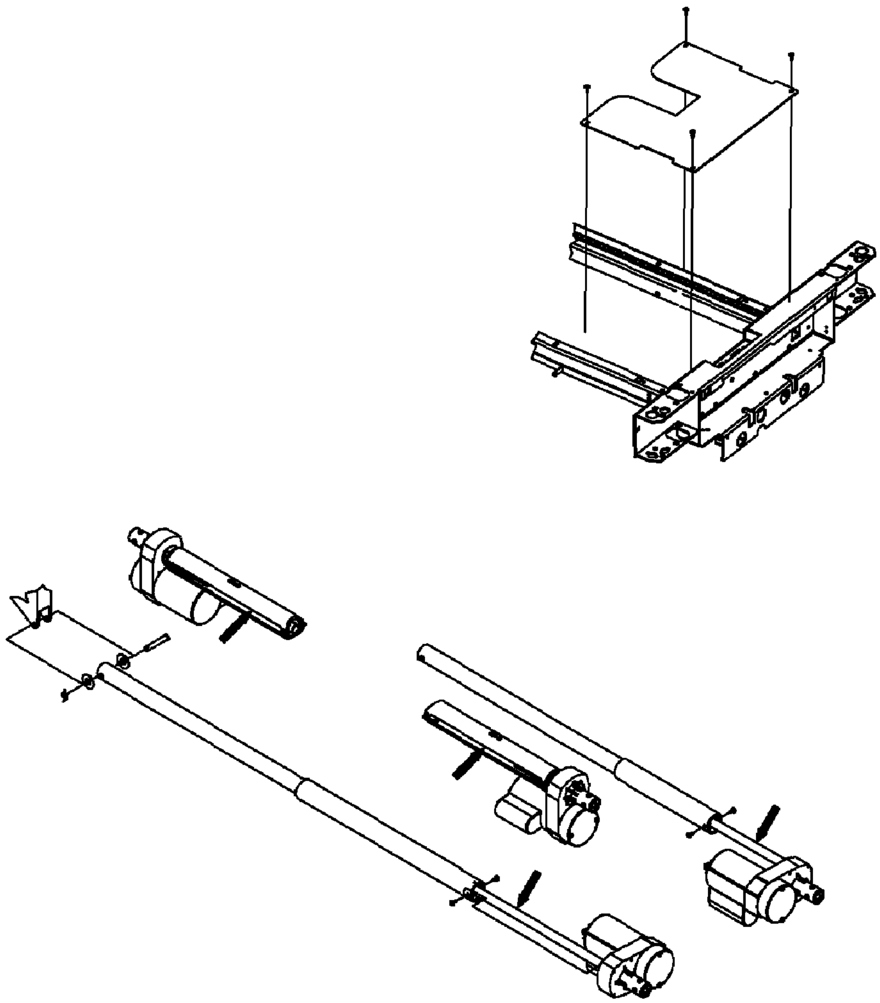
FIG. 30 is a perspective view of an actuator for the mobile frame according to one embodiment of the present invention.
Figure 31:
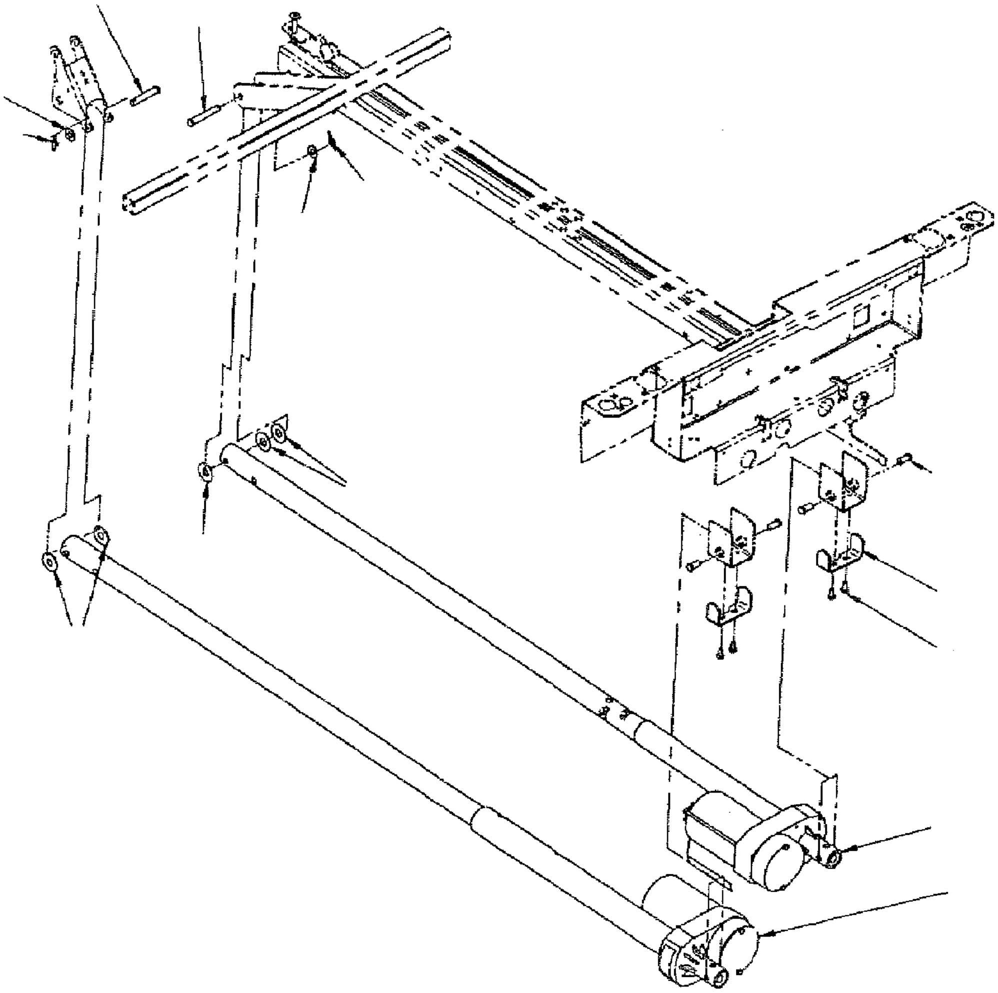
FIG. 31 is a partial perspective view of actuators in relation to a mobile frame according to one embodiment of the present invention.

The mobile frame 400 (FIG. 26) is as shown in FIGS. 6, 13 and 19 is mated with the load frame 200 via complementary mating extensions 425 and longitudinal mating grooves 225 of superior components 201 of load frame 200.

The Intermediate Frame

Figure 18:
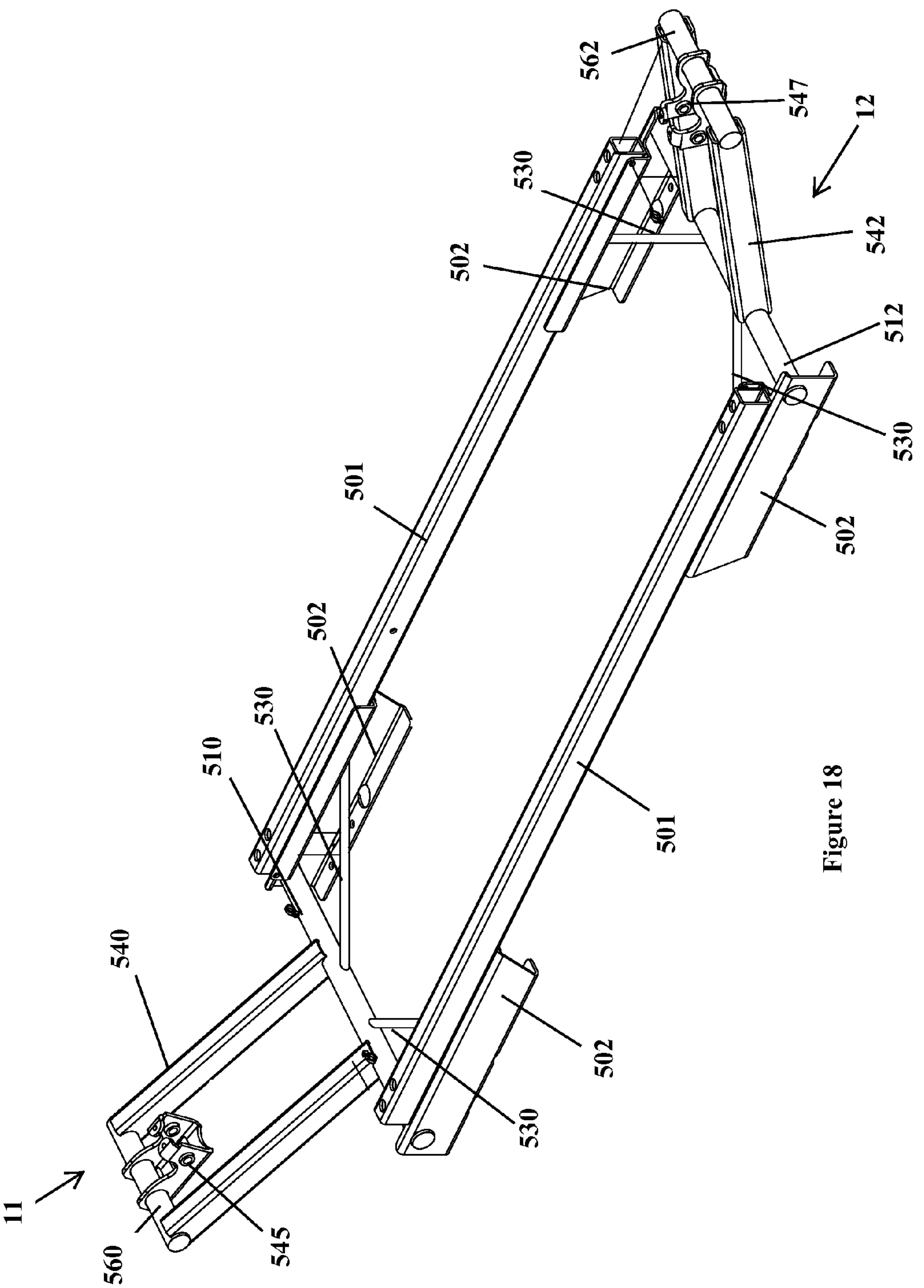
FIG. 18 is a perspective view of an intermediate frame according to one embodiment of the present invention.

With reference to FIGS. 3, 13, 14, 18 and 23, embodiments of an intermediate frame 500 according to the present invention are depicted. FIG. 18 illustrates an intermediate frame 500 comprising superior components 501, inferior components 502, transverse members 510 and 512, struts 530 and elevation actuator support arms 540 and 542. The inferior components 502 of the intermediate frame 500 are connected by head transverse member 510 and foot transverse member 512. The stability of the transverse connection is further stabilized by the diagonal connecting struts 530 connecting head transverse member 510 to the head end of each inferior component 502 connecting foot transverse member 510 to foot end of each inferior component 502. A head elevation actuator support arm 540 extends outward and upward from the head transverse member 510 and has an elevation actuator clamp 545 attached thereto on the upward transverse aspect 560 of the head elevation actuator support arm 540. Similarly, a foot elevation actuator support arm 542 extends outward and upward from the foot transverse member 512 and has an elevation actuator clamp 547 attached thereto on the upward transverse aspect 562 of the foot elevation actuator support arm 542.

The Elevation System

Figure 35:
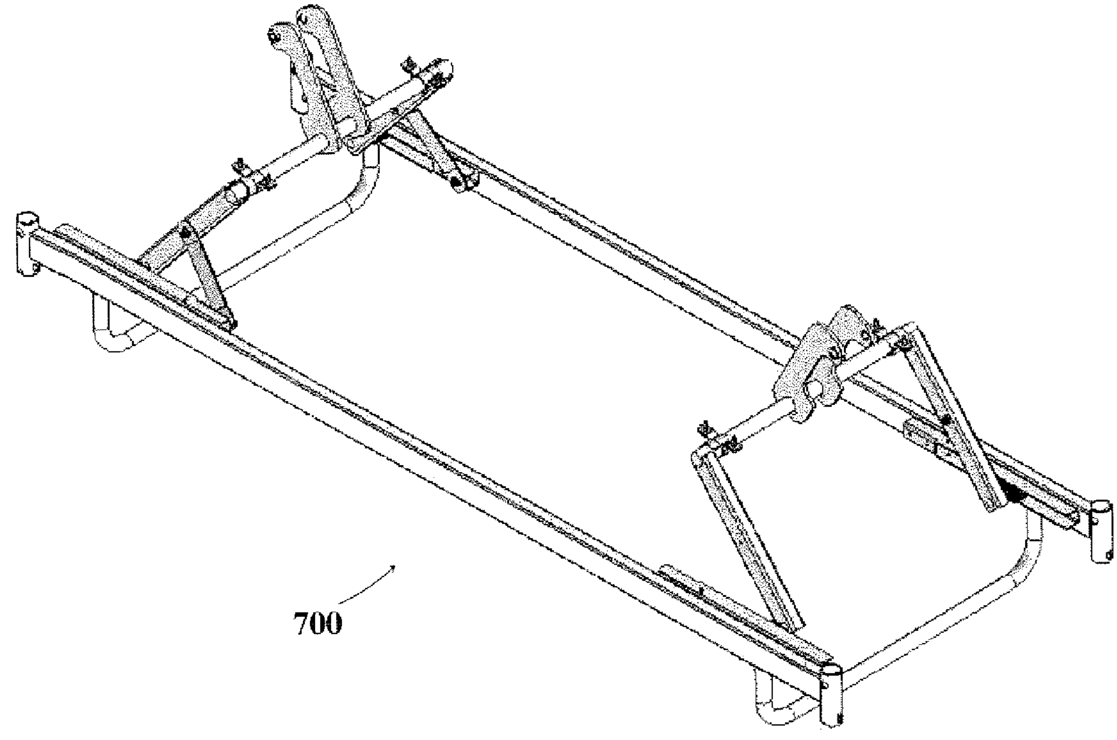
FIG. 35 is a partial perspective view of an elevation system according to one embodiment of the present invention.
Figure 36:
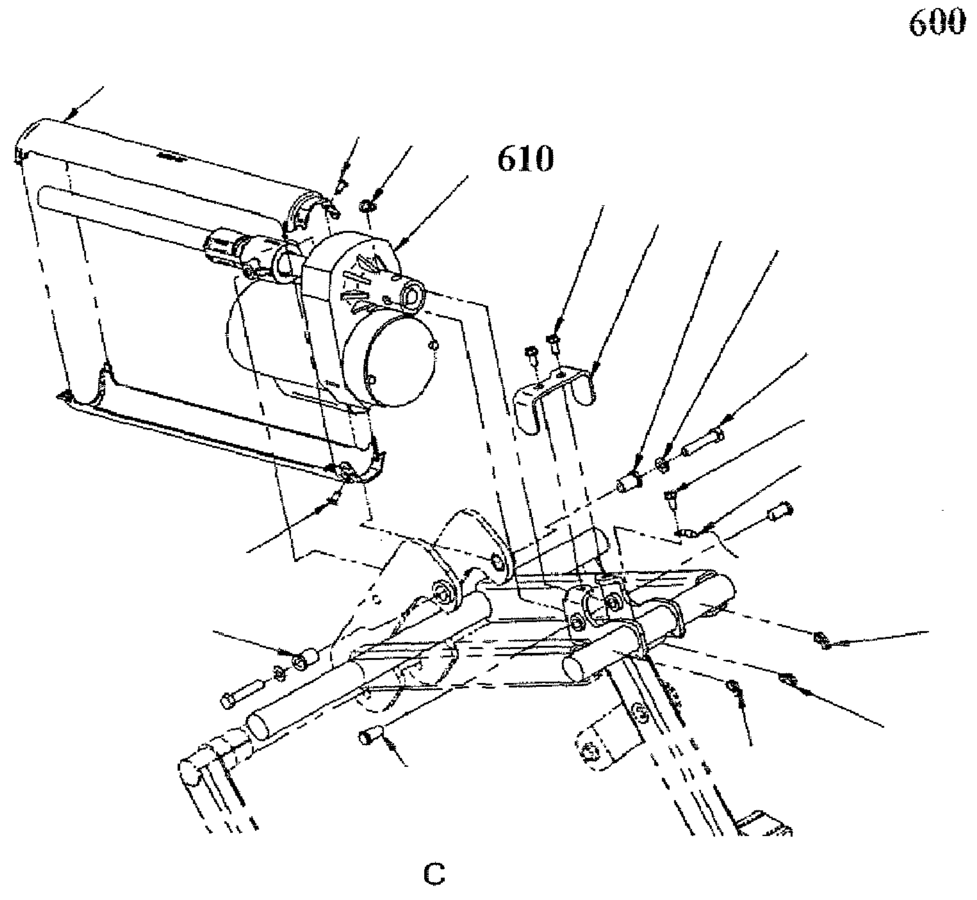
FIG. 36 is a partial exploded perspective view of an elevation system according to one embodiment of the present invention showing an actuator.

In reference to FIGS. 13, 35 and 36, an elevation system 600 for the patient support 10 is provided. A lift arm is pivotally attached to base frame 700 at a pivot point at one end and to the head section at second pivot point at another end. Similarly, a lift arm is also attached to the other side of the base frame 700 at pivot point at one end and to the head section at pivot point at the other end. The lift arms can be attached to the frame and the head section by a bolt or other fastening means that secures the lift arms to the frame and the head section, while still allowing the lift arms, to pivot at the pivot points through the use of Hi-Lo actuators 610. Accordingly, transverse movement of the head section toward and away from the foot section will cause the respective lift arms to rotate together about the associated pivot points. In a similar manner, the foot section can be articulated with lift arms, which are pivotally attached at one end to frame and at a distal end thereof to foot section respectively, to provide for elevation of the foot section with respect to the horizontal plane of the frame. As a result, the foot section and the head section can be configured and positioned at various degrees of inclination with respect to the seat section, which is fixed in the horizontal plane.

The Base Frame

The base frame is supported by a plurality of caster wheels and an auxiliary drive wheel, which engage with a surface, such as a floor. The base frame supports an elevation system, which is coupled to the intermediate frame. The base frame also comprises the braking mechanism that engages with one or more caster wheels or the drive wheel. A suitable cover can be used to cover many or all of the base frame components and wiring for aesthetic and safety reasons.

The Casters

Typically a plurality of caster wheels, also known as casters, are located proximate the perimeter of the base frame. In one embodiment, four casters are position at the four corners of the base frame. The casters extend below the base frame and engage with the surface, such as a floor. Casters are known in the prior art.

The Drive Wheel

The drive wheel and its support structure are generally positioned near or at the centre of the base frame. The drive wheel extends from the support structure and suspends towards a surface on which the casters engage, such as a floor. Examples of drive wheels contemplated for use with the bed of the present invention include those disclosed in U.S. Pat. Nos. 6,240,579 and 6,256,812 both of which are currently assigned to the applicant of the present invention.

The Head End Siderails

Head end siderails are coupled to the head section of the lying surface support and may be moved between raised and lowered positions.

The Foot End Siderails

Foot end siderails are coupled to the load frame? and may also be moved between raised and lowered positions.

Figure 47:
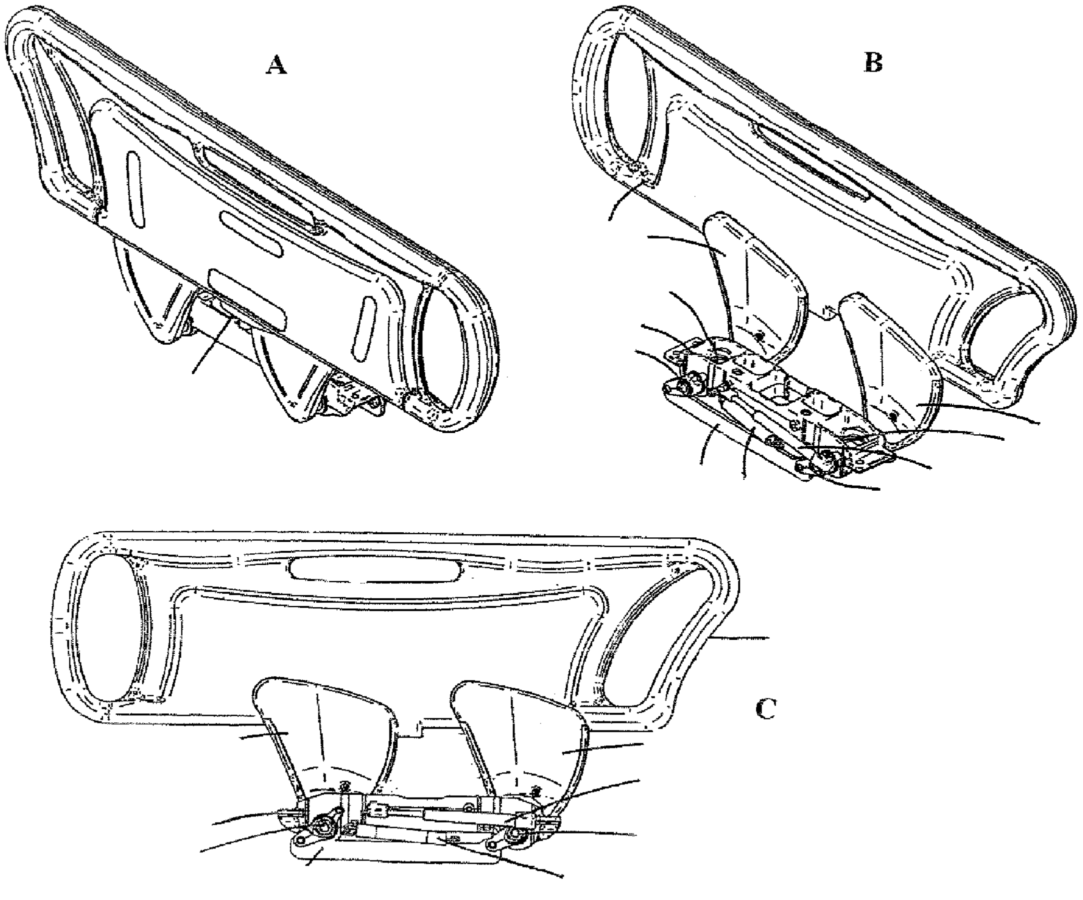
FIG. 47A depicts a perspective external view of the spring and damper in the raised siderail according to one embodiment of the present invention wherein the angle between the arm and the mechanism is about 70 degrees.
FIGS. 47B and 47C depict perspective internal and front internal views of the siderail of FIG. 47A.
Figure 48:
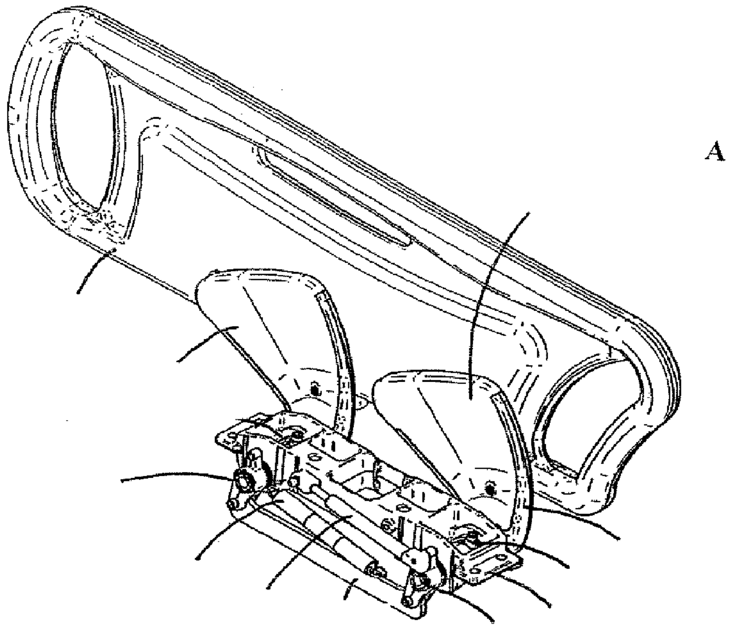
FIGS. 48A and 48B depict perspective internal and front internal views of the spring and damper in the partially raised siderail according to one embodiment of the present invention wherein the angle between the arm and the mechanism is about 30 degrees.
Figure 48:
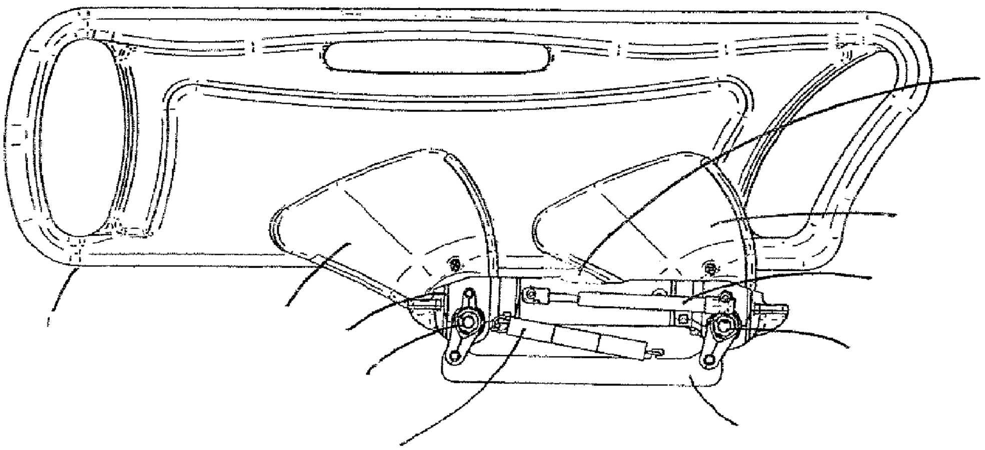
Figure 49:
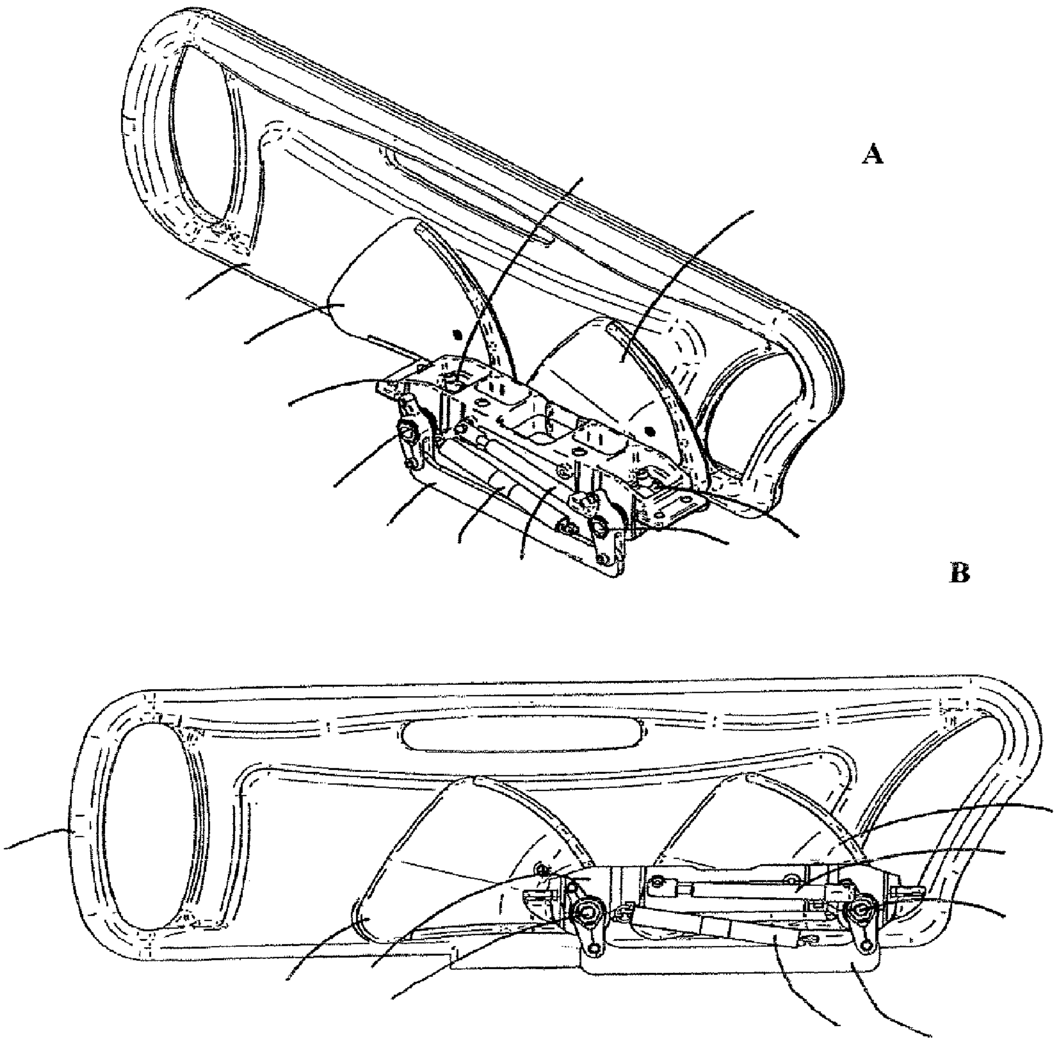
FIGS. 49A and 49B depict perspective internal and front internal views of the spring and damper in the partially lowered siderail according to one embodiment of the present invention wherein the angle between the arm and the mechanism is about 0 degree.
Figure 50:
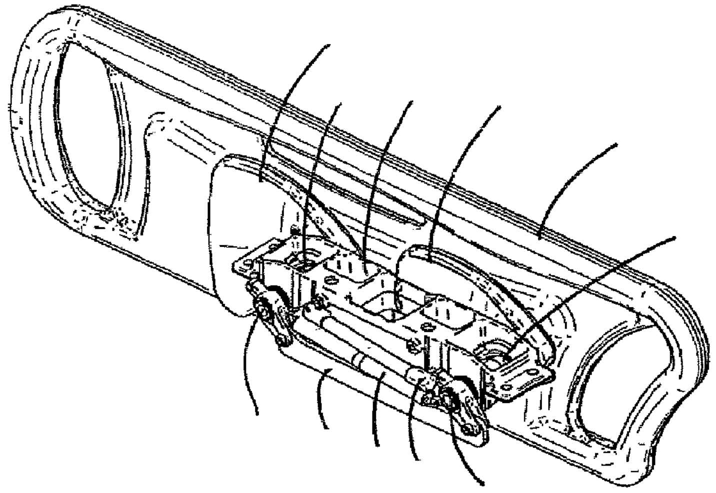
FIGS. 50A and 50B depict perspective internal and front internal views of the spring and damper in the lowered siderail according to one embodiment of the present invention wherein the angle between the arm and the mechanism is about −35 degrees.
Figure 50:
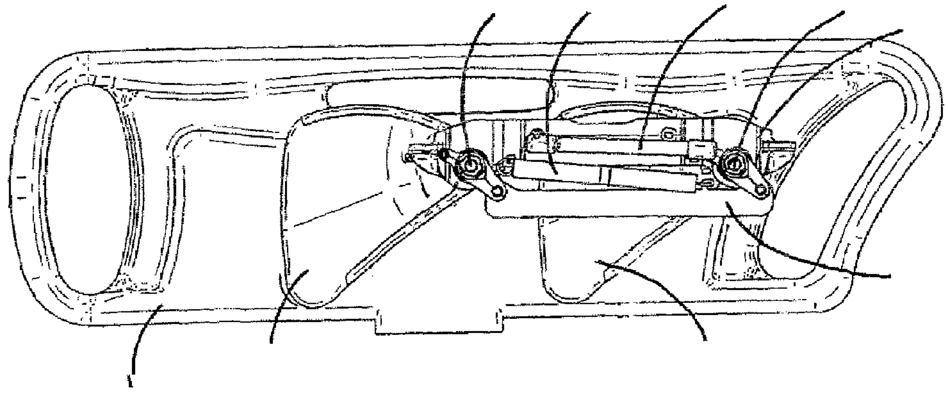

The patient support apparatus comprises a headboard, a footboard, a pair of head-end siderails, and a pair of foot-end siderails. Head and foot-end siderails are configured to move between raised or deployed positions, FIGS. 47 and 48 and lowered or stowed positions, as shown in FIGS. 49 and 50 to permit entry and egress of patients into and out of the patient support apparatus. Head-end siderails are coupled to the head section of the deck support and may be moved between raised and lowered positions. Foot-end siderails are coupled to the intermediate frame and may also be moved between raised and lowered positions. As the head section of the deck support rotates relative to the intermediate frame, head end siderail also rotates relative to the intermediate frame.

Siderails include rail members and linkage assemblies coupled between 1) rail members and the head section of the deck support and 2) respective rail members and the intermediate frame, that permit the rail members to be moved between upper and lower positions.

The term "siderail body" is used to define the part of a siderail apparatus designed to ensure the patient does not fall from or exit the patient support apparatus when the siderail is in its fully or partially deployed positions. The term "locking mechanism" is used to define any mechanism configured to allow the siderail to be locked or unlocked in any predetermined position. The term "support arms" is used to define the physical components connecting the siderail body to the mechanism casing through pivots situated in proximity of each end of each of said support arms. The term "guiding mechanism" is used to define a means for guiding the siderail body through a lateral movement of the siderail body towards and away from the patient support apparatus during rotational movement of the siderail body. The term "inside view" is used to define a view in relation to the siderail means the view from the side in relative proximity of the patient support apparatus and the term "outside view" is used to define a view from the side opposite to that shown in the inside view. The term "upper pivot" is used to define a pivot used to connect a support arm and a siderail body or siderail body support. The pivot connected to the other end of the support arm is defined to as a "lower pivot". The previous definition is not affected by the spatial position of the lower and upper pivot relatively to each other, as this position can change during operation of the siderail mechanism.

The present invention provides a movable siderail for use with a patient support apparatus comprising a siderail body and two or more support arms. A first end of each support arm is pivotally connected to the siderail body in a longitudinally spaced apart relationship using an upper pivot. A second end of each support arm is pivotally connected to a cross-member in a longitudinally spaced apart relationship through a lower pivot, the cross-member being coupled to the patient support apparatus, to either the deck support or the intermediate frame. In one embodiment, the head-end siderail is attached proximate the first end of the deck support and the foot-end siderail is attached to the seat section of the intermediate frame.

The movable siderail for use with the patient support apparatus according to the present invention comprises a siderail body and two or more support arms. A first end of each support arm is pivotally connected to the siderail body in a longitudinally spaced apart relationship using an upper pivot, a second end of each support arm is pivotally connected to a cross-member in a longitudinally spaced apart relationship through a lower pivot, the cross-member being coupled to either the deck support or the intermediate frame. Each support arm is configured to have a shape with a width greater at the first end than at the second end thereof. The siderail body is movable between a deployed position and a stowed position through clock-type rotational movement in a plane substantially vertical and substantially parallel to the longitudinal length of the patient support apparatus. As a result of the shape of the support arms, the siderail angle defined between each support arm and the bottom edge of the siderail body remains obtuse at all times during the rotational movement of the siderail body. This configuration eliminates pinch points created between each support arm and the bottom edge of the siderail body, which typically occur when traditional support arms are used.

The movable siderail for use with the patient support apparatus according to the present invention comprises a siderail body with two or more support arms. A first end of each support arm is pivotally connected to the siderail body in a longitudinally spaced apart relationship using an upper pivot, a second end of each support arm is pivotally connected to a guiding mechanism through a lower pivot operatively engaged thereto in a longitudinally spaced apart relationship. The guiding mechanism is coupled to a cross-member connected to either the deck support or the intermediate frame. Each of the lower pivots includes a radial protrusion configured to engage with a groove in the guiding mechanism. When the lower pivots are rotationally moved, the radial protrusions are guided by the grooves thereby creating a transverse transitional movement of the pivots along the pivot slots of the guiding mechanism resulting in the transverse movement of the siderail body towards or away from the patient support apparatus, during the raising or lowering movement of the siderail.

Siderail Body and Support Arms

FIG. 47B illustrates a three dimensional inside view of one embodiment of the siderail. The siderail body is connected to two support arms through two respective upper pivots. Two respective lower pivots are used to connect the other ends of the two support arms to a cross-member. The distinctive shape of the support arms is an example of the configuration designed to avoid the creation of pinch points between the support arms and the lower side of the siderail body during movement of the siderail. FIG. 47A illustrates an outside view of the embodiment of FIG. 47B with the siderail body attached to the siderail mechanism. The siderail body is coupled to a siderail body support, and can be replaced or changed if damaged or to suit different needs, without having to change the complete siderail. A release system for a locking mechanism is shown. The location of the release system is designed according to its intended use. As such, where it is preferable to limit the use of the locking mechanism to the caregiver or someone else other that the person on the patient support apparatus, the release system can be configured and located on the siderail body support where it cannot be operated by the person on the patient support apparatus. This configuration is useful for security and safety reasons.

With reference to FIGS. 47C, 48B, 149B and 50B, inside views of the siderail in accordance with one embodiment are illustrated for different positions from a fully deployed position (FIG. 47C) to a fully stowed position (FIG. 50B). It can be clearly identified that the angle formed between each support arm and the bottom edge of the siderail body remains obtuse at all times during the rotational movement of the siderail body. The siderail body of the siderail mechanism can be made for example from plastic or other synthetic materials which can be molded while the siderail body support can be made for example of aluminum, aluminum alloys or any other material with a desired level of strength. These materials are provided solely as examples and the choice of materials used for these parts can vary according to various considerations such as weight, strength, appearance, durability and sturdiness for example.

The characteristics of the shape of the support arms is an important feature. Several shapes for the support arms can be used, with the common characteristic that the width of the support arms is greater at the upper ends (operatively connected to the upper pivots) than the lower ends (operatively connected to the lower pivots) so that the angle defined by the lower side of the siderail body (or siderail body support) and the support arms remains obtuse at all times during the operation of the siderail, eliminating pinch points during operation of the siderail.

Figure 51:
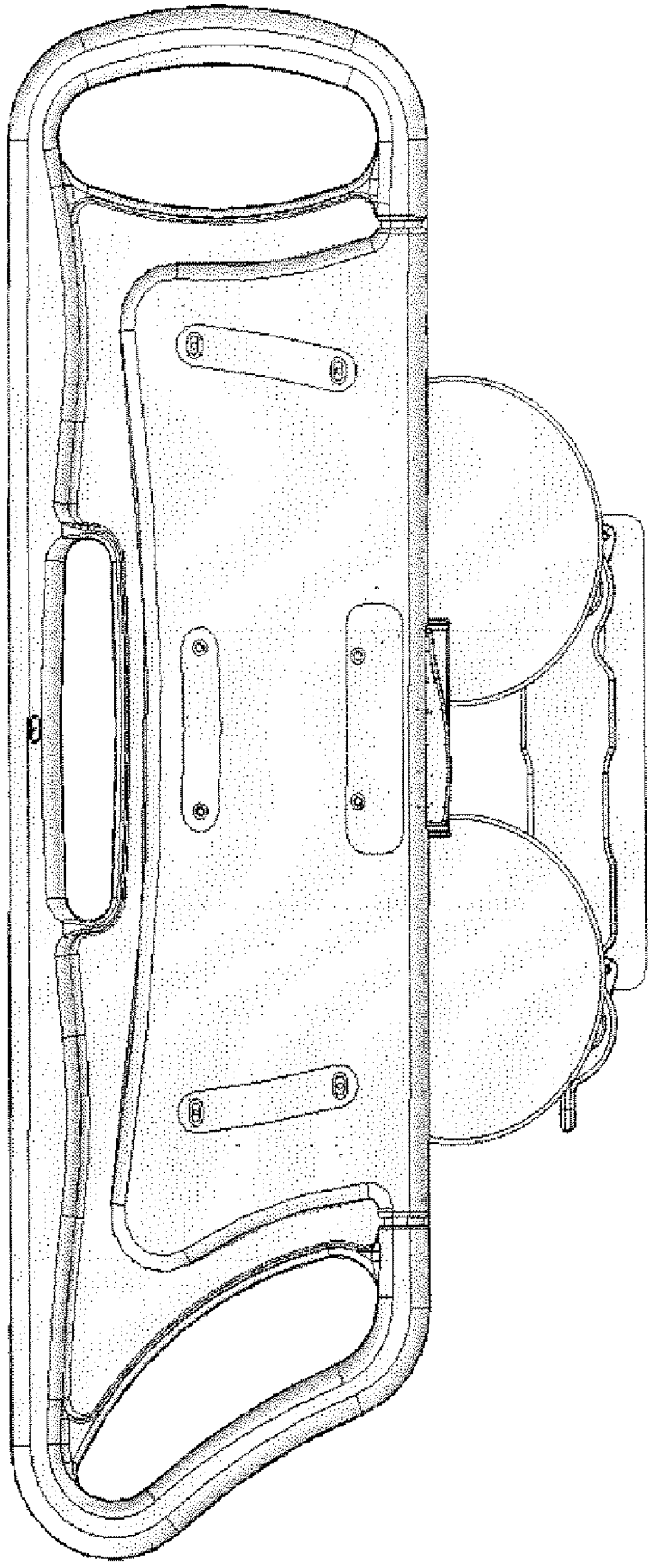
FIG. 51 is a front exterior view of a siderail according to one embodiment of the present invention in a fully raised position wherein the shape of the support arms is round.
Figure 52:
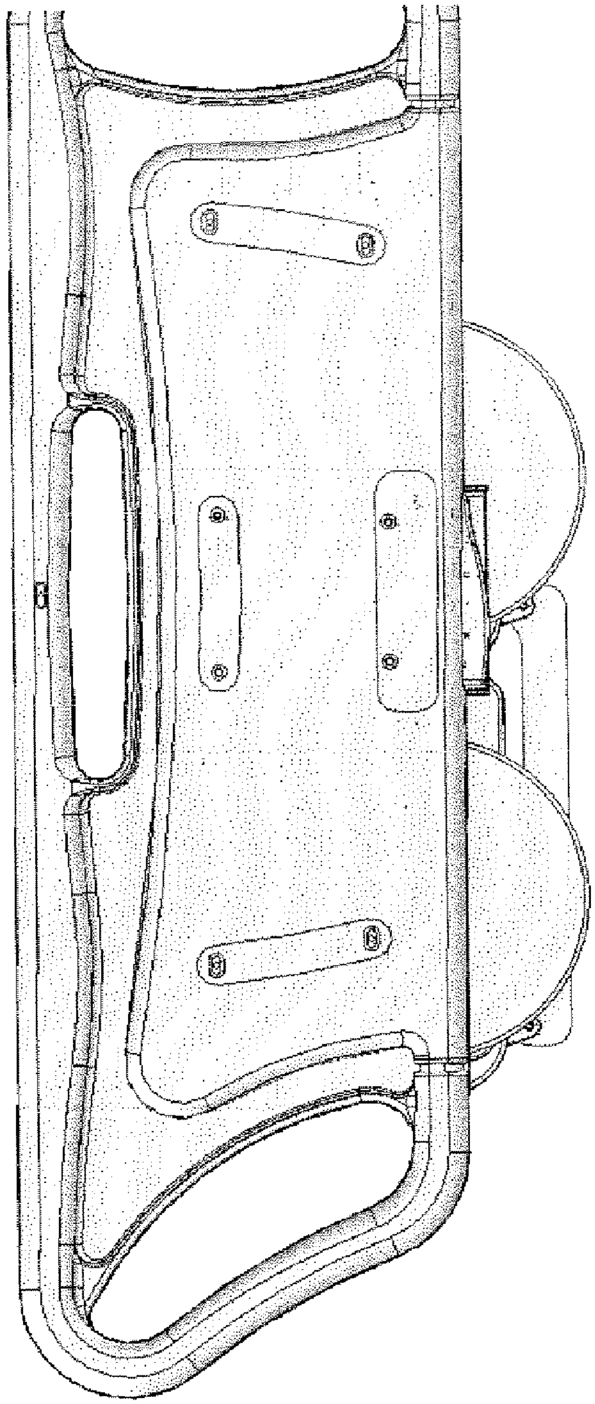
FIG. 52 is a front exterior view of the siderail of FIG. 51 in a partially raised position.
Figure 53:
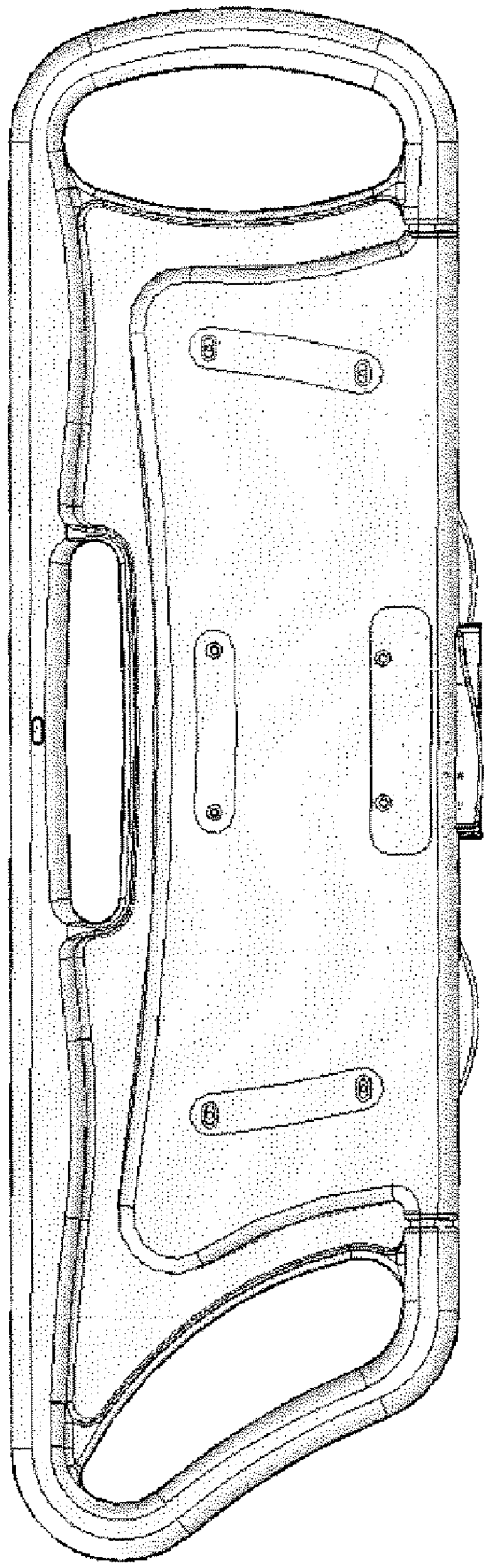
FIG. 53 is a front exterior view of the siderail of FIG. 51 in a partially lowered position.
Figure 54:
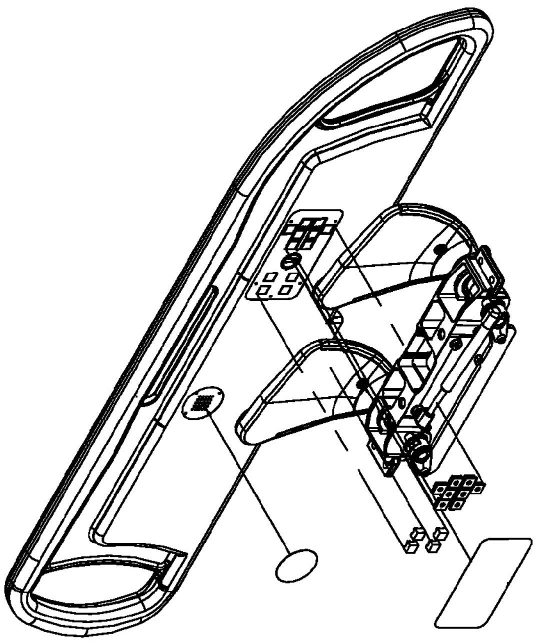
FIGS. 54A and 54B depict perspective internal views of right and left head-end siderails according to one embodiment of the present invention, wherein the siderail control system is shown in an exploded view.
Figure 54:
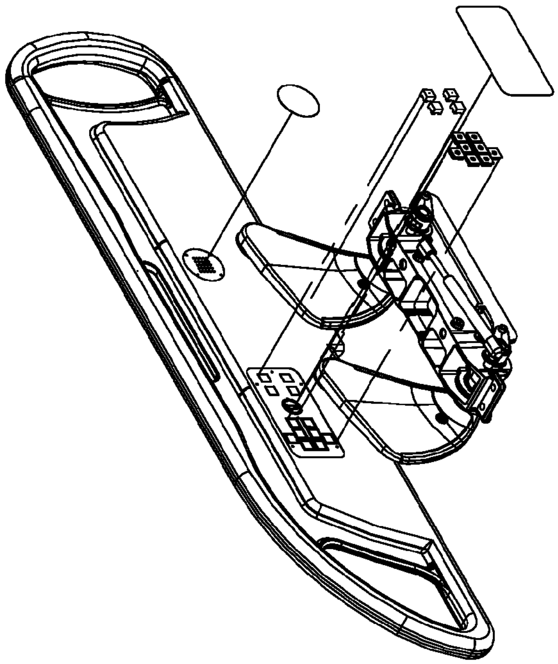
Figure 55:
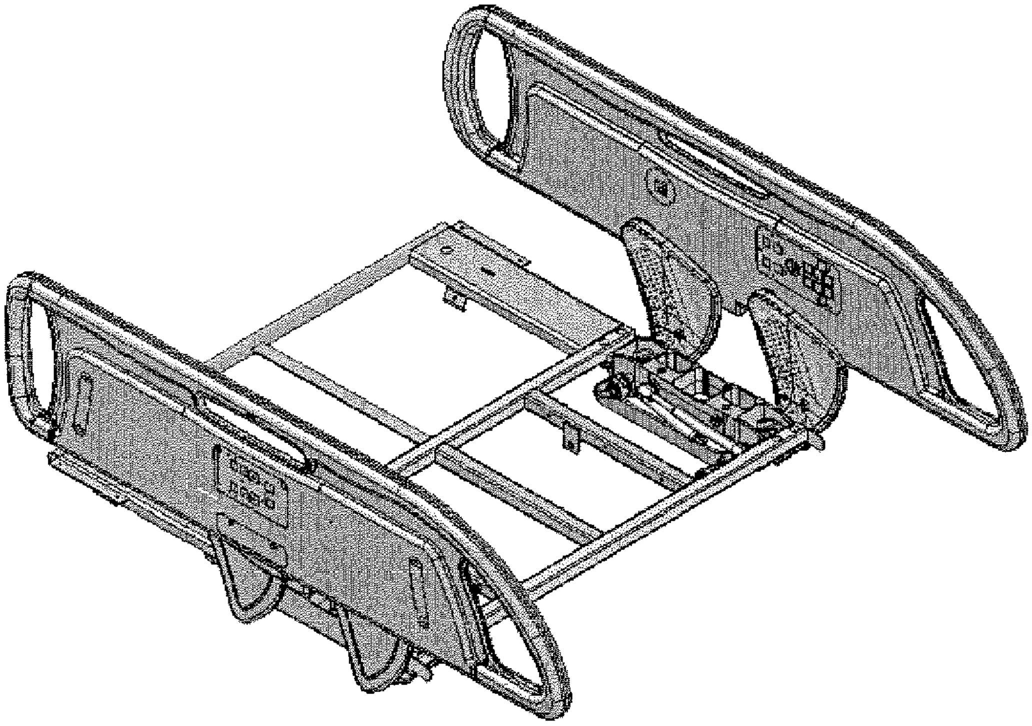
FIG. 55 shows a perspective view of the head-end siderails according to one embodiment of the present invention in a raised position attached to the lying surface support.
Figure 56:
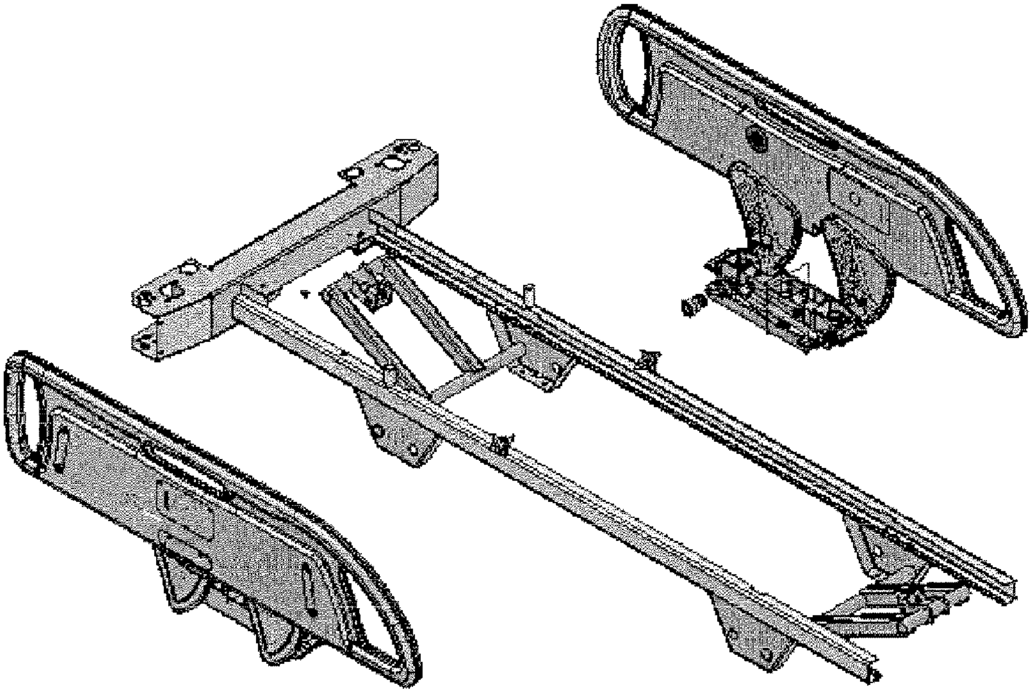
FIG. 56 depicts a perspective view of the position of the head-end siderails according to one embodiment of the present invention relative to the load frame.
Figure 57:
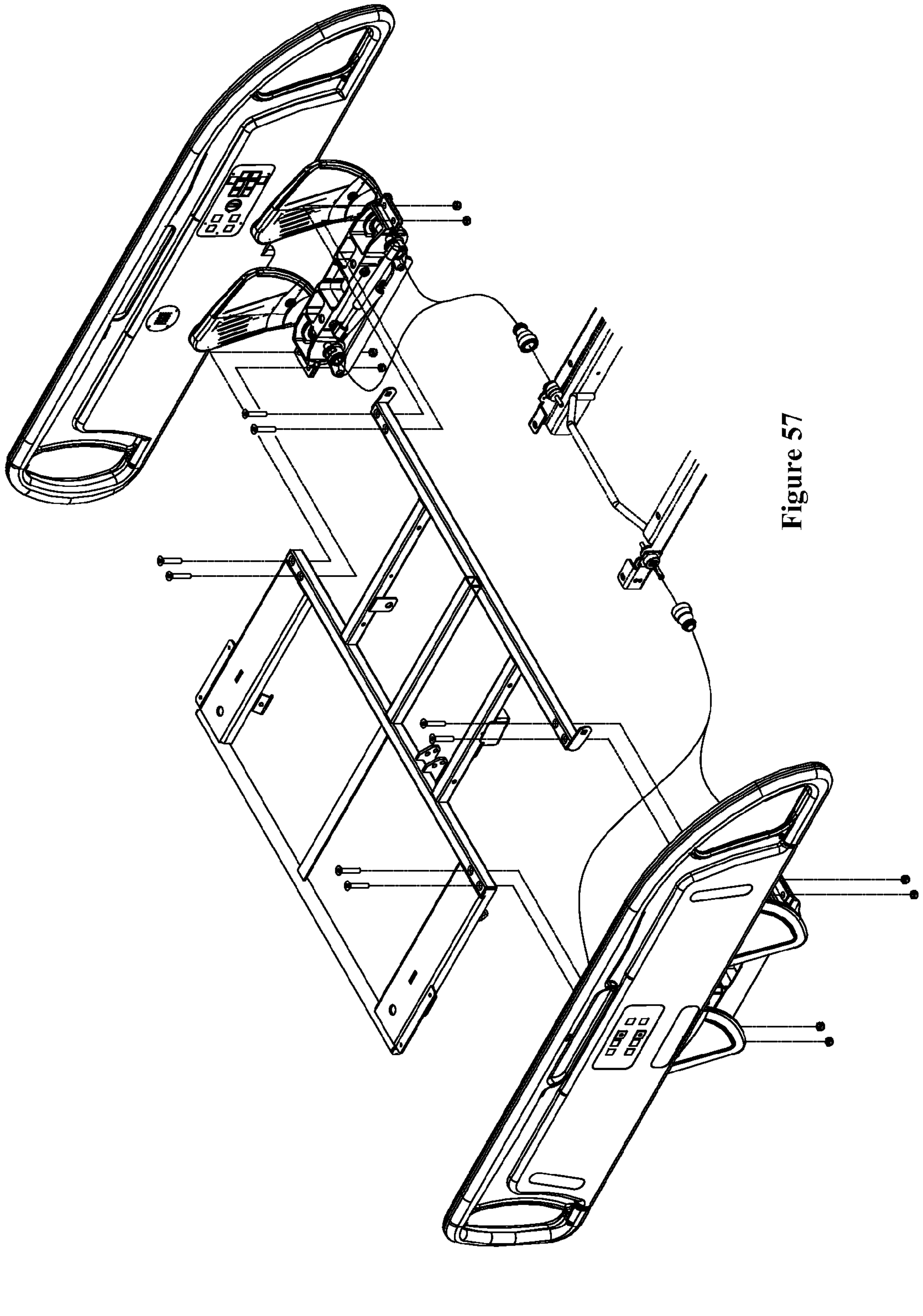
FIG. 57 depicts an exploded view of the head-end siderails according to one embodiment of the present invention attached to the lying surface support.
Figure 58:
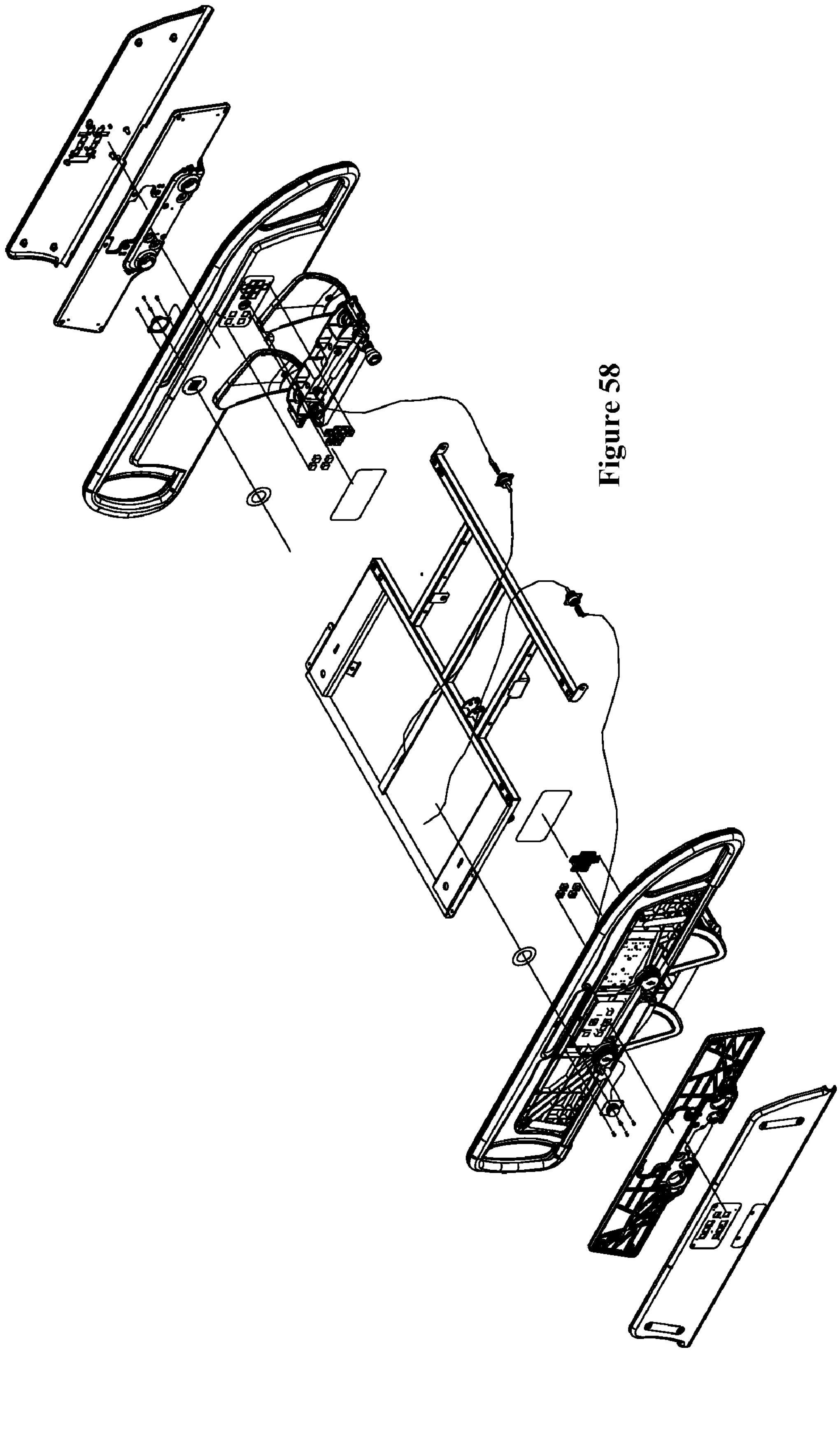
FIG. 58 depicts an exploded view of the head-end siderail components and control system with the lying surface support of FIG. 57.
Figure 59:
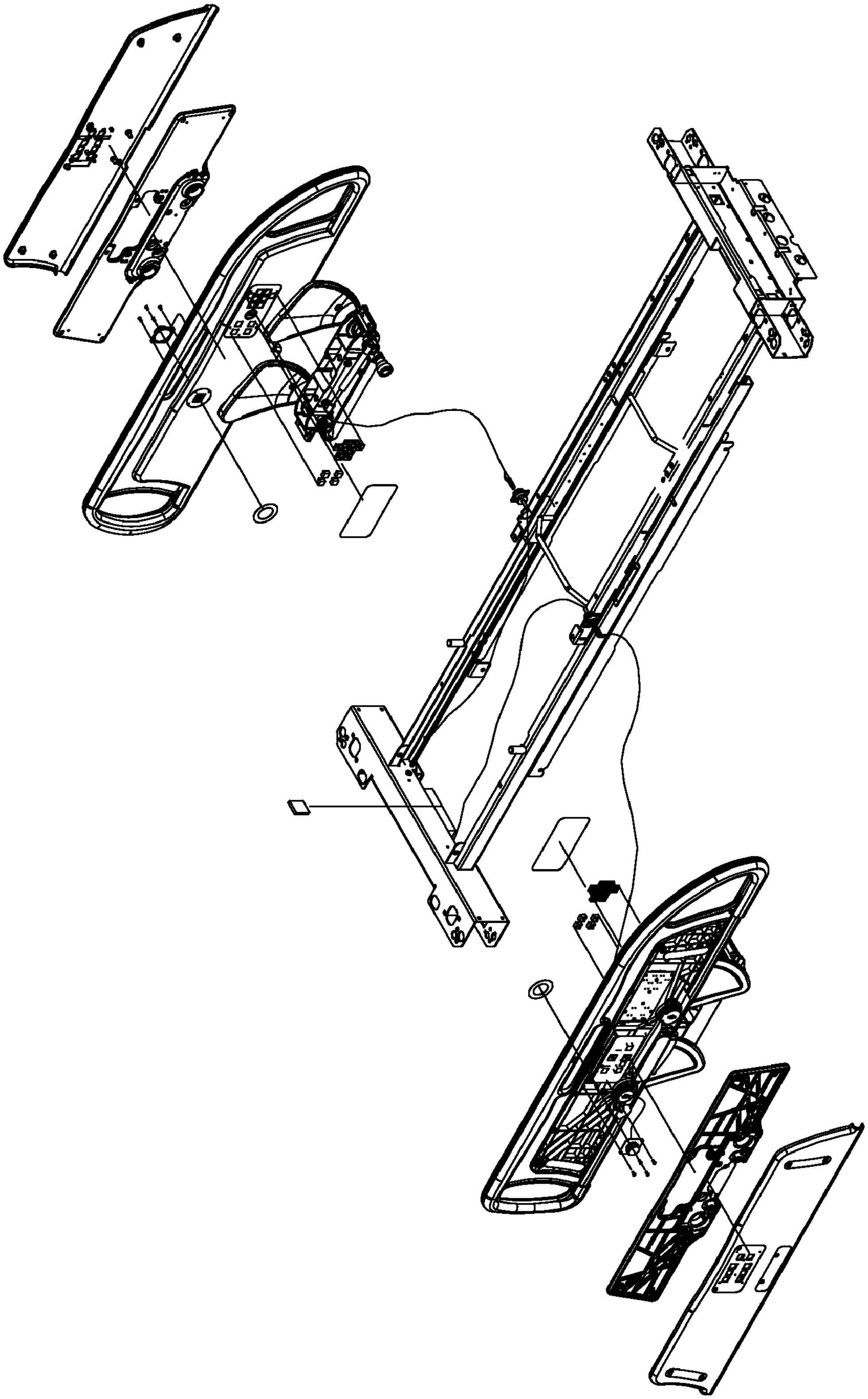
FIG. 59 depicts an exploded view of the head-end siderail components and control system in relation to the load frame.
Figure 60:
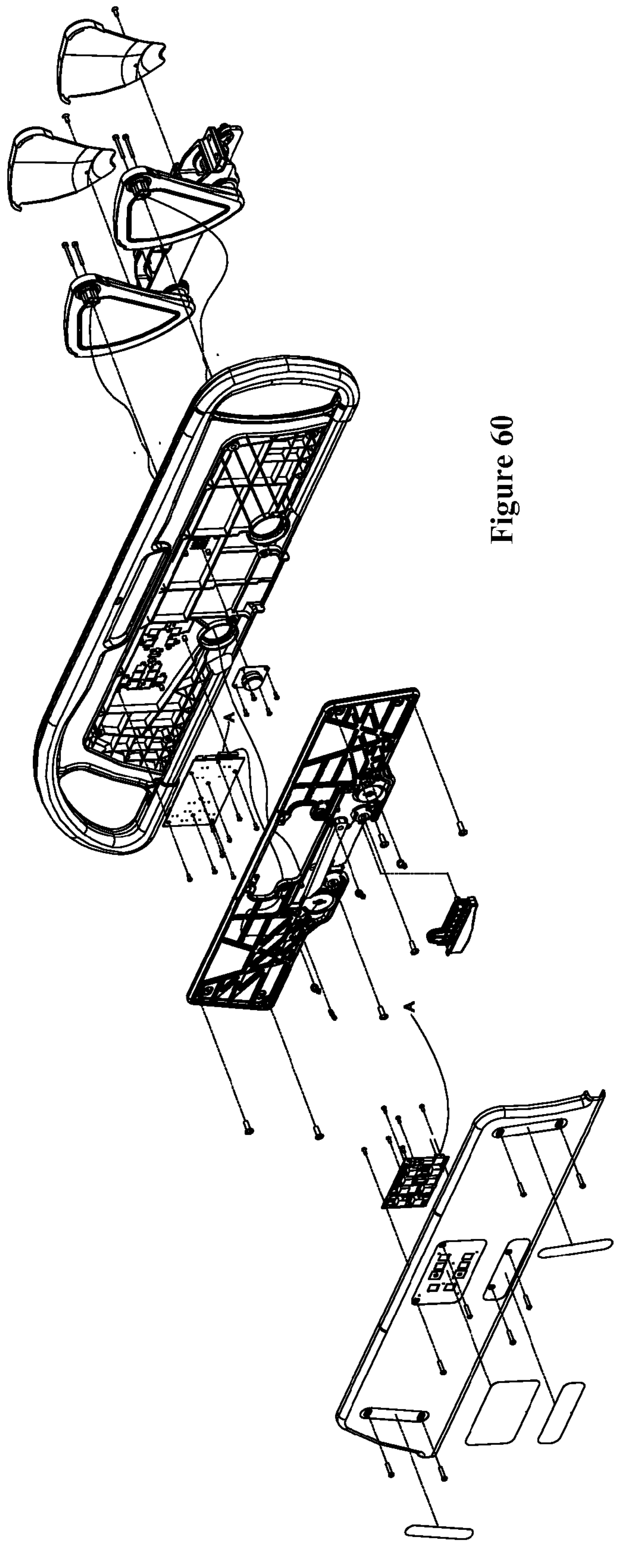
FIG. 60 depicts an exploded view of head-end siderail components, control system and support arms according to one embodiment of the present invention.
Figure 61:
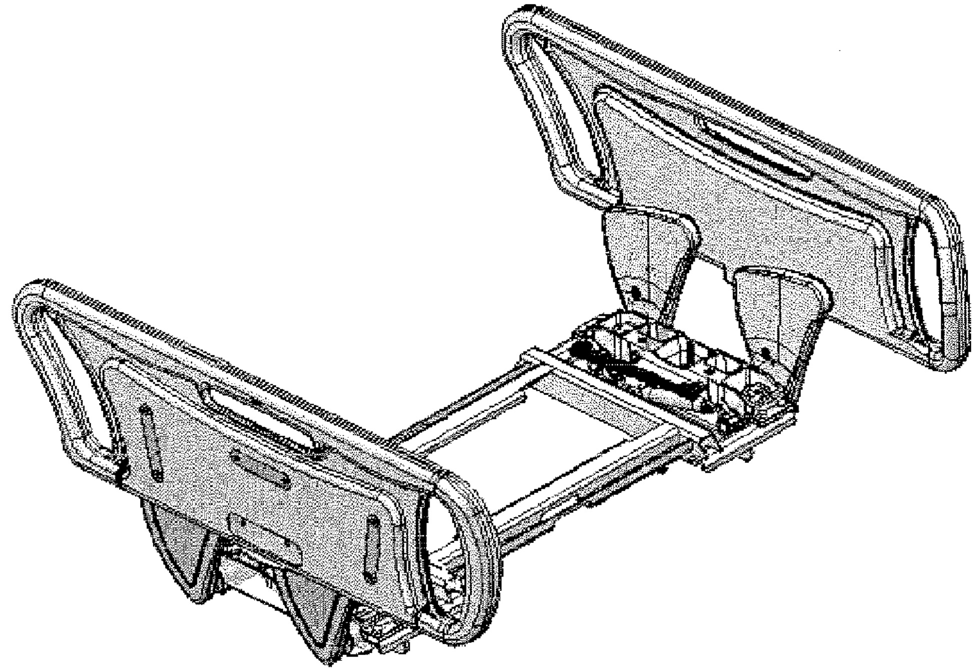
FIG. 61 shows a perspective view of the foot-end siderails in a raised position attached to the load frame according to one embodiment of the present invention.
Figure 62:
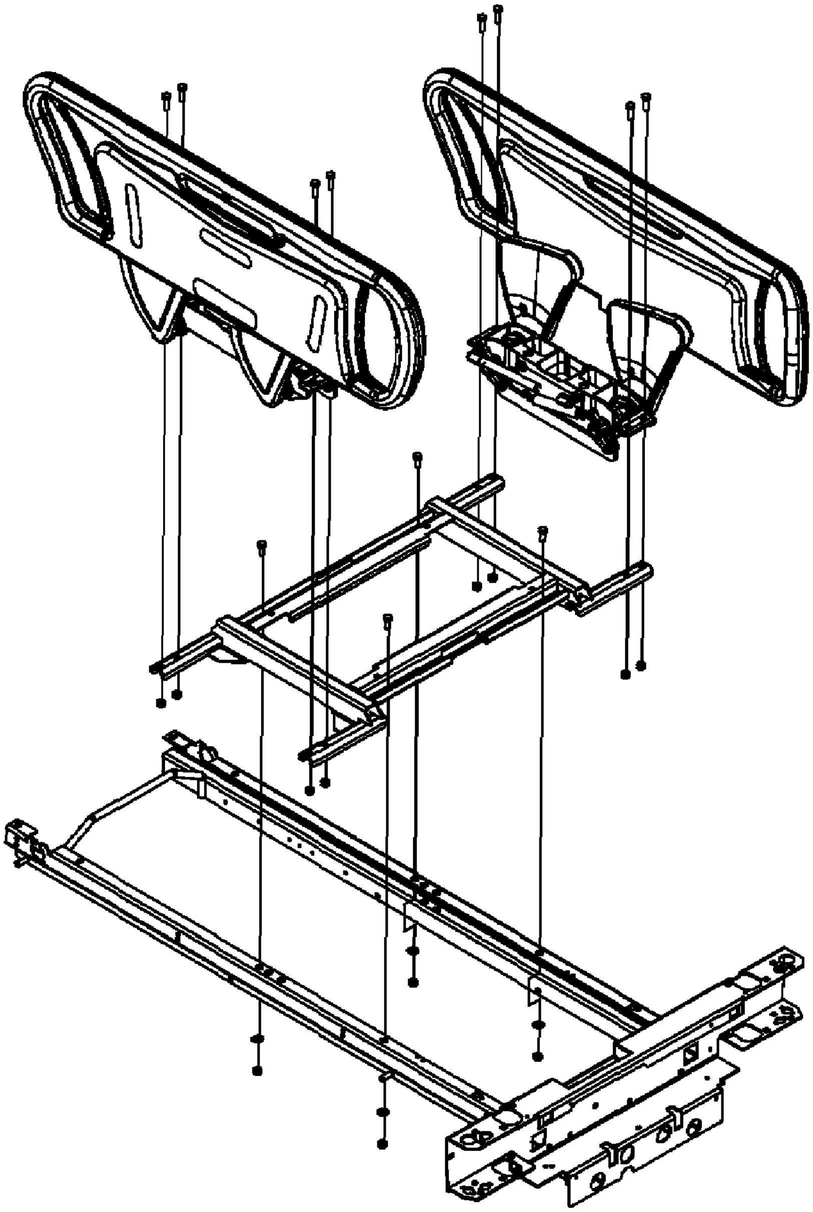
FIG. 62 shows an exploded view of the foot-end siderails of FIG. 61 attached to the load frame.
Figure 63:
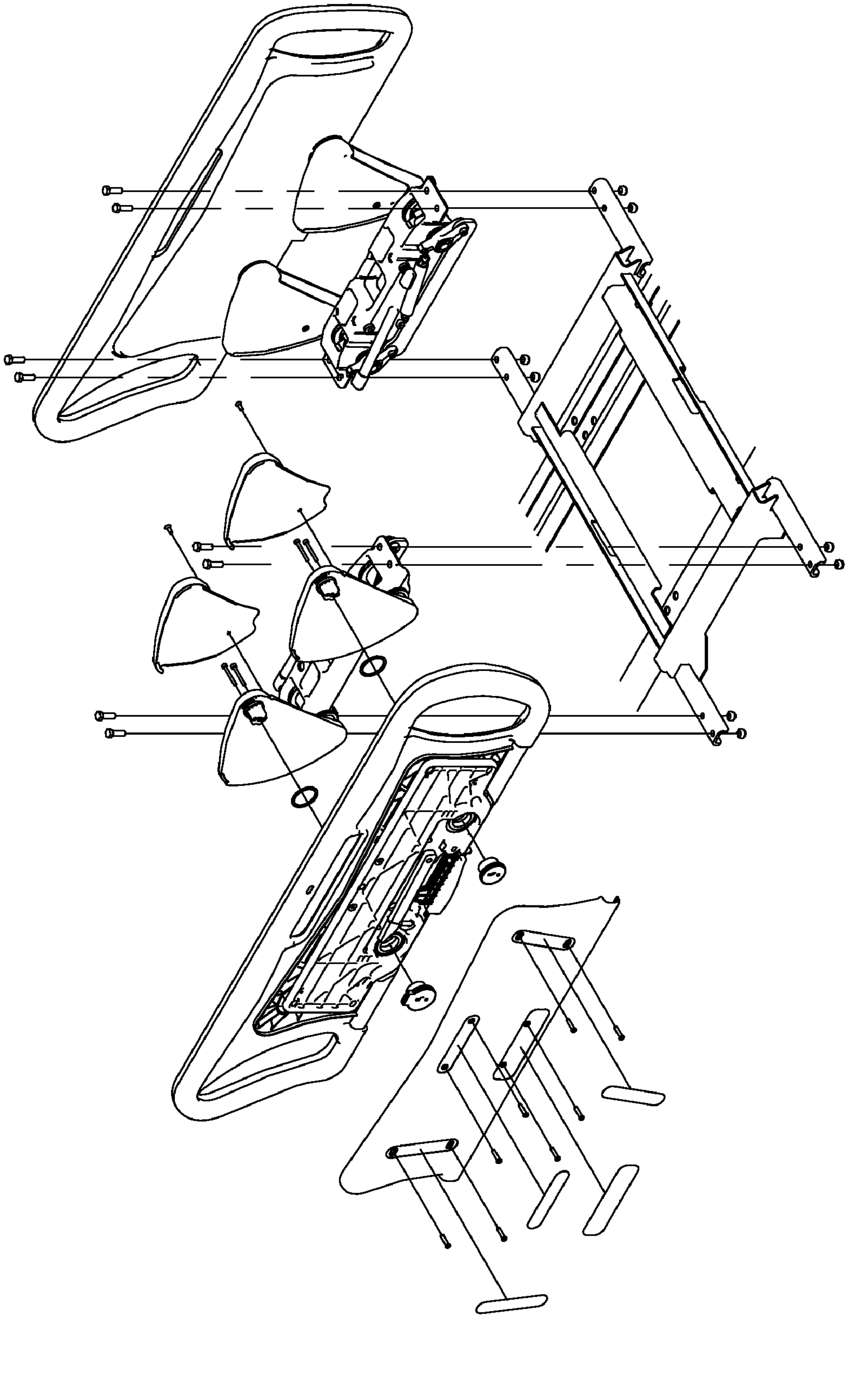
FIG. 63 is a perspective view of the foot-end siderails of FIG. 61 showing an exploded view of the right siderail and attachment to the seat section of the load frame.
Figure 64:
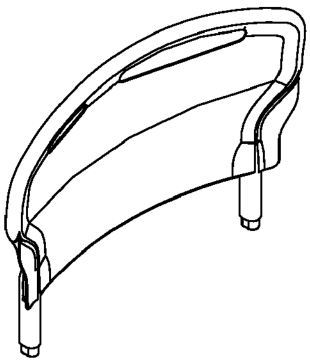
FIG. 64A is a perspective internal view of the headboard according to one embodiment of the present invention.
FIG. 64B is a perspective external view of the assembled footboard, equipment holder and holder support according to one embodiment of the present invention.
Figure 64:
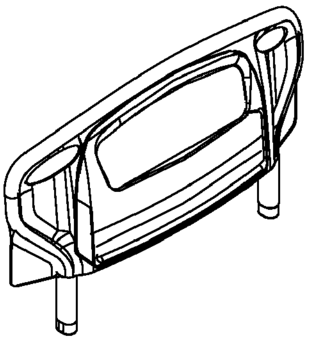
Figure 65:
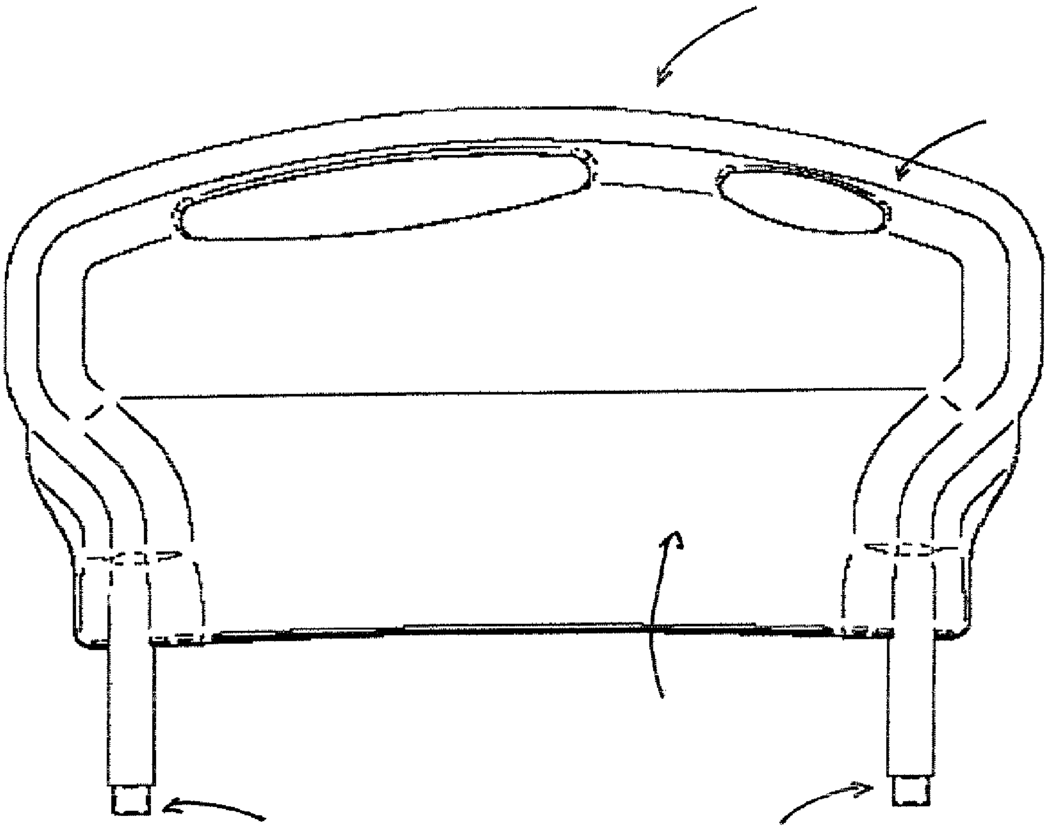
FIG. 65 is front external view of the headboard of FIG. 64A.
Figure 66:
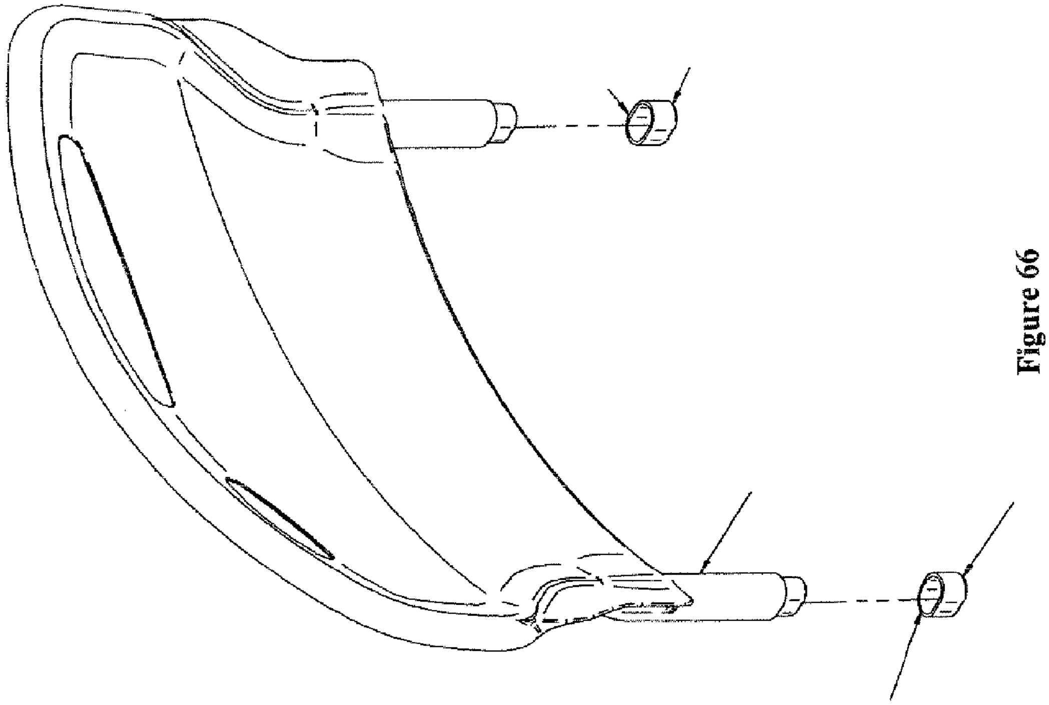
FIG. 66 is a perspective internal view of the headboard of FIG. 64A showing an exploded view of the caps or covers and the headboard posts.
Figure 67:
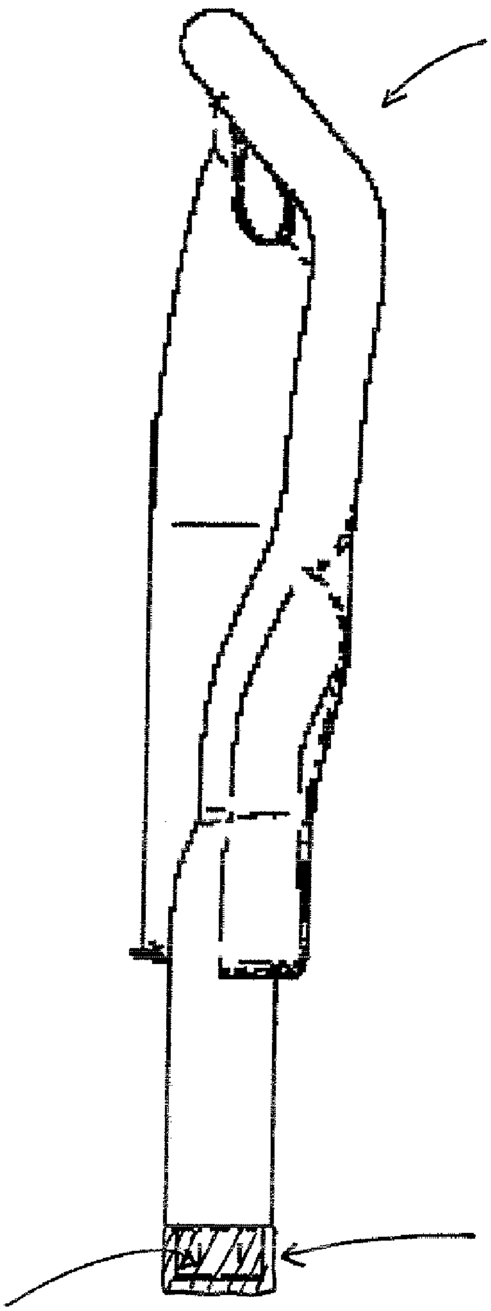
FIG. 67 is a side view of the headboard of FIG. 64A.
Figure 68:
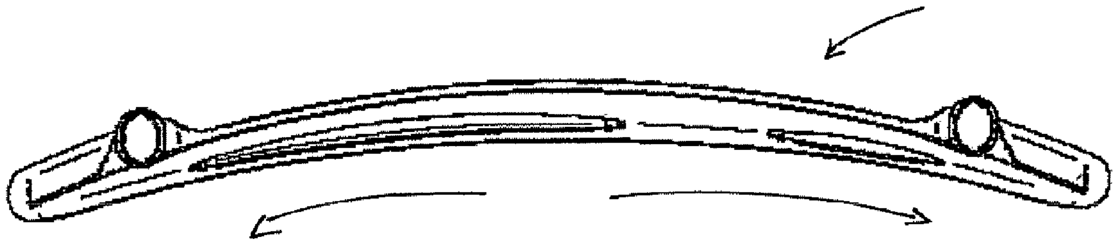
FIG. 68 is a bottom view of the headboard of FIG. 64A.

For example, possible shapes for the support arms are triangular, trapezoidal, round (see for example FIGS. 51-53), having sides curved in a convex or concave manner, etc. To have the desired effect of eliminating pinch points, the location of the connection between the upper ends of the support arms and the upper pivots is also important. The connection points between the upper ends of the support arms and the upper pivots have to be proximal to the rotational side of the support arms which faces the rotational movement when the siderail is moved from the deployed position to the stowed position as illustrated in FIGS. 47C, 48B, 49B and 50B.

FIGS. 48B and 49B are detailed inside views of the siderail at intermediate positions. The angle formed by the bottom edge of the siderail body and the support arms remains obtuse until it is eliminated when the siderail body (shown in FIGS. 49A-B) is lowered to a point where the upper pivots are substantially aligned horizontally to the lower pivots. This illustrates how the siderail body can be moved laterally towards and away from the center of the patient support apparatus in order to minimize the width of the patient support apparatus when not in use and conversely maximize the patient's surface when in use. Also, the vertical and lateral movement of the siderail body takes place through a single movement during operation of the siderail and thereby decreasing the effort and separate actions required for operation of the siderail.

Guiding Mechanism and Cross-Member

FIGS. 47A-C are detailed views of the siderail in the fully deployed position according to one embodiment. The siderail body support is pivotally connected to two support arms through a pair of upper pivots. The two support arms are pivotally connected to guiding mechanisms through a pair of lower pivots, the guiding mechanisms operatively connected to a cross-member. A radial protrusion located on each lower pivot is operatively coupled to a bearing assembly which is operatively engaged with a groove of the guiding mechanism. The bearing assembly operatively coupled to the radial protrusion reduces the frictional coefficient during the operation of the siderail considerably diminishing the wear of the radial protrusion and the edges of the groove. Any kind of conventional bearing assembly can be used for this purpose. The shape and size of groove can vary depending on the desired lateral transitional movement of the lower pivots along the pivot slots of the guiding mechanism. The rotational movement around the lower pivots which occurs during operation of the siderail results in the transverse movement of the lower pivots and translates into a transverse movement of the siderail body support towards or away from the longitudinal centerline of the patient support apparatus. The distance between the siderail body support and the deck support or the intermediate frame is at its maximum in this deployed position. FIG. 47C illustrates an inside view of FIG. 47A and illustrates the angle formed between the support arms and the siderail body being obtuse.

The characteristics of the guiding mechanism can be configured in several ways. For example, the guiding mechanism can be cast in a single component, incorporating the cross-member. It can also be machined from a single piece of material. Some of the advantages of such embodiments are reduced costs of production, simplified installation and structural integrity of the guiding mechanisms and the cross-member. The guiding mechanism and cross-member can also be formed from several parts. For instance, the areas immediately surrounding the grooves of the guiding mechanism can be made from parts distinct from the rest of the guiding mechanism. Given that these sections of the guiding mechanism are the areas which will sustain the heaviest wear due to the friction between the radial protrusions located on each lower pivot or the bearing assembly operatively coupled to the radial protrusions, it is desirable to have these sections separate from the rest of the guiding mechanism and the cross-member in order to replace only the damaged sections when needed instead of replacing the whole guiding mechanism or cross-member.

This aspect of the invention is also useful to replace the said sections immediately surrounding the grooves of the guiding mechanism to change the configuration of the grooves for different uses of the siderail with the same patient support apparatus. The shape of the guiding grooves themselves can vary to accommodate various needs and various lying surfaces the siderail is to be used with. For example, the grooves can be linear, curved, angled or a combination thereof, as long as the guiding grooves of a siderail are identical and have the same orientation.

The embodiment illustrated in FIGS. 47-50, for example, has guiding grooves which have a substantially longitudinally linear portion followed by a curved portion. When a rotational force is applied to the siderail, there is no lateral movement until the radial protrusions engage with the curved portions of the guiding grooves. When the radial protrusions reach the beginning of the curved portions of the guiding grooves, the top of the siderail body is located lower that the side of the deck support or intermediate frame so that once the radial protrusions engage with the curved portions of the guiding grooves, the siderail body is free to translate laterally closer to the center of the patient support apparatus. Other embodiments where the radial protrusion and bearing assembly are in different positions during the lateral translation movement are also provided. The preceding is merely one example of possible configurations of the guiding grooves. The guiding grooves can have curved portions curving towards or away from the cross-member, or any combination of curved and linear portions. For example, a guiding groove can have two curved portions curving towards the cross-member separated by a linear portion such that a rotational force applied to the siderail body will result in a lateral movement translating in the siderail body being closer to the center of the patient support apparatus when in a fully deployed position or fully stowed position and will while the siderail body would be farther from the center of the patient support apparatus when in transitional positions.

In a further embodiment of the invention, the guiding grooves are located on the pivot shaft to operatively engage with one or more protrusions, coupled or no to a bearing assembly, extending from the inside of the pivot slot.

In one embodiment the guiding mechanism and the cross-member, or the different components thereof, as the case may be, can be made of several materials. Characteristics such as weight-to-strength ratio, hardness, wear resistance and corrosion resistance (corrosion from airborne corrosive agents, air and cleaning solvents and bodily fluids usually found in a hospital/medical environment) should be given consideration when choosing the materials to be used in the manufacturing of the guiding mechanism and the cross-member or the different components thereof. For example, aluminum is lightweight and resistant to corrosion, making a good material for the cross-member. However, other parts such as the areas immediately surrounding the grooves of the guiding mechanism and the slots of the lower pivot can be made from other materials to accommodate the higher frictional abrasion on such parts and therefore being more prone to wear. Materials with a high resistance to wear, such as steel, stainless steels or ferrite alloys for example, can be used for making these parts. Other parts of the siderail mechanism can be made from further different materials and are not limited in any way to the materials used for the guiding mechanism. The various parts of the guiding mechanism and the cross-member can comprise interlocking mechanisms provided between the multiple parts to ensure correct alignment of these multiple parts during assembly. As mentioned previously, for example, the guiding grooves within a same guiding mechanism have to be the same for the siderail to function properly, requiring parts that are precisely operatively connected. Slots, grooves, apertures or fittings, for example, may be used to interlock the various parts of the siderail together precisely.

With reference to FIGS. 48B and 49B, embodiments of the siderail are illustrated in transitional positions between a fully deployed position and a fully stowed position. The siderail body support is pivotally connected to two support arms through a pair of upper pivots. The two support arms are pivotally connected to the guiding mechanism coupled to the cross-member through a pair of lower pivots. A radial protrusion located on each lower pivot shaft is operatively coupled to a bearing assembly which is operatively engaged with a groove of the guiding mechanism. The bearing assembly operatively coupled to the radial protrusion reduces the frictional coefficient during the operation of the siderail considerably diminishing the wear of the radial protrusion and the edges of the groove. The radial protrusions are guided along the guiding grooves. The rotational movement around the lower pivots which occurs during operation of the siderail results in a transverse movement of the lower pivots and translates into a transverse movement of the siderail body support towards or away from the longitudinal centerline of the patient support apparatus. In the present embodiment, the distance between the siderail body support and the deck support or intermediate frame is at its maximum in this deployed position. Still referring to the present embodiment, the spacing between the support arms and the guiding mechanism of the cross-member is diminished as the siderail body is lowered. The rate at which the spacing between the support arms and the cross-member is diminished and the lateral transitional movement are defined by the size and shape of the guiding grooves of the guiding mechanism. Variations to the siderail can be made in order to get relative spacing between the support arms and the cross-member which varies at different stages of the rotational movement of the siderail body. A single or several lower pivot shafts can be designed to have radial protrusion to operatively be coupled to a bearing assembly which is operatively engaged with a groove of the guiding mechanism.

The operation of the siderail is as described above and illustrated in FIGS. 47-50. The distance between the lower portion of the siderail body support and the deck support or intermediate frame is at its minimum in this fully stowed position. FIG. 49B illustrates the absence of an angle between the support arms and the lower edge of the siderail body support, and therefore the absence of pinch points.

In one embodiment, the pivot shafts of the lower pivots engaging with the guiding mechanism are screw-type shafts. In this embodiment, the guiding mechanism is designed to have treads matching the radial extensions of the screw-type pivot shafts to operatively receive the said radial extensions creating a lateral translation movement of the pivot shafts through a rotation of the pivot shafts. The lateral translation movement is away or towards the guiding mechanism depending on the orientation of the rotational movement applied to the shafts. Using this type of screw-type pivot shaft, one or more lower pivot shafts can be designed to have radial extensions to operatively be coupled to a bearing assembly which can be operatively engaged with treads of the guiding mechanism.

In one embodiment the pivot journals or journal bearings can be used between the pivots shafts and their corresponding pivot slots. The pivot journals or journal bearings help reduce significantly the wearing of the pivot shafts and the corresponding pivot slots while also reducing high contact stresses and strain. Within the parameters of the embodiments of the present invention, this is especially useful when applied to the upper pivots since they sustain the heaviest strain during operation of the siderail mechanism due to their relational position from the lying surface.

During operation of the siderail mechanism according to an embodiment of the present invention, a rotational force is applied to the siderail body. However, while operating the siderail mechanism, there will always be a certain amount of substantially longitudinal force applied to the mechanism possibly resulting in binding at the pivot points. This can happen as a result of the application of a force to the siderail that is not aligned with the rotation centered with the lower pivots. In order to address and minimize such a result, an embodiment provides a first upper pivot slot being slightly oblong-shaped while the second upper pivot slot is circular. This feature is particularly advantageous for one hand operation of the siderail where the force applied to the siderail will likely not be aligned with the rotational movement of the siderail.

Locking Mechanism

In an embodiment the siderail includes a locking mechanism configured to allow the siderail apparatus to be locked in a specific position. The locking mechanism includes a locking arm pivotally mounted on the siderail body support at a first end and having a locking tooth at a second end. The locking arm is biased downwardly by a spring for the locking tooth to engage with a locking cog mounted on the shaft of one upper pivots. The position in which the siderail body is locked is determined by the position of the locking cog mounted on the shaft of one upper pivots. The locking mechanism includes a one hand lock release mechanism to unlock the siderail from its locked position to permit the moving of the siderail body.

Damper Mechanism

In one embodiment the movable siderail apparatus incorporates a damper mechanism. FIGS. 47-50 illustrate various views of the damper when the angle between the support arm and the cross-member (also called the siderail angle) is 70, 30, 0 and −35 degrees respectively. As the angle diminishes, the siderail body lowers relative to the cross-member. The cross-member is fixed to either the deck support (for the head-end siderail) or the intermediate frame (for the foot-end siderail) and therefore may not move when the siderail body moves.

The damper mechanism comprises a spring, link member and damper operatively connected with the cross-member of the siderail. One end of the spring is coupled to the cross-member and the other end is coupled to the link member. The link member is coupled to the cross-member with links that move proportionally to the rotation of the support arms. One end of the damper is coupled to the cross-member and the other end is coupled to a link.

The damper mechanism facilitates the downward, lowering movement of the siderail body. The damper mechanism prevents the siderail body from descending to a lower position at an undesired fast rate due to the gravitational force acting on the siderail body. The skilled worker will appreciate that the tension in the spring changes with movement of the siderail body and damper. For example, as the siderail body descends, the link member displaces longitudinally, thereby increasing tension in the spring.

Based on the shape of the support arm and the angle it forms with the cross-member, the siderail angle may vary at any given point. In this embodiment, as can be seen in FIGS. 47A-C, when the siderail body is fully raised or deployed, the siderail angle is about degrees and the damper is fully open. At this point, there is minimal tension in the spring.

As the siderail body lowers to a partially deployed position (see FIGS. 48A-B) the siderail angle decreases to about degrees, and the link member is displaced horizontally. The damper is partially open at this point.

FIGS. 49A-B depict a siderail angle of about 0 degrees at which point the siderail body is in a partially stowed position. The link member has displaced even further and the damper is partially closed.

FIGS. 50A-B depict the siderail body in a fully stowed position. The siderail angle is about 35 degrees past the horizontal and the damper is fully closed. Since the link member is at its maximum displacement, the tension in the spring is at its highest.

The magnitude of effect on the lowering movement is called the damping coefficient. For the adjustability of the damping coefficient, the stiffness of the material in the damper may be adjusted, thereby impacting the damper's degree of damping. The illustrated damper mechanism can use elastomeric pads which may be identified by color coding corresponding to the desired damping coefficient. As the damper mechanism of the illustrated embodiments are installed in the siderail mechanism to dampen the downward motion of the siderail body (ie: attenuating the force of gravity on the siderail), the range of desired damping coefficients is not large.

The damper mechanism can further act as a shock absorber by decreasing the amplitude of the mechanical oscillations (up and down movement) of the spring. As such, the damper mechanism eliminates or progressively diminishes the vibrations or oscillations of the siderail body, thereby resulting in a smooth movement from the fully deployed to the fully stowed positions.

There are many advantages associated with the use of a damper mechanism with the siderail movement, such as achieving a smoother movement of the siderail body, improving the feel for the user of the siderail, eliminating noise and possible damage or injury caused when a siderail body is dropped from the raised position and improving the feel of quality of the siderail.

Relative Positioning of Siderail

In various embodiments, the siderail or siderails are positioned on a first side of the patient support apparatus and can be designed to operate in a mirror fashion to the siderail or siderails located on the other side of the patient support apparatus, where the siderail on one side of the lying surface would operate in the opposite rotational direction (clock-wise/counter clock-wise) to the corresponding siderail on the other side of the patient support apparatus and where the longitudinal movement of the siderail bodies along the length of the patient support apparatus would be in the same direction. Alternatively, a patient support apparatus can have other configurations such as one siderail on one side and two siderails on the other. When a patient support apparatus comprises two siderails on a single side thereof, the relative rotational movement of these two siderails would be opposite in order to avoid impact therebetween, for example when only one of the two siderails is moved between a raised and lowered position and vice versa. A single patient support apparatus can have siderails of different shapes and sizes.

The Headboard and the Footboard

The headboard is removably connected to the load frame. The footboard is connected to the mobile frame. The headboard and footboard according to one embodiment of the present invention are individually molded using a gas-assist injection molding process. Gas-assist injection molding is a well-known process that utilizes an inert gas (normally nitrogen) to create one or more hollow channels within an injection-molded plastic part. During the process, resin such as polypropylene is injected into the closed mold. It is understood that any other suitable material, such as ABS, nylon, or any other resin compatible with the process may be used. At the end of the filling stage, the gas such as nitrogen gas is injected into the still liquid core of the molding. From there, the gas follows the path of the least resistance and replaces the thick molten sections with gas-filled channels. Next, gas pressure packs the plastic against the mold cavity surface, compensating for volumetric shrinkage until the part solidifies. Finally, the gas is vented to atmosphere or recycled. Advantages to using such a process over other molding processes are known to a worker skilled in the art.

The headboard is made of one piece. FIGS. 65-68 depict the headboard of one embodiment. The mold is designed to produce a curved removable headboard which is sturdy, very light, and easy to access and manipulate by the user.

Typically, medical professionals require access to the head section of a hospital patient support to position equipment proximate to the patient's head. In urgent situations, such as when the patient requires immediate medical attention, immediate access to the head section is often required. In both such situations, the headboard must be moved away from the access area or completely removed from the patient support. For a headboard that is removed from the patient support, it is desirable that such headboard be as light as possible, while still maintaining sufficient structural integrity. Once removed from the patient support, the headboard is typically place within the near vicinity, such as by leaning against a support surface such as a wall proximate to the patient support.

Since the headboard of the present invention is a one-piece unit, it is less costly to manufacture than headboards which have multiple parts and require assembly. With no additional parts to attach to the headboard, there are also fewer parts that are subject to mechanical failure.

The design of the headboard mold, and thus the patient support's headboard, is unique. The headboard has a generally rectangular shape. A generally tubular channel, which is hollow, borders the headboard at both sides and the top tapering inwards towards the bottom and ending in two ends which project below the generally rectangular portion of the headboard. Proximate to each end is a generally oval post for removably mounting the headboard into mounting sockets (not shown) which are affixed to the patient support proximate the top of the head section. Optionally, in order for the headboard to avoid being damaged when it is resting on the floor against a wall for example, a cap or cover, made of a non-stick material such as rubber, can be fitted around each post. Additionally, the cap may ensure a snug fit into the mounting sockets and minimize wear on the posts. The cap can be attached to or molded into the headboard.

The generally rectangular portion of the headboard comprises a flat thin layer of resin or headboard skin which joins the tubular channel. In one embodiment of the present invention, the headboard skin has a thickness of about ⅛ inch. It will be appreciated that the thickness of the headboard skin and tubular channel is proportional to the amount of material required and the weight of the headboard. The headboard can also be translucent or transparent for easier monitoring of the patient and better visibility.

The headboard has a gradual concave shape such that when the posts are fitted into the mounting sockets, the centre of the headboard skin is furthest from the patient support's head section. Given that the headboard is formed by a process which uses a minimal amount of resin, the concave shape provides additional stability to the headboard.

In operation, users, such as medical professionals, can seize the tubular channel at both sides of the headboard and lift upwards for removal of the headboard. Installation requires lining up over and inserting each post inside the mounting sockets. Optionally, one or more holes of various shapes and sizes can be located within the skin to allow users to conveniently grasp the headboard prior to removal or installation.

Figure 69:
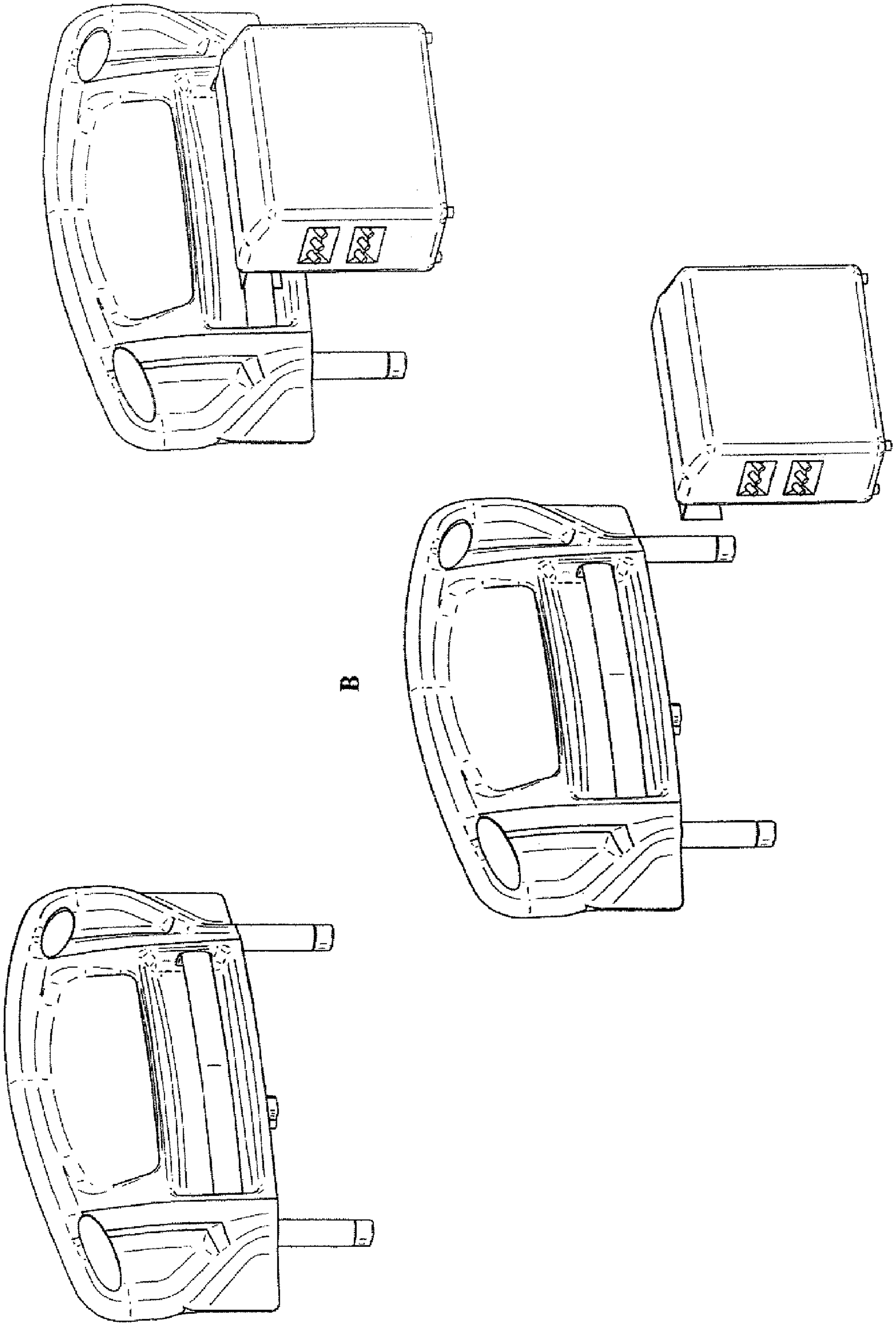
FIG. 69A is a perspective exterior view of the footboard, holder support and equipment holder without equipment according to one embodiment of the present invention.
FIG. 69B is a perspective exterior view of the footboard of FIG. 69A in relation to equipment which comprises a hanging means.
FIG. 69C is a perspective exterior view of the footboard of FIG. 69 B wherein the equipment is hanging on the equipment holder.
Figure 70:
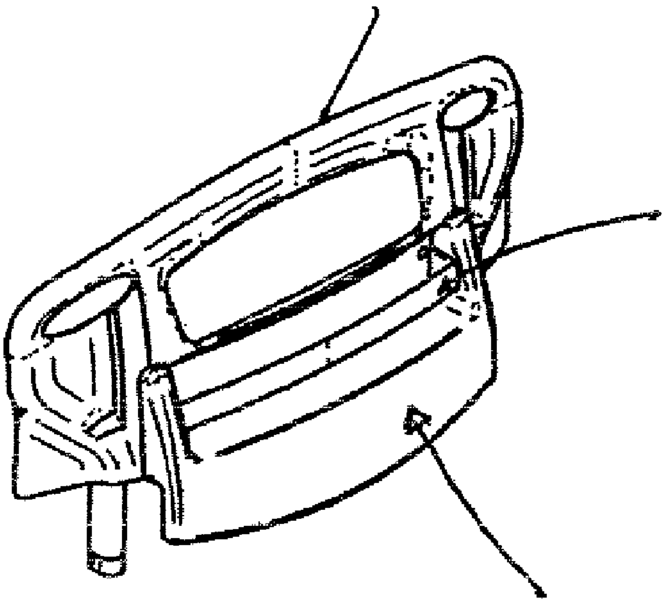
FIG. 70 is a perspective external view depicting the assembled footboard, equipment holder and holder support according to one embodiment of the present invention.
Figure 71:
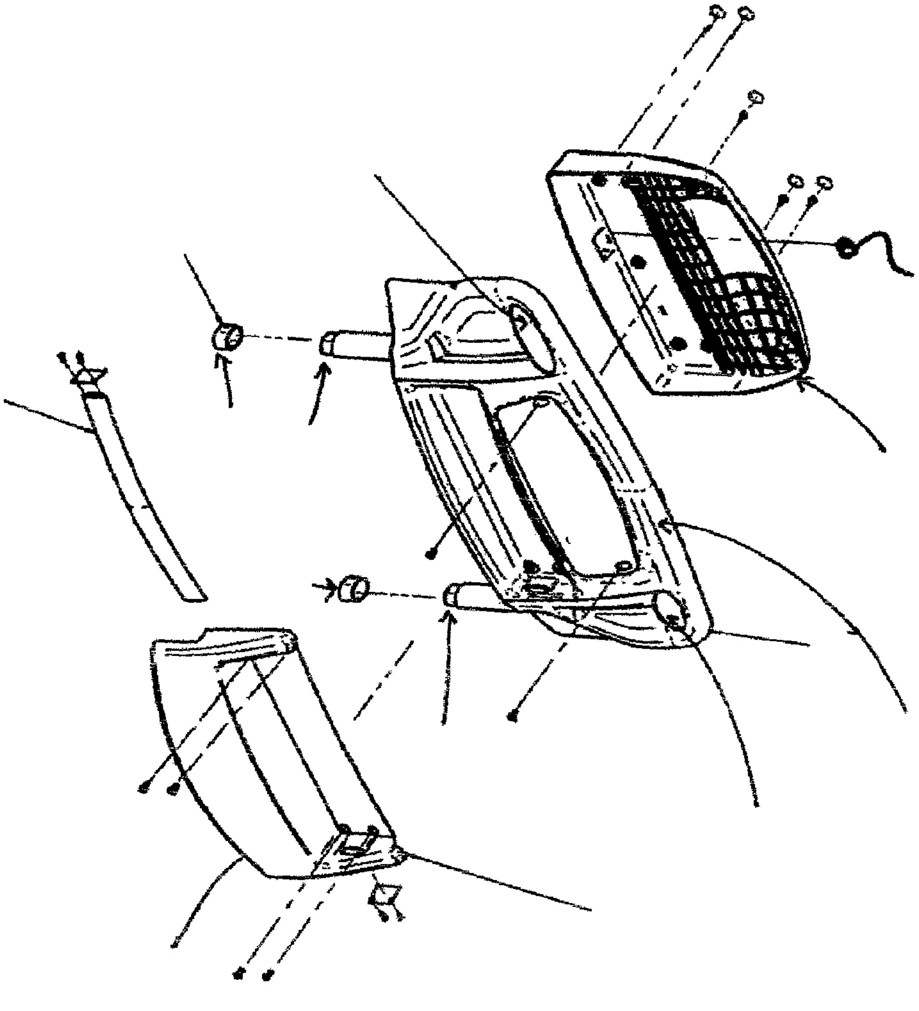
FIG. 71 is an exploded perspective view of the footboard of FIG. 70.
Figure 72:
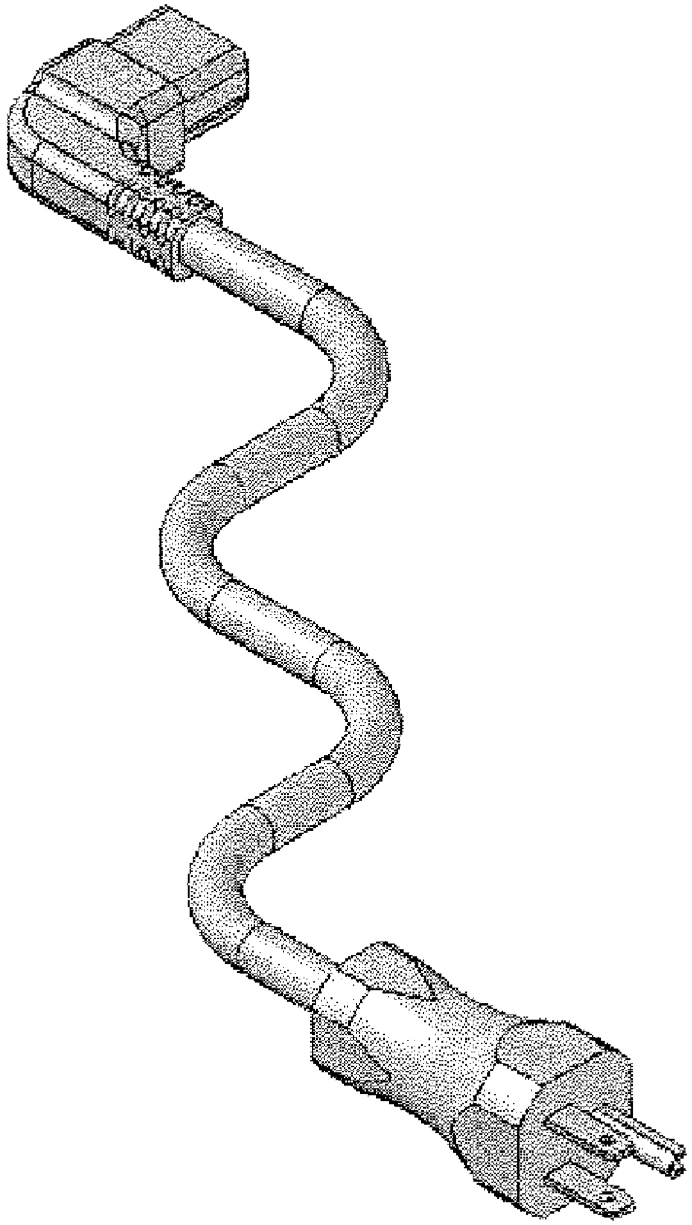
FIG. 72 depicts a power cord and plug for use as a power source according to one embodiment of the present invention.
Figure 73A:
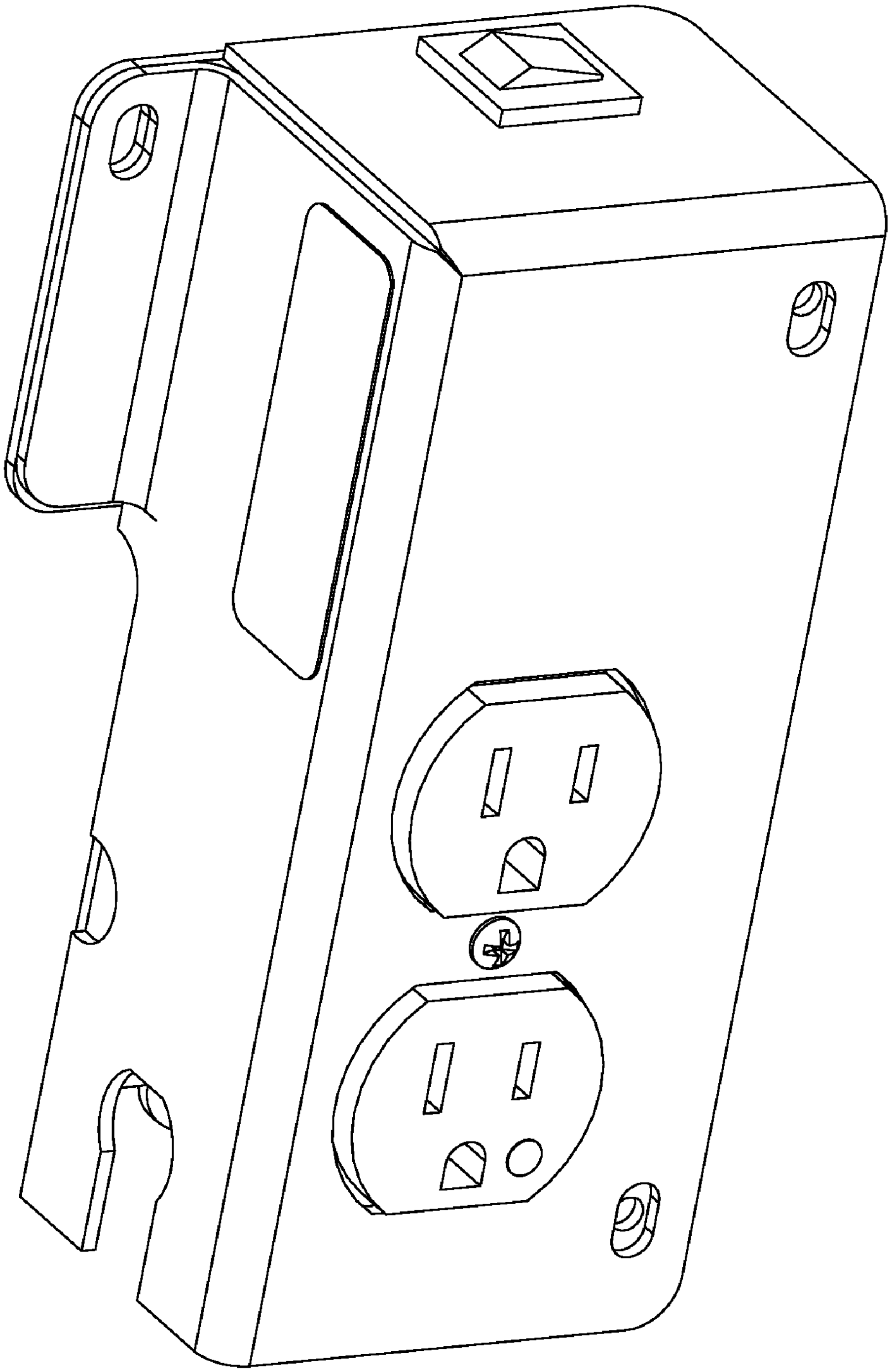
FIG. 73A depicts an auxiliary outlet according to one embodiment of the present invention.
Figure 73B:
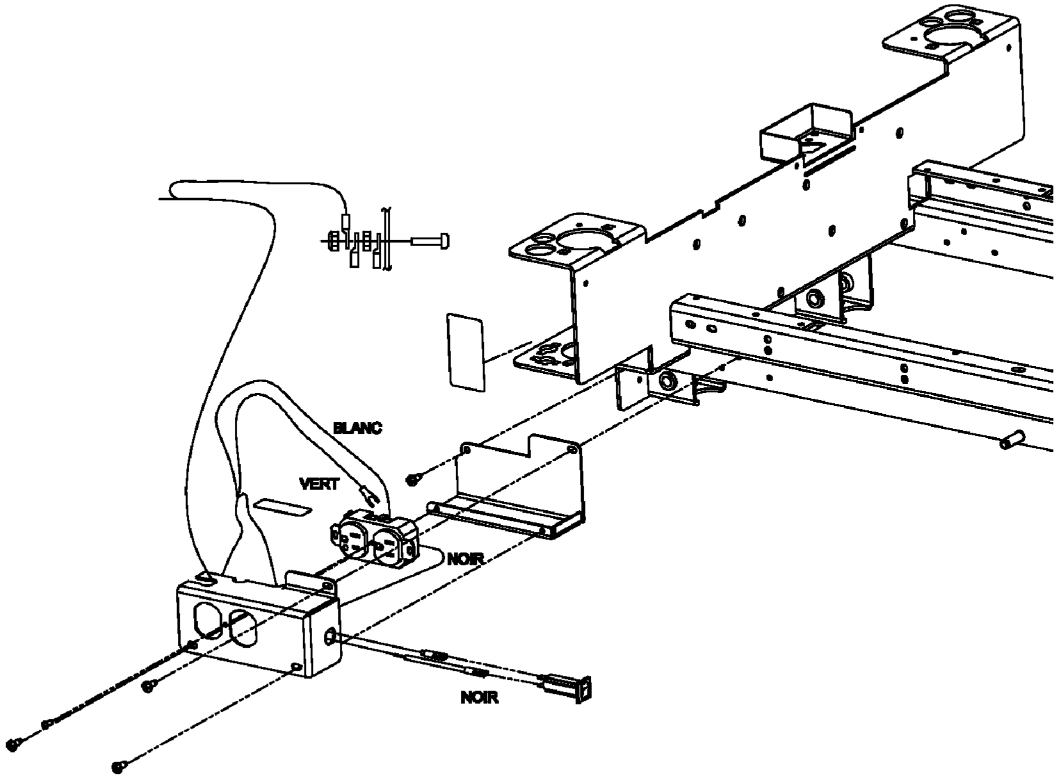
FIG. 73B is an exploded view of the auxiliary outlet of FIG. 73A attached to the load frame.
Figure 74:
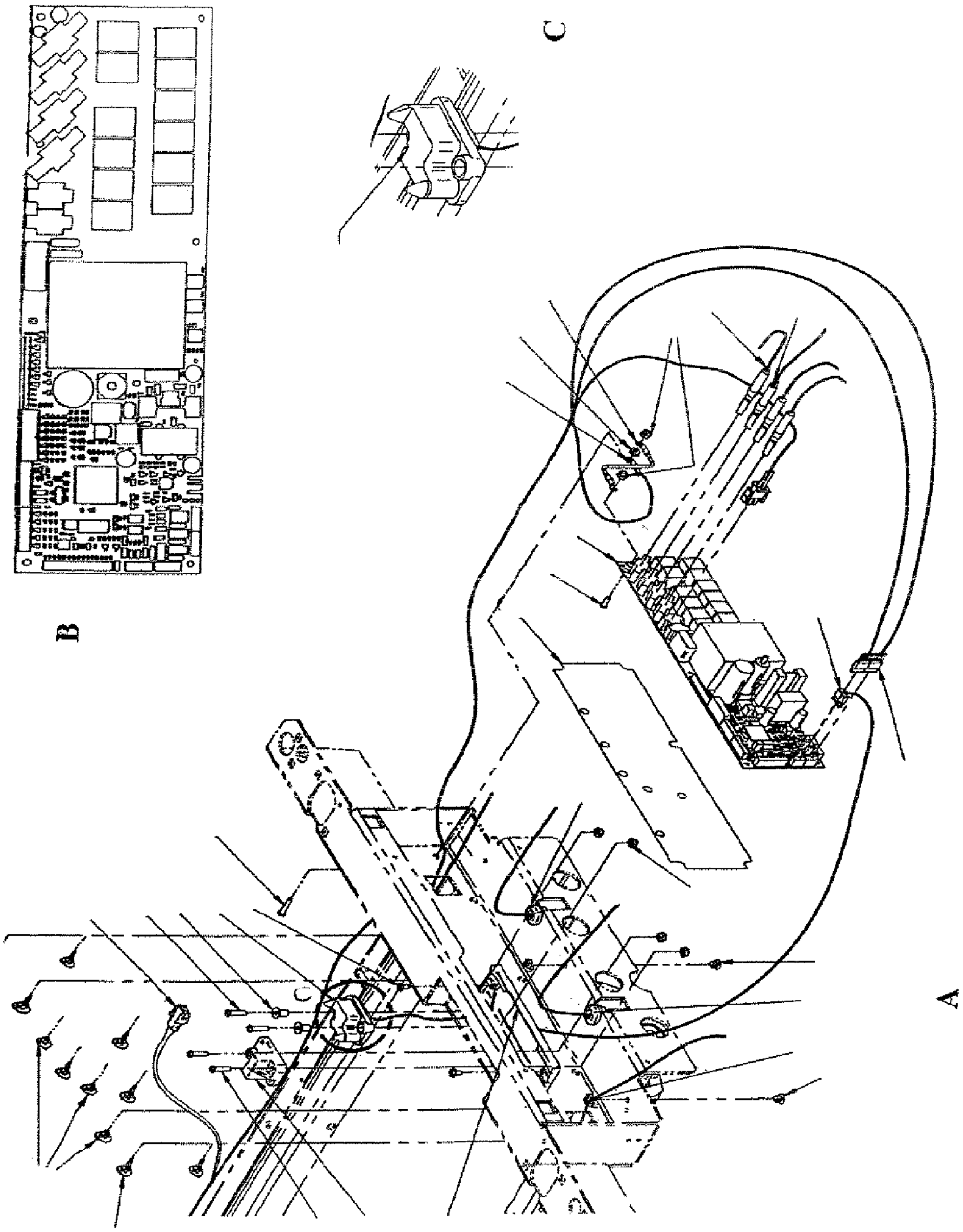
FIG. 74A is an exploded partial view of a control system attached to the foot end casing of the mobile frame.
FIG. 74B is an embodiment of the control board detail in the control system of FIG. 74A.
FIG. 74C depicts the connector position detail in FIG. 74A.
Figure 75:
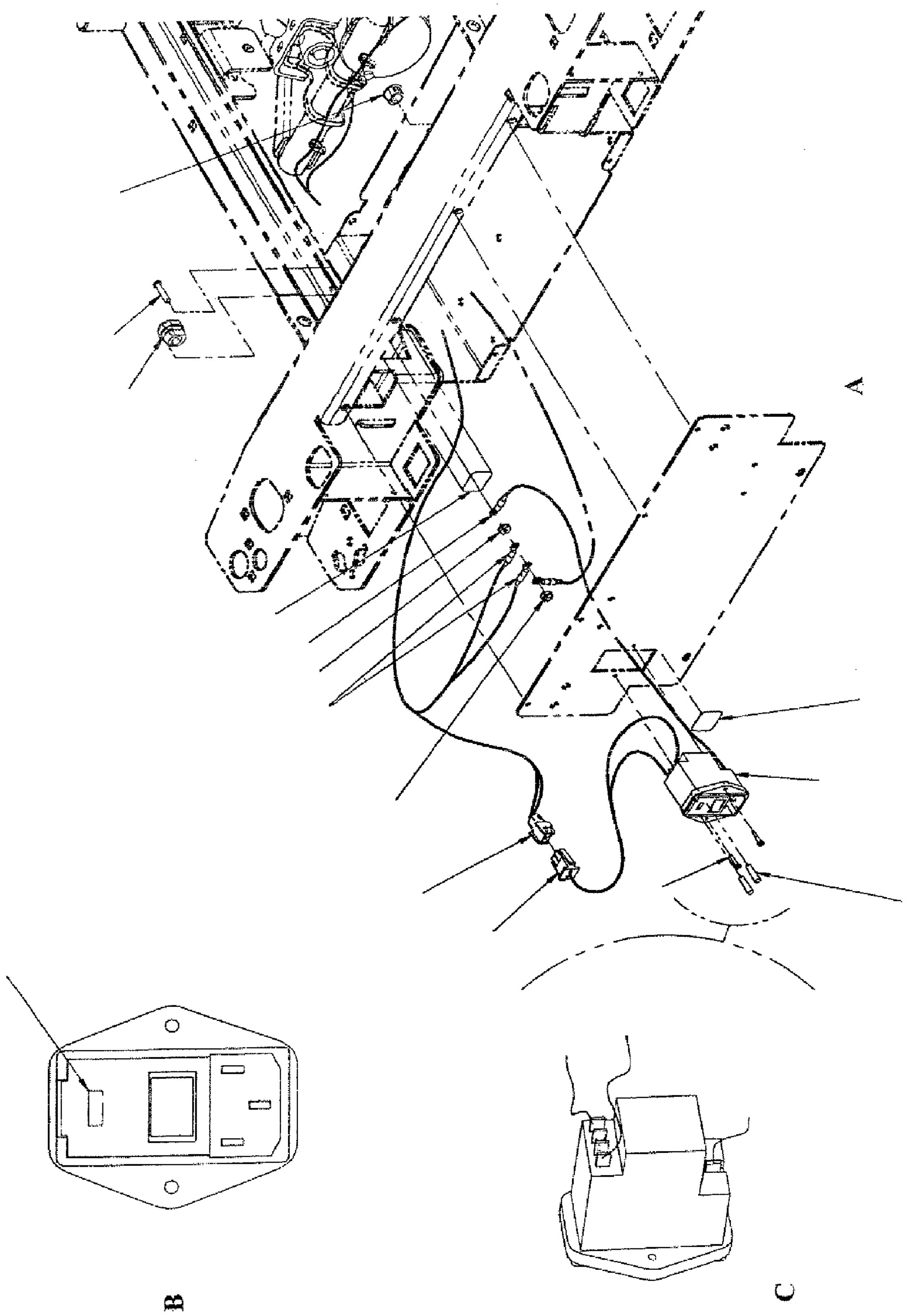
FIG. 75A shows an exploded partial view of a power system attached to the head end casing of the load frame according to one embodiment of the present invention.
FIGS. 75B and 75C are front and rear perspective views of the power supply inlet depicted in FIG. 75A.
Figure 76:
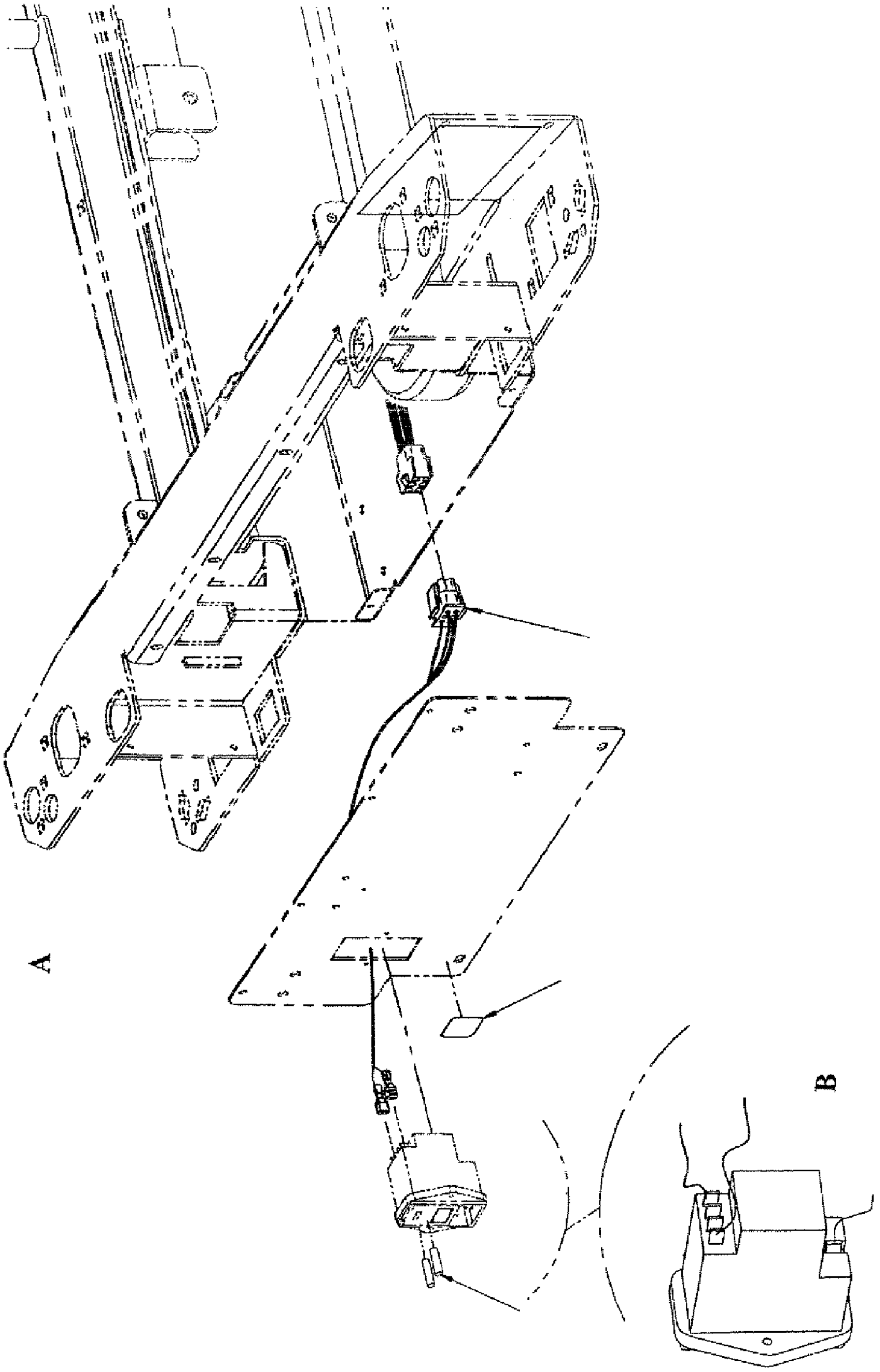
FIG. 76A shows an exploded partial view of another power system attached to the head end casing of the load frame according to one embodiment of the present invention.
FIG. 76B is a rear perspective view of the power supply inlet depicted in FIG. 76A.
FIG. 76C is a rear perspective view of the power inlet depicted in FIG. 76A.

FIGS. 69-71 depict the footboard of the present invention. The footboard is formed using a similar gas-assist injection molding process as the headboard. The footboard also has a generally rectangular shape. A generally tubular channel which is hollow, borders the footboard at both sides and the top tapering inwards towards the bottom and ending in two ends which project below the generally rectangular portion of the footboard.

Proximate to each end is a generally oval post for removably mounting the footboard into mounting sockets which are affixed to the patient support. Similar to the cap used with each post of the headboard, a cap can be fitted around each post.

The generally rectangular portion of the footboard is a thin layer of resin or footboard skin which joins the tubular channel. Optionally, one or more holes of various shapes and sizes can be located within the skin to allow users to conveniently grasp the footboard prior to removal or installation.

The footboard is molded to be attached to two additional components, a control board (not shown) at board zone and a holder support. Since a control board is attached to the footboard a back panel needs to be attached to the footboard to secure and protect the control board's electronic components. The control board has a display or console with which the user can interface.

The console can be of any shape or size. The board zone is generally structured to complement the interface. Users such as medical professionals, require an unobstructed view and access to the console. In one embodiment, a generally rectangular control board and console can be located at the board zone in the upper middle half of the footboard. The console may optionally be positioned at an angle relative to the vertical such that a user peering down at the console from a position above is afforded an unobstructed perspective of the console.

Below the console, generally in the lower middle half of the footboard is the holder support comprising a horizontally disposed equipment holder bar. The holder support is connected to the footboard such as with screws adhesive or other connection means. The holder bar is useful to hang extra equipment. As required, equipment such as pumps can be temporarily positioned on the holder bar as opposed to the top edge of the footboard which could otherwise obstruct the view and access to the console. In addition, use of the holder bar to hang equipment which is located lower than and away from the interface minimizes the risk of damage to the console and footboard. Such equipment can freely hang. Using the holder bar to hang equipment also results in less motion generated on the patient support which could otherwise disrupt the patient. Additional advantages to users are readily apparent including reducing the risk of damaged equipment which previously was hung on the top edge of the footboard and would subsequently fall or slide off.

In one embodiment shown in FIGS. 69A to 69C, the holder bar is directly attached to the footboard.

In another embodiment the holder bar is molded as part of the footboard. The holder bar is almost in line with the opening of the handles. By doing that, the handles and the holder bar can be used simultaneously to hang equipment.

The Power System

The Communication system and the remainder of patient support are powered by an AC source or a battery source.

The Communication System

A communication system is provided to communicate with and control various functions of the patient support. In one aspect the communication system comprises one or more load cells and one or more tilt sensors for compensating weight measurements when the patient support is articulated. For example, one or more load cells to measure the weight on the patient support are located in positions where the load can be read.

Loads Cells and Tilt Sensors

One difficulty with determining the patient's weight occurs when the patient support is articulated or at positions other than the horizontally flat base position at which the load cells are usually calibrated. For example, when the lying surface support is angled in respect of the horizon or is articulated at various angles, the raw measurements on typical load cells will not reflect a patient's accurate weight since the load's center of gravity shifts, thereby affecting the individual load signals sensed by each load cell. An inclinometry method to determine the angular position of a patient by way of gravitational accelerometers. When an accelerometer is in a stationary position, the only force acting on it is the vertical gravitational force having a constant acceleration. Accordingly, the angular position of the patient can be calculated by measuring the deviation in the inclination angle between the inclination axis and the vertical gravitational force. Although the accelerometers can provide an effective way to measure the inclination in the patient's position, the resolution of the gravitational accelerometers is restricted to a limited range of inclination angles. The resolution of the angular position of a patient can however be improved by using dual axis (X-Y) accelerometers to sense the inclination angle with a higher degree of accuracy over a broader range of inclination. Advantageously, the gravitational accelerometers can be orientated in a variety of mounted angles, independent of any reference to other components of the patient support. As a result, a particular accelerometer can be positioned such that its effective resolution specifically targets the anticipated range of inclination for a given application.

To provide a more complete assessment of a patient's position, a plurality of gravitational accelerometers can be located in various parts of the patient support, for example connected to the load frame, the mobile frame, the head, seat, thigh and foot sections of the lying surface support. Output from the plurality of accelerometers can be compiled to provide a three-dimensional view of the patient's position. The angular inclination readings from the X-axis channel or the Y-axis channel of an accelerometer can be independently selected. Moreover, the sensed inclinations can be used to complement measurements from other sensors in the bed, such as load cells. In one embodiment of the present invention, monolithic gravitational accelerometers are employed to further reduce the inaccuracies associated with mechanical sensors.

As described above and referring to FIGS. 23, 32, 33 and 34, load cells 250 can be positioned at one or more locations in the frame system 30 of the patient support 10 such that measurements of various load signals can be achieved. Load cells 250 generate load signals indicative of forces applied to the load cells 250.

Accurate load cell 250 readings are important for various reasons such as determining the weight fluctuations of a patient over time and the patient's center of gravity at any given time.

Figure 32:
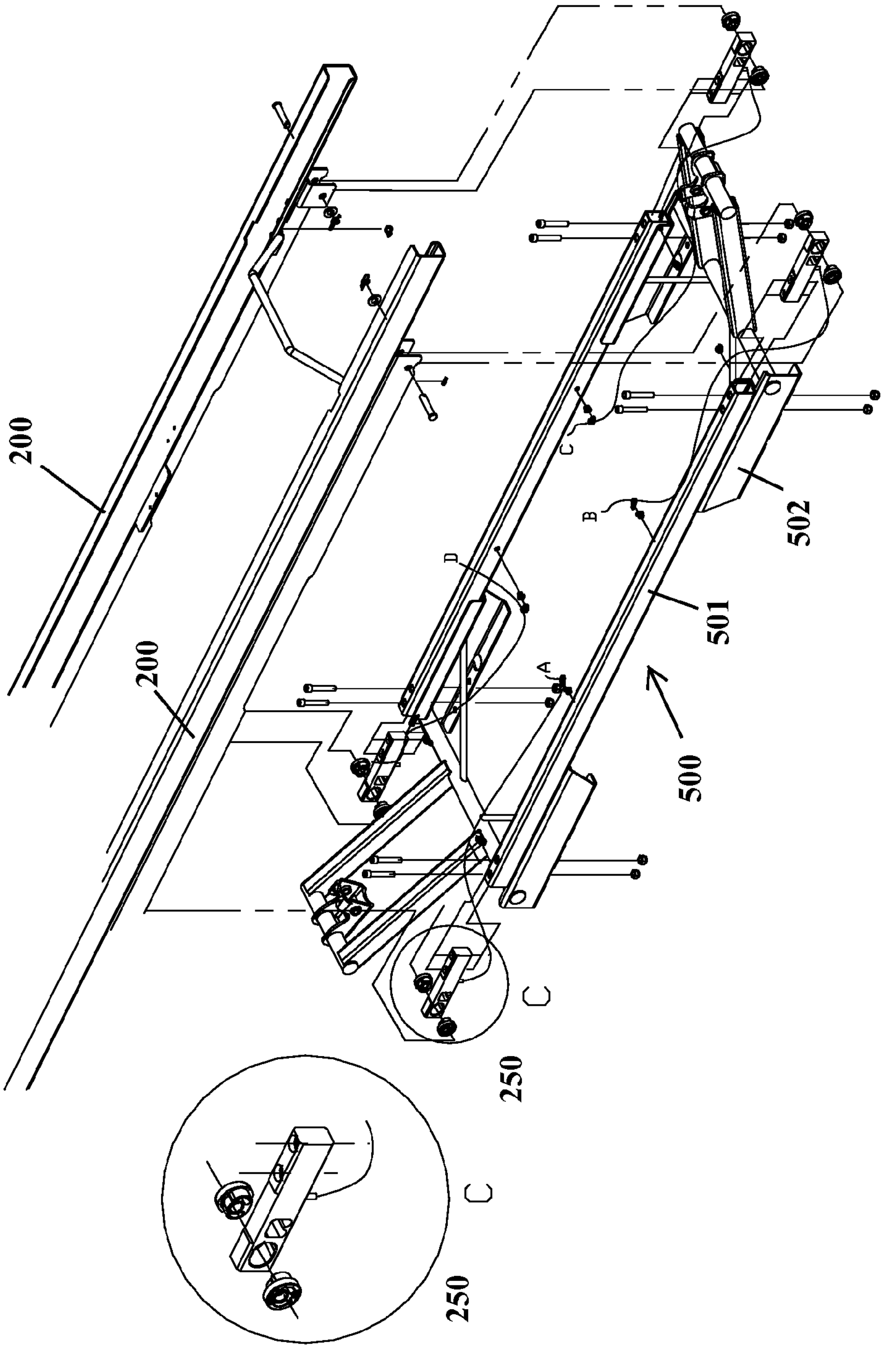
FIG. 32 is a perspective view depicting four load cells in relation to an intermediate frame according to one embodiment of the present invention.
Figure 33:
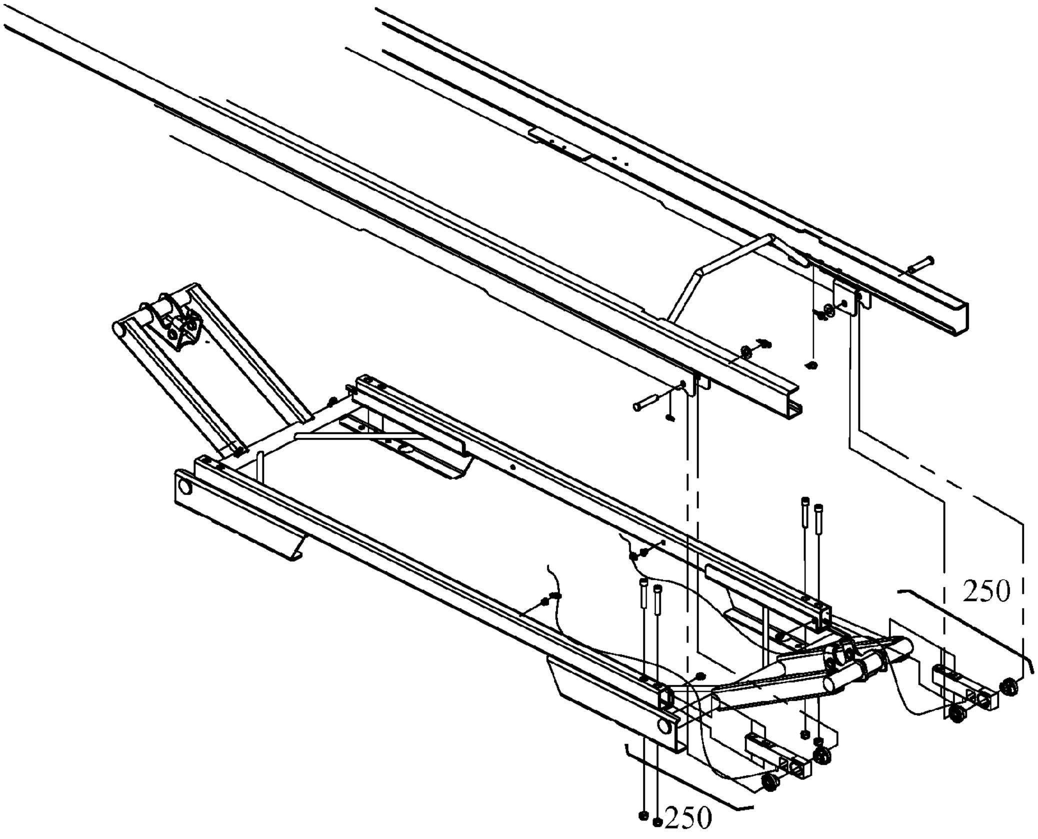
FIG. 33 is a partial perspective view of load cells in relation to a load frame and an intermediate frame according to one embodiment of the present invention.
Figure 34:
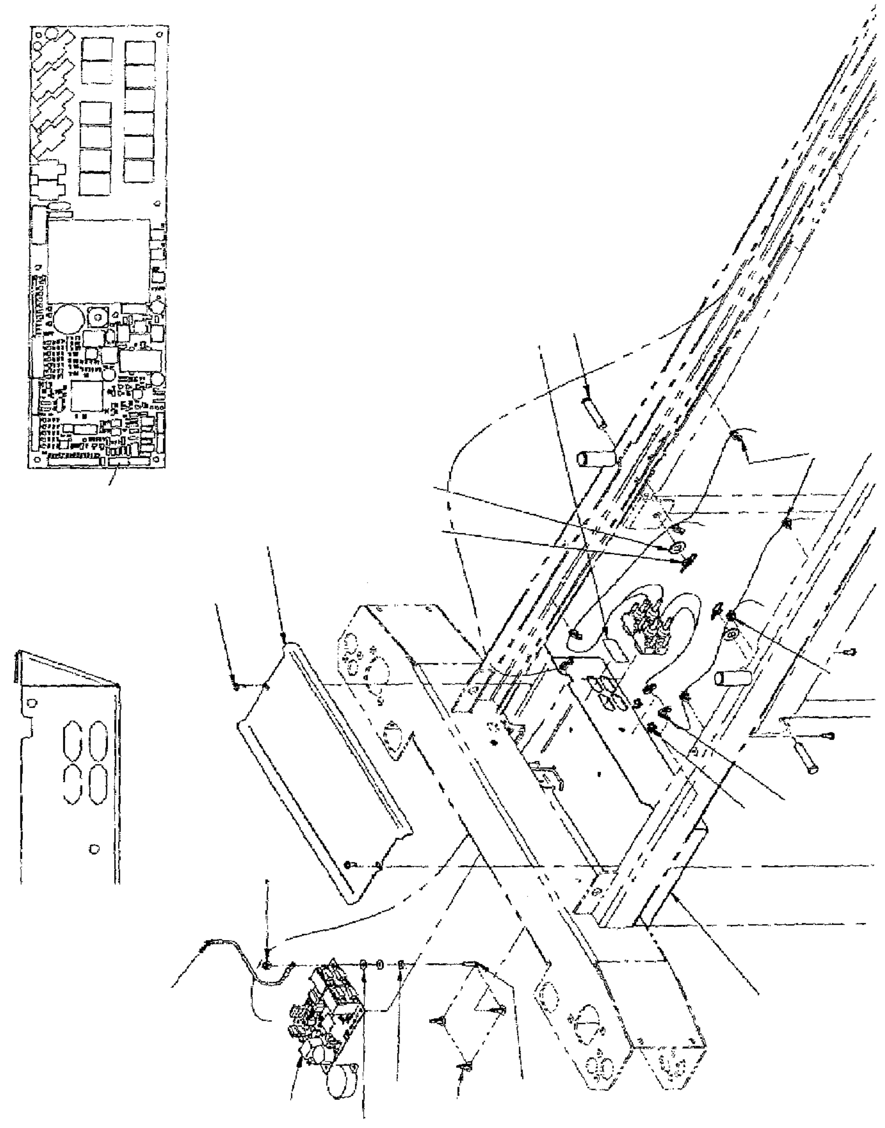
FIG. 34 is a partial exploded perspective view of a mobile frame and load cell system according to one embodiment of the present invention.

FIG. 32 illustrates one embodiment of the present invention wherein four load cells 250 are within the frame system 30. The load cells 250 are respectively located proximate to the four corners of the intermediate frame 500, said intermediate frame 500 being operatively connected to the load frame 200 via the four load cells 250. More specifically, the load cells 250 are coupled with the respective ends of the superior components 501 of the intermediate frame 500 and with complementary areas on the inferior components 202 of the load frame 200. The superior components 501 of the intermediate frame 500 and the inferior components 202 of the load frame 200 are longitudinally adjacent but are not in contact, the sole physical connection between these components being through the load cells 250.

In a patient support 10 according to one embodiment of the present invention, the load cell 250 measurements can be used together with other measured or input information, such as the articulation angle of a section of the lying surface support 100 or the entire load frame 200 in order to determine, for example, a patient's weight. For example, when the patient support 10 is angled to the Trendelenburg and reverse Trendelenburg positions, the actual load can be calculated by knowing the angle of the load frame 200 and respective loads measured by each load cell 250, independent of the load frame's 200 position. One or more tilt sensors 260 can determine the angular position of the load frame 200 while the load's center of gravity shifts.

Medical personnel require accurate readings of the patient's weight independent of the patient support's 10 articulation. Such a measurement is possible by calculating the patient support's 10 angle relative to baseline and load cell 250 measurements.

A tilt sensor 260, which incorporates an accelerometer 270, is attached to any part of the frame system 30 that can be elevated, angled and/or articulated. FIG. 16 depicts an exploded view of an embodiment of a tilt sensor circuit 265 attached to an end of the load frame 200.

The tilt sensor 260 provides a signal that is read and measurements are calculated after a given time period, such as 50 ms. It can run continuously, intermittently or upon command from the user, such as when components of the frame system 30 are in an articulated position. The tilt sensor 260 is connected to at least one motherboard, processor or any electronic board via a communications network, fibre optic, or wireless connection to allow for a reading of the tilt sensor signal.

Figure 77:
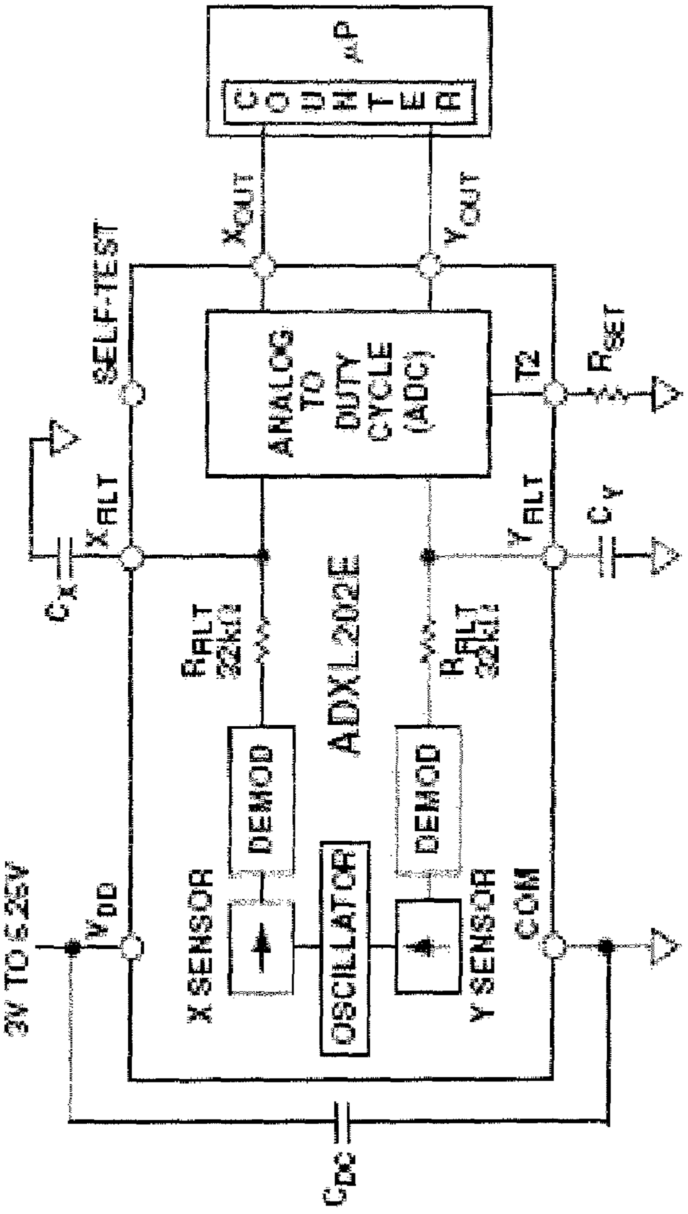
FIG. 77 depicts the functional block diagram of an accelerometer used in an embodiment of the present invention.
Figure 78:
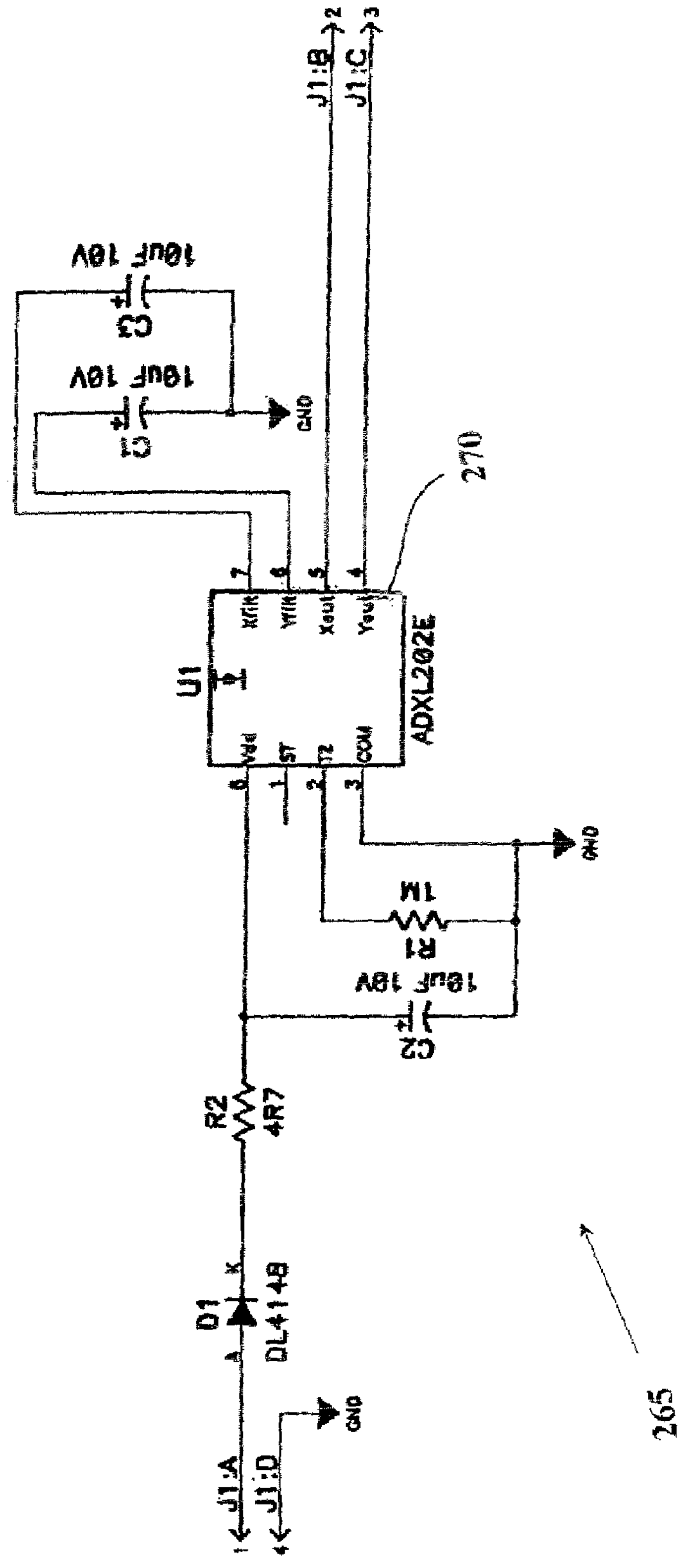
FIG. 78 displays a tilt sensor circuit according to an embodiment of the present invention.

In one embodiment, the tilt sensor 260 is designed with a solid state accelerometer 270, such as the ADXL202E accelerometer from Analog Devices, Inc. of One Technology Way, Norwood, Mass., schematically represented in FIGS. 77 and 78. Angular solid state sensors or electronic angular sensors, where a change in angle of the sensor changes the impedance of the sensor which can be measured, could also be used. Other accelerometers may also be used within the present invention, as would be understood by a worker skilled in the art to which this invention relates. The accelerometer 270 of this embodiment is a 2-axis acceleration sensor with a direct interface to low-cost microcontrollers. This interface is possible through a duty cycle (ratio of the pulse width to the total period) output. The outputs of the accelerometer 270 can be analog or digital signals whose duty cycles are proportional to acceleration. The outputs can be directly measured with an integrated microprocessor counter, without any external converter.

FIG. 77 depicts a functional block diagram of the accelerometer 270 used in this embodiment. For each axis, a circuit output converts the signal into a modulated duty cycle that is decoded by the microprocessor. The accelerometer 270 of this embodiment must be capable of measuring positive and negative accelerations to at least +−2 g, so as to measure static acceleration forces such as gravity and therefore be used in a tilt sensor 260.

Theoretically, a 0 g acceleration produces a 50% nominal duty cycle. Acceleration is calculated as follows:

$$A(g)=(T/T2-0.5)/12.5\%$$

$$T2(s)=R_{SET}(\Omega)/125\ \text{M}\Omega$$

The 12.5% corresponds to the theoretical gain of the accelerometer. When used as a tilt sensor 260, the accelerometer 270 uses the force of gravity as the input vector to determine the orientation of the object in space. The accelerometer 270 is more sensitive to tilt when its reading axis is perpendicular to the force of gravity, that is to say, parallel to the earth's surface. When the accelerometer 270 is orientated on axis to gravity, that is to say, near its +1 g or −1 g reading, the change in output acceleration per degree of tilt is negligible. When the accelerometer 270 is perpendicular, the output varies nearly 17.5 mg per degree of tilt, but at 45 degrees the output only varies 12.2 mg by degree and the resolution declines. This is illustrated in the following table:

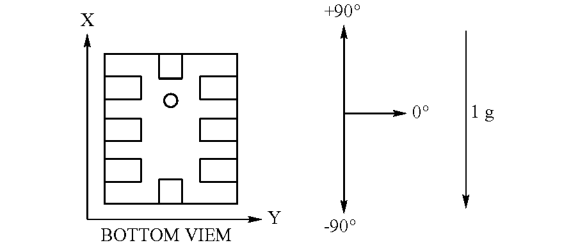

| X Axis Orientation to Horizon(°) | X Output (g) | Δ per Degree of Tilt (mg) | Y Output (g) | Δ per Degree of Tilt (mg) |
|---|---|---|---|---|
| | X Output | | Y Output (g) | |
| -90 | −1.000 | −0.2 | 0.000 | 17.5 |
| −75 | −0.966 | 4.4 | 0.259 | 16.9 |
| −60 | −0.866 | 8.6 | 0.500 | 15.2 |
| −45 | −0.707 | 12.2 | 0.707 | 12.4 |
| −30 | −0.500 | 15.0 | 0.866 | 8.9 |
| −15 | −0.259 | 16.8 | 0.966 | 4.7 |
| 0 | 0.000 | 17.5 | 1.000 | 0.2 |
| 15 | 0.259 | 16.9 | 0.966 | −4.4 |
| 30 | 0.500 | 15.2 | 0.886 | −8.6 |
| 45 | 0.707 | 12.4 | 0.707 | −12.2 |
| 60 | 0.866 | 8.9 | 0.500 | −15.0 |
| 75 | 0.966 | 4.7 | 0.259 | −16.8 |
| 90 | 1.000 | 0.2 | 0.000 | −17.5 |

It is also to be noted that the gravity value varies according to the sine of the angle, which also influences the precision and consequently the orientation of the tilt sensor 260 of this embodiment. The sensor precision can be improved by using both Xout and Yout signals in the angular determination. By doing so, the low sensitivity range (around 0 degrees) is reduced.

The tilt sensor circuit 265 used in one embodiment was therefore designed from the Analog Devices Inc. accelerometer 270 following the recommended design parameters. The schematic of the circuit for this embodiment is shown at FIG. 78.

D1 is added to protect the circuitry against polarity inversion.

$R_{SET}$ value was set to 1 MΩ. Therefore, T2 value is:

$$T2=1\ \text{M}\Omega/125\ \text{M}\Omega=0.008$$

T2 total period is thus 8 ms, therefore giving a 125 Hz frequency.

In order to determine the actual values of the zero and the gain, the tilt sensor circuit 265 must be calibrated. Since the zero and the gain are known after calibration, only T1/T2 is unknown. It is this duty cycle that varies according to the angle. The microprocessor thus takes this reading and calculates the corresponding angle.

The tilt sensor circuit 265 comprises an analog potentiometer which outputs a PWM (pulse width modulation) signal with a good signal-to-noise ratio. This PWM signal is sent to a microcontroller wherein the period of the signal is measured and the on-time of the signals. A ratio of these results is proportional to the sine of the angle. By using the cosine of this angle within a formula (discussed below) the precise angle can be determined. This analysis can be accomplished by a microprocessor.

To calibrate the tilt sensor circuit 265, two duty cycle readings must be taken at known angles. With these two PWM readings, the two unknowns (zero and gain) can be computed. It is preferable to take a PWM reading when the tilt sensor 260 is at its zero position, as readings are usually precise at this position. This also provides a reading of the PWM value corresponding to the zero of the tilt sensor 260, since a sensor in zero position gives 0 g.

The tilt sensors 260 of this embodiment are used to indicate the angle of the load frame 200, such as the Trendelenburg and reverse Trendelenburg angles. A compensation of the weight read by the load cells 250 according to the Trendelenburg angle can then be computed. Consequently, the weight value displayed is thus in the required margin.

As previously indicated, the axis in which the tilt sensor 260 is positioned is important to obtain precise readings. For example, the position of a head section 102 of the lying surface support 100 may vary between 0 and 80 degrees. Given that the tilt sensor 260 of the embodiment is more precise from −45 to 45 degrees than from 0 to 90 degrees, the tilt sensor 260 would be positioned in the bed so that the zero of the sensor is at 45 degrees. In computation, one would account for this position by adding 45 degrees to each angle read.

Figure 79:
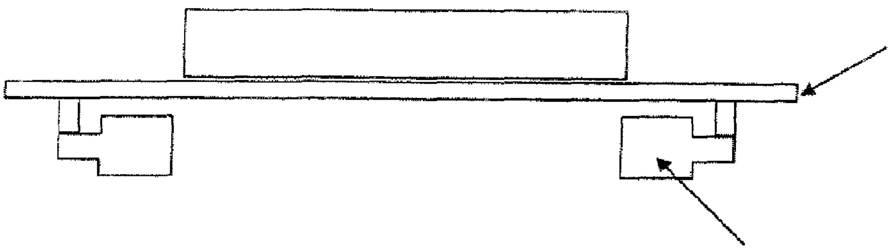
FIG. 79A depicts a horizontal patient support with a load according to an embodiment of the present invention.
FIG. 79B depicts an incline patient support with a load at angle ⊖ according to an embodiment of the present invention.
Figure 79:
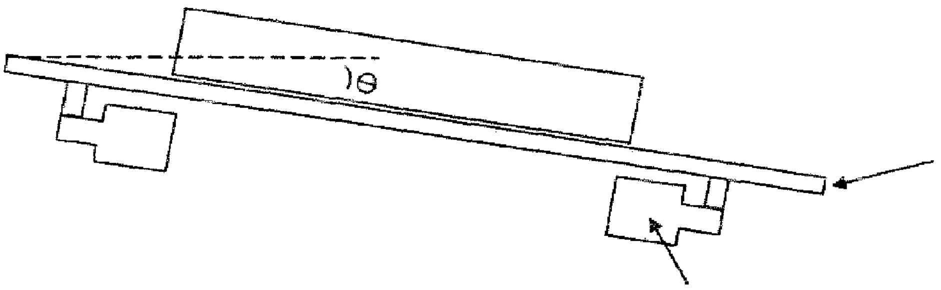

The calculation of load and calibration values is readily apparent in referring to FIGS. 79A and 79B, where:

X patient load;

$Y_+$ weight of bed frame which changes with the Trendelenburg angle;

$Z_+$ load cell factor which is not influenced by the Trendelenburg angle;

$Y_-$ weight of bed frame which changes with the reverse Trendelenburg angle;

$Z_-$ load cell factor which is not influenced by the reverse Trendelenburg angle;

$\ominus$ bed frame angle; and

T load cell readings.

$$\text{At } \ominus=0°, T_0°=X+Y_++Z_+$$

$$\text{At } \ominus=12°, T_{12}°=(X_++Y_+)\cos\ominus+Z_+$$

During calibration, the load frame 200 without the patient is measured at 0° and at 12°, providing:

$$X = 0$$

$$T_0° = \text{first measurement at } 0°$$

$$T_{12}° = \text{second measurement at } 12°$$

$$T_0° = Y_+ + Z_+$$

$$T_{12}° = Y_+\cos\theta + Z_+$$

$$Y_+ = T_0° - Z_+$$

$$Y_+\cos\theta = T_{12}° - Z_+$$

$$Y_+ = \frac{T_{12}° - Z_+}{\cos\theta}$$

-continued $$T_0° - Z_+ = \frac{T_{12}° - Z_+}{\cos\theta}$$

$$Z_+ = \frac{T_{12}° - T_0°\cos\theta}{1-\cos\theta}$$

$$\text{if } \theta = 12°$$

$$Z_+ = \frac{T_{12}° - T_0°\cos 12°}{1-\cos 12°}$$

$$Z_+ = (T_{12}° - T_0° * 0.97815) * 45.761565$$

$$Y_+ T_0° - Z_+$$

$Z_+$ and $Y_+$ for each load cell 250 are determined during calibration. In a similar manner, $Z_-$ and $Y_-$ are determined using measurements at 0° and −12°, providing:

$$Z_-=(T_{-12}°-T_0°*0.97815)*45.761565$$

$$Y_-=T_0°-Z_-$$

When determining the patient's weight, X, the following calculations are made for each load cell:

$$T_\theta = (X+Y)\cos\theta + Z$$

$$T_\theta = X\cos\theta + Y\cos\theta + Z$$

$$X\cos\theta = T_\theta - Y\cos\theta - Z$$

$$X = \frac{T_\theta - Y\cos\theta - Z}{\cos\theta}$$

$$X = \frac{T_\theta - Z}{\cos\theta} - Y$$

The processor determines the load frame's 200 angular position (Trendelenburg or reverse Trendelenburg) prior to choosing $Y_+$ or $Y_-$ and $Z_+$ or $Z_-$. When the load frame's 200 angle is 0°, the processor chooses $Y_+$ and $Z_+$ to calculate the load.

The center of gravity can be calculated as follows, using for example four load cells 250 (schematically represented in FIG. 90) positioned in a rectangle relative to the patient:

X length (head to foot)

Y width (left to right)

LC(0) load cell value foot left

LC(1) load cell value head right

LC(2) load cell value foot right

LC(3) load cell value head left

W total weight of the patient

H(X) distance between the head load cells and foot load cells

H(Y) distance between the right load cells and left load cells $$CG[X] = \frac{LC(3)+LC(1)}{\frac{W}{100}} * H(X) * 0.01$$

-continued $$CG[Y] = \frac{\frac{LC(3) + LC(1)}{W}}{100} * H(Y) * 0.01$$

This embodiment of a load cell system 251 can be used for monitoring movement of a patient. The system can be integrated into the patient support 10 or can be part of a lying surface 20 such as a mattress. In addition, the load cell system 251 can comprise a number of load cells 250 or load sensors, for example a load cell 250 which can be embedded in the bed proximally positioned at each of a bedded person's limbs and optionally at the center of the patient support 10. The load cell system 251 also can be comprised of a mesh of load cells 250 for example. The signals from the load cells 250 can be monitored and processed by a processing unit in the load cell system 251 or a central processing unit capable of monitoring, processing, and controlling signals from the patient support's 10 various subsystems. Instead of forming part of a lying surface 20 such as a mattress the load cell system 251 can also integrated into the lying surface support 100. The load cell system 251 can provide a measure for the pressure, weight, or mass load of a certain load cell 250, for example foot left or right load cell 250 values and head left or right load cell 250 values and additional information about the location of the center of gravity.

In one embodiment of the present invention, the tilt sensors 260 can provide a means for determining possible interface between components of the patient support 10. For example, if a particular component is in a certain relative position, a second component might not be able to perform certain functions associated with it. In this embodiment, there can furthermore be a movement termination based on the evaluation of tilt sensors 260 readings.

In a further embodiment of the present invention, tilt sensors 260 can be used to evaluate a patient's position over a period of time through the collection of angle variation data.

In one embodiment, a collection of angular data from the tilt sensors 260 can also provide assistance for the maintenance of the patient support 10. For example it can help to determine the angle of a particular patient support component and the period of time that that position is held, especially when a particular position results in higher stress levels being applied to specific components of the patient support 10.

In an another embodiment of the present invention, tilt sensors 260 can be positioned on the elevation system 600 for determination of the height of the patient support surface.

In an another embodiment of the present invention, tilt sensors 260 are wireless. In a further embodiment, tilt sensors 260 do not have an on board power supply and are powered in the same way as for example an RFID tag, by the scanning frequencies sent by a scanner for example. In another embodiment, tilt sensors 260 are integrated within load cells 250.

A worker skilled in the art would understand that tilt sensors 260 could be positioned in a plurality of other components of the patient support 10, for example, the siderails 800, a control panel, on an intravenous apparatus support attached to a patient support, etc.

Figure 80:
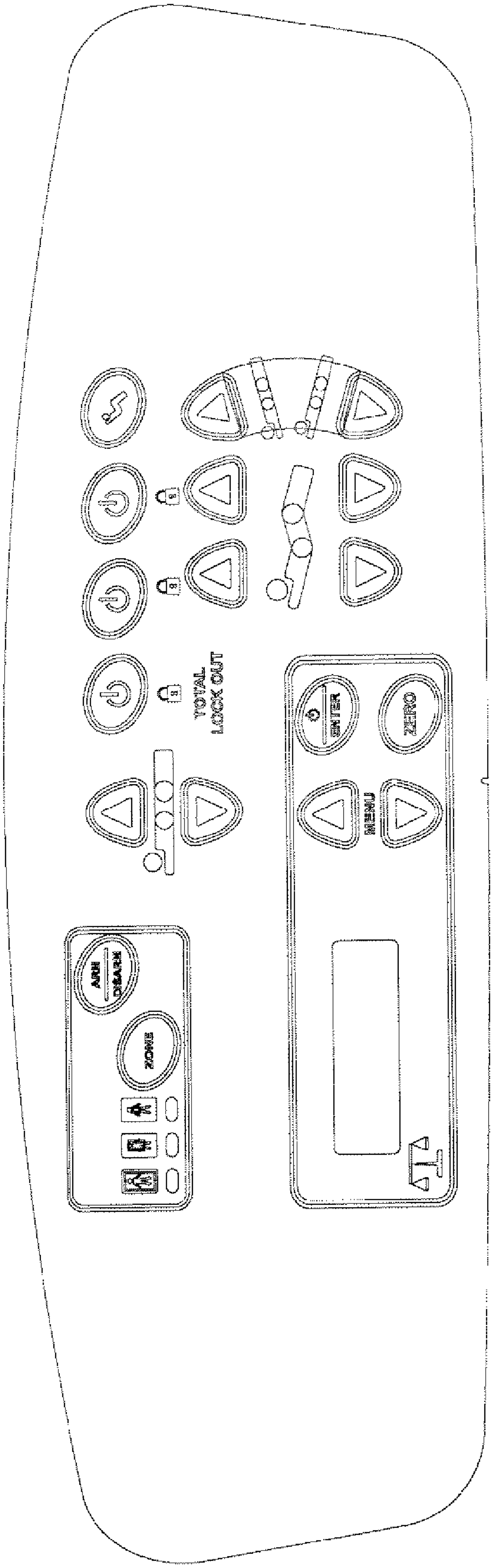
FIG. 80 illustrates a part of a user interface embedded into a patient support according to an embodiment of the present invention.

FIG. 80 illustrates a schematic view of a console, which can be part of a user interface embedded into a patient support. The console can be integrated into the footboard of the patient support illustrated in FIG. 1 and provide access to the patient support's functions. The console has backlit zone indicators, which can indicate a set zone mode of the patient support for indicating a preset restriction level for movement of an supported person. Indicators can also be multi-color backlit to provide an indication of whether the system is in an armed or a disarmed state.

Buttons can be used to set and switch between the zone alarm as indicated by the zone alarm indicators. Buttons can be arms or disarms the zone alarm functionality in a toggling fashion. Buttons can be sectional or full color or multi-color back-lit to indicate an armed or disarmed state of the zone alarm system. Interface elements can be used to raise or lower the patient support surface. While pushing the arrow-up button the patient support raises and while pushing the arrow-down button the patient support lowers. Pushing and holding both buttons may cause the movement to stop or continue the movement according to the button which was pressed first. Button can lock out some or all functionality accessible through this or other consoles until the button is pressed again. Buttons and can be used to lock-out access to reorient the respective head and knee sections of the patient support. Button when pressed causes the patient support to assume a cardiac position or other predetermined shape of the patient support surface. Each of buttons and when pressed individually inclines or reclines the overall patient support surface without affecting the shape of the patient support surface. Interface elements and provide button groups which when pressed can reorient the head or the knee sections of the patient support and can be used in order to achieve respective desired angles between the upper body and the upper leg, as well as the upper leg and the lower leg of an supported person. Display can be used to display information about certain functions or the state of certain parts of the patient support and its system components. Button group can be used to scroll through information, which is available in form of a menu for display but exceeds the amount of information, which can be displayed simultaneously on display. Buttons and can be used to select or enter information and to interact with the menu following a command and control concept.

Figure 81:
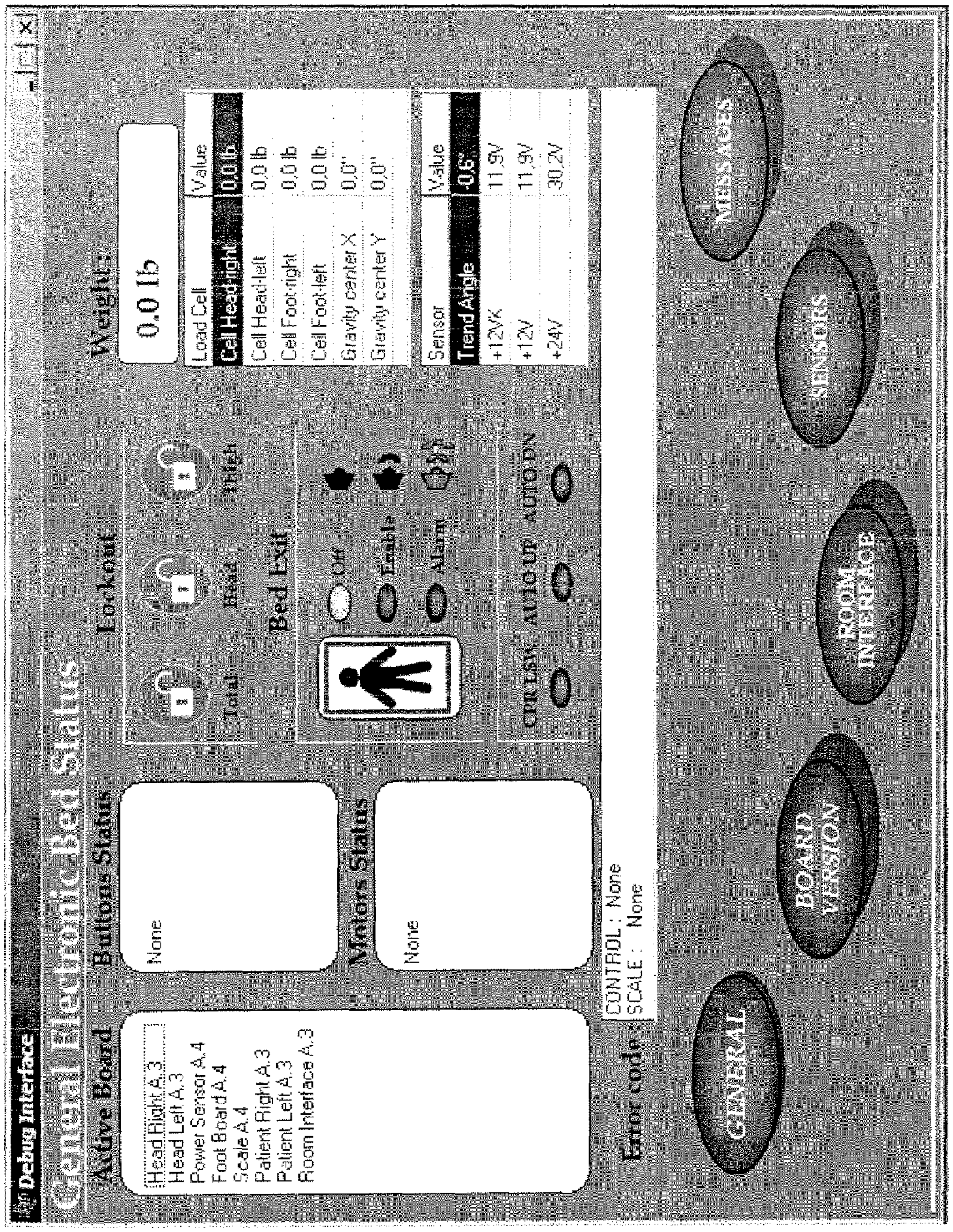
FIG. 81 illustrates the window content of a step in a series of user-patient support interaction processes displayed on a detached device such as a general purpose computer according to one embodiment of the present invention.

FIG. 81 illustrates the window content of a step in a series of user-patient support interaction processes that can be displayed on a detached device such as a general purpose computer. This is part of an interface which for example can provide remote access to control, diagnose, or monitor functions of the patient support system. The interface can provide functions to select certain components from a list of components or subsystems of the patient support system for detailed investigation. The user interface may change its look and feel by changing some or all of its user interface components when selecting to investigate a specific component of the patient support system. The user interface can provide and display information in a categorized graphical fashion and can utilize a button status field, a motor status field, fields for monitoring vital information about a supported person etc. The user interface can also provide a menu system to select from providing access to different aspects of interaction of the patient support system such as for example, a monitoring interface, a maintenance interface, an operator interface etc. Switching between these modes may require authorization and may be password or security code protected.

Figure 82:
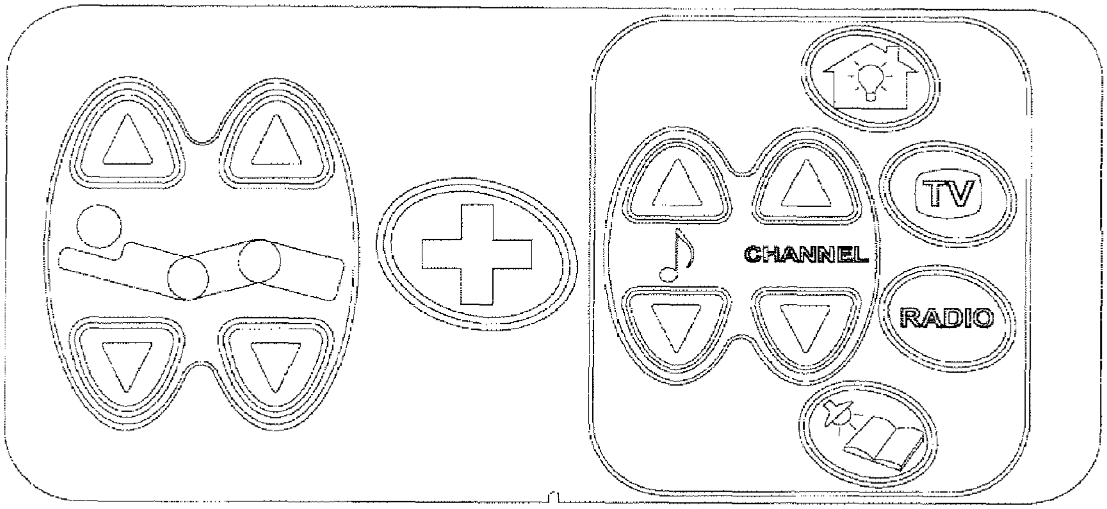
FIG. 82 illustrates part of a user interface according to one embodiment of the present invention intended for use by a patient.
Figure 83:
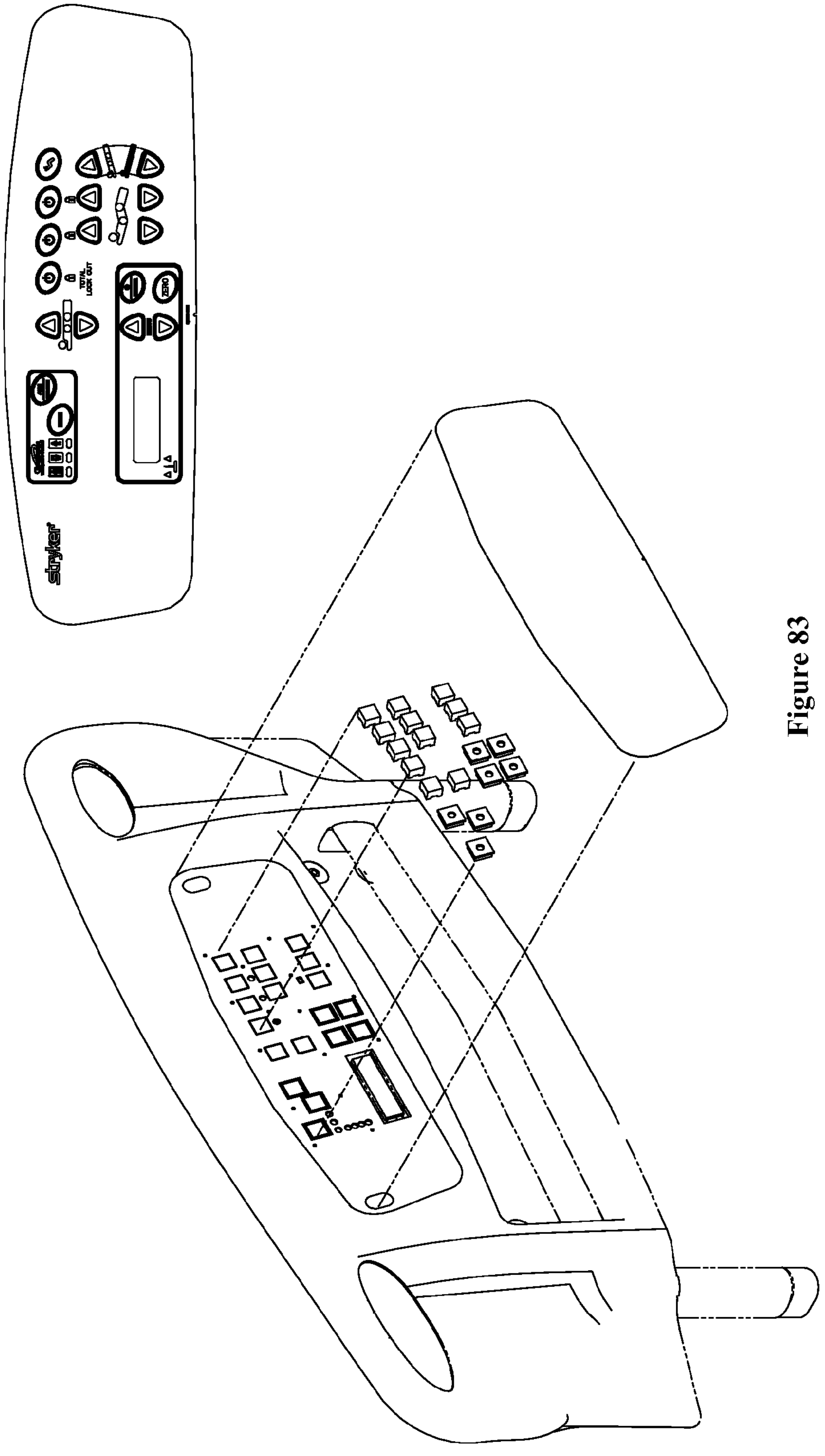
FIG. 83 depicts a perspective exterior view of a footboard according to an embodiment of the present invention showing an partial exploded view of a control system and interface embodiment that does not include a scale system or patient monitoring system.
Figure 84:
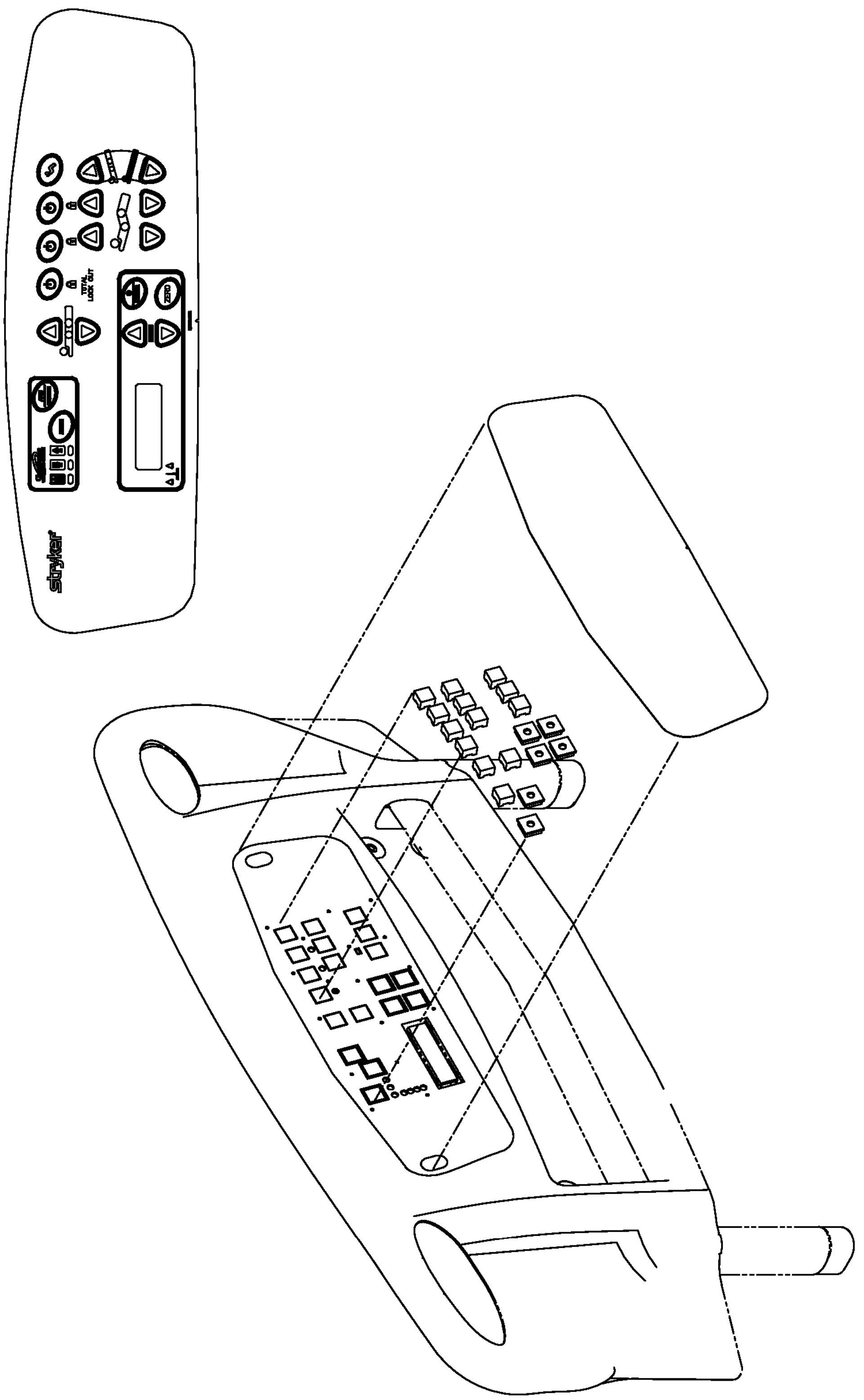
FIG. 84 depicts the footboard of FIG. 83 and interface embodiment that does not include a scale system but which does include an embodiment of a patient monitoring system.
Figure 85:
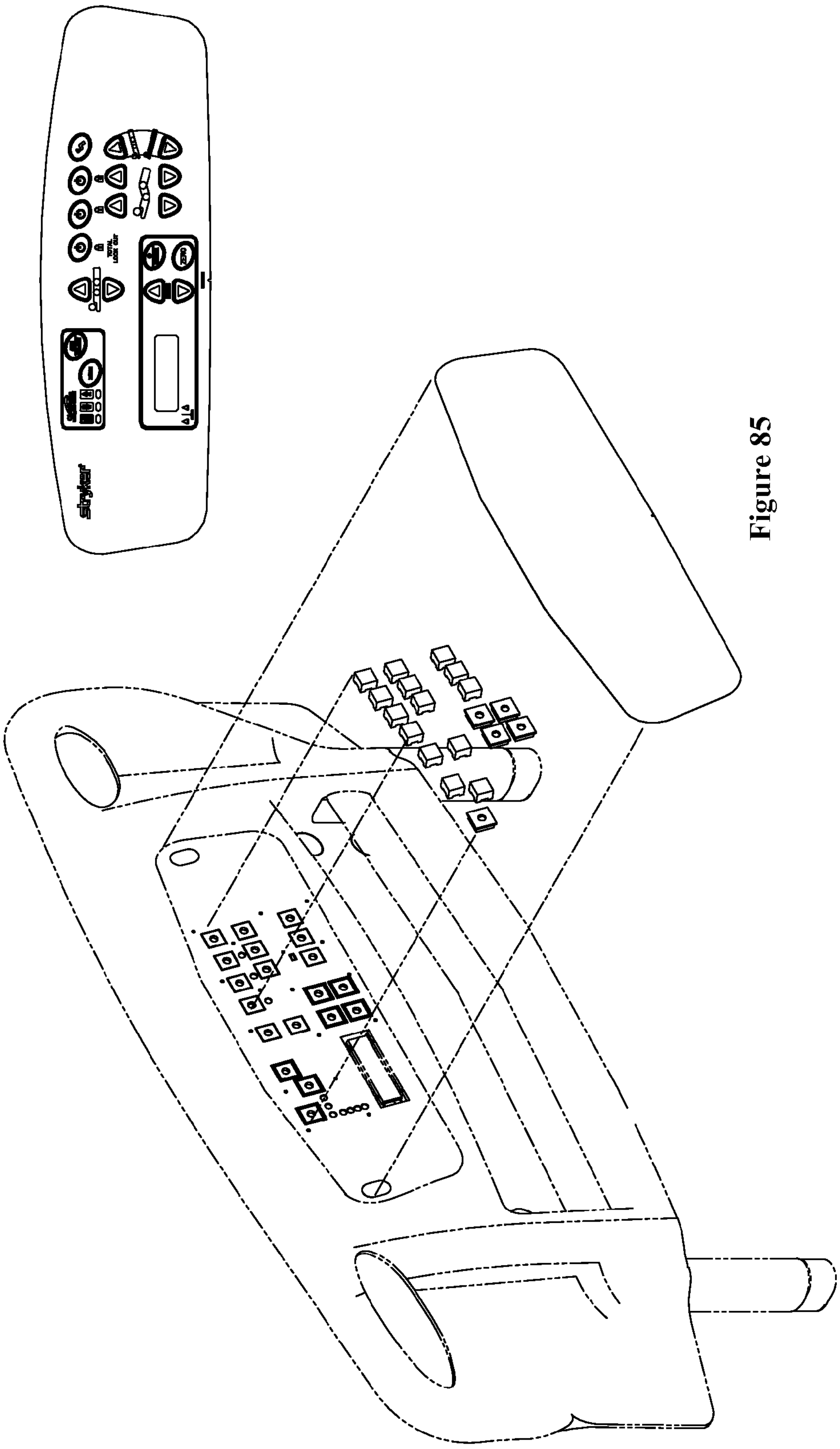
FIG. 85 depicts the footboard of FIG. 83 and interface embodiment that does not include a scale system but which does include another embodiment of a patient monitoring system.
Figure 86:
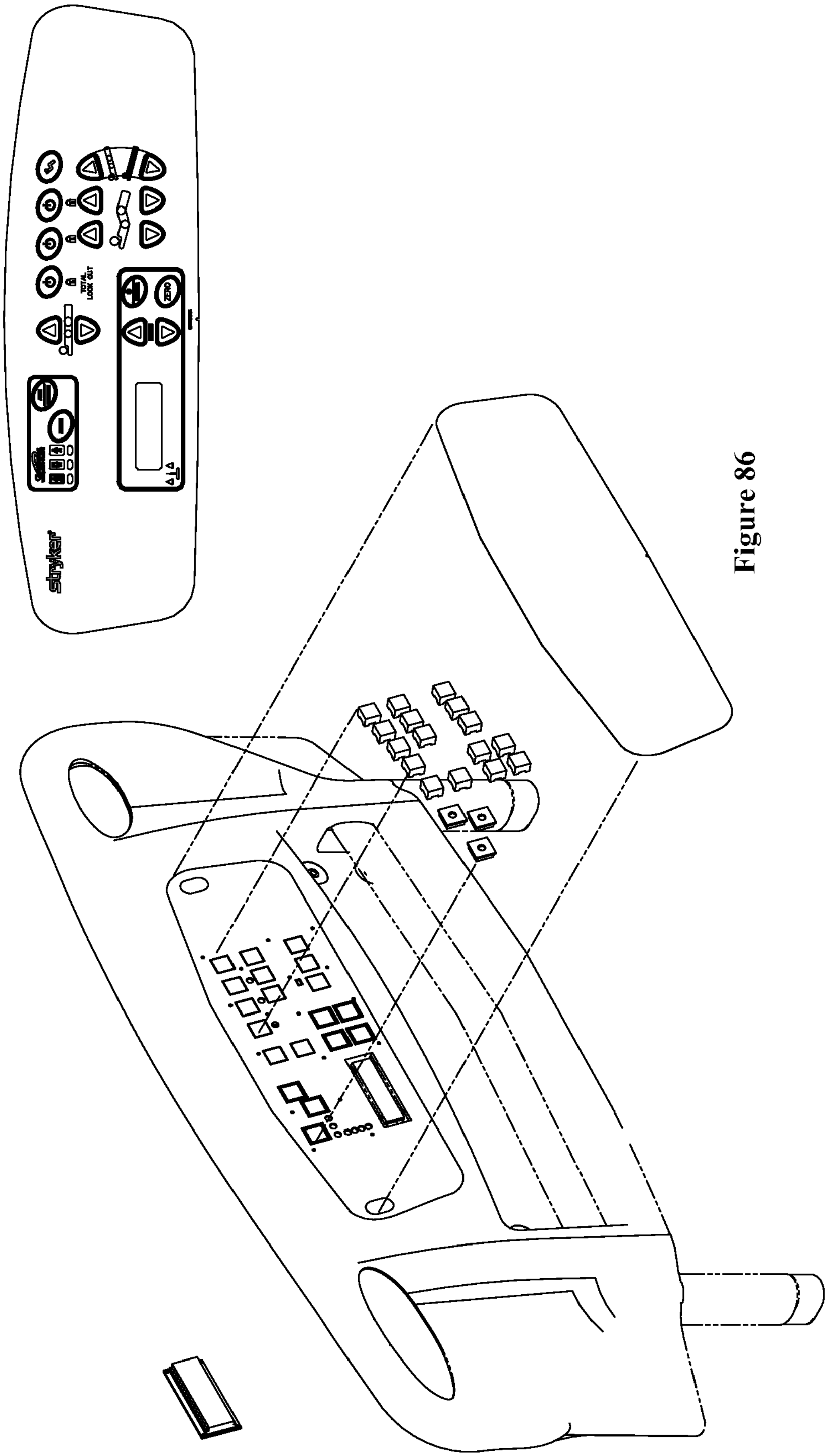
FIG. 86 depicts the footboard of FIG. 83 and interface embodiment that does include a scale system but which does not include a patient monitoring system.
Figure 87:
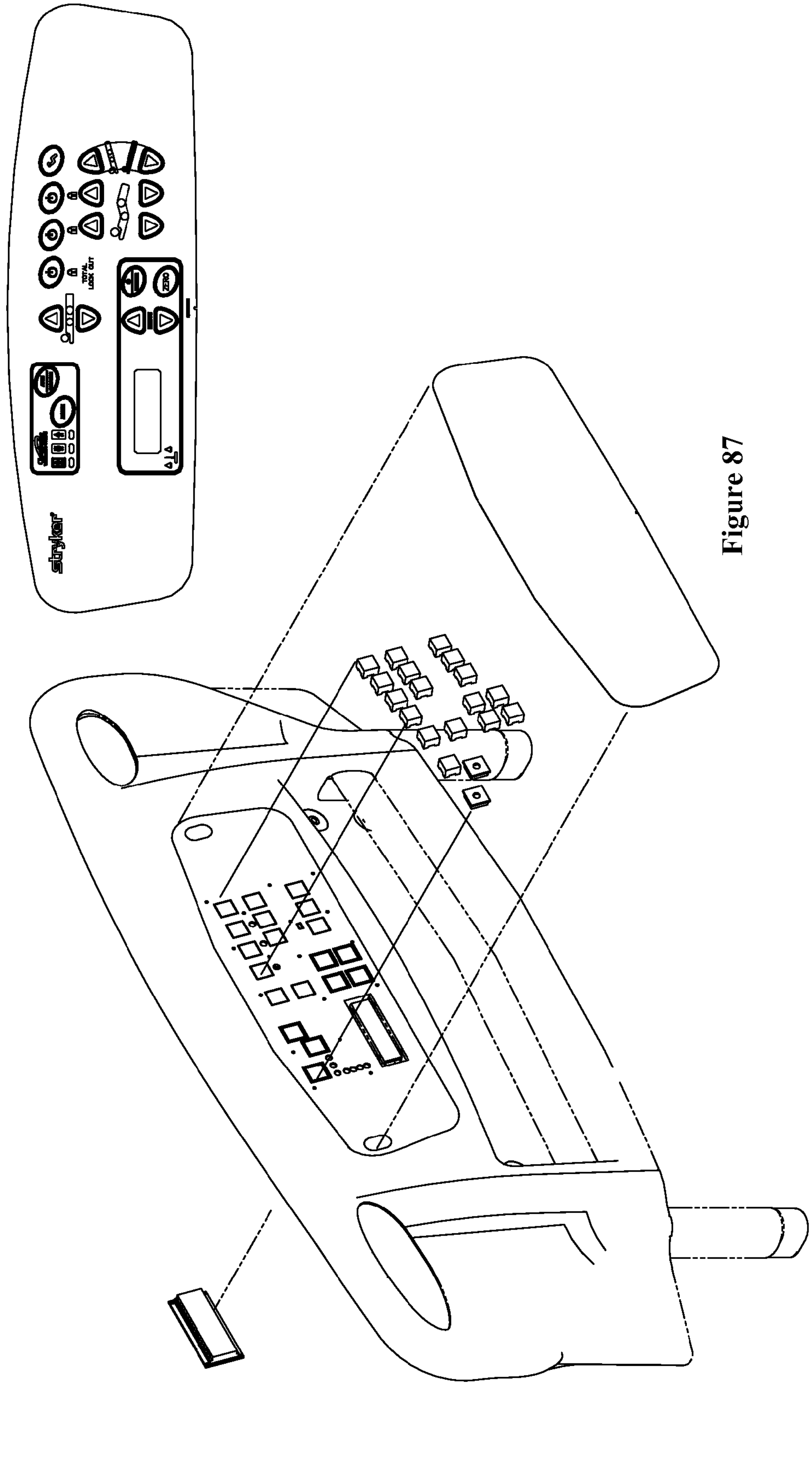
FIG. 87 depicts the footboard of FIG. 83 and interface embodiment that does include a scale system and one embodiment of a patient monitoring system.
Figure 88:
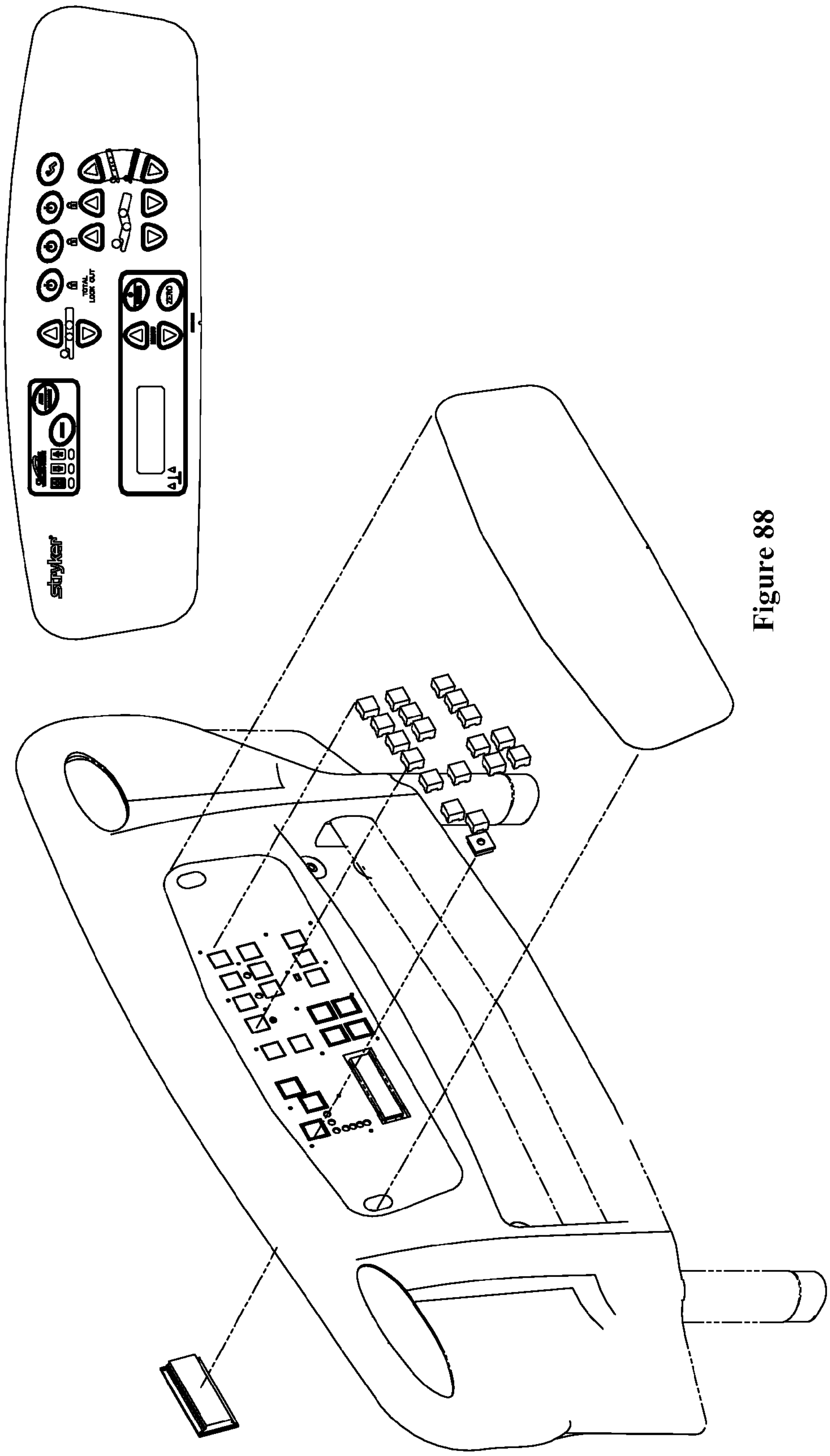
FIG. 88 depicts the footboard of FIG. 83 and interface embodiment that does include a scale system and another embodiment of a patient monitoring system.

FIG. 82 illustrates an embodiment of a part of the user interface intended for use by the supported person. As illustrated, the user interface for the supported person can provide access to reclining functions, emergency call functions or control of entertainment equipment.

Figure 89:
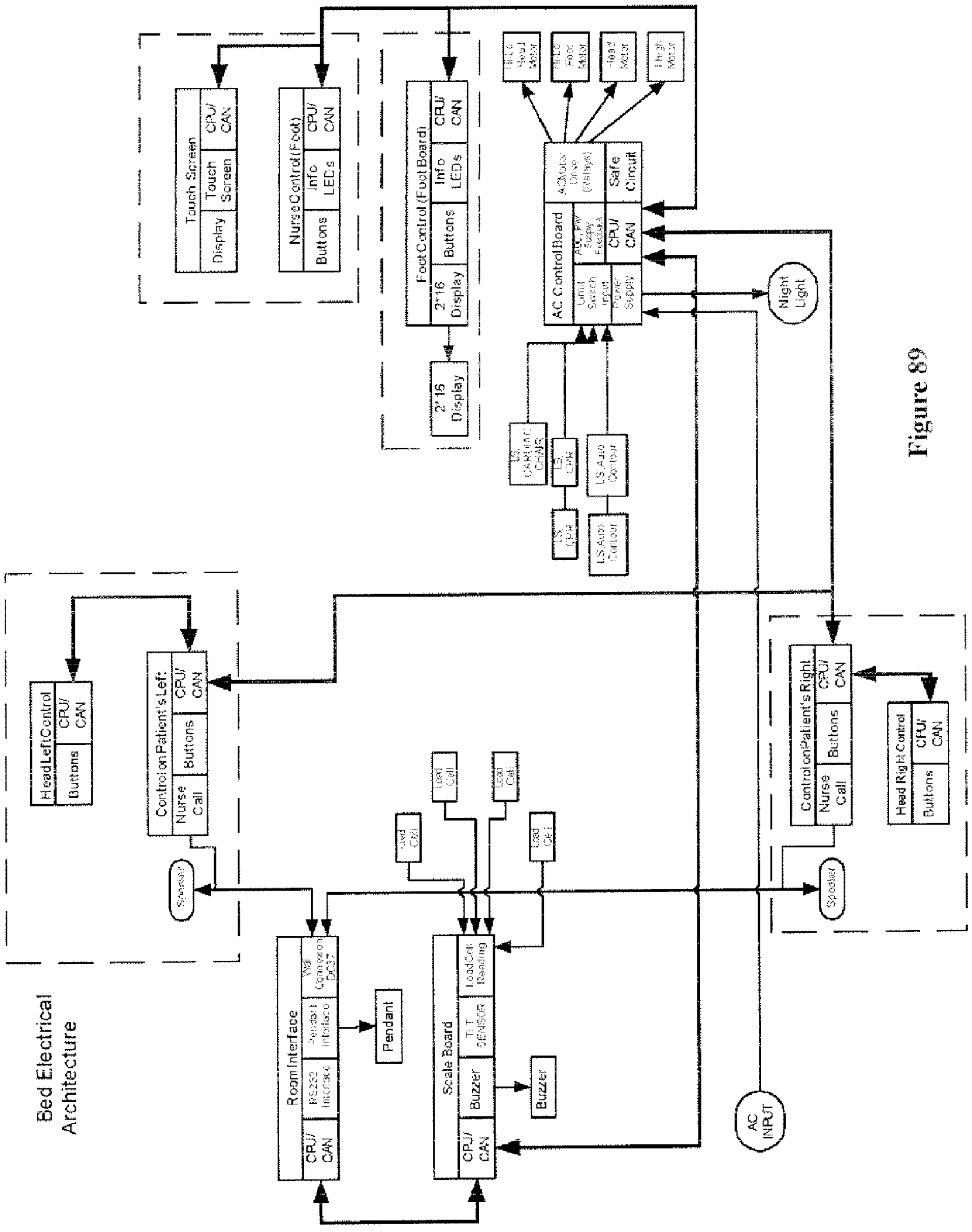
FIG. 89 schematically illustrates the electrical architecture of a patient support control and diagnostic system according to one embodiment of the present invention.

FIG. 89 illustrates a schematic diagram of the system architecture of a patient support control and diagnostic system. The architecture can be divided into a number of user interface and control subsystem components. The system architecture comprises a power or AC control system for supplying electrical power, an actuator subsystem providing ability for positioning and orienting parts of the patient support, a number of sensor and detector subsystems for sensing and detecting the state of parts of the patient support, and a diagnostic subsystem as indicated. The diagnostic subsystem can interact with the sensor and detector subsystem or it can have its own redundant sensor and detector system. The user interface subsystem can comprise a number of control consoles and comprising indication or display systems. The display systems can have a touch screen or a regular display with separate buttons. The sensor system can comprise a scale subsystem including a load cell system and tilt sensor. The system architecture can further comprise a room or other interface for communicating information from the patient support to a remote user interface system or vice versa.

Figure 90:
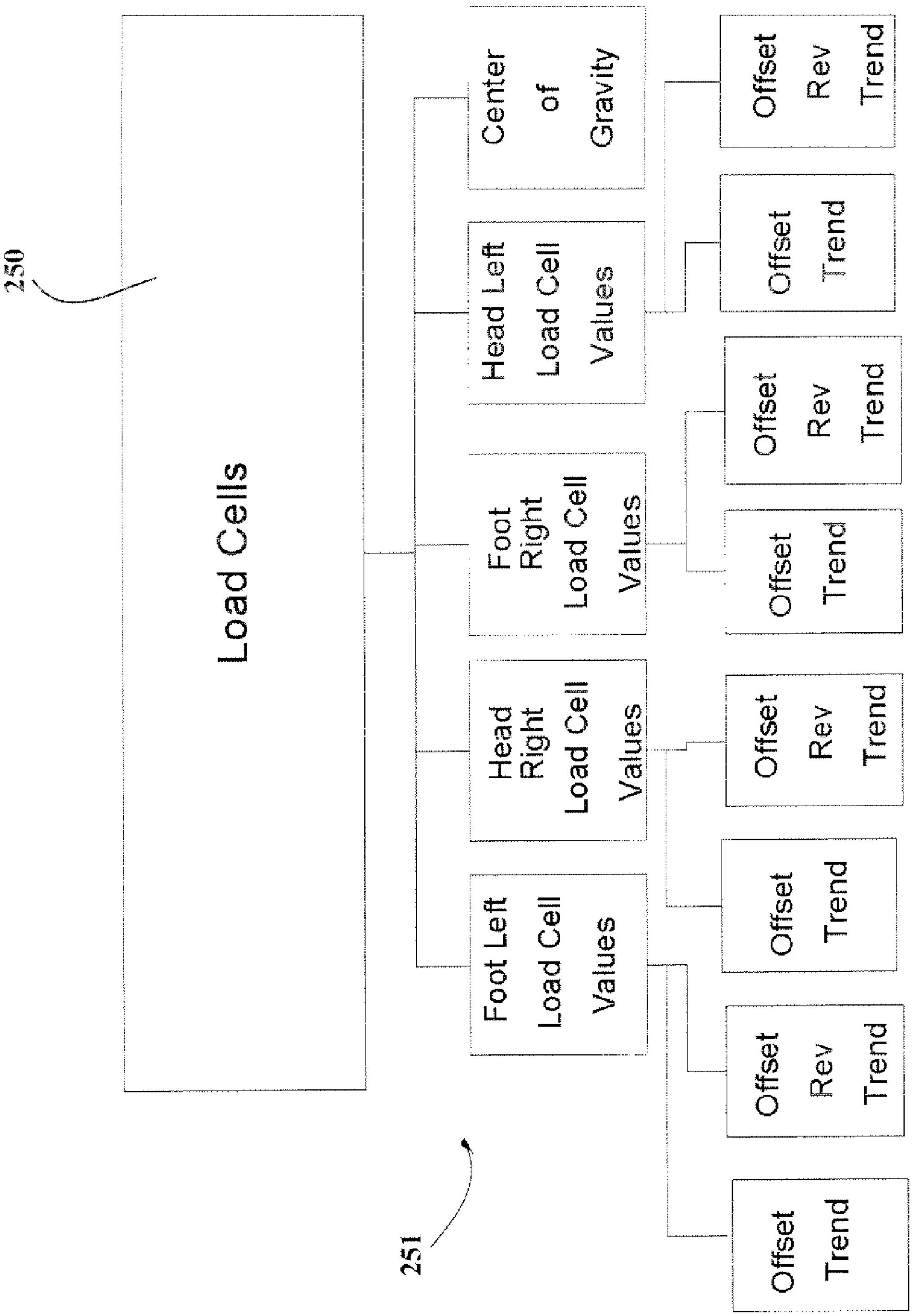
FIG. 90 illustrates a load cell system that is used for monitoring movement and mass or weight of a patient according to one embodiment of the present invention.

FIG. 90 illustrates the information made available by a load cell system 265, which is used for monitoring movement of a patient. The system can be integrated into the patient support or can be part of a person support element such as a lying surface. In addition, the load cell system can comprise a number of load cells or load sensors for example a load cell which can be embedded in the patient support proximally positioned at each of a supported person's limbs and optionally at the center of the patient support. The load cell system also can be comprised of a mesh of load cells for example. The signals from the load cells can be monitored and processed by a processing unit in the load cell system or a central processing unit capable of monitoring, processing, and controlling signals from the patient support's subsystems. Instead of forming part of a support element, the load cell system can be integrated into the surface of the patient support frame. The load cell system can provide a measure for the pressure, weight, or mass load of a certain load cell, for example foot left or right load cell values and head left or right load cell values and additional information about the location of the centre of gravity.

Figure 91:
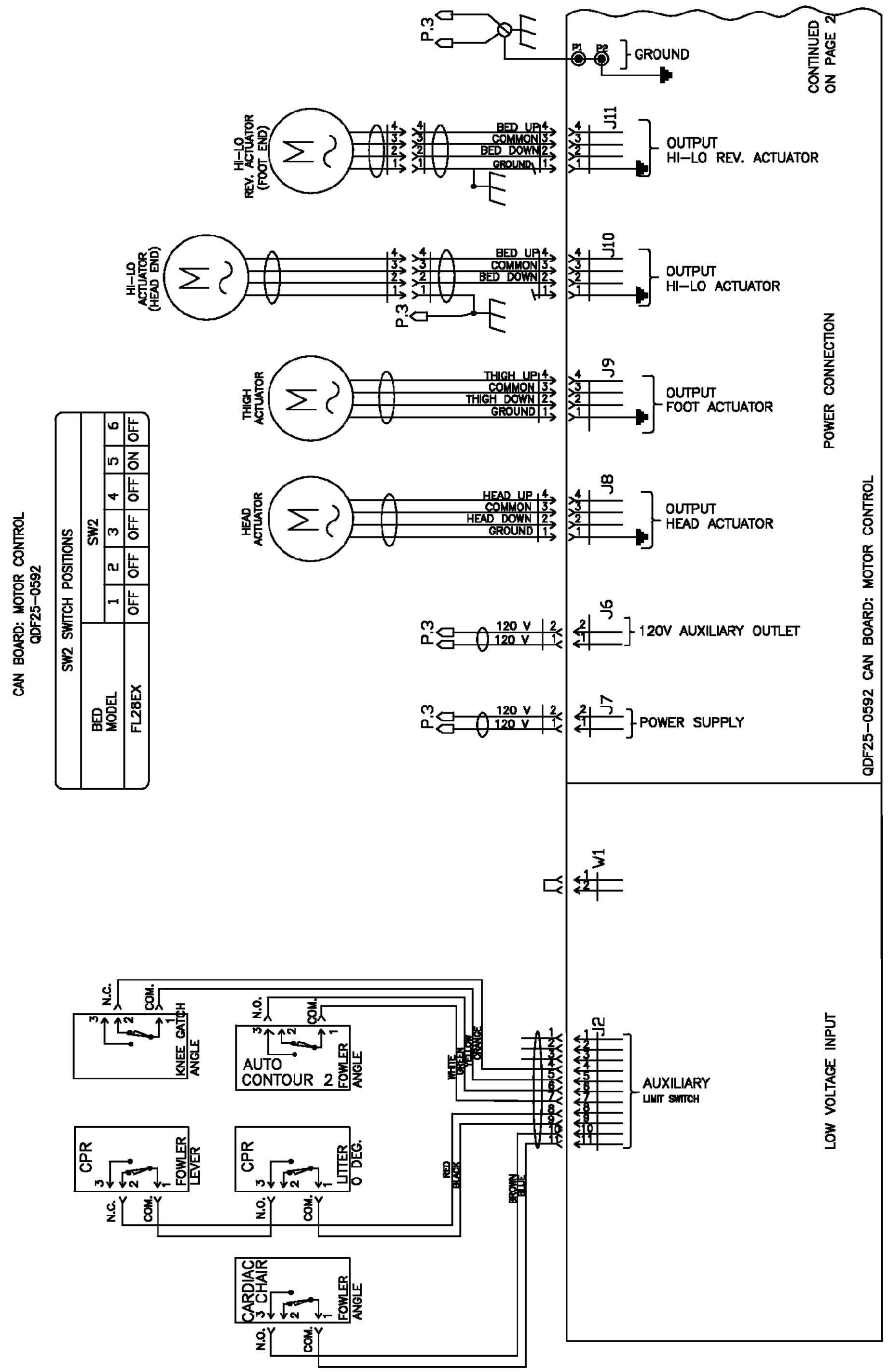
FIG. 91 illustrates a motor control and drive system according to one embodiment of the present invention.

FIG. 91 schematically illustrates an embodiment of the motor control subsystem with a number of attached actuators and limit switches. It is understood that, depending on the functionality of the patient support, there can be a different number of actuators or limit switches than illustrated. In this embodiment the surface of the patient support can be shaped by orienting a head, thigh, and a foot section where the support surface for a supported person is intended to fold and provide an adjustable angle between the upper body and the thigh as well as under the knee between the thigh and the lower leg. The head actuator can position the end of the head section, and the thigh actuator can position the knee section of the patient support support surface relative to an even or flat support structure. The HI-LO head actuator can position the head end of the even support structure relative to the frame of the patient support which is in contact with the floor. The HI-LO foot actuator can position the foot end of the even support structure relative to the frame of the patient support, for example. The two HI-LO actuators can pivot the support surface horizontally whereas the head and the thigh actuator can shape the support surface by pivotally adjusting sections of the patient support support surface.

The motor control subsystem is connected to a number of limit switch or angle sensor systems which ensures that the actuators do not move or position parts beyond predetermined limit angles or distances. When a part or section of the patient support reaches a predetermined limit position while moving, the motor control subsystem can receive a status change signal via one or more limit sensor signals and can interrupt the respective movement. The motor control subsystem can have a safety control feature that does not allow any further continued movement in that same direction or orientation unless the limit condition indicated by the limit sensor system is resolved. Provided that no movement of other degrees of freedom of the patient support takes place, the limit condition typically can be resolved by reversing the original movement.

Figure 9:
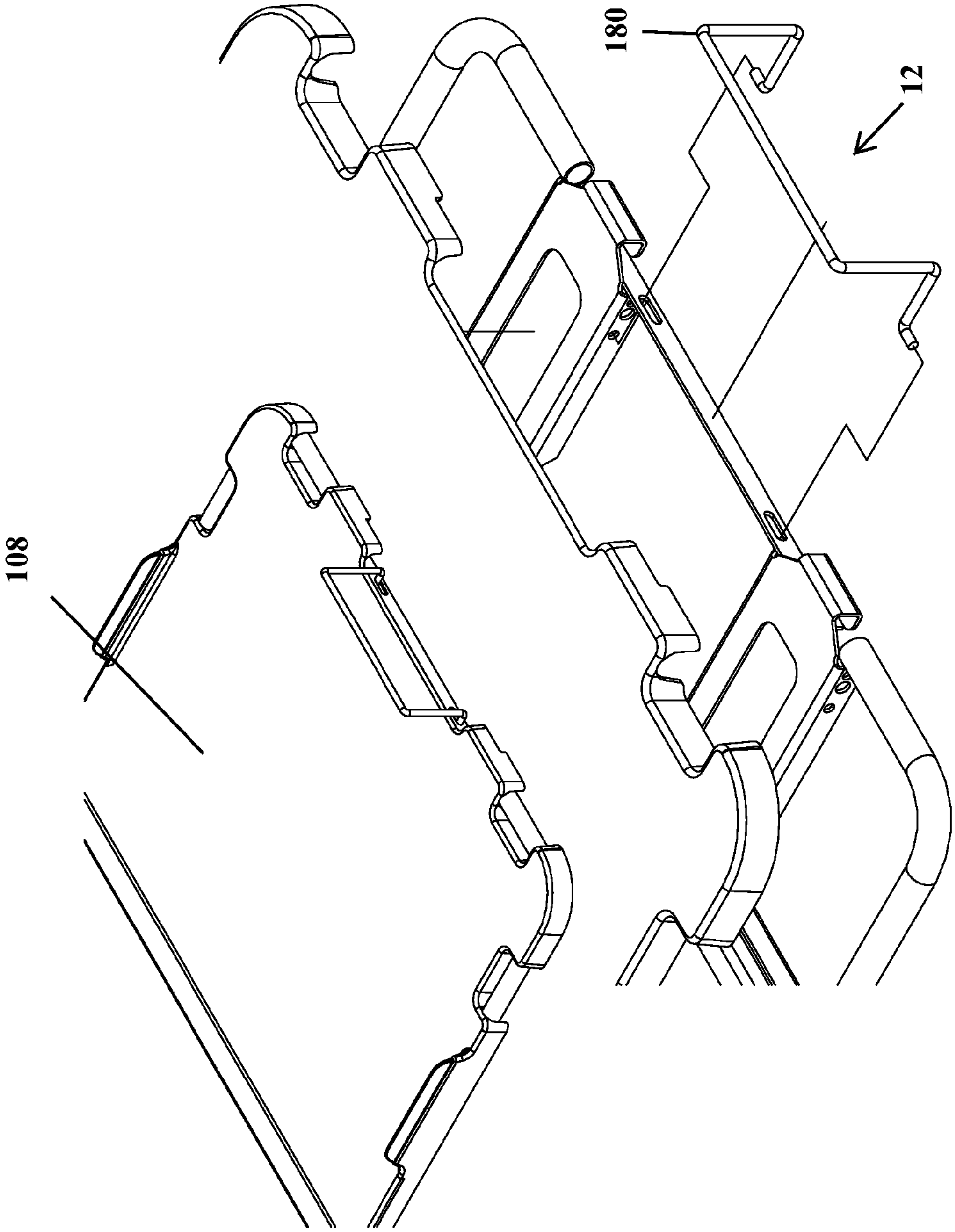
FIG. 9 is a perspective and exploded view of the foot section of a lying surface support and a lying surface retainer according to one embodiment of the present invention.
Figure 10:
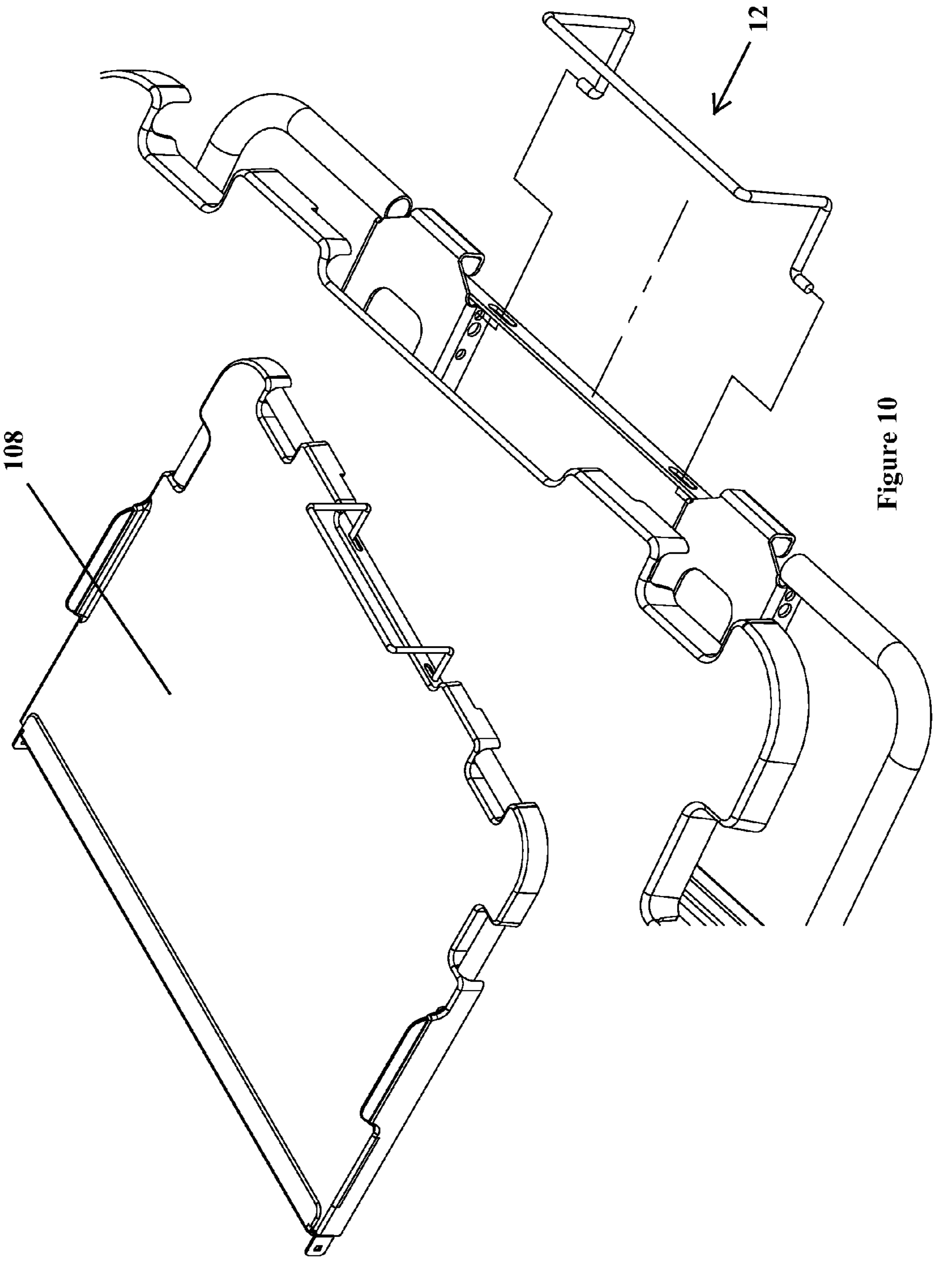
FIG. 10 is a perspective and exploded view of the foot section of a lying surface support and a lying surface retainer according to one embodiment of the present invention.
Figure 11:
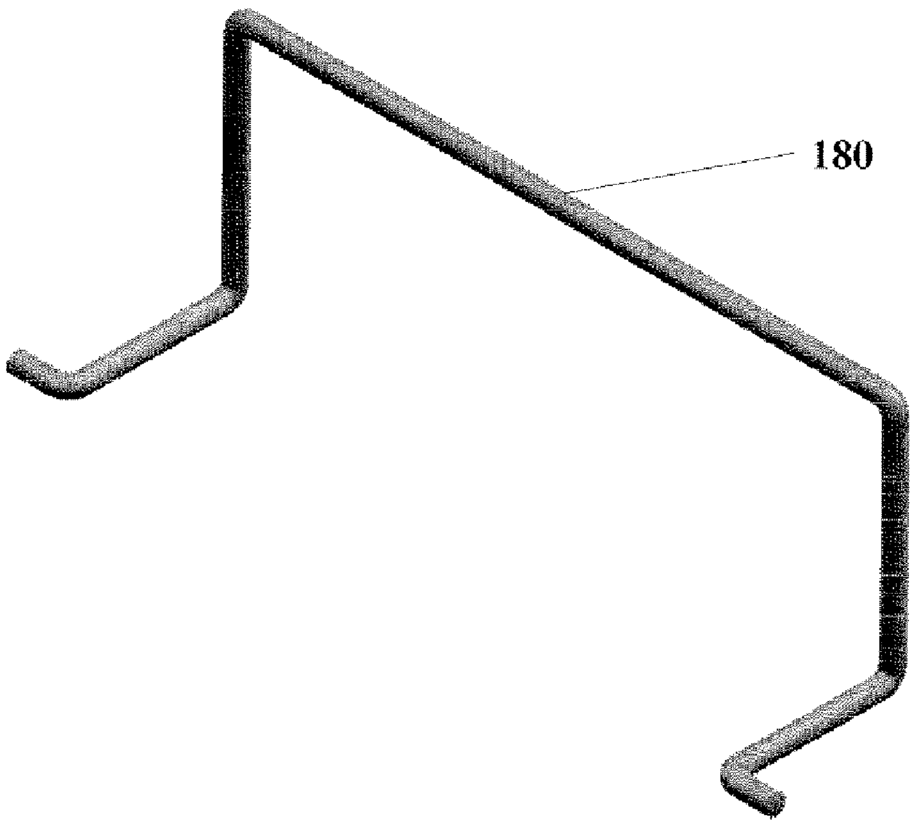
FIG. 11 is a perspective view of a lying surface retainer according to one embodiment of the present invention.
Figure 12:
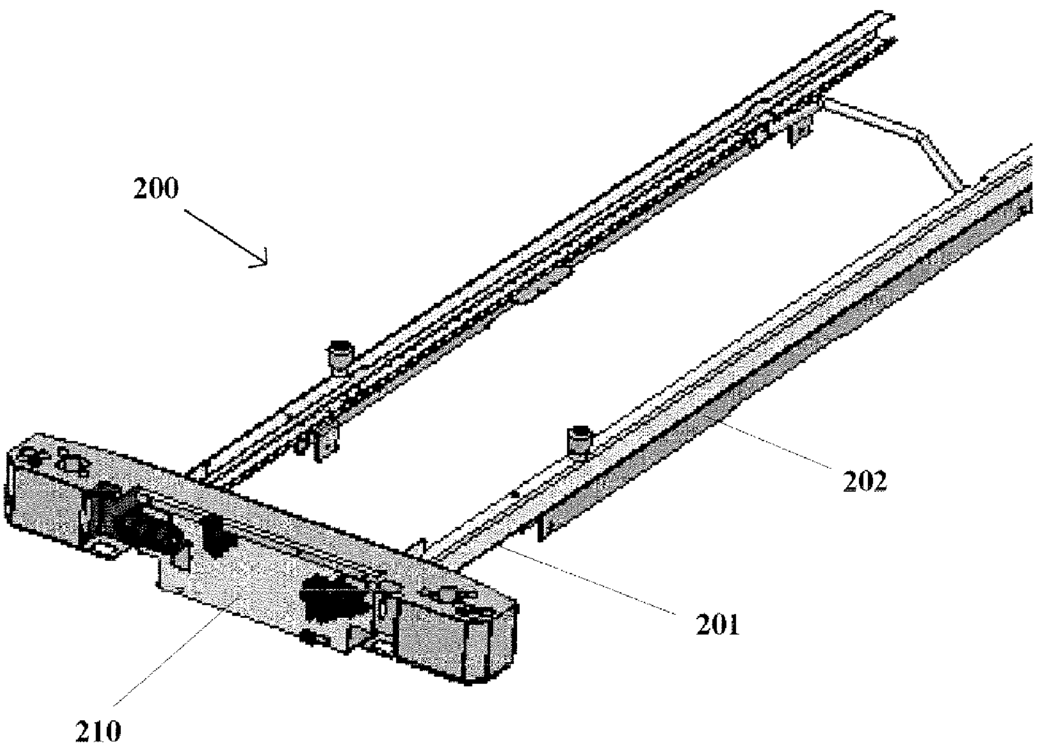
FIG. 12 is a perspective view of a load frame according to one embodiment of the present invention.
Figure 92:
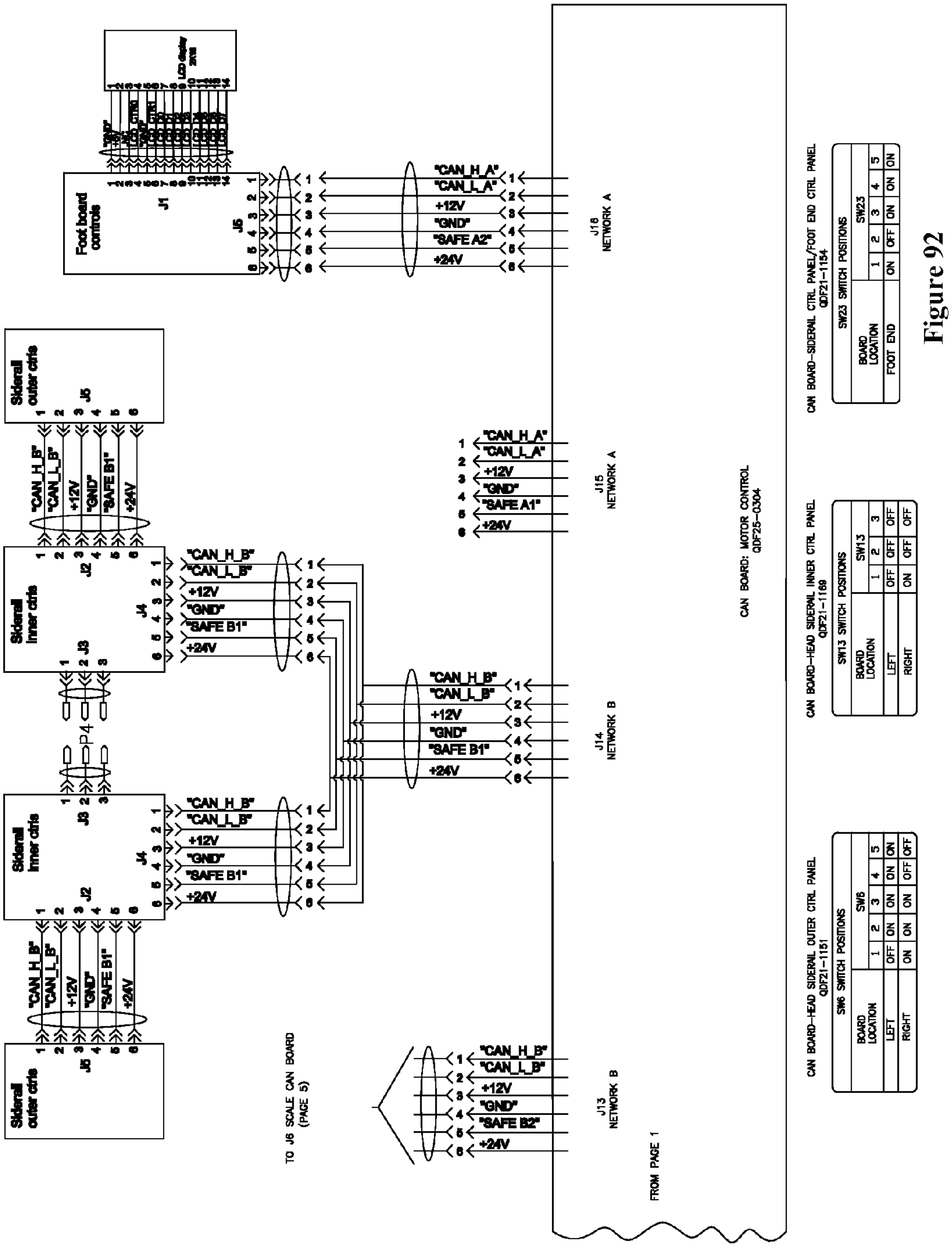
FIG. 92 illustrates an interface controller according to one embodiment of the present invention.

FIG. 92 schematically illustrates an embodiment of the user interface controller with a number of attached user interface consoles. The patient support can have a number of user-interface consoles, each providing access to a certain set of patient support system functions. For example the patient support can have user interface consoles integrated into one or both of the side rails of the patient support providing easy access to certain patient support system functions for a supported person or for a person at the side of the patient support. The patient support can also have a user interface console located at the foot or the head section of the patient support. Each such interface console may be integrated into a respective foot or head board of the patient support for example. A foot or a head interface console may provide access to a set of patient support system functions different from each other as well as different from the side rail consoles. There can be inner or outer side rail consoles intended for access from within or from outside of the patient support. An embodiment of a side rail console is illustrated in FIG. 11 and an embodiment of a foot board interface console is illustrated in FIG. 9. The foot board console can have a display system included. The display system can be a touch screen display or a simple passive display system with a separate input system as illustrated in FIG. 9. In addition the interface controller can have a remote control interface to which a remote console can be connected. The remote control interface can provide wired or wireless connection of a special purpose or a general purpose computing device for example. A number of different bus systems and control protocols are available to communicate through the remote control interface as known to a person skilled in the art. The interface controller may also provide a number of additional control or remote control interfaces.

Figure 93:
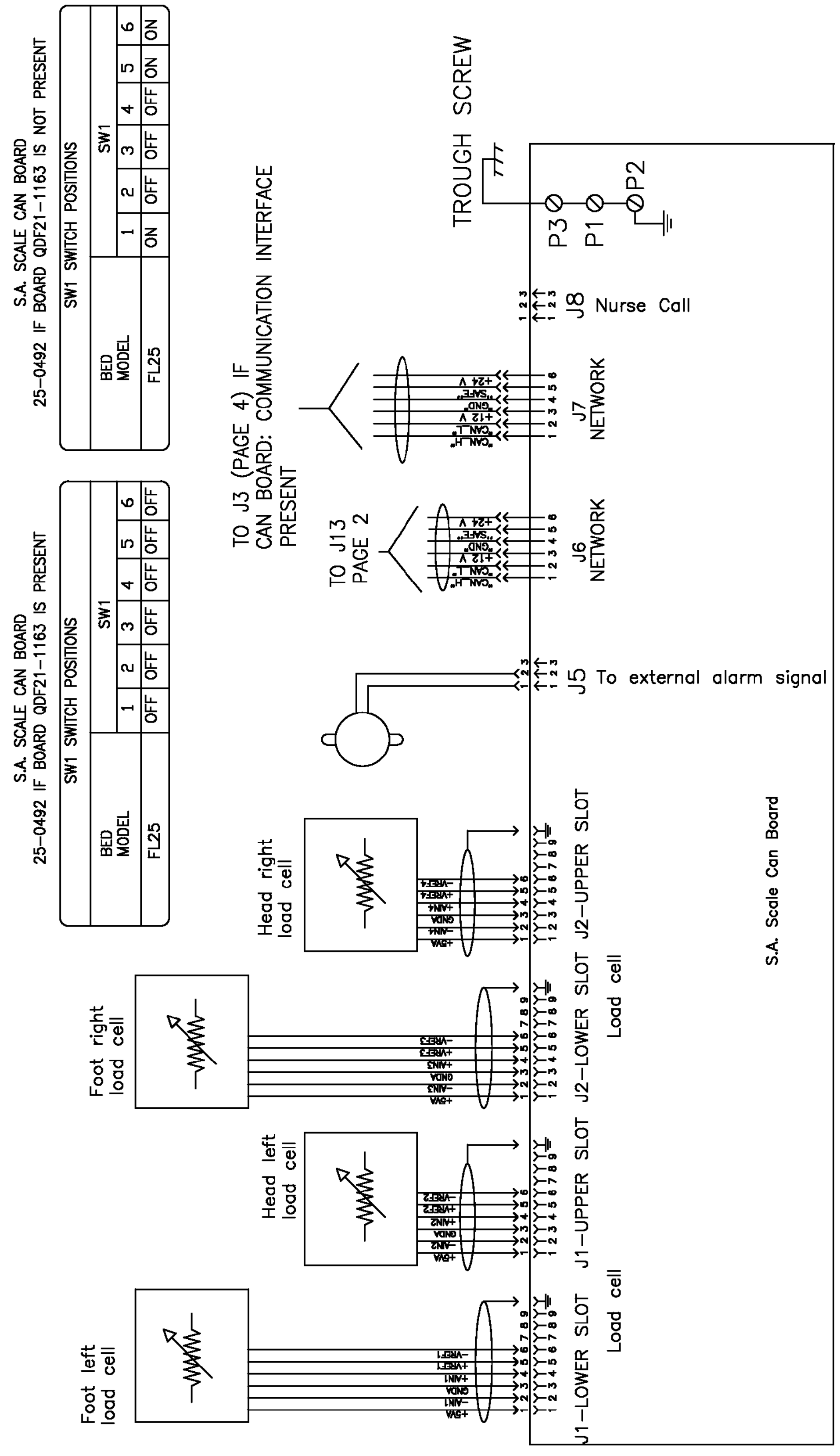
FIG. 93 illustrates a scale subsystem according to one embodiment of the present invention.

FIG. 93 illustrates a part of a scale subsystem. The scale subsystem can connect to a number of load sensors or load cells. The number of load sensors can be different from that illustrated. In this embodiment, four load sensors which are capable of sensing pressure and can be calibrated to provide a measure of force or mass applied to each sensor are attached to the scale subsystem control interface. The scale subsystem controller can process signals incoming from the load cells and can be used to detect the status of a supported person. The scale control subsystem can be configured to provide a messaging signal or to alert monitoring personnel through an external alarm system interface for example. When each load cell is properly calibrated, the scale control subsystem can also provide a measure of the weight of a supported person, which is then compensated by the angle of the patient support to provide the actual weight. The weight information can be utilized and can also be recorded in another subsystem of the patient support which may be desired for patient monitoring for example. As previously described, the angle of the patient support and the load sensor measurements are used to calculate the patient's actual weight, independent of the patient support's position.

Figure 94:
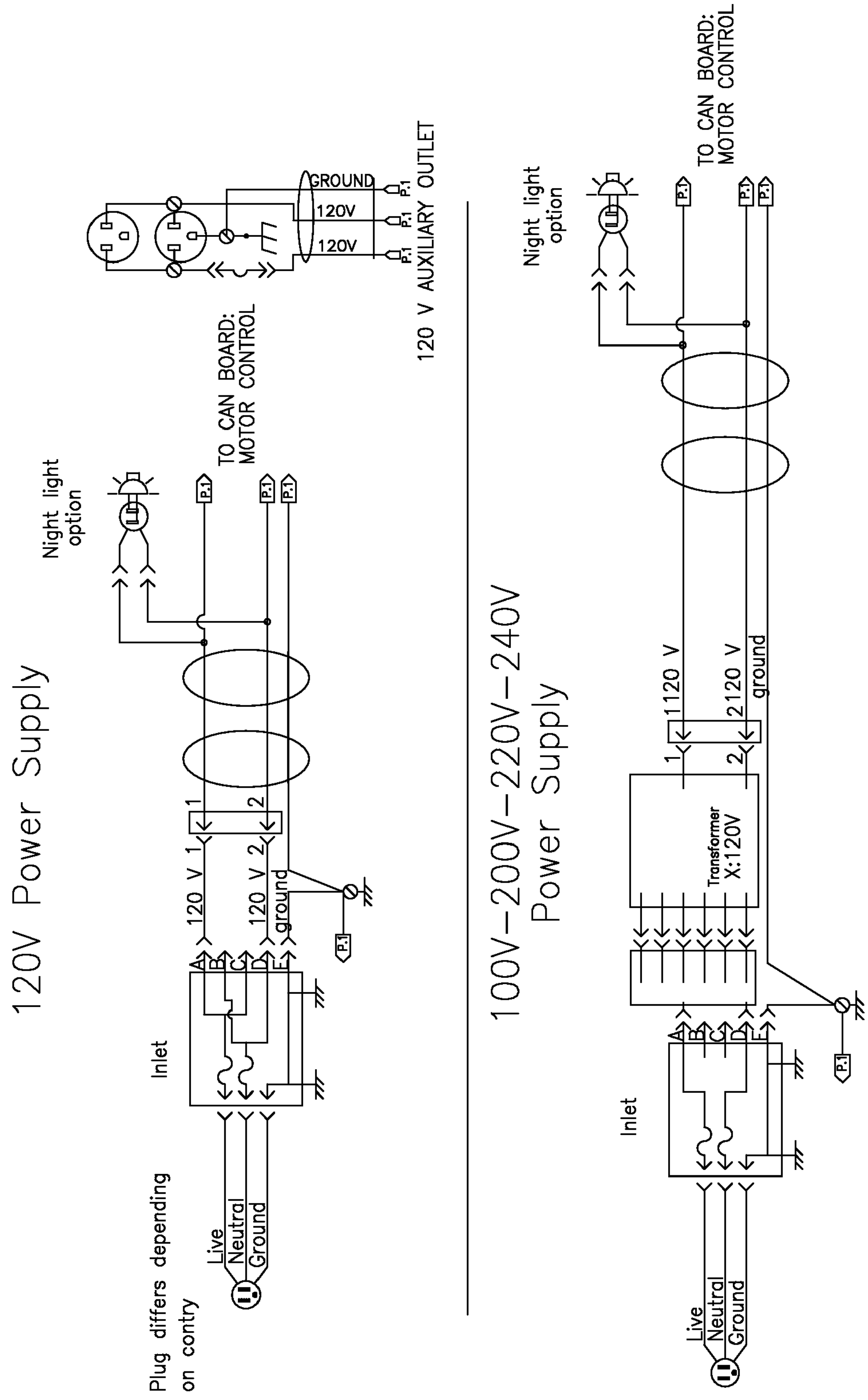
FIG. 94 illustrates a power supply system according to one embodiment of the present invention.

FIG. 94 illustrates an embodiment of a power supply system. The power supply system may include an adaptation subsystem including a transformer and an adaptive wiring and plugging subsystem to achieve compatibility with standard power outlets and the different voltage standards of other regions or countries.

Figure 95:
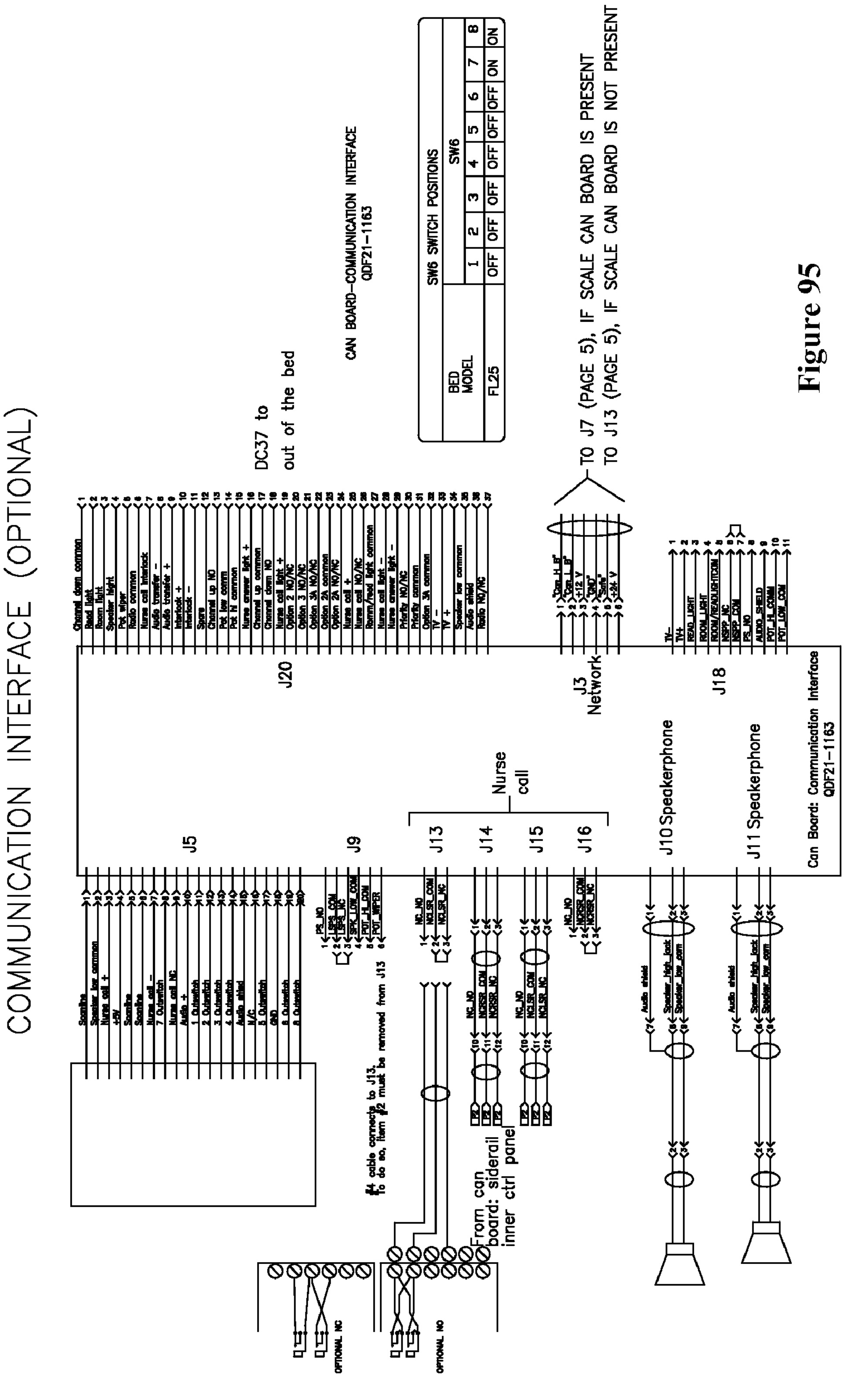
FIG. 95 illustrates a communication interface according to one embodiment of the present invention.

FIG. 95 schematically illustrates the communication interface of the CAN board controller for communication with other components of the patient support. The communications interface includes subinterfaces for side rail consoles, footboard consoles, remote monitoring consoles, external alarm system, speakers, an entertainment system etc.

Patient Support System Components

A multifunctional patient support can be equipped with one or more of a plurality of electronic devices that can provide a means for controlling the functionality of the patient support. For example, electronically controlled drivers or actuators can be provided to help automatically adjust any part or section of a patient support, wherein these actuators can be electrical, pneumatic or hydraulic in nature and may require a suitable electrical, pneumatic or hydraulic drive or power supply system for operation thereof. A patient support system can additionally include one or more sensors and detectors for sensing and detecting the status of structural or functional components of the patient support as well as certain vital signs of a patient. For example, sensors or detectors can be appropriately designed load sensors, angular movement sensors, pressure sensors, temperature sensors or any other type of sensor or detector that would be appropriate for integration into a patient support as would be readily understood by a worker skilled in the art. Each of these sensors or detectors can be configured to evaluate a desired piece of information relating to the supported person or the patient support itself, for example the information can relate to the mass of the patient, the orientation of the patient support in terms of position of the supported person or other characteristics.

In addition, the patient support system comprises a form of human-machine interface system that can assist in accessing the functionalities that are associated with the patient support, for example to enable movement of portions of the patient support or to evaluate the condition of desired aspects of the patient support's functionality, such as monitoring or fault detection, for example. The interface system can be realised with one or more specific interfaces for enabling access, wherein interfaces can be provided on a footboard, headboard, side rails or other locations on the patient support for example. The position and number of interfaces can be determined based on the number of desired access points to the various functionalities of the components of the patient support.

In one embodiment, the patient support system components further comprises a sensor for detecting if a patient is inadvertently obstructing the selected movement of the patient support. For example, if a patients arm is below a side rail, a sensor can detect the presence of the arm and not proceed with the lowering of the side rail if this request has been made. In this manner, the diagnostic and control system can monitor and evaluate if a patient's orientation or position would inhibit a selected movement of patient support component.

Control Subsystem

The diagnostic and control system can comprise a single monolithic subsystem or one or more modular subsystems enabling the control, monitoring, and, if required, calibration of the electronic elements of the patient support system. In this manner the functionality of each of the electronic elements, for example load sensors, temperature sensors, tilt sensors, actuator position sensors, actuators and the like can be evaluated and assessed for functionality within a desired set of parameters.

The diagnostic and control system can further monitor or query the functionality or status of the electronic elements, including for example, actuators, load sensors and the like. The system can monitor the current status of the operational parameters of these electronic elements and cross-reference the collected data with a set of standard operational characteristics. In this manner the system can be provided with a means for detection of a potential fault or error when a specific electronic element is not operating within a desired and/or predetermined range. For example, if a load sensor is being monitored and an extraneous load reading is detected, the system can re-query the load sensor to evaluate if it was merely an inaccurate reading or if a potential problem exists. This extraneous reading may be for example a reading that may be outside of normal operating conditions of the load sensor or may be evaluated as extraneous upon comparison with other load sensors in the vicinity, for example. Each of the electronic elements associated with the patient support system can be monitored in this manner as would be readily understood by a worker skilled in the art.

The diagnostic and control system can perform the monitoring of the patient support system components in a continuous manner, periodic manner or on-demand manner. The frequency of the monitoring of these components can be dependent on the electronic element being monitored. For example, the format of the monitoring can be dependent on the level of computation that is required to determine if a component is operating within desired and/or predetermined parameters. Constant monitoring may include querying the sensors for current readings for comparison with operational parameters. Periodic monitoring may be performed when evaluation of the orientation and angular position of the patient support frame is desired and on-demand monitoring may be performed on the diagnostic and control system itself wherein monitoring thereof would typically comprise a more extensive computation of current status.

In one embodiment of the present invention, the diagnostic and control system initializes or calibrates the operation of each of the electronic elements, for example actuators, load sensors and tilt sensors, in order that these electronic elements can provide the desired level of accuracy and desired functionality to the patient support. For example, calibration of a load sensor may be performed when a lying surface is positioned on the patient support and the load sensor can be zeroed under this condition. Furthermore, one or more of the actuators and tilt sensors can be calibrated or zeroed when a patient support is in a known orientation, for example linearly flat in a horizontal orientation.

In one embodiment of the present invention, the diagnostic and control system, while providing control of the functionality of the patient support system, can additionally ensure that a procedure requested by a user is both possible and safe to be performed. In this scenario the diagnostic and control system can evaluate the current status of the patient support systems, and subsequently determine if the selected function is possible. For example if an operator requests the elevation of the head portion of the patient support, the system can determine if the head portion can be elevated, and if this procedure is possible, subsequently perform the desired function. If, for example, the head portion was fully raised, and the function was performed regardless, the actuator performing the requested function may be unnecessarily damaged due to overloading or over-extension, for example. This evaluation of the requested function can additionally be determined based on a current treatment being performed on a patient. For example, if a patient is to be oriented in a particular position, the diagnostic and control system can be configured to not allow any adjustment of the patient support system until this particular position can be changed according to treatment procedures or requirements.

In one embodiment of the present invention, the diagnostic and control system can be designed using an interface-controller-model architecture. The interface can provide user access to functions of the patient support, as well as a query or notification system that can provide access to patient support functionality, or notify monitoring personnel of important status information about parameters of patient support functionality in addition to certain vital information about the supported person. The model can provide an abstract description of the patient support's operational parameters, for example desired operating conditions in the form of a virtual machine, data set or database. The interface and controller can also read information from the model and based on current detected status of the electronic elements associated with the patient support, can determine if the patient support is performing within desired parameters. For example, a representational model for a collection of loads sensors can be provided which can provide operational parameters for the load sensors that can additionally be representative of the configuration of a load sensor web, thereby providing a means for evaluating the operational characteristics of the loads sensors during operation.

In one embodiment of the present invention, the diagnostic and control system can include one or more monitoring sensors that can provide a means for independently monitoring the functionality of one or more of the functions of the patient support. For example, a monitoring sensor can be associated with an actuator, wherein this monitoring sensor can be a temperature sensor that may enable the detection of overloading or overuse of an actuator due to an excessive temperature reading. The diagnostic and control system may optionally comprise redundant sensors for example, which may be activated upon detection of extraneous readings for a typically used sensor. This form of redundancy can additionally provide a means for evaluating the operational characteristics of the electronic elements associated with the patient support.

In one embodiment, an interface associated with the diagnostic and control system can provide one or more different classes of functionalities to one or more different categories of users. For example functionalities can be categorized into functions accessible to a supported person, functions accessible to a monitoring person, and functions accessible to maintenance personnel for accessing diagnostic functionality. Consequently, there can be user interface subsystems that are available and intended for use by a specific user group. Functions of the patient support can also be grouped according to a person's physical accessibility to the patient support and can be accessible on-site or remotely or both. As a result, the patient support control system can interact with two or more physical tangible human-machine interface subsystems such as for example a console embedded in the patient support. Another important aspect of the present invention is the ability to connect to the patient support's control subsystem and diagnostic subsystem and transfer information therefrom or instructions thereto via a suitable number of user interface subsystems, for example communication systems using wired or wireless devices. Therefore, the diagnostic and control system according to one embodiment of the present invention provides the ability to obtain diagnostic information from the patient support via wireless devices or by connecting a computer or other wired communication device to the patient support. This provides an end user or a technician a means to access constructive information about the patient support for any repairs or maintenance that could be required.

In a similar fashion, the monitoring personnel or health care provider can have access to information about the supported person without being in close proximity to the patient support incorporating the diagnosis and control system.

Upon the detection of a fault or error, the diagnostic and control system can activate an alarm setting that can be a visual, audible or other form of fault indication. For example, the interface associated with the patient support can have an error message displayed thereon. In one embodiment, this error message can provide a means for a technician to evaluate and correct the identified fault.

In one embodiment of the present invention, upon detection of a system fault during the monitoring of the functionality of the patient support system, the diagnostic and control system can initiate a full diagnostic subsystem which can perform a more complete system diagnostic evaluation and, in turn, evaluate and identify one or more sources of the detected system fault.

In one embodiment of the present invention, the diagnostic and control system can collect specific information relating to the current status of particular components of the patient support system that are directly related to the detected fault, for example one or more sensor readings or the like, for subsequent use by the diagnostic subsystem for analysis of this fault.

Diagnostic Subsystem

The diagnostic and control system of the present invention comprises a diagnostic subsystem that can collect and evaluate the collected information relating to an identified fault and perform an analysis thereof in order to determine a source of such fault and a potential remedy to the detected fault. The diagnostic subsystem can indicate malfunctions of the patient support control system which can be due to a number of reasons such as for example an actuator break-down, an unacceptable deviation between a parameter of the patient support and the patient support control system's parameter's desired value as, for example, caused by overload or lack of calibration of an actuator, or any other condition of the patient support control system. A diagnostic program may be applied in order to make a distinction between any critical or non-critical function of the patient support control system when diagnosing a malfunction.

In one embodiment the diagnostic subsystem can also record a number of events including system data and user commands into one or more log records, for example one or more files in an embedded or a remote controller or computer system. Furthermore, essential information regarding any form of treatment administered to the supported person can be securely recorded which could be used in the future. The log records can also contain information from other subsystems of the patient support. Information in the log records can be categorized; time stamped, and can contain human or machine-readable data describing the event. The data can be encoded, encrypted or clear text messages. Each subsystem can have its own logging mechanism for logging events specific to that subsystem, accessible only through an interface of the subsystem or accessible through interaction with a central controller. Events can be categorized into groups according to a severity or other schemes and, depending on the categorisation, include varying degrees of detailed information relevant to a particular category.

In one embodiment of the present invention, the diagnostic and control system has a movement counting device (data logger) which is used to produce a diagnostic that can be used to improve the design of the system for specific uses or to perform preventive maintenance on the system. For example, it will be possible for an establishment utilising such a diagnostic and control system to use the data logger in order to determine the different ways in which the patient support is being manipulated and therefore provide information in a very constructive manner for any future designs. The information gathered by the data logger could also used in preventive maintenance such that more attention is given to any parts of the patient support that is involved in more motion or manipulation.

In one embodiment the diagnostic subsystem can analyze the detected information relating to the functionality of the patient support associated with the detected fault, and subsequently evaluate one or more indicators that can be compared with known indicators of known problems relating to patient support functionality. In this manner, based on a comparison with the indicators of known problems, the diagnostic subsystem can determine the specific problem. Once a specific problem has been identified, a possible corresponding remedy for this problem can be identified, thereby providing a means for the remediation of the identified problem. The correlation between a calculated indicator defined by information relating to the present status of the patient support system may not precisely match an indicator of a known problem. In this instance a probability of correlation between the evaluated indicator and the known indicator can be determined thereby providing a means for assigning a confidence factor with the identified problem.

In one embodiment of the present invention, the diagnostic subsystem can evaluate the identified fault through the analysis of previously detected readings, thereby providing for a correlation between the current readings at fault detection and previous readings. This manner of analysis may provide a means for identifying a malfunctioning component, for example a sensor through the correlation with previously detected values. In one embodiment of the present invention, the diagnostic subsystem can be directly integrated into the patient support. Optionally, the diagnostic subsystem can be electronically coupled to the patient support upon the issuance of a error notification. Moreover, the patient support system architecture can comprise a diagnostic interface providing access to the patient support system such that a diagnostic subsystem can be separated or detached from the physical patient support and provide the same set, a subset or superset of diagnostic tools than an integrated diagnostic subsystem.

In one embodiment of the present invention, the diagnostic and control system comprises a communication system that can provide a means for transmitting information relating to the evaluated functionality of the patient support to another location. In this embodiment, the communication system can enable wired or wireless communication. For example, this form of connectivity of the patient support may enable the remote monitoring of patient support functionality at a location removed from the location of the patient support. For example, in a hospital setting, this remote monitoring can be performed at a nursing station or optionally can be provided at a remote location removed from the hospital. The communication system can enable the transmission of monitoring and diagnostic results to a technician for analysis, for example if a more detailed diagnostic analysis of the patient support is required in order to determine the source of the indicated error. This can provide a means for a detailed diagnostic to be performed and an appropriate remedy identified prior to the dispatching of a technician to the patient support site. In this manner, time may be saved as the technician may be dispatched with appropriate replacement parts, thereby reducing the downtime of the patient support.

The functionality of the diagnostic and control system according to the present invention can be provided by any number of computing devices, for example one or more microprocessors, one or more controllers or one or more computer systems that can be integrated into the patient support itself in order to provide the desired computational functionality. In one embodiment of the present invention, the diagnostic subsystem can be configured for coupling to the patient support to subsequently provide the diagnostic capabilities. It would be readily understood how to couple the diagnostic and control system to the one or more electronic elements in order to data transfer therebetween, for example this connection can be a wired or wireless connection.

Figure 99:
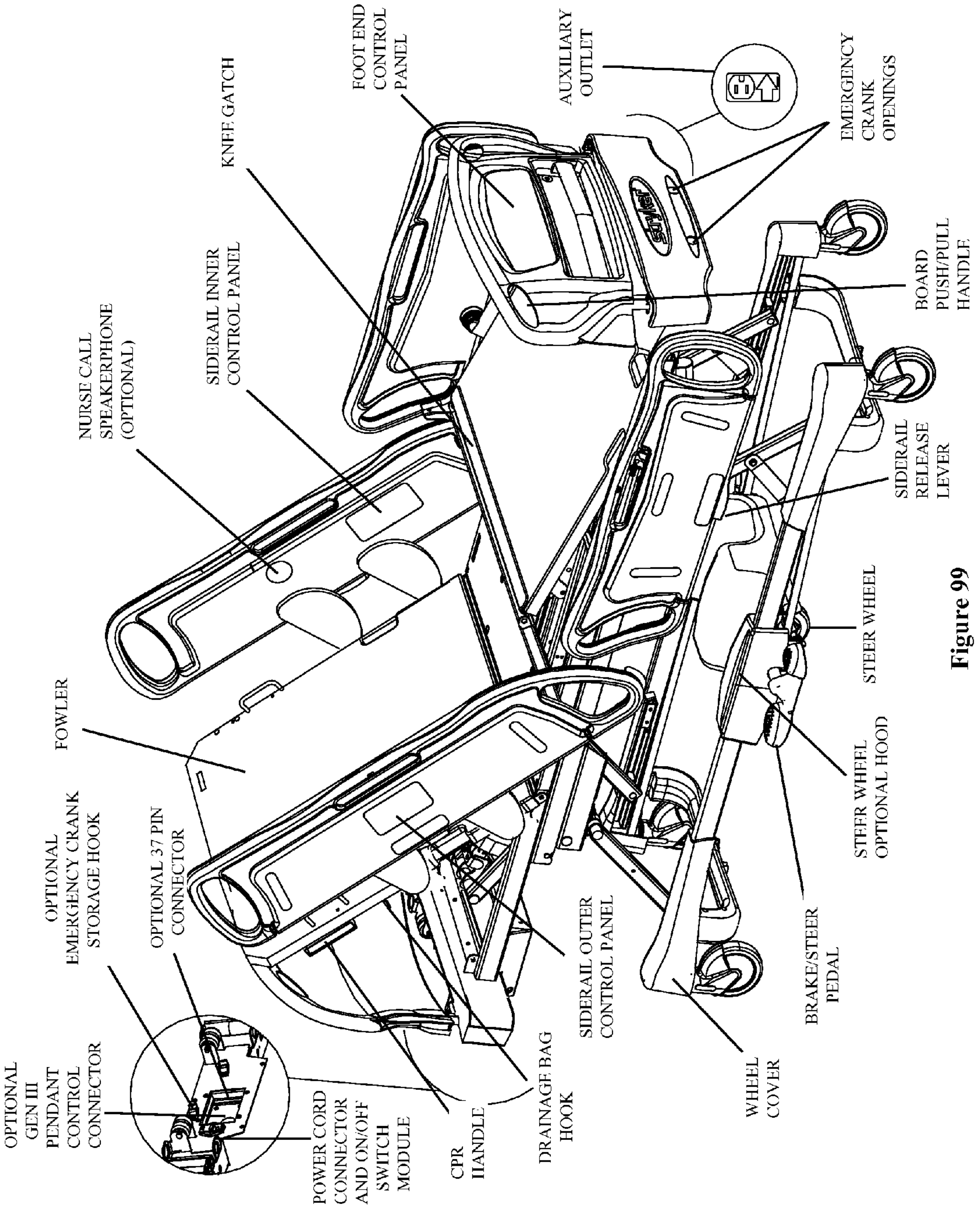
FIG. 99 illustrates a perspective view of a patient support according to an embodiment of the present invention.

FIG. 99 illustrates an example hospital patient support having patient support components that can be controlled, monitored and diagnosed by one embodiment of the diagnostic and control system according to the present invention. The patient support is shown with some of its sections placed in one possible configuration. This example of a patient support is not to be considered limiting as the diagnostic and control system according to the present invention can be integrated into any number of patient support configurations.

FIG. 80 illustrates a schematic view of one embodiment of a console or interface that can provide access to some or all functionality of the diagnostic and control system, wherein this user interface may be embedded into a patient support. The console can be integrated into the foot board of the patient support illustrated in FIG. 99 and can provide access to the patient support's functions. The console has back lit zone indicators which can indicate a set zone mode of the patient support for indicating a preset restriction level for movement of a supported person. Indicators can also be multi-color back lit to indicate an armed or disarmed state. Button can be used to set and switch between the zone alarm as indicated by the zone alarm indicators. Button can arm or disarm the zone alarm functionality in a toggling fashion. Button can be sectional or full color or multi-color back lit to indicate an armed or disarmed state of the zone alarm system. Interface elements can be used to raise or lower the lying surface. While pushing the arrow-up button the raises and while pushing the arrow-down button the patient support lowers. Pushing and holding both buttons may cause the movement to stop or continue the movement according to the button which was pressed first. Button can lock out some or all functionality accessible through this or other consoles until the button is pressed again. Buttons and can be used to lock-out access to reorient the respective head and knee sections of the patient support. Button when pressed causes the patient support to assume a cardiac position or other predetermined shape of the patient support surface. Each of buttons and when pressed individually inclines or reclines the overall support surface without affecting the shape of the patient support surface.

Interface elements and provide button groups which when pressed can reorient the head or the knee sections of the and can be used in order to achieve respective desired angles between the upper body and the upper leg, as well as the upper leg and the lower leg of a patient. Display can be used to display information about certain functions or the state of certain parts of the patient support and its system components. Button group can be used to scroll through information which is available in form of a menu for display but exceeds the amount of information which can be displayed simultaneously on display. Buttons and can be used to select or enter information and to interact with the menu following a command and control concept.

FIG. 81 illustrates an embodiment of the window content of a step in a series of user-patient support interaction processes that can be displayed on a detached device such as a general purpose computer. This is part of an interface that for example can provide remote access to control, diagnose, or monitor functions of the patient support system. The interface can provide functions to select certain components from a list of components or subsystems of the patient support system for detailed investigation. The user interface may change its look and feel by changing some or all of its user interface components when selecting to investigate a specific component of the patient support system. The user interface can provide and display information in a categorized graphical fashion and can utilize a button status field, a motor status field, fields for monitoring vital information about a supported person etc.

The user interface can also provide a menu system to select from and to provide access to different aspects of interaction of the patient support system such as for example, a monitoring interface, a maintenance interface, an operator interface etc. For example, a maintenance interface or menu can be presented to an end user or a technician. The maintenance menu is able to convey very accurate information in regards to any faulty components in the patient support so that the end user or technician can undertake appropriate action. The maintenance menu can be transferred to a computer, a server or other external device allowing the information to be displayed to the end user or technician via a computer or terminal.

Therefore, remote diagnostic of the patient support can be achieved thus improving efficiency in remedying the fault. Switching between monitoring interface, maintenance interface, operator interface etc. may require authorization and may be password or security code protected.

FIG. 82 illustrates a part of the user interface intended for use by the supported person, according to an embodiment of the present invention. As illustrated, the user interface for the supported person can provide access to reclining functions, emergency call functions or control of entertainment equipment.

FIG. 89 illustrates a schematic diagram of the system architecture of a patient support control and diagnostic system. The architecture can be divided into a number of user interface and control subsystem components. The system architecture comprises a power or AC control system for supplying electrical power, an actuator subsystem providing ability for positioning and orienting parts of the patient support, a number of sensor and detector subsystems for sensing and detecting the state of parts of the patient support, and a diagnostic subsystem as indicated. The diagnostic subsystem can interact with the sensor and detector subsystem or it can have its own alternative sensor and detector system. The user interface subsystem can comprise a number of control consoles and comprising indication or display systems. The display systems can have a touch screen or a regular display with separate buttons. The sensor system can comprise a scale subsystem including a load cell system. The system architecture can further comprise a room or other interface for communicating information to and from the patient support and a remote user interface system.

In one embodiment the patient support system architecture further comprises a model subsystem or virtual state machine for representation of the state of the patient support components for interaction with the controller and the user interface under operating conditions. Each control subsystem can comprise its own model and independent processor or the model of the subsystem can be integrated in a central program controlled by a central processing unit controlling the patient support system.

In one embodiment the architecture may include a diagnostic subsystem for monitoring or querying the functionality or status of various patient support components. The diagnostic subsystem can be separate from or simply an additional component of the one or more control subsystems. The diagnostic subsystem can monitor some or all of the patient support actuators and can utilize an operatively required and already present sensor system or the diagnostic subsystem can have its own redundant sensor system for improved reliability of the patient support control system. The diagnostic system may monitor the patient support components on an continuous basis during the patient support's normal or intended operation or it may be activated only when required to perform certain maintenance procedures. None, some or all of the functions intended for use during normal operation of the patient support may be available during some or all of the diagnostic maintenance procedures. In addition, it may be safe for a person to remain in the patient support during none, some or all of the diagnostic maintenance procedures.

In one embodiment the diagnostic subsystem can comprise sensors for the purpose of self-diagnosis of the patient support control system sensing the status of actuating components for example. Such sensors may not be required to sense the status of the patient support per se but rather provide access to important status information of the control system. Examples can include the temperature of actuator components or controller hardware.

In one embodiment of the present invention, the diagnostic subsystem can passively alert users through messaging systems, for example error messages displayed on the display system. The diagnostic subsystem may also provide procedures to actively query internal status information of the patient support system not intended for use during normal operation. Examples of internal status information can include any kind of readings from sensors or results from self-diagnostic modes of employed digital devices. This information can be important, for example, when calibrating actuators and their respective motion sensor system to accurately scale sensor readings to provide positioning information that corresponds with the true physical position of the respective patient support component. Other examples for internal status information include power supply voltages or current readings.

In one embodiment the diagnostic subsystem can also include a debug mode permitting the step-by-step execution of commands or procedures of the microcontroller or processing unit. For example, the diagnostic subsystem could be accessed via a general purpose computer for extensive debugging of such subsystem.

In one embodiment of the present invention, the diagnostic subsystem has a simple graphic interface that gives a code to the user to diagnose the problem with the faulty component. The user then cross-references with another document or program to interpret the code to diagnose the problem.

In another embodiment, the diagnostic subsystem has a complete graphical interface that communicates in plain language to the user who has to interpret the problem with the faulty component The diagnostic subsystem in both embodiments can also be coupled to a remote location via a network connection which is either wired or wireless. The remote location in one embodiment is the factory that can identify the cause of the fault and send a technician with the parts and advanced knowledge of the fault to minimize the downtime of the faulty component In another embodiment, the diagnostic subsystem is used to perform preventive maintenance on the patient support. Since the motherboard on the control susbsystem can record and interpret data, it can send signal to prevent failure of a component before it happens.

The communication between different components within the patient support control and diagnostic system is achieved through network communication between components such as CAN-Open for example. This protocol utilizes the broadcast of information to the different electronic components (or module) within the patient support. Information regarding any commands requested by the end user is thus transferred to every single electronic component within the patient support and thereafter, action is taken by the component (or module) which is concerned by the information that has just been broadcast. Alternatively, the communication between different components within the patient support control and diagnostic system can be achieved by a peer-to-peer network communication system or any other network communication protocol that would be known to a worker skilled in the art.

FIG. 90 illustrates an embodiment of a load cell system 251 that is used for monitoring movement of a patient. The system can be integrated into the patient support or can be part of a person support element such as a lying surface 20. In addition, the load cell system 251 can comprise a number of load cells or load sensors for example a load cell which can be embedded in the patient support proximally positioned at each of a patient's limbs and optionally at the center of the patient support. The load cell system also can be comprised of a mesh of load cells for example. The signals from the load cells can be monitored and processed by a processing unit in the load cell system or a central processing unit capable of monitoring, processing, and controlling signals from the patient support's subsystems. Instead of forming part of a support element such as a lying surface the load cell system can also integrated into the surface of the patient support for supporting the support element. The load cell system 251 can provide a measure for the pressure, weight, or mass load of a certain load cell, for example foot left or right load cell values and head left or right load cell values and additional information about the location of the center of gravity.

In one embodiment the control and diagnostic system 1400 can comprise an additional scale subsystem providing a calibration process for calibrating the scale subsystem to provide accurate reading of a patient's weight and subsequently to calibrate a motion detection system for monitoring movement of the patient. It may be necessary to calibrate the load cells' 250 electronics in order to provide match the sensor signals with the scale subsystem electronics.

In one embodiment, the tilt sensors 260 can be used with a control and diagnostic system 1400 as a means for fault detection. For example, where no change in an angle is detected when an actuator is being activated to modify said angle, the situation can be indicative of a blockage related to the actuator movement or an actuator malfunction.

Figure 96:
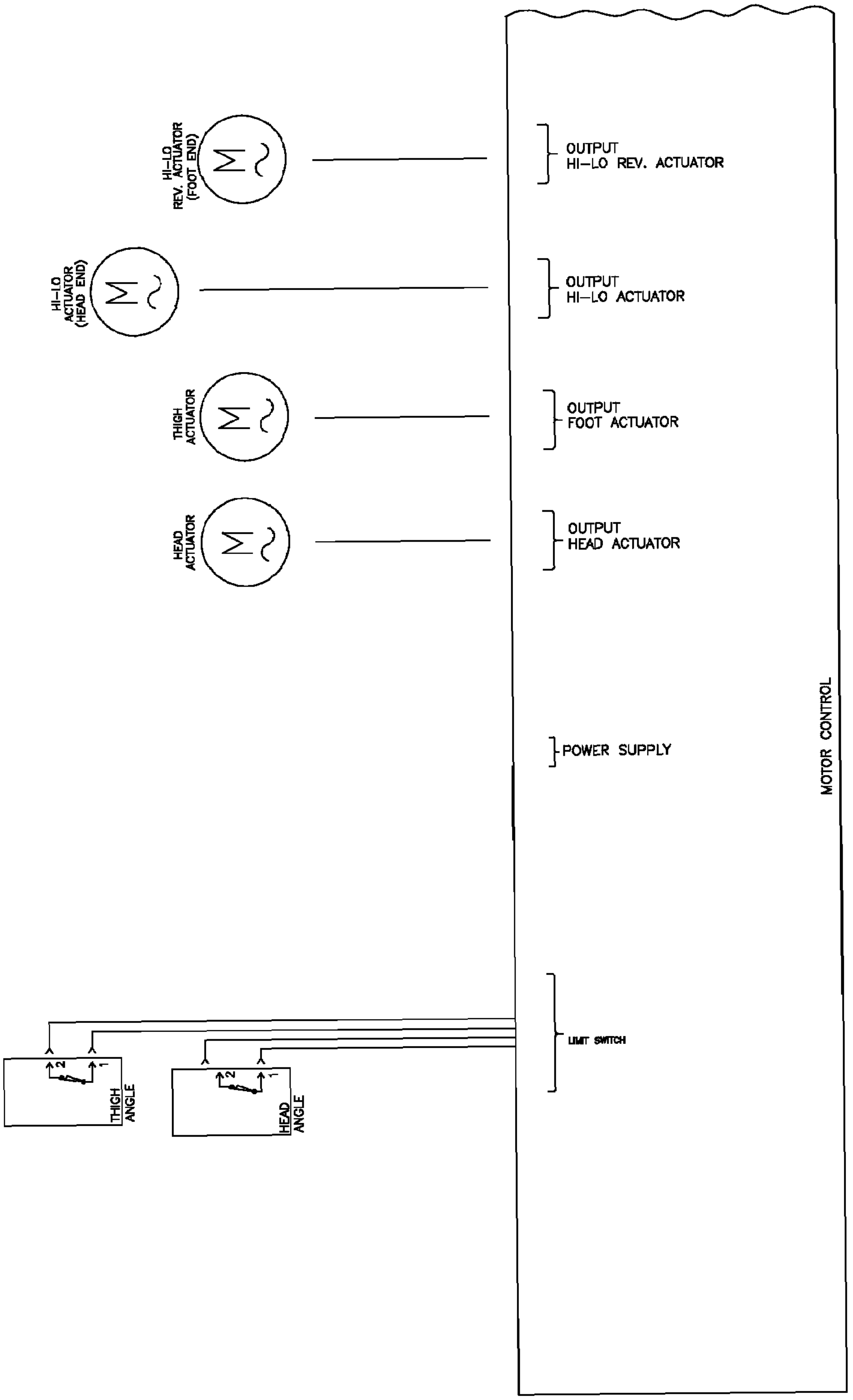
FIG. 96 illustrates an embodiment of a motor control, and motor and actuator system.

FIG. 96 schematically illustrates an embodiment of the motor control subsystem with a number of attached actuators and limit switches. It is understood that, depending on the functionality of the patient support, there can be different numbers of actuators or limit switches than illustrated. In this embodiment the surface of the patient support can be shaped by orienting a head, thigh, and a foot section where the support surface for a supported person is intended to fold and provide an adjustable angle between the upper body and the thigh as well as under the knee between the thigh and the lower leg. The head actuator can position the end of the head section, and the thigh actuator can position the knee section of the lying surface support relative to an even support structure. The HI-LO head actuator can position the head end of the even support structure relative to the frame of the patient support, which is in contact with the floor. The HI-LO foot actuator can position the foot end of the even support structure relative to the frame of the patient support, for example. The two HI-LO actuators and can pivot the support surface horizontally whereas the head and the thigh actuator can shape the support surface by pivotally adjusting sections of the lying surface support.

In one embodiment, the motor control subsystem is connected to a number of limit switch or angle sensor systems which ensures that the actuators do not move or position parts beyond predetermined limit angles or distances. When a part or section of the patient support reaches a predetermined limit position while moving, the motor control subsystem can receive a status change signal via one or more limit sensor signals and can interrupt the respective movement. The motor control subsystem can have a safety control feature that does not allow any further continued movement in that same direction or orientation unless the limit condition indicated by the limit sensor system is resolved. Provided that no movement of other degrees of freedom of the patient support takes place the limit condition typically can be resolved by reversing the original movement.

As discussed previously, each component of the motor control system including the actuators and the limit switch sensor system can provide diagnostic features or a diagnostic mode. The diagnostic features also can include a separate redundant diagnosis sensor subsystem for monitoring the state of the respective device or component for example a temperature sensor or a redundant parallel or serial sensor limit switch system to enhance the reliability of the positioning system. An important aspect of the diagnostic subsystem that is relevant to the motor control system can regard the accurate calibration of sensors providing actuator position information. The motor control system interprets actuator position sensor signals to be accurate representations, encoded in form of a suitable signal, of the real position of a respective part or section of the patient support. The motor control system may fail to execute a given command when the real position deviates from the motor control system's perceived position as provided by or derived from an actuator signal. In such a case the diagnostic system can provide functionality to help avoid or diagnose a malfunction which can reach from functionalities such as automatic recalibration to alerting or messaging.

Figure 97:
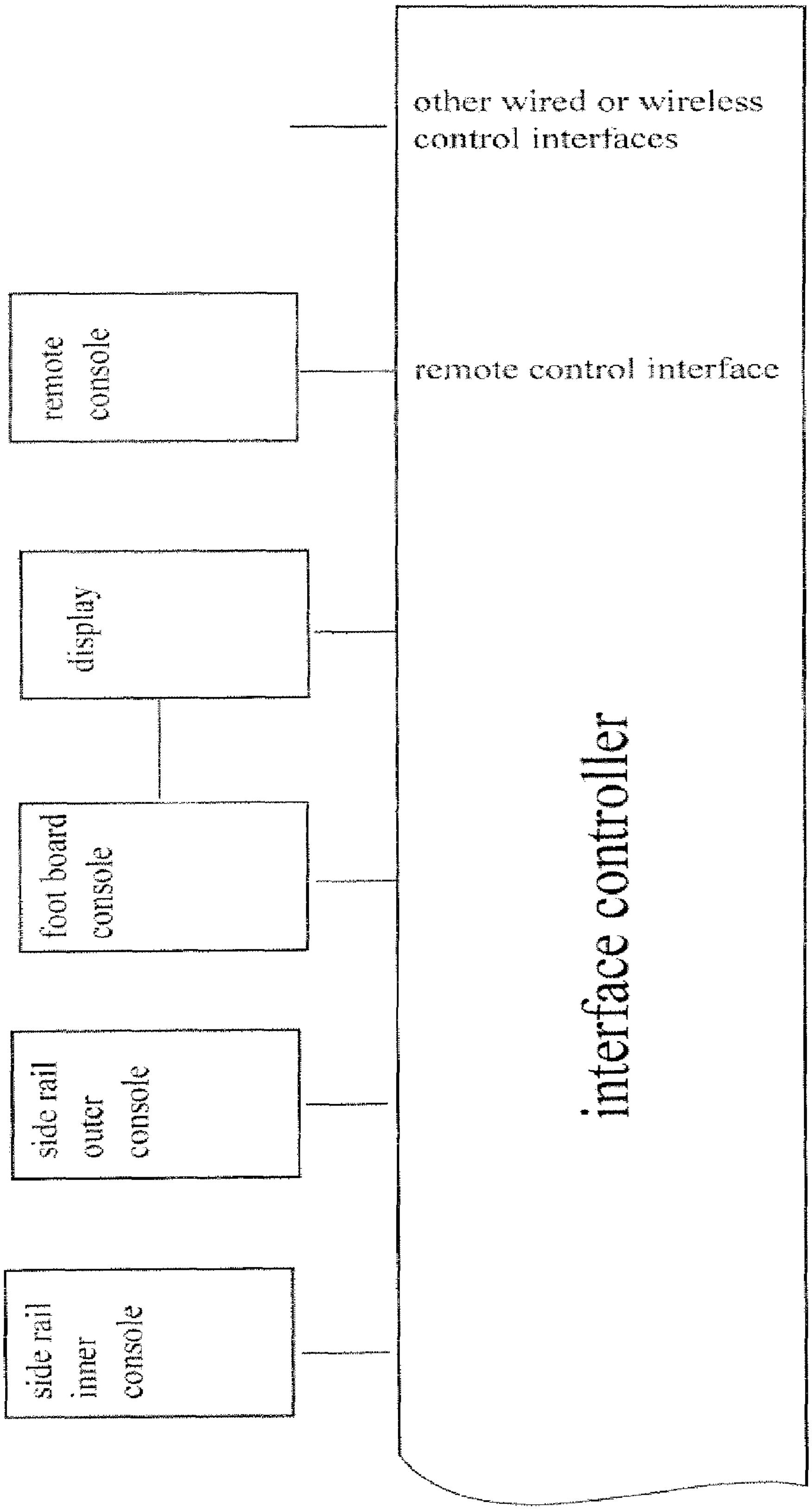
FIG. 97 illustrates an embodiment of an interface controller.

FIG. 97 schematically illustrates an embodiment of the user interface controller with a number of attached user interface consoles. The patient support can have a number of user-interface consoles each providing access to a certain set of patient support system functions. For example the patient support can have user interface consoles integrated into one or both of the side rails of the patient support providing easy access to certain patient support system functions to a supported person or a person at the side of the patient support.

Figure 2:
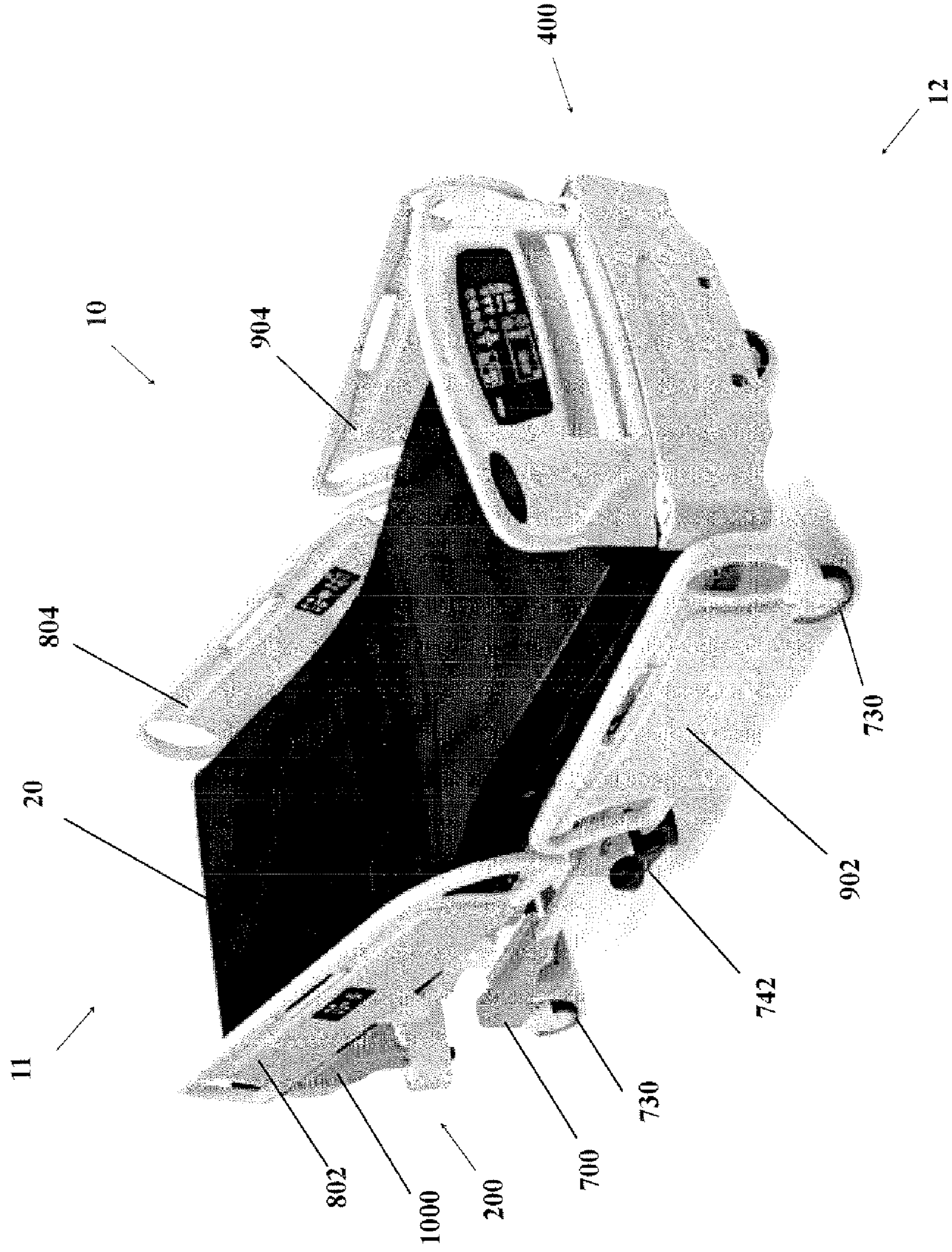
FIG. 2 illustrates another perspective view of a patient support according to an embodiment of the present invention.
Figure 3:
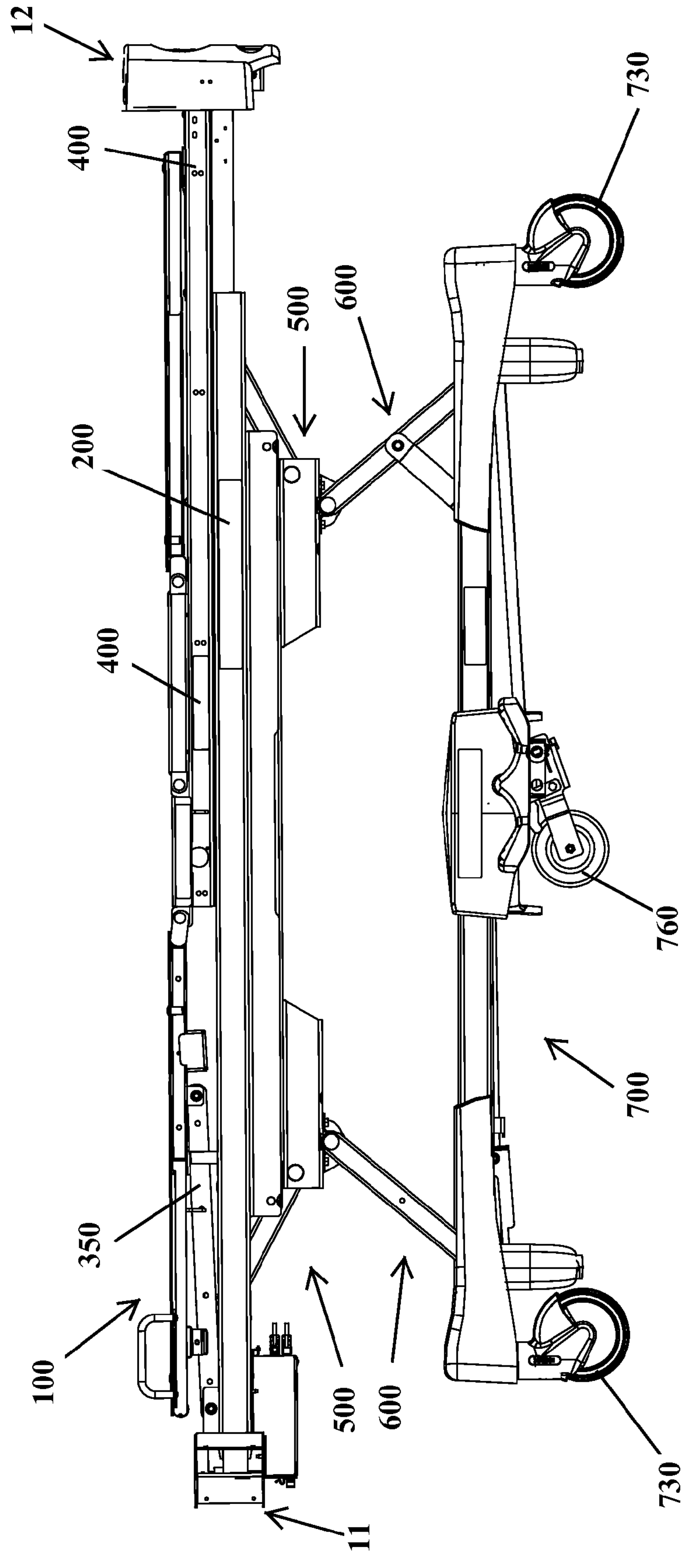
FIG. 3 is a lateral view of a patient support according to one embodiment of the present invention.
Figure 4:
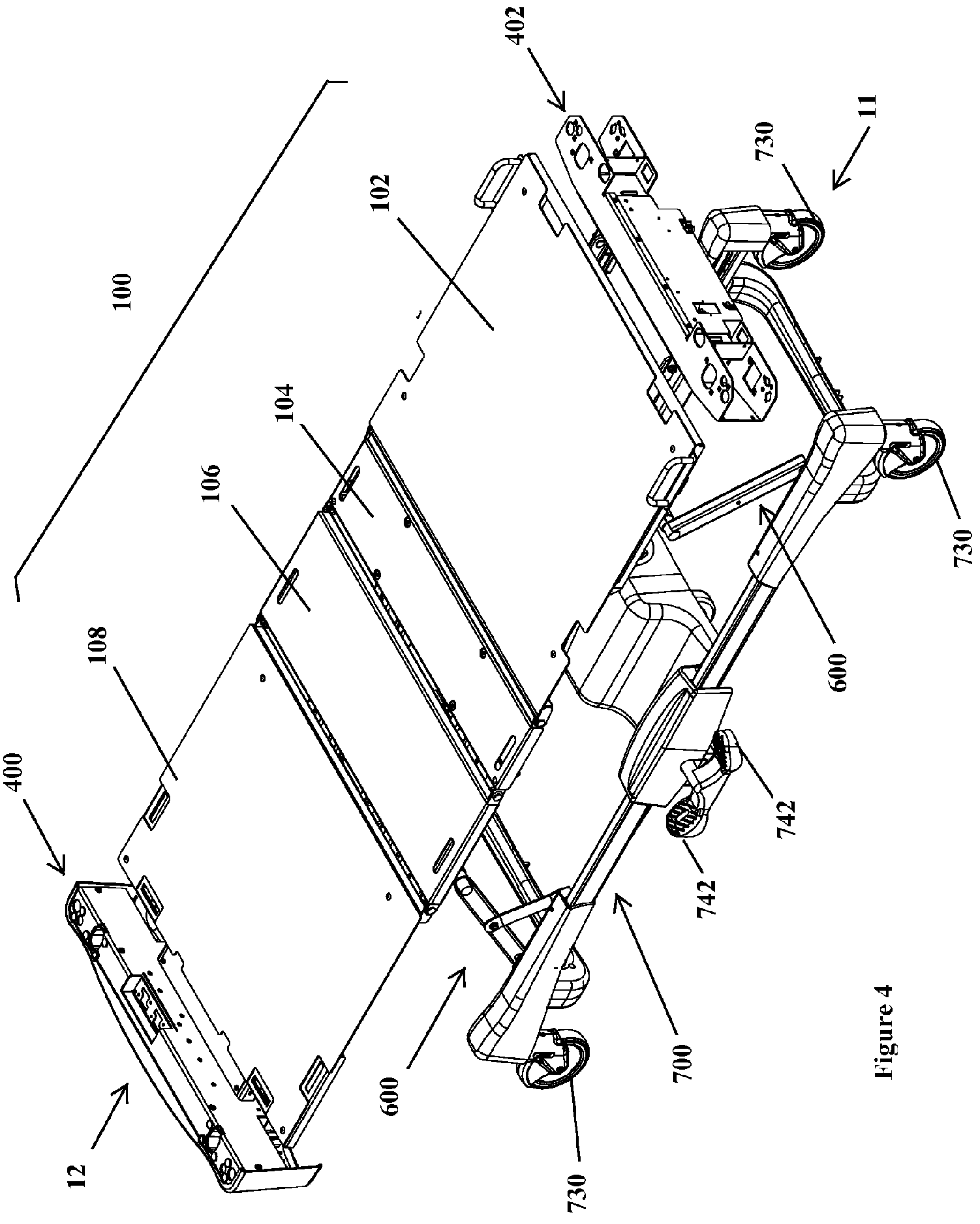
FIG. 4 is a perspective view of a patient support according to an embodiment of the present invention showing the lying surface support.
Figure 5:
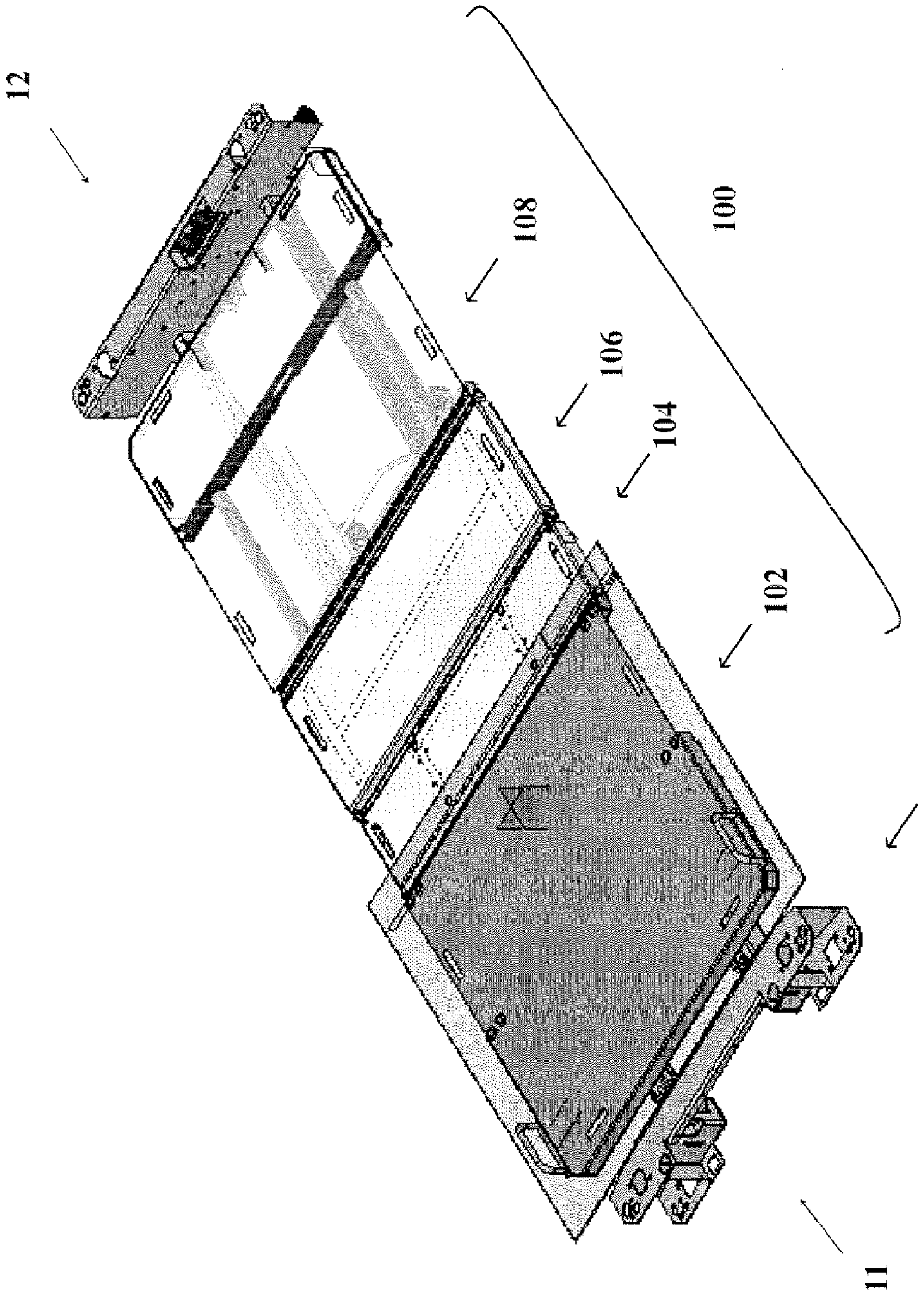
FIG. 5 is a perspective view of a lying surface support and part of a load frame and a mobile frame according to one embodiment of the present invention.

The patient support can also have a user interface console located at the foot or the head section of the patient support. Each such interface console may be integrated into a respective foot or head board of the patient support for example. A foot or a head interface console may provide access to a set of patient support system functions different from each other as well as different from the side rail consoles. There can be inner or outer side rail consoles intended for access from within or from outside of the patient support. An embodiment of a side rail interface console is illustrated in FIG. 82 and an embodiment of a foot board interface console is illustrated in FIG. 80. The foot board console can have a display system included. The display system can be a touch screen display or a simple passive display system with a separate input system as illustrated in FIG. 2. In addition the interface controller can have a remote control interface to which a remote console can be connected. The remote control interface can provide wired or wireless connection to a specialized or a general purpose computing device for example. A number of different bus systems and control protocols are available to communicate through the remote control interface as discussed previously and as would be known to a person skilled in the art. The interface controller may also provide a number of additional control or remote control interfaces.

In one embodiment the interface controller as well as the attached user interface consoles can have self-diagnosis features or provide an interface for access to diagnostic procedures. The interface controller may be able to provide a debugging mode for step-by-step execution of control commands or to query status information of the components or devices of the patient support system.

Figure 98:
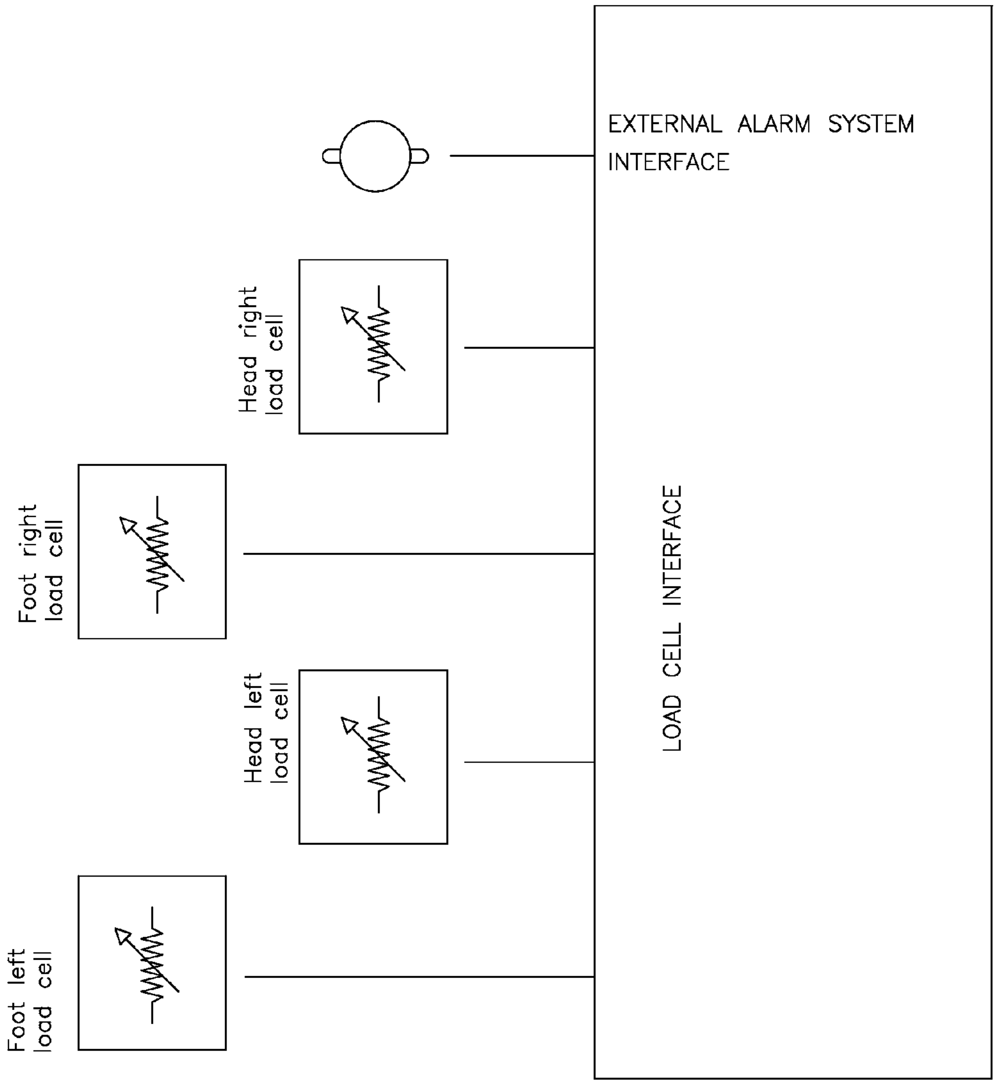
FIG. 98 illustrates an embodiment of a scale or weigh subsystem.

FIG. 98 illustrates a part of a scale subsystem according to one embodiment of the present invention. The scale subsystem can connect to a number of load sensors. The number of load sensors can be different from the ones illustrated. In this embodiment four load sensors which are capable of sensing pressure and can be calibrated to provide a measure of force or weight applied to each sensor are attached to the scale subsystem control interface. The scale subsystem controller can process signals incoming from the load cells and can be used to detect the status of a supported person. The scale control subsystem can be configured to provide a messaging signal or to alert monitoring personnel through an external alarm system interface for example. If each load cell is properly calibrated, the scale control subsystem can also provide a measure of the weight of a supported person. The information can be utilized to determine a person's mass or weight or the respective mass or weight and can also be used to record this information in another subsystem of the patient support that may be desired for patient monitoring for example.

In one embodiment, the scale subsystem may require occasional calibration depending on the nature of the chosen sensor technology. Access to the scale subsystem for calibration, monitoring or diagnostic purposes may be possible through the user interface as described in FIG. 97.

It is understood that any kind of diagnostic procedure also includes inspection of the corresponding component and that each component may provide a hardware interface for connection to a special purpose diagnostic device for diagnosing the component.

EXAMPLES

Some examples of how the communication system is used to interface with the patient support are provided.

Main Power Switch

The patient support is equipped with a main power switch located at the head end of the patient support. This power switch must be switched on in order to activate the patient support functions. Should this switch be turned off, or there is other interruption to the power, such as a power failure, the settings of the lockout controls and the calibration data of the Scale and the Patient Support Exit systems are preserved.

Brake/Steer Foot Pedal Control

The patient support is equipped with two lateral pedals secured to the middle section of the base frame member. The pedals control the brakes and the centrally-located drive wheel 760. The functions of the pedals are determined by the user pushing in a forward or backward motion; such forward or backward motion corresponding to either brake control or steering control as denoted by affixed labels. Neutral control is maintained by leaving the position of the brake in the middle.

The patient support is equipped with a central locking system engaged by either lateral brake/steer pedals. The system is toggled by fully depressing the pedal in the direction indicated by the affixed labels.

The patient support is equipped with a drive wheel 760 and is engaged by fully depressing the brake/steer pedal in the direction indicated by the affixed labels. The drive wheel 760 is centrally located under the base frame member and aids in guiding the patient support along a straight line and around corners.

Foley Bag Hook

Four Foley bag hooks are located on both sides of the patient support under the edges of the lying surface support head and seat sections. The Foley bag hooks move when the fowler is raised or lowered. The fowler motion is intended to be locked out when the Foley bag hooks are in use.

Patient Strap Locations

There are 12 locations on the lying surface support for installing patient restraint straps. Ten are located on the long edges of lying surface support directly across from each other. The other two are located along the head edge of the lying surface support.

Night Light

The patient support is equipped with an optional photo-electric night light to illuminate the floor area around the patient support. The light turns on as the ambient light dims.

CPR Emergency Release

The CPR emergency release system includes two handles located either side of the head section of the patient support. Pulling on either of the CPR emergency release handles will flatten the fowler and knee gatch, should either be raised. The handles can be disengaged at any time before the fowler or knee gatch have completely lowered. The fowler must be lowered completely by pulling on the CPR emergency release handles or the fowler down control in order to reset the fowler motor.

Nurse Call Usage System

The nurse call usage system includes a speakerphone and a nurse call button, both of which are integrated to the inner control panel of the head siderails. The communication between patient and nurse is established when (a) a patient presses the nurse call button; or (b) when the power to the nurse call usage system is interrupted.

Auxiliary Power Outlet Usage System

The patient support contains an auxiliary power outlet located at the foot end of the patient support. The outlet is integrated to a 5 Amp breaker.

Manual Siderail Control System

There are two sets of siderails located on either side of the patient support. The first set is located at the head end and the second is located at the foot end. The siderails may be raised to prevent a patient from inadvertently rolling off the patient support, or lowered to allow a patient to exit the patient support. A lever is attached to the lower portion of each siderail. Engaging said lever allows the siderail to raise or lower with the use of one hand. In the lowered position, the siderail may be pushed into the lying surface support.

Head and Foot Board System

The patient support includes a head board and a foot board, located at the head end of the patient support and the foot end of the patient support, respectively. Both head board and foot board can be removed by lifting the board out of mounting sockets that are located on the lying surface support. The foot board mounting socket contains an electrical socket for delivering power and information to the control panel located on the foot board. Removing the foot board will trigger a lockout of the system. The lockout can be deactivated where siderails have a control panel located on them.

Foot Board Control Panel System

The foot board contains a control panel system that controls the electrical functions of the patient support. The control panel is located on the outside of the foot panel, facing away from the patient support. The control panel contains the following functions: raise/lower fowler, raise/lower knee gatch, raise/lower patient support in Trendelenburg position (lying surface flat in an inclined position with head either above or below feet), cardiac chair position control, lockout controls for fowler and knee gatch, total lockout button, raise/lower patient support, Scale Control System controls, and Patient support Exit Control System controls.

Foot Board Controls: Scale System and Scale System Controls

The patient support optionally includes a scale system. The control functions are located on the foot board control panel. The scale system includes software, which can be of varying software versions. The scale system includes a power button that activates or deactivates the scale system separately from other electrical functions of the patient support. The scale system includes a zero function, which returns the scale measurement to zero when there is no patient occupying the patient support. The scale system includes several information and information tracking options. These include options for viewing current weight, viewing gain or loss in weight, viewing the reference weight used to measure gain or loss of weight, setting for changing equipment, changing patient weight, selecting unit weight. The scale system display will turn off automatically after one minute of idle time. The scale system remains active at all times except when the change equipment function is triggered. The scale will not operate if the angle of the patient support surpasses 12 degrees when in the Trendelenberg position. The scale equipment may be added or removed while the patient is in the patient support by selecting the change equipment option. The same weight that was displayed prior to changing equipment will display when the equipment is replaced.

Foot Board Controls: Patient support Exit Detection System

The patient support can optionally include a patient support exit detection system. The patient support exit control system includes a display panel that is located on the foot board control panel. The control panel includes an arming/disarming function button and display light that is activated when the patient support exit system is armed. The Arm/Disarm button arms or disarms the system. The scale system must be zeroed prior to arming the patient support exit detection system. The scale system triggers the patient support exit detection system when the system is armed and a patient exits the patient support. Upon the system being triggered, an alarm in the patient support will sound. If the patient support is equipped with a nurse call button, the alarm will sound at the nurse call station.

Foot Board Controls: Zone Control System

The patient support optionally includes a zone control system, which may replace the patient support exit system. The zone control system includes a display panel that is located on the foot board control panel. The control panel includes an arming/disarming function button, a zone control button, and display lights that correspond to a desired zone of detection. The Arm/Disarm button arms or disarms the system. The scale system must be zeroed prior to arming the zone control system. The zone control system has different levels of detection sensitivity, each of which can be selected by pressing the zone control button. When the first zone is selected, a patient can move freely in the patient support without triggering the zone control system; the system is triggered when a patient leaves the patient support. When the second zone is selected, a patient can make some movements, such as sitting up or rolling over, without triggering the zone control system; the zone control system is triggered when the patient attempts to exit the patient support. When the third zone is selected, any small movement by the patient triggers the zone control system. An alarm will sound at the patient support when zone control system is triggered. If the patient support is equipped with a nurse call button, the alarm will sound at the nurse call station.

Head Siderail Control Panel System

The siderails can optionally contain control panels for the electrical functions of the patient support. The control panels can be located on the inside or outside of the head siderail. The control panels on the inside and the outside of the siderails include the following functions: raise fowler (or head end of lying surface support), lower fowler, raise knee gatch, lower knee gatch, raise patient support, lower patient support. The control panels on the inside of the siderails can include the following additional functions: nurse call and optional communications package (includes controls for room lighting, reading light, and power and volume buttons for external television and radio systems).

Accessories System

The patient support can optionally include various accessories. These accessories include:

patient support extension;
oxygen bottle upright holder;
monitor tray;
2-stage folding fixed intravenous pole;
3-stage folding fixed intravenous pole;
removable anodized aluminum intravenous pole;
emergency crank;
padded siderail covers; and
two-function Curbell pendant control.

The disclosure of all patents, publications, including published patent applications, and database entries referenced in this specification are specifically incorporated by reference in their entirety to the same extent as if each such individual patent, publication, and database entry were specifically and individually indicated to be incorporated by reference. These publications include the Parts List (January 2006), the Operations Manual (December 2005), and the Maintenance Manual (December 2005) for the Model FL28EX, obtainable from Stryker Corporation, MI.

It is obvious that the foregoing embodiments of the invention are exemplary and can be varied in many ways. Such present or future variations are not to be regarded as a departure from the spirit and scope of the invention, and all such modifications, as would be obvious in the art, are intended to be included within the scope of the following claims.

What is claimed is:

1. A patient support structure comprising:

a base unit;

a plurality of lifts coupled to said base unit;

a frame secured to said plurality of lifts, said lifts configured to raise and lower the frame with respect to said base unit;

a patient lying surface coupled to said frame, said patient lying surface including a head section and a seat section;

an actuator for pivoting said head section with respect to said seat section;

a load sensor operatively coupled to the frame and adapted to output a signal indicative of a force exerted from said frame onto said load sensor;

a tilt sensor operatively coupled to said frame and adapted to output data representative of a tilt of said frame with respect to a direction of a force of gravity;

a controller in communication with said load sensor and said tilt sensor, said controller adapted to use said data from said tilt sensor to process said signal from said load sensor such that said controller is able to calculate a weight of a patient supported by said lying surface when said frame is tilted to different orientations;

a footboard having a touch screen display attached to the footboard, said touch screen display adapted to allow a person to control a plurality of aspects of said patient support structure; and a horizontal support bar connected to said footboard at a location lower than said control panel whereby a piece of hospital equipment may be mounted on said support bar without obstructing access to said control panel.

2. The patient support structure of claim 1 wherein said patient support structure includes a plurality of load sensors operatively coupled to said frame, and each said load sensor is adapted to output a signal to said controller indicative of a force exerted from said frame onto said respective load sensor, said controller adapted to use said data from said tilt sensor to process each of said signals from said plurality of load sensors such that said controller is able to calculate a weight of a patient when said frame is tilted to different orientations.

3. The patient support structure of claim 2 wherein said tilt sensor includes a gravitational accelerometer adapted to output a signal indicative of the tilt of said frame with respect to the force of gravity.

4. A patient support structure comprising:

a base unit;

a plurality of lifts coupled to said base unit;

a frame secured to said plurality of lifts, said lifts configured to raise and lower the frame with respect to said base unit;

a patient lying surface coupled to said frame, said patient lying surface including a head section and a seat section;

an actuator for pivoting said head section with respect to said seat section;

a load sensor operatively coupled to the frame and adapted to output a signal indicative of a force exerted from said frame onto said load sensor;

a tilt sensor operatively coupled to said frame and adapted to output data representative of a tilt of said frame with respect to a direction of a force of gravity;

a controller in communication with said load sensor and said tilt sensor, said controller adapted to use said data from said tilt sensor to process said signal from said load sensor such that said controller is able to calculate a weight of a patient supported by said lying surface when said frame is tilted to different orientations; and a detachable footboard able to be coupled to said frame, said detachable footboard including a control panel for controlling a plurality of functions of said patient support.

5. A patient support structure comprising:

base unit;

a plurality of lifts coupled to said base unit;

a frame secured to said plurality of lifts, said lifts configured to raise and lower the frame with respect to said base unit;

a patient lying surface coupled to said frame, said patient lying surface including a head section and a seat section;

an actuator for pivoting said head section with respect to said seat section;

a load operatively coupled to the frame and adapted to output a signal indicative of a force exerted from said frame onto said load sensor;

a tilt sensor operatively coupled to said frame and adapted to output data representative of a tilt of said frame with respect to a direction of a force of gravity;

a controller in communication with said load sensor and said tilt sensor, said controller adapted to use said data from said tilt sensor to process said signal from said load sensor such that said controller is able to calculate a weight of a patient supported by said lying surface when said frame is tilted to different orientations; and a detachable headboard able to be coupled to said frame, said detachable headboard including a concave inner surface oriented toward a patient lying surface.

6. The patient support structure of claim 2 further including a diagnostic system adapted to detect a fault with at least one of said actuator, said load sensor, said tilt sensor, and said plurality of lifts.

7. The patient support structure of claim 6 wherein said diagnostic system is further adapted to communicate said fault to a remote location via a network connection.

8. The patient support structure of claim 7 wherein said remote location is a facility where a technician is located who can analyze said detected fault and take appropriate corrective action.

9. A patient support structure comprising:

a base unit;

a plurality of lifts coupled to said base unit;

a frame secured to said plurality of lifts, said lifts configured to raise and lower the frame with respect to said base unit;

a patient lying surface coupled to said frame, said patient lying surface including a head section and a seat section;

an actuator for pivoting said head section with respect to said seat section;

a load sensor operatively coupled to the frame and adapted to output a signal indicative of a force exerted from said frame onto said load sensor;

a tilt sensor operatively coupled to said frame and adapted to output data representative of a tilt of said frame with respect to a direction of a force of gravity;

a controller in communication with said load sensor and said tilt sensor, said controller adapted to use said data from said tilt sensor to process said signal from said load sensor such that said controller is able to calculate a weight of a patient supported by said lying surface when said frame is tilted to different orientations; and a data logger adapted to record a number of movements of at least one of said plurality of lifts and said actuator.

10. The patient support structure of claim 1 further including a detachable headboard able to be coupled to said frame and a detachable footboard able to be coupled to said frame, both said detachable headboard and said detachable footboard being molded from plastic using a gas-assist injection molding process.

11. The patient support structure of claim 2 further including:

a plurality of user interfaces, each user interface adapted to allow a person to control a plurality of aspects of said patient support structure, a motor control board adapted to control movement of at least one of said actuator and said plurality of lifts; and a Controller Area Network electrically coupling each of said plurality of user interfaces to said motor control board whereby said user interfaces communicate with said motor control board over said Controller Area Network.

12. The patient support structure of claim 11 further including a sensor adapted to detect a vital sign of a patient supported on said patient support structure.

13. The patient support structure of claim 11 further including a plurality of movable patient support components and a control system adapted to detect if a patient on the patient support structure is in a position that would inhibit a movement of at least one of said plurality of movable patient support components.

14. The patient support structure of claim 1 further including a footboard having a touch screen display attached to the footboard, said touch screen display adapted to allow a person to control a plurality of aspects of said patient support structure.

15. The patient support of claim 4 further including a horizontal support bar connected to said footboard at a location lower than said control panel whereby a piece of hospital equipment may be mounted on said support bar without obstructing access to said control panel.

16. The patient support structure of claim 15 further including at least one additional control panel mounted to a siderail of said patient support structure.

17. The patient support structure of claim 16 further including a Controller Area Network (CAN) coupled between said at least one additional control panel and said control panel on said detachable footboard.

18. The patient support structure of claim 9 wherein said user interface includes at least one touch screen mounted to a footboard attached to said patient support structure.

19. The patient support structure of claim 18 further including a plurality of user interfaces, each of said user interfaces in said plurality of user interfaces being in electrical communication with each other via a Controller Area Network.

20. The patient support of claim 9 further including:

a plurality of siderails moveable between raised and lowered portions;

a plurality of sensors for detecting movement of said plurality of siderails between said raised and lowered positions; and wherein said data logger is further adapted to record a number of movements of at least one of said siderails.

21. The patient support structure of claim 2 further including a data logger adapted to record a number of movements of at least one of said plurality of lifts and said actuator.

* * * * *

UNITED STATES PATENT AND TRADEMARK OFFICE

CERTIFICATE OF CORRECTION

PATENT NO. : 7,472,439 B2
APPLICATION NO. : 11/362543
DATED : January 6, 2009
INVENTOR(S) : Guy Lemire et al.

It is certified that error appears in the above-identified patent and that said Letters Patent is hereby corrected as shown below:

Column 2
Line 24, insert --practice reduces access to the controls on footboards, damages foot controls and-- between "current" and "footboards"

Column 23
Line 59, "A(g)=(T/T2-0.5)/l2.5%" should be --"A(g)=(T1/T2-0.5)/12.5%"--

Column 24
Line 33, under Y output (g) "0.886" should be --0.866--

Column 27

Line 1, " $CG[Y]=\frac{LC(3)+LC(1)}{\frac{W}{100}}*H(Y)*0.01$ "

should be -- $CG[Y]=\frac{LC(3)+LC(0)}{\frac{W}{100}}*H(Y)*0.01$ --

Line 29, "interface" should be --interference--

Column 38
Line 63, add --.-- after "component"

UNITED STATES PATENT AND TRADEMARK OFFICE

CERTIFICATE OF CORRECTION

PATENT NO. : 7,472,439 B2
APPLICATION NO. : 11/362543
DATED : January 6, 2009
INVENTOR(S) : Guy Lemire et al.

It is certified that error appears in the above-identified patent and that said Letters Patent is hereby corrected as shown below:

Column 39
Line 6, "susbsystem" should be --subsystem--

Column 46
Claim 5, Line 9, insert --a-- before "base unit;"
Claim 5, Line 18, insert --sensor-- before "operatively"

Signed and Sealed this

Fourteenth Day of April, 2009

JOHN DOLL
*Acting Director of the United States Patent and Trademark Office*